United States Patent
McDaniel

(10) Patent No.: US 12,232,498 B2
(45) Date of Patent: Feb. 25, 2025

(54) ANTI-VIRAL PAINTS AND COATINGS AND ARTICLES COMPRISING SAME

(71) Applicant: REACTIVE SURFACES LTD., LLP, Austin, TX (US)

(72) Inventor: Claude Steven McDaniel, Austin, TX (US)

(73) Assignee: REACTIVE SURFACES LTD., LLP, Austin, TX (US)

(*) Notice: Subject to any disclaimer, the term of this patent is extended or adjusted under 35 U.S.C. 154(b) by 0 days.

(21) Appl. No.: 18/452,079

(22) Filed: Aug. 18, 2023

(65) Prior Publication Data

US 2024/0016160 A1 Jan. 18, 2024

Related U.S. Application Data

(63) Continuation of application No. 17/541,060, filed on Dec. 2, 2021, now Pat. No. 11,980,192, which is a continuation of application No. 17/378,585, filed on Jul. 16, 2021, now Pat. No. 11,304,420, which is a continuation of application No. 17/037,415, filed on Sep. 29, 2020, now Pat. No. 11,102,983, which is a continuation-in-part of application No. 16/266,096, filed on Feb. 3, 2019, now abandoned.

(60) Provisional application No. 63/036,480, filed on Jun. 9, 2020.

(51) Int. Cl.
*A01N 63/40* (2020.01)
*A01N 25/10* (2006.01)
*A01N 63/50* (2020.01)

(52) U.S. Cl.
CPC ............ *A01N 63/40* (2020.01); *A01N 25/10* (2013.01); *A01N 63/50* (2020.01)

(58) Field of Classification Search
None
See application file for complete search history.

(56) References Cited

U.S. PATENT DOCUMENTS

| | | |
|---|---|---|
| 5,646,014 A | 7/1997 | Hara |
| 5,770,188 A | 6/1998 | Hamade |
| 5,879,440 A | 3/1999 | Sau |
| 5,885,782 A | 3/1999 | Edwards |
| 6,858,581 B2* | 2/2005 | Kuhner .................. A61P 31/04 530/300 |
| 2011/0224131 A1* | 9/2011 | McDaniel ................ C09D 5/14 106/18.32 |

OTHER PUBLICATIONS

Carvaho et al., Evaluation of Phi6 Persistence and Suitability as an Enveloped Virus Surrogate, Environmental Science & Technology, Jun. 2017, pp. 8692-8700, vol. 51, American Chemical Society, United States.
Prussin II et al., Survival of the Enveloped Virus Phi6 in Droplets as a Function of Relative Humidity, Absolute Humidity, and Temperature, Applied and Environmental Microbiology, Jun. 2018, pp. 1-10, vol. 84-issue 12, American Society for Microbiology, United States.

* cited by examiner

*Primary Examiner* — Alton N Pryor
(74) *Attorney, Agent, or Firm* — Kilpatrick Townsend & Stockton LLP

(57) ABSTRACT

Disclosed herein are material composition formulated for mitigating activity of a virus on a surface of an article. Methods of preparing such a material composition are also disclosed.

35 Claims, 1 Drawing Sheet
Specification includes a Sequence Listing.

| Control | Lipase | AMP7 | Lipase + AMP7 |
|---|---|---|---|
| 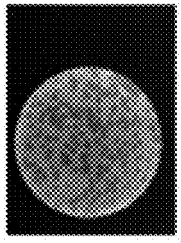 | 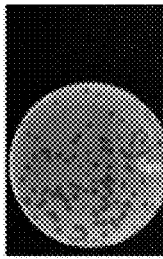 | 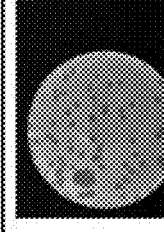 | 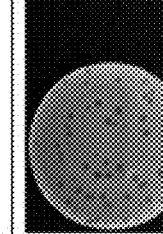 |
| 260 plaques | 142 plaques | 71 plaques | 53 plaques |
| N/A | 45.4% reduction | 72.7% reduction | 79.6% reduction |

ANTI-VIRAL PAINTS AND COATINGS AND ARTICLES COMPRISING SAME

RELATED APPLICATIONS

This application is a continuation of U.S. Non-provisional application Ser. No. 17/541,060 filed Dec. 2, 2021, which is a continuation of U.S. Non-provisional application Ser. No. 17/378,585 filed Jul. 16, 2021, now U.S. Pat. No. 11,304, 420, entitled "ANTI-VIRAL PAINTS AND COATINGS AND ARTICLES COMPRISING SAME," which is a continuation of U.S. Non-provisional application Ser. No. 17/037,415 filed Sep. 29, 2020, now U.S. Pat. No. 11,102, 983, entitled "ANTI-VIRAL PAINTS AND COATINGS AND ARTICLES COMPRISING SAME," which claims priority to U.S. Provisional Application No. 63/036,480 filed Jun. 9, 2020 entitled "ANTI-VIRAL PAINTS AND COATINGS AND ARTICLES COMPRISING SAME," and is a continuation-in-part to U.S. Non-provisional application Ser. No. 16/266,096 filed Feb. 3, 2019 entitled "ANTI-VIRAL PAINTS AND COATINGS AND ARTICLES COMPRISING SAME," all of which are incorporated herein in their entirety by reference.

BACKGROUND OF THE INVENTION

Field of the Invention

The composition may comprise a polymeric material such as a coating, a plastic, an elastomer, a composite, a laminate, an adhesive, or a sealant; a surface treatment such as a textile finish or a wax, that comprises a bio-based anti-viral preservative such as an active enzyme or peptide that mitigates viral activity on surfaces or articles.

B. Description of the Related Art

A polymeric material such as a plastic, an elastomer, a composite, or a laminate, comprises a molecular polymer often to form a shaped material typically for a consumer or an industrial product. Antimicrobial compounds (i.e., biocides, fungicides, algaecides, mildewcides, etc.) are currently available and approved for use in the U. S./NAFTA, Europe, and the Asia Pacific region for use with a material formulation such as a polymeric material, a surface treatment. The surface of the polymeric material may be subject to addition of a surface treatment such as a coating, an adhesive, a sealant, a textile finish, and/or a wax, with a surface treatment typically used, for example, to protect, decorate, attach, and/or seal a surface and/or the underlying material. A polymeric material may comprise a surface treatment, such as in the case of a coating comprising a polymer. An example of use of such items comprises a coating such as paint comprising a preservative for in-can preservation from microbial infestation prior to forming a solid protective, decorative, or functional adherent film on a surface of a plastic article.

A biomolecule comprises a molecule often produced and isolated from an organism, such as an enzyme which catalyzes a chemical reaction. An example are lysozymes, which have widespread distribution in animals and plants. A lysozyme serves as a "natural antibiotic" protecting fluids and tissues that are rich in potential food for bacterial growth, such as an egg white. As a part of the innate defense mechanism, lysozyme may be found in many mammalian secretions and tissues, saliva, tears, milk, cervical mucus, leucocytes, kidneys, etc. An example of an enzyme comprises a lipolytic enzyme (e.g., a lipase) that catalyzes a reaction on a lipid substrate, such as a component of a biological cell or virus.

SUMMARY OF THE INVENTION

In general, the invention features a material composition for mitigating activity of a virus on a surface (e.g., a coating) formed from the material composition where the material composition comprises a lipolytic enzyme and a peptide dispersed within a coating material or paint in respective sufficient quantities to mitigate activity of a virus that comes into contact with a surface formed from the material composition, were such mitigation can be assessed as a function of activity of the virus itself, by activity of an analog of the virus or a combination thereof.

Further embodiments provide a method for mitigating activity of a virus on a surface (e.g., a coating) formed from an anti-viral material composition where the method comprises preparing a polymeric material by admixing a lipolytic enzyme and a peptide within a coating or paint to provide the anti-viral material composition and forming a film of such anti-viral material composition on the surface of the article, wherein the lipolytic enzyme and a peptide are dispersed within polymeric material (e.g., a coating material or paint) in respective sufficient quantities to mitigate activity of a virus that comes into contact with a surface formed from the anti-viral material composition.

In certain embodiments, the lipolytic enzyme is at least one selected from a lipase, a phospholipase A, a phospholipase C, and a lysophospholipase. In some aspects, the peptidase is at least one selected from a thermolysin, a trypsin, a chymotrypsin, and a chymosin. In other aspects, the saccharidase is at least one selected from a glycosidase, a beta mannanase, an endo mannanase, an alpha amylase, and a glucoamylase. In other embodiments, the reactive oxygen based compound producing biomolecule is at least one selected from a lactoferrin, a peroxidase, a glycose oxidase, and a laccase. In further embodiments, the cell wall disrupting biomolecule is at least one selected from a lysozyme, a polygalacturonase, an endo glucanase, a beta glucanase, a cellulase, a beta-mannosidase, and a nisin. In certain aspects, the biomolecule that disrupts a component of a microbe produced biofilm is an alginate lysase. In some embodiments, the antibiological peptidic biomolecule (e.g., a peptide) is at least one selected from AMP-6 (SEQ ID no. 34), AMP-7 (SEQ ID no. 40), SEQ ID no. 41, a melittin, and a duramycin. In some embodiments, the antibiological peptidic biomolecule is at least one selected from AMP-6 (SEQ ID no. 34), AMP-7 (SEQ ID no. 40), SEQ ID no. 41, AMP-LKLK (SEQ ID no. 200), a melittin, and a duramycin.

In other embodiments, the antibiological composition further comprises at least one non-biologically based antibiological substance selected from a preservative, an antimicrobial agent for a polymeric material, and a chelator. In particular facets, the chelator is EDTA.

In some embodiments, the virus (e.g., an enveloped virus) whose activity is mitigated by material composition in accordance with embodiments of the disclosures made herein may include a DNA virus such as a Herpesviridae ("herpesviruses"), a Poxviridae ("poxviruse"), and/or a Baculoviridae ("baculooviruses"); an RNA virus such as a Flaviviridae ("flavivirus"), a Togaviridae ("togavirus"), a Coronaviridae ("coronavirus"; e.g., Severe Acute Respiratory Syndrome—"SARS"), a Deltaviridae ("deltavirus"; e.g., Hepatitis D), an Orthomyxoviridae ("orthomyxovirus"), a Paramyxoviridae ("paramyxovirus"), a Rhabdoviridae ("rhabdovirus"), a Bunyaviridae ("bunyavirus"), a Filoviridae ("filovirus"), and/or a Reoviridae ("Reovirus"); a retrovirus such as a Retroviridae ("retroviruses"), and/or a Hepadnaviridae ("hepadnavirus"); or a combination thereof.

In certain embodiments, the antibiological agents include at two to thirty antibiological agents, including any intermediate range (i.e., integer) or combination thereof. In certain embodiments, the antibiological agents include at three antibiological agents, wherein the at least three antibiological agents include at least one cell wall disrupting biomolecule and at least one reactive oxygen based compound producing biomolecule. In particular aspects the at least one cell wall disrupting biomolecule includes at least one of a lysozyme and a nisin. In other aspects, the at least one reactive oxygen based compound producing biomolecule includes at least one of a glucose oxidase and a horseradish peroxidase. In some facets, the antibiological agents are SEQ ID no. 40, a lysozyme, a glucose oxidase and an alginate lyase. In other facets, the antibiological agents are a nisin, a lysozyme, and a horseradish peroxidase in combination with ethylenediaminetetraacetic acid ("EDTA") and 4-aminobenzamidine dihydrochloride ("ABHCl").

In further embodiments, a polymeric material in accordance with embodiments of the disclosures made herein is a liquid coating that is used to form a cured film layer.

In other embodiments, a polymeric material in accordance with embodiments of the disclosures made herein undergoes curing to produce a cured polymeric material, and wherein the cured film layer of the polymeric material retains the anti-viral activity of the antibiological agents in a sufficient amount to mitigate activity of one or more viruses in contact with a cured film layer of the polymeric material.

BRIEF DESCRIPTION OF THE DRAWINGS

FIG. 1 is a set of visual microscopy images showing results of evaluated control and anti-viral coating compositions on infective enveloped virus particles.

DETAILED DESCRIPTION OF THE EMBODIMENTS

For a further understanding of the nature and function of the embodiments, reference should be made to the following detailed description. Detailed descriptions of the embodiments are provided herein, as well as, the best mode of carrying out and employing the present invention. It will be readily appreciated that the embodiments are well adapted to carry out and obtain the ends and features mentioned as well as those inherent therein. It is to be understood, however, that the present invention may be embodied in various forms. Therefore, specific details disclosed herein are not to be interpreted as limiting, but rather as a basis for the claims and as a representative basis for teaching to employ the present invention in virtually any appropriately detailed system, structure or manner. Other features will be readily apparent from the following detailed description; specific examples and claims; and various changes, substitutions, other uses and modifications that may be made to the embodiments disclosed herein without departing from the scope and spirit of the invention or as defined by the scope of the appended claims.

It should be understood that a preservative(s), biomolecule composition(s), coating(s), paint(s), polymeric material(s), material formulation(s), compound(s), method(s), procedure(s), and technique(s) described herein are presently representative of various embodiments. These techniques are intended to be exemplary, are given by way of illustration only, and are not intended as limitations on the scope. All patents and publications mentioned in this specification are herein incorporated by reference to the same extent as if each individual publication was specifically and individually indicated to be incorporated by reference. U.S. patent application Ser. Nos. 14/097,128, 12/696,651, 12/474,921, 12/243,755, and 10/884,355 and U.S. Provisional Patent Application Nos. 62/626,044, 61/148,502, 61/057,705, 61/058,025; 60/485,234, 60/976,676, and 60/409,102 are each specifically incorporated by reference.

As used herein other than the claims, the terms "a," "an," "the," and/or "said" means one or more. As used herein in the claim(s), when used in conjunction with the words "comprise," "comprises" and/or "comprising," the words "a," "an," "the," and/or "said" may mean one or more than one. As used herein and in the claims, the terms "having," "has," "is," "have," "including," "includes," and/or "include" has the same meaning as "comprising," "comprises," and "comprise." As used herein and in the claims "another" may mean at least a second or more. As used herein and in the claims, "about" refers to any inherent measurement error or a rounding of digits for a value (e.g., a measured value, calculated value such as a ratio), and thus the term "about" may be used with any value and/or range.

The phrase "a combination thereof" "a mixture thereof" and such like following a listing, the use of "and/or" as part of a listing, a listing in a table, the use of "etc." as part of a listing, the phrase "such as," and/or a listing within brackets with "e.g.," or "i.e.," refers to any combination (e.g., any sub-set) of a set of listed components, and combinations and/or mixtures of related species and/or embodiments described herein though not directly placed in such a listing are also contemplated. For example, compositions described as an preservative suitable for use in a coating described in different sections of the specification may be claimed individually and/or as a combination, as they are part of the same genera of preservative (e.g., a coating preservative). Such related and/or like genera(s), sub-genera(s), specie(s), and/or embodiment(s) described herein are contemplated both in the form of an individual component that may be claimed, as well as a mixture and/or a combination that may be described in the claims as, for example, "at least one selected from," "a mixture thereof" and/or "a combination thereof."

In various embodiments described herein, exemplary values are specified as a range, and all intermediate range(s), subrange(s), combination(s) of range(s) and individualj value(s) (e.g., an integer, a fraction, etc.) within a cited range are contemplated and included herein. For example, citation of a range "0.03% to 0.07%" provides specific values within the cited range, such as, for example, 0.03%, 0.04%, 0.05%, 0.06%, and 0.07%, as well as various combinations of such specific values, such as, for example, 0.03%, 0.06% and 0.07%, 0.04% and 0.06%, and/or 0.05% and 0.07%, as well as sub-ranges such as 0.03% to 0.05%, 0.04% to 0.07%, and/or 0.04% to 0.06%, etc. In another example, a range of "0.0001% to 20.0%" provides specific values and sub-ranges such as "8.5%," and "11.3 to 18.9%." Example 40 provides additional descriptions of specific numeric values within any cited range that may be used for an integer, intermediate range(s), subrange(s), combinations of range(s) and individual value(s) within a cited range, including in the claims.

Some terms often have different meanings for different material types and/or uses being described, and the meaning applicable to the material should be applied as appropriate in the context, as understood in the applicable art. For example, in the context of a polymeric material, other than a coating, a "film" ("polymeric film") of a polymeric material refers to a planar form (i.e., a large width and large length relative to thickness) capable of being flexed, creased without cracking, folded, or a combination thereof, while being self-supporting (e.g., a plastic wrap), though such a film may also be treated with a surface treatment (e.g., coated with a coating). A polymeric film comprises from about 5 µm to about 250 µm thick (e.g., about 10 µm to about 180 µm thick), while a plastic sheet ("sheeting") refers to a planar form having a thickness of about 250 µm to about 250 mm thick. Thus, a "film," for example, in the plastic art being described and/or claimed in the context of a plastic differs in composition, meaning, manufacture process, function and/or purpose than a "film" in a coating (e.g., a paint) art. In another example, a "cell" in a biological art refers to the smallest unit of living matter, while a "cell" in a polymeric material art (e.g., a plastic art, an elastomer art) refers to a void in a polymeric material to produce a solid foam material (e.g., a plastic foam, an elastomer foam material). A surface comprises the outer layer of any solid object. The term "substrate," in the context of a coating, may be synonymous with the term "surface." However, as "substrate" has a different meaning in the art of enzymology, a chemical that undergoes an accelerated chemical reaction upon contact with an enzyme, the term "surface" may be preferentially used herein for clarity. In such instances, the appropriate definition and/or meaning for the term should be applied in accordance with the context of the term's use in light of the present disclosures.

In many embodiments, the compositions and methods herein may produce materials ("material formulations") (e.g., compositions, manufactured articles, etc) with a bioactivity. The disclosures herein describe various embodiments where a biomolecule's activity (e.g., an enzyme's catalytic reaction, a peptide's antimicrobial activity) may be conferred to a material via incorporation of a biomolecule into and/or upon the surface of the material to confer a property to a material, alter a property of a material, and/or maintain a property of a material.

As used herein, a biomolecule ("biomolecule composition," "biomolecular composition") refers to a molecule (e.g., a compound) typically synthesized in living organisms, with examples of such biomolecules including but not limited to, an amino acid, a proteinaceous molecule (e.g., an enzyme, an antibody, a receptor, a transport protein, structural protein, an antibiological proteinaceous molecule), a nucleotide, a nucleic acid, a saccharide (e.g., a sugar), a polysaccharide, a lipid, a colorant (e.g., a chlorophyll), or a combination thereof. A biomolecule typically comprises one or more chemical moiety(s) ["specie(s)," "group(s)," "functionality(s)," "functional group(s)"] such as an amine, a carboxylic acid, a hydroxyl, an ester, a double bond, etc. that may be chemically reactive (e.g., reacted with a coupling agent) and/or acted upon contact with another biomolecule (e.g., an enzyme that acts on a hydroxyl moiety). An enzyme refers to a proteinaceous molecule that possesses the ability to accelerate a chemical reaction, typically acting one or more biomolecule(s) (e.g., a lipid, a proteinaceous molecule, a polysaccharide, etc.). As used herein a "proteinaceous molecule," proteinaceous composition," and/or "peptidic agent" comprises a polymer formed from one or more amino acid(s), such as a peptide (i.e., about 3 to about 100 amino acids), a polypeptide (i.e., about 101 or more amino acids, such as about 50,000 or more amino acids), and/or a protein. As used herein a "protein" may comprise a proteinaceous molecule comprising a contiguous molecular sequence three amino acids or greater in length, matching the length of a biologically produced proteinaceous molecule encoded by the genome of an organism.

In some embodiments, a biomolecule composition comprises a biomolecule (e.g., an enzyme, a peptide) that acts upon a lipid (e.g., a lipolytic enzyme), a protein (e.g., a peptidase, a protease), a polysaccharide (e.g., a polysaccharidase), a cell wall (e.g., a lysozyme), or a combination thereof, to confer an antibiological agent property to a material formulation (e.g., a coating), a manufactured article, a device, a composition, etc. Various such biomolecules described herein or as would be known to one of ordinary skill in the art in light of the present disclosures, including those having an antibiological property, may be used.

In the context of a biomolecule composition, active or bioactive refers to the effect of biomolecule, such as to retain function upon and/or within a material formulation. In one example, a coating stored in container a bioactive enzyme to accelerate a chemical reaction (e.g., degrading a biomolecule from a living cell to produce an antibiological activity) within or upon the body of the coating differentiating such activity from a like ability of a coating that does not comprise an enzyme to accelerate a chemical reaction. An effective amount refers to a concentration of component (e.g., a biomolecule composition) of a material formulation capable of exerting a desired effect (e.g., an antibiological activity).

Examples of a material formulation that may comprise a biomolecule composition include a polymeric material, a surface treatment, a filler, or a combination thereof. For example, in many preferred embodiments, a biomolecule composition, may confer a property to, alter a property of and/or maintain a property of, a material formulation. Examples of a property that may be conferred, altered and/or maintained include resistance to a microorganism, resistance to biodegradation, enzymatic activity upon contact with a substrate of an enzyme, resistance to aging, consistent performance sustained over an extended period of time (e.g., service life), or a combination thereof. Numerous examples of component(s) (e.g., polymers, binders, liquid components, additives, coloring agents, etc.) of that are combined to prepared certain material formulations (e.g., a coating, a polymeric material) are described herein, and inclusion of a biomolecule composition may confer, alter and/or maintain a property to such a component, and may also confer, alter, and/or maintain such a property in later prepared material formulation comprising such a component.

In preferred embodiments, the biomolecule composition is an antibiological agent, which as used herein refers to a biomolecule composition possessing an antibiological activity that may be conferred to a material formulation. An antibiological agent may act by treating an infestation, preventing infestation, inhibiting infestation (e.g., preventing cell attachment), inhibiting growth, preventing growth, lysing, and/or killing; a biological entity such as a cell and/or a virus (e.g., one or more genera and/or species of a cell and/or a virus). Thus, some embodiments comprise a process for treating an infestation, preventing infestation, inhibiting infestation (e.g., preventing cell attachment), inhibiting growth, preventing growth, lysing, and/or killing a cell and/or a virus (e.g., a fungal cell, a bacterial cell) comprising contacting the cell and/or the virus with a material formulation (e.g., a paint, a coating composition, a biomolecule composition) comprising at least one biomolecule composition (e.g., a biologically produced molecule and/or based on molecule based on biochemistry such as a chemically synthesized peptide). Possible modes of action by which an antibiological agent exert their effect(s) (e.g., an inhibitory effect, a fungicidal effect), may include, for example, destabilizing a cellular (e.g., a fungal cell) membrane (e.g., perturb membrane functions responsible for osmotic balance); a disruption of macromolecular synthesis (e.g., cell wall biosynthesis) and/or metabolism; disruption of appressorium formation; damage to one or more biomolecule component(s) of a biological cell or virus (e.g., via production of a toxin such as an reactive oxygen species), or a combination thereof. (see, for example, Fiedler, et al., *J. Chem. Technol. Biotechnol.,* 32:271-280, 1982; Isono, K. and S. Suzuki. *Heterocycles* 13:333-351, 1979; Zasloff, M. *Proc. Natl. Acad. Sci. USA* 84:5449-5453, 1987; U.S. patent application Ser. No. 10/601,207).

An antibiological agent (e.g., an antimicrobial agent, an antifouling agent) may act on a biological entity such as a biological cell and/or a biological virus, such as for example a biological entity that contacts (e.g., a surface contact, an internal incorporation, an infiltration, an infestation) a material formulation. Examples of a cell include a prokaryotic cell and/or an eukaryotic cell. In some embodiments, an antibiological agent functions by binding a biomolecule of a biological entity to disrupt the function of the biomolecule, such as, for example an enzyme cleaving a cellular biomolecule important in adherence to a surface; a peptide associating with and disrupting a cellular membrane important in metabolic function and/or the physical integrity of a cell; etc. In many embodiments, a cellular component such as component of a cell wall, a viral component (e.g., a viral proteinaceous molecule), and/or a cellular membrane may comprise a target of an antibiological agent. Examples of such a cell wall, a viral proteinaceous molecule, and/or a cellular membrane biomolecule component includes a peptidoglycan, a pseudopeptidoglycan, a teichoic acid, a teichuronic acid, a cellulose, a neutral polysaccharide, a chitin, an argarose, a mannin, a glucan, a proteinaceous molecule, a lipid (e.g., a phospholipid), or a combination thereof. For example, many proteinaceous molecule(s) have antibiological properties, such as an antibiological peptide, antibiological polypeptide, an antibiological enzyme, and/or an antibiological protein. In a further example, a lipolytic enzyme such as a phospholipase and/or an antimicrobial peptide that acts to compromise the integrity of a cell membrane, may allow ease of access for one or more enzyme(s) that degrade a cell wall component, and/or allow ease of access for non-biomolecule antibiological composition (e.g., a preservative) to act as well. For the purposes of preparing and using an active antibiological agent (e.g., an antifungal agent), used in a material formulation (e.g., a paint, a coating composition), it may not be necessary to understand the mechanism by which the desired antibiological (effect is exerted on a cell and/or a virus).

In some aspects, such an antibiological agent may possess a biocidal and/or a biostatic activity. For example, an antimicrobial and/or an antifouling enzyme may act as a biocide and/or a biostatic. In some embodiments, an antibiological agent may inhibit growth of a cell and/or a virus, which refers to cessation and/or reduction of cell (e.g., a fungal cell) and/or viral proliferation, and can also include inhibition of expression of cellularly produced proteins in a static cell colony. For example, a coating comprising an antimicrobial agent may act against a microbial cell and/or a virus adapted for growth in a non-marine environment and/or does not produces fouling; while a coating comprising an antifouling agent may act against a marine cell that produces fouling. In some embodiments, an antibiological agent may not possess antifouling properties, and vice versa. In another example, a virus may be a target of such an antibiological agent, as the virus (e.g., a membrane enveloped virus) may comprise a biomolecule target of an antibiological agent (e.g., an enzyme, an antibiological proteinaceous molecule such as a peptide).

In a further example, a biomolecule composition possessing an antibiological activity (e.g., biocidal activity, biostatic activity, etc.) may be incorporated separately into one or more components of surface treatment (e.g., a coating, a textile finish) and confer antibiological activity to those components prior to, during, and/or after admixing to form a surface treatment. That prepared material formulation of a surface treatment in many embodiments will also possess antibiological activity conferred from the biomolecule composition during storage (e.g., in-can coating storage). In another example, a biomolecule composition possessing an antibiological property may be admixed with the material formulation with or without prior incorporation of a biomolecule composition to one or more components of the material formulation. In an additional example, the surface of a manufactured article, a device, a material formulation, etc., having a material formulation comprising a biomolecule composition (e.g., a surface treatment) applied to the surface would also possess such property(s), such as for example a cured film possessing antibiological property to protect the film and/or material the film whose surface the film is adhered. Thus, in many preferred embodiments, a material formulation may comprise an antibiological agent by being formulated, prepared, processed, post-cured processed, manufactured, and/or applied (e.g., applied to a surface), in a fashion to be suitable to possess an antibiological activity and/or function (e.g., an antimicrobial activity, an antifouling activity).

In other embodiments, a biomolecule composition may possess a self-cleaning bioactivity, and may confer such a self-cleaning property to a material formulation comprising such a biomolecule composition. As used herein, self-cleaning bioactivity includes conversion of a chemical (e.g., a biomolecule) into a product that is less adherent (e.g., easier to remove with washing), and/or retards infestation (e.g., adherence to a surface, growth upon a surface) of a biological entity (e.g., a biological cell, a virus). In many embodiments, a biomolecule composition possesses one of or both antibiological and self-cleaning property(s).

In various embodiments, a target cell and/or a target virus may be capable of infesting an inanimate object (e.g., a building material, an indoor structure, an outdoor structure). An "inanimate object" refers to structures and objects other than a living cell (e.g., a living organism). Examples of an inanimate object include an architectural structure that may comprise a painted and/or an unpainted surface such as the exterior wall of a building; the interior wall of a building; an industrial equipment; an outdoor sculpture; an outdoor furniture; a construction material for indoor and/or outdoor use such as a wood, a stone, a brick, a wall board (e.g., a sheetrock), a ceiling tile, a concrete, an unglazed tile, a stucco, a grout, a roofing tile, a shingle, a painted and/or a treated wood, a synthetic composite material, a leather, a textile, or a combination thereof. Such an inanimate object (e.g., a plastic building material, a wood coated with a surface treatment) may comprise a material formulation. Examples of a building material includes a conventional and/or a non-conventional indoor and/or an outdoor construction and/or a decorative material, such as a wood; a sheet-rock (e.g., a wallboard); a paper and/or vinyl coated wallboard; a fabric (e.g., a textile); a carpet; a leather; a ceiling tile; a cellulose resin wall board (e.g., a fiberboard); a stone; a brick; a concrete; an unglazed tile; a stucco; a grout; a painted surface; a roofing tile; a shingle; a cellulose-rich material; a material capable of providing nutrient(s) to a cell (e.g., fungi) and/or a virus, capable of harboring nutrient material(s) and/or supporting a biological (e.g., a fungal) infestation; or a combination thereof.

One or more cells (e.g., a fungus) and/or viruses may, for example, infest, survive upon, survive within, grow on the surface, and/or grow within, an inanimate object. Such a target cell and/or a target virus (e.g., a fungal cell) include those that can infest and/or survive upon and/or within: an inanimate object such as an indoor structure, an outdoor structure, a building material, or a combination thereof, and may cause defacement (e.g., deterioration or discoloration), odor, environment hazards, and other undesirable effects.

A material (e.g., an object) may be susceptible ("prone") to infestation by a cell and/or a virus when it is capable of serving as a food source for a cell (e.g., the material comprises a substance that serves as a food source). It is contemplated that any described formulation of a cell and/or a virus (e.g., a fungus) prone material formulation may be modified to incorporate an antibiological agent (e.g., an antifungal peptidic agent). For example, in the context of a paint or coating composition, a fungal-prone material may comprise a binder comprising a carbon-based polymer that serves as a nutrient for a fungus, and a coating comprising the binder as a component may also comprise an antibiological agent. In another example, a susceptible material formulation such as a grout and/or a caulk that may be in frequent contact with or constantly exposed to fungal nutrients and moisture may comprise an antibiological agent effective against a fungus on and/or within the susceptible material formulation (e.g., a surface).

Antibiological agent activity (e.g., growth inhibition, biocidal activity) can provide and/or facilitate disinfection, decontamination and/or sanitization of an material and/or an object (e.g., an inanimate object, a building material), which refer to the process of reducing the number of cell(s) (e.g., a fungus microorganism) and/or viruses to levels that no longer pose a threat (e.g., a threat to property, a threat to the health of a desired organism such as human). Use of a bioactive antifungal agent can be accompanied by removal (e.g., manual removal, machine aided removal) of the cell(s) and/or the virus(s).

In another example, a material formulation (e.g., a surface treatment) comprising an antimicrobial agent may be used in an application such as a hospital and/or a health care application, such as reducing and/or preventing a hospital-acquired infection (e.g., a so-called "super bugs" infection); and/or reducing (e.g., reducing the spread) and/or preventing infection(s) (e.g., a viral infection such as SARS); as well as a hygienic surface application (e.g., an antimicrobial cleaner, an antimicrobial utensil, an antimicrobial food preparation surface, an antimicrobial coating system); reducing and/or preventing food poisoning; or a combination thereof. Examples of a strain of bacteria that may be resistant to a conventional antibiotic, such as a *Staphylococcus* [e.g., a Methicillin-resistant *Staphylococcus aureus* ("MRSA")], a *Streptococcus* bacteria, and/or a Vero-cytotoxin producing variants of *Escherichia coli*.

The selection of a biomolecule composition for incorporation into a material formulation to confer a antibiological property, a manufactured article having a surface treatment and/or surface with such an antibiological property, a device having a surface treatment and/or surface with such an antibiological property, etc. may be based on the bioactivity of the biomolecule composition. Methods for assaying and/or selecting an antibiological biomolecule composition are described herein as well as in U.S. Pat. Nos. 6,020,312; 5,885,782; and 5,602,097, and patent application Ser Nos. 10/884,355 and 11/368,086, such as, for example, contacting a material formulation (e.g., a coating) comprising a proteinaceous molecule with a biological cell and measuring growth over time relative to a like material formulation comprising less or no selected proteinaceous molecule content. For example, a fungal cell may be used in assaying and/or screening for an antifungal composition (e.g., a peptide library), may comprise a fungal organism known to, or suspected of, infesting a vulnerable material(s) and/or surface(s) (e.g., a construction material). Such methods may be used to assay and/or screen, for example, antifungal activity against a wide variety of fungus genera and species, such as in the case of selecting a composition comprising a broad-spectrum antifungal activity. Similar methods may be used to identify particular antibiological agent(s) (e.g., a peptide, a plurality peptides) that target specific fungus genera or species. Examples of such a fungal cell often used in such an assay include members of the genera Stachybotrys (especially *Stachybotrys chartarum*), *Aspergillus* species (sp.), *Penicillium* sp., *Fusarium* sp., *Alternaria dianthicola*, *Aureobasidium pullulans* (aka *Pullularia pullulans*), *Phoma pigmentivora* and *Cladosporium* sp, though an assay may be adapted for other cell(s). In another example, a proteinaceous molecule (e.g., a peptide) may be effective (e.g., inhibit growth, treat infestation, etc.) against a cell (e.g., a fungal cell, a bacterial cell) and/or a virus from a genera and/or a species of, for example, an *Alternaria* (e.g., an *Alternaria dianthicola*), an *Aspergillus* [(e.g., an *Aspergillus* species (sp.), an *Aspergillus fumigatus*, an *Aspergillus Parasiticus*], an *Aureobasidium* (e.g., an *Aureobasidium pullulans* a.k.a. a *Pullularia pullulans*), a *Candida*; a *Ceratocystis* (e.g., a *Ceratocystis fagacearum*), a *Cladosporium* (e.g., a *Cladosporium* sp.), a *Fusarium* (e.g., a *Fusarium* sp., a *Fusarium oxysporum*, a *Fusarium sambucinum*), a *Magnaporthe* (e.g., a *Magnaporthe Aspergillus nidulans*), a *Mycosphaerella*, a *Penicillium* (e.g., a *Penicillium* sp.), a *Phoma* (e.g., a *Phoma pigmentivora*), a Pphiostoma (e.g., a Pphiostoma *ulmi*), a *Pythium* (e.g., a *Pythium ultimum*, a *Rhizoctonia* (e.g., *Rhizoctonia solani*), a Stachybotrys (e.g., a *Stachybotrys chartarum*), or a combination thereof. Cell and/or viral culture conditions may be modified appropriately to provide favorable growth and proliferation conditions, using the techniques of the art, and to assay and/or screen for activity against a target cell (e.g., a bacteria, an algae, etc.) and/or a virus. For example, any suitable peptide/polypeptide/protein screening method in the art may be used to identify an antibiological proteinaceous molecule (e.g., an antifungal peptide) for an assay as active antibiological agent (e.g., an antifungal agent) in a material formulation (e.g., a paint, a coating material, a biomolecule composition). For example, an in vitro method to determine bioactivity of a peptide, such as a peptide from a synthetic peptide combinational library, may be used (Furka, A., et al. *Int. J. Pept. Protein Res.* 37:487, 1991; Houghten, R. A., et al. *Nature* 354:84, 1991; Houghten, R. A., et al. *BioTechniques* 13:412, 1992).

An antibiological agent may be combined with any other antibiological composition described herein and/or known in the art, such as a preservative (e.g., a chemical biocide, a chemical biostatic) traditionally used in a surface treatment (e.g., a coating, a paint) and/or an antimicrobial composition (e.g., a chemical biocide, a chemical biostatic) traditionally used in a polymeric material (e.g., a plastic, a composite, etc). For example, one or more antibiological agent(s) (e.g., an antifungal peptidic agent, an enzyme) may be used in combination with and/or as a substitute for one or more existing antibiological composition (e.g., a preservative, an antimicrobial agent, a fungicide, a fungistatic, a bactericide, an algaecide, etc.) identified herein and/or in the art. Examples of an antibiological composition that an antibiological agent (e.g., an antimicrobial proteinaceous molecule, an antifungal peptidic agent, an antimicrobial enzyme) may substitute for and/or be combined include, but are not limited to those non-peptidic antimicrobial compounds (i.e., biocides, fungicides, algaecides, mildewcides, etc.) which have been shown to be of utility and are currently available and approved for use in the U. S./NAFTA, Europe, and the Asia Pacific region, and numerous examples are described herein for use with a material formulation such as a polymeric material, a surface treatment (e.g., a coating), etc. Some such combinations of antibiological agent(s) and/or combinations with another antibiological compositions may provide an advantage such as a broader range of activity against various organisms (e.g., a bacteria, an algae, a fungi, etc.), a synergistic antibiological and/or preservative effect, a longer duration of effect, or a combination thereof. For example, a fungal prone composition and/or a surface coated with such a composition are also susceptible to damage by a variety of organisms, and a combination of antibiological agent(s) and antibiological composition(s) may protect against the variety of organisms. In another example of a combination, an antibiological agent (e.g., an antimicrobial agent and/or an antifouling agent) comprising an enzyme (e.g., an antimicrobial enzyme, an antifouling enzyme) and/or a peptide (e.g., an antifouling peptide, an antimicrobial peptide, an antifungal peptide, an antialgae peptide, an antibacterial peptide, an antimildew peptide, etc) may be used alone or in combination with one or more additional antibiological composition(s) (e.g., an antimicrobial agent, an antifouling agent, a preservative, a biocide, a biostatic agent) and/or technique (see for example, Baldridge, G. D. et al, *Current Microbiology* 51:233-238, 2005; Hancock, R. E. W. and Scott, M. G. PNAS 97(16): 8856-8861, 2000).

In particular aspects, an antimicrobial agent peptide comprises ProteCoat® (Reactive Surfaces, Ltd.; also described in U.S. Pat. Nos. 6,020,312; 5,885,782; and and patent application Ser. Nos. 10/884,355 and 11/368,086). For example, certain peptides contemplated for use (e.g., ProteCoat®; Reactive Surfaces, Ltd.) as described herein have been shown to involve synergy between the peptides (e.g., antifungal peptides) and non-peptide antifungal composition(s) that may be useful in controlling growth of a *Fusarium*, a *Rhizoctonia*, a *Ceratocystis*, a *Pythium*, a *Mycosphaerella*, an *Aspergillus* and/or a *Candida* genera of fungi. In particular, synergistic combinations have been described and successfully used to inhibit the growth of an *Aspergillus fumigatus* and an *A. parasiticus*, and also an *Fusarium oxysporum* with respect to agricultural applications. These and other synergistic combinations of peptide agent(s) and non-peptide compositions(s) may be useful as, for example, a component (e.g., an additive) in a material formulation (e.g., a paint, a coating) such as for deterring, preventing, and/or treating a fungal infestation for in-can use and/or after application of a material formulation to a surface.

In some aspects, an antibiological agent (e.g., an antimicrobial agent, an antifouling agent) and/or technique comprises a detergent (e.g., a nonionic detergent, a zwitterionic detergent, an ionic detergent), such as 3-[(3-Cholamidopropyl)dimethylammonio]-1-propanesulfonate ("CHAPS") (zwitterionic), a Triton X series detergent (nonionic), and/or a SDS (ionic); a basic protein such as a protamine; a cationic polysaccharide such as chitosan; a metal ion chelator such as EDTA; or a combination thereof, all of which have may have effectiveness against a lipid cellular membrane, and may be incorporated into a material formulation and/or used in a washing composition (e.g., a washing solution, a washing suspension, a washing emulsion) applied to a material formulation. For example, a material formulation comprising an antimicrobial peptide and an antimicrobial enzyme may be washed with a commercial washing solution that may also comprise an antimicrobial peptide. In another example, an additional preservative, an biocide, an biostatic composition, or a combination thereof, comprises a non-peptidic antimicrobial composition, a non-amino based antimicrobial agent, a compounded peptide antimicrobial agent, an enzyme-based antimicrobial agent, or a combination thereof, such as those described in U.S. patent application Ser. No. 11/865,514 filed incorporated by reference. In another example, an antibiological agent (e.g., an antimicrobial agent, an antifouling agent) may comprise components such as a Protecoat® combined with a non-peptidic antimicrobial composition, a non-amino based antimicrobial composition, a compounded peptide antimicrobial agent, an enzyme-based antimicrobial agent, or a combination thereof, and an improved (e.g., additive, synergistic) effect may occur, so that the concentration of one or more components of the antibiological material (i.e., an antibiological agent, an antibiological composition, or a combination thereof) may be reduced relative to the component's use alone or in a combination comprising fewer components. In some embodiments, the concentration of any individual antibiological material's component(s) (e.g., an antimicrobial component, an antifouling component) comprises about 0.000000001% to about 20% (e.g., about 0.000000001% to about 4%) or more, of a material formulation, an antibiological agent (e.g., an antimicrobial agent, an antifouling agent), a washing composition, or a combination thereof.

In some aspects, a biological entity that may be a target of an antibiological agent comprises an Animalia ("animal") cell, a Plantae ("plant") cell, an Archaea ("Archaebacteria") cell, an Eubacteria ("bacteria") cell, a Fungi ("fungi") cell, a Protista ("protists") cell, a virus (e.g., an enveloped virus), or a combination thereof.

An Archaea typically comprises a cell wall comprising a pseudopeptidoglycan, a peptide, a polypeptide, a protein (e.g., a glycoprotein), or a combination thereof. Examples of an Archaea genus includes an *Acidianus*, an *Acidilobus*, an *Aeropyrum*, an *Archaeoglobus*, a *Caldivirga*, a *Desulfurococcus*, a *Ferroglobus*, a *Ferroplasma*, a *Haloarcula*, a *Halobacterium*, a *Halobaculum*, a *Halococcus*, a *Haloferax*, a *Halogeometricum*, a *Halomicrobium*, a *Halorhabdus*, a *Halorubrum*, a *Haloterrigena*, a *Hyperthermus*, an *Ignicoccus*, a *Metallosphaera*, a *Methanobacterium*, a *Methanobrevibacter*, a *Methanocalculus*, a *Methanocaldococcus*, a *Methanococcoides*, a *Methanococcus*, a *Methanocorpusculum*, a *Methanoculleus*, a *Methanofollis*, a *Methanogenium*, a *Methanohalobium*, a *Methanohalophilus*, a *Methanolacinia*, a *Methanolobus*, a *Methanomicrobium*, a *Methanomicrococcus*, a *Methanoplanus*, a *Methanopyrus*, a *Methanosaeta*, a *Methanosalsum*, a *Methanosarcina*, a *Methanosphaera*, a *Methanospirillum*, a *Methanothermobacter*, a *Methanothermococcus*, a *Methanothermus*, a *Methanothrix*, a *Methanotorris*, a *Natrialba*, a *Natronobacterium*, a *Natronococcus*, a *Natronomonas*, a *Palaeococcus*, a *Picrophilus*, a *Pyrobaculum*, a *Pyrococcus*, a *Pyrodictium*, a *Pyrolobus*, a *Staphylothermus*, a *Stetteria*, a *Stygiolobus*, a

*Sulfolobus*, a *Sulfophobococcus*, a *Sulfurisphaera*, a *Thermococcus*, a *Thermofilum*, a *Thermoplasma*, a *Thermoproteus*, a *Thermosphaera*, a *Vulcanisaeta*, or a combination thereof.

An Eubacteria typically comprises a cell wall comprising a peptidoglycan, a peptide, a polypeptide, a protein (e.g., a glycoprotein), a lipid, or a combination thereof. Often, the members of the Eubacteria phyla are divided into Gram-positive Eubacteria or Gram-negative Eubacteria (e.g., Cyanobacteria, Proteobacteria, Spirochetes) based on biochemical and structural differences between the cell wall and/or an associated a phospholipid bilayer ("cell membrane") of the organism(s). A "Gram-positive Eubacteria" ("Gram-positive bacteria") refers to an Eubacteria comprising a cell wall that typically stains positive with Gram stain reaction (see, for example, Scherrer, R., 1984) and may not be surrounded by an outer cell membrane. A Gram positive bacteria generally have a cell wall composed of a thick layer of peptidoglycan overlaid by a thinner layer of techoic acid. A "Gram-negative Eubacteria" ("Gram negative bacteria") refers to Eubacteria comprising a cell wall that typically stains negative with Gram stain reaction and may be surrounded by a second lipid bilayer ("outer cell membrane"). Gram negative bacteria have a thinner layer of peptidoglycan. A few types of Gram-negative Eubacteria do not stain well using a standard Gram stain procedure. However, these bacteria may be classified as a Gram-negative Eubacteria by the presence of an outer cell membrane, a morphological feature typically not present in a Gram-positive Eubacteria.

Examples of a Gram-positive Eubacteria comprise an *Acetobacterium*, an *Actinokineospora*, an *Actinomadura*, an *Actinomyces*, an *Actinoplanes*, an *Actinopolyspora*, an *Actinosynnema*, an *Aerococcus*, an *Aeromicrobium*, an *Agromyces*, an *Amphibacillus*, an *Amycolatopsis*, an *Arcanobacterium*, an *Arthrobacter*, an *Aureobacterium*, a *Bacillus*, a *Bifidobacterium*, a *Brachybacterium*, a *Brevibacterium*, a *Brochothrix*, a *Carnobacterium*, a *Caryophanon*, a *Catellatospora*, a *Cellulomonas*, a *Clavibacter*, a *Clostridium*, a *Coprococcus*, a *Coriobacterium*, a *Corynebacterium*, a *Curtobacterium*, a *Dactylosporangium*, a *Deinobacter*, a *Deinococcus*, a *Dermabacter*, a *Dermatophilus*, a *Desulfotomaculum*, an *Enterococcus*, an *Erysipelothrix*, an *Eubacterium*, an *Exiguobacterium*, a *Falcivibrio*, a *Frankia*, a *Gardnerella*, a *Gemella*, a *Geodermatophilus*, a *Glycomyces*, a *Gordonia*, an *Intrasporangium*, a *Jonesia*, a *Kibdelosporangium*, a *Kineosporia*, a *Kitasatospora*, a *Kurthia*, a *Lactobacillus*, a *Lactococcus*, a *Leuconostoc*, a *Listeria*, a *Marinococcus*, a *Melissococcus*, a *Microbacterium*, a *Microbispora*, a *Micrococcus*, a *Micromonospora*, a *Microtetraspora*, a *Mobiluncus*, a *Mycobacterium*, a *Nocardia*, a *Nocardioides*, a *Nocardiopsis*, an *Oerskovia*, a *Pediococcus*, a *Peptococcus*, a *Peptostreptococcus*, a *Pilimelia*, a *Planobispora*, a *Planococcus*, a *Planomonospora*, a *Promicromonospora*, a *Propionibacterium*, a *Pseudonocardia*, a *Rarobacter*, a *Renibacterium*, a *Rhodococcus*, a *Rothia*, a *Rubrobacter*, a *Ruminococcus*, a *Saccharococcus*, a *Saccharomonospora*, a *Saccharopolyspora*, a *Saccharothrix*, a *Salinicoccus*, a *Sarcina*, a *Sphaerobacter*, a *Spirillospora*, a *Sporichthya*, a *Sporohalobacter*, a *Sporolactobacillus*, a *Sporosarcina*, a *Staphylococcus*, a *Streptoalloteichus*, a *Streptococcus*, a *Streptomyces*, a *Streptosporangium*, a *Syntrophospora*, a *Terrabacter*, a *Thermacetogenium*, a *Thermoactinomyces*, a *Thermoanaerobacter*, a *Thermoanaerobium*, a *Thermomonospora*, a *Trichococcus*, a *Tsukamurella*, a *Vagococcus*, or a combination thereof.

Examples of a Gram-negative Eubacteria comprises an *Acetivibrio*, an *Acetoanaerobium*, an *Acetobacter*, an *Acetomicrobium*, an *Acidaminobacter*, an *Acidaminococcus*, an *Acidiphilium*, an *Acidomonas*, an *Acidovorax*, an *Acinetobacter*, an *Aeromonas*, an *Agitococcus*, an *Agrobacterium*, an *Agromonas*, an *Alcaligenes*, an *Allochromatium*, an *Alteromonas*, an *Alysiella*, an *Aminobacter*, an *Anabaena*, an *Anaerobiospirillum*, an *Anaerorhabdus*, an *Anaerovibrio*, an *Ancalomicrobium*, an *Ancylobacter*, an *Angulomicrobium*, an *Aquaspirillum*, an *Archangium*, an *Arsenophonus*, an *Arthrospira*, an *Asticcacaulis*, an *Azomonas*, an *Azorhizobium*, an *Azospirillum*, an *Azotobacter*, a *Bacteroides*, a *Bdellovibrio*, a *Beggiatoa*, a *Beijerinckia*, a *Blastobacter*, a *Blastochloris*, a *Bordetella*, a *Borrelia*, a *Brachyspira*, a *Bradyrhizobium*, a *Brevundimonas*, a *Brucella*, a *Budvicia*, a *Buttiauxella*, a *Butyrivibrio*, a *Calothrix*, a *Campylobacter*, a *Capnocytophaga*, a *Cardiobacterium*, a *Caulobacter*, a *Cedecea*, a *Cellulophaga*, a *Cellvibrio*, a *Centipeda*, a *Chitinophaga*, a *Chlorobium*, a *Chloroflexus*, a *Chlorogloeopsis*, a *Chloroherpeton*, a *Chondromyces*, a *Chromobacterium*, a *Chromohalobacter*, a *Chroococcidiopsis*, a *Citrobacter*, a *Cobetia*, a *Comamonas*, a *Crinalium*, a *Cupriavidus*, a *Cyclobacterium*, a *Cylindrospermum*, a *Cystobacter*, a *Cytophaga*, a *Dermocarpella*, a *Derxia*, a *Desulfobacter*, a *Desulfobacterium*, a *Desulfobulbus*, a *Desulfococcus*, a *Desulfomicrobium*, a *Desulfomonile*, a *Desulfonema*, a *Desulfosarcina*, a *Desulfovibrio*, a *Desulfurella*, a *Desulfuromonas*, a *Dichotomicrobium*, an *Ectothiorhodospira*, an *Edwardsiella*, an *Eikenella*, an *Enhydrobacter*, an *Ensifer*, an *Enterobacter*, an *Erwinia*, an *Erythrobacter*, an *Erythromicrobium*, an *Escherichia*, an *Ewingella*, a *Fervidobacterium*, a *Fibrobacter*, a *Filomicrobium*, a *Fischerella*, a *Flammeovirga*, a *Flavobacterium*, a *Flectobacillus*, a *Flexibacter*, a *Flexithrix*, a *Francisella*, a *Frateuria*, a *Fusobacterium*, a *Gemmata*, a *Gemmiger*, a *Gloeobacter*, a *Gloeocapsa*, a *Gluconobacter*, a *Haemophilus*, a *Hafnia*, a *Haliscomenobacter*, a *Haloanaerobium*, a *Halobacteroides*, a *Halochromatium*, a *Halomonas*, a *Halorhodospira*, a *Helicobacter*, a *Heliobacillus*, a *Heliobacterium*, a *Herbaspirillum*, a *Herpetosiphon*, a *Hirschia*, a *Hydrogenophaga*, a *Hyphomicrobium*, a *Hyphomonas*, an *Ilyobacter*, an *Isochromatium*, an *Isosphaera*, a *Janthinobacterium*, a *Kingella*, a *Klebsiella*, a *Kluyvera*, a *Labrys*, a *Lachnospira*, a *Lamprocystis*, a *Lampropedia*, a *Leclercia*, a *Legionella*, a *Leminorella*, a *Leptospira*, a *Leptospirillum*, a *Leptothrix*, a *Leptotrichia*, a *Leucothrix*, a *Lysobacter*, a *Malonomonas*, a *Marinilabilia*, a *Marichromatium*, a *Marinobacter*, a *Marinomonas*, a *Megamonas*, a *Megasphaera*, a *Melittangium*, a *Meniscus*, a *Mesophilobacter*, a *Metallogenium*, a *Methylobacillus*, a *Methylobacterium*, a *Methylococcus*, a *Methylomonas*, a *Methylophaga*, a *Methylophilus*, a *Methylovorus*, a *Microscilla*, a *Mitsuokella*, a *Moellerella*, a *Moraxella*, a *Morganella*, a *Morococcus*, a *Myxococcus*, a *Myxosarcina*, a *Nannocystis*, a *Neisseria*, a *Nevskia*, a *Nitrobacter*, a *Nitrococcus*, a *Nitrosococcus*, a *Nitrosomonas*, a *Nitrosospira*, a *Nitrospira*, a *Nostoc*, an *Obesumbacterium*, an *Oceanospirillum*, an *Ochrobactrum*, an *Oligella*, an *Oscillatoria*, an *Oxalobacter*, a *Pantoea*, a *Paracoccus*, a *Pasteurella*, a *Pectinatus*, a *Pedobacter*, a *Pedomicrobium*, a *Pelobacter*, a *Pelodictyon*, a *Persicobacter*, a *Phaeospirillum*, a *Phenylobacterium*, a *Photobacterium*, a *Phyllobacterium*, a *Pirellula*, a *Planctomyces*, a *Plesiomonas*, a *Pleurocapsa*, a *Polyangium*, a *Porphyrobacter*, a *Porphyromonas*, a *Pragia*, a *Prevotella*, a *Propionigenium*, a *Propionispira*, a *Prosthecobacter*, a *Prosthecochloris*, a *Prosthecomicrobium*, a *Proteus*, a *Providencia*, a *Pseudanabaena*, a *Pseudomonas*, a *Psychrobacter*, a *Rahnella*, a *Rhabdochromatium*, a *Rhizobacter*, a *Rhizobium*, a *Rhizomonas*, a *Rhodobacter*, a *Rhodobium*, a *Rhodoblastus*, a

*Rhodobaca*, a *Rhodocista*, a *Rhodocyclus*, a *Rhodoferax*, a *Rhodomicrobium*, a *Rhodopila*, a *Rhodoplanes*, a *Rhodopseudomonas*, a *Rhodospirillum*, a *Rhodothalassium*, a *Rhodovibrio*, a *Rhodovulum*, a *Rikenella*, a *Roseobacter*, a *Roseococcus*, a *Rugamonas*, a *Rubrivivax*, a *Ruminobacter*, a *Runella*, a *Salmonella*, a *Saprospira*, a *Scytonema*, a *Sebaldella*, a *Selenomonas*, a *Seliberia*, a *Serpens*, a *Serpulina*, a *Serratia*, a *Shigella*, a *Simonsiella*, a *Sinorhizobium*, a *Sphaerotilus*, a *Sphingobacterium*, a *Spirillum*, a *Spirochaeta*, a *Spirosoma*, a *Spirulina*, a *Sporocytophaga*, a *Sporomusa*, a *Stella*, a *Stigmatella*, a *Streptobacillus*, a *Succinimonas*, a *Succinivibrio*, a *Sulfobacillus*; a *Synechococcus*; a *Synechocystis*, a *Syntrophobacter*, a *Syntrophococcus*, a *Syntrophomonas*, a *Tatumella*, a *Taylorella*, a *Thermochromatium*, a *Thermodesulfobacterium*, a *Thermoleophilum*, a *Thermomicrobium*, a *Thermonema*, a *Thermosipho*, a *Thermotoga*, a *Thermus*, a *Thiobacillus*, a *Thiocapsa*, a *Thiococcus*, a *Thiocystis*, a *Thiodictyon*, a *Thiohalocapsa*, a *Thiolamprovum*, a *Thiomicrospira*, a *Thiorhodovibrio*, a *Thiothrix*, a *Tissierella*, a *Tolypothrix*, a *Treponema*, a *Vampirovibrio*, a *Variovorax*, a *Veillonella*, a *Verrucomicrobium*, a *Vibrio*, a *Vitreoscilla*, a *Weeksella*, a *Wolinella*, a *Xanthobacter*, a *Xanthomonas*, a *Xenococcus*, a *Xenorhabdus*, a *Xylella*, a *Xylophilus*, a *Yersinia*, a *Yokenella*, a *Zobellia*, a *Zoogloea*, a *Zymomonas*, a *Zymophilus*, or a combination thereof.

Additional examples of an Eubacteria comprises an *Abiotrophia*, an *Acetitomaculum*, an *Acetohalobium*, an *Acetonema*, an *Achromobacter*, an *Acidimicrobium*, an *Acidithiobacillus*, an *Acidobacterium*, an *Acidocella*, an *Acrocarpospora*, an *Actinoalloteichus*, an *Actinobacillus*, an *Actinobaculum*, an *Actinocorallia*, an *Aequorivita*, an *Afipia*, an *Agreia*, an *Agrococcus*, an *Ahrensia*, an *Albibacter*, an *Albidovulum*, an *Akanivorax*, an *Alicychphilus*, an *Alicyclobacillus*, an *Alkalibacterium*, an *Alkaliimnicola*, an *Alkalispirillum*, an *Alkanindiges*, an *Aminobacterium*, an *Aminomonas*, an *Ammonifex*, an *Ammomphilus*, an *Anaeroarcus*, an *Anaerobacter*, an *Anaerobaculum*, an *Anaerobranca*, an *Anaerococcus*, an *Anaerofilum*, an *Anaeromusa*, an *Anaerophaga*, an *Anaeroplasma*, an *Anaerosinus*, an *Anaerostipes*, an *Anaerovorax*, an *Aneurinibacillus*, an *Angiococcus*, an *Anoxybacillus*, an *Antarctobacter*, an *Aquabacter*, an *Aquabacterium*, an *Aquamicrobium*, an *Aquifex*, an *Arcobacter*, an *Arhodomonas*, an *Asanoa*, an *Atopobium*, an *Azoarcus*, an *Azorhizophilus*, an *Azospira*, a *Bacteriovorax*, a *Bartonella*, a *Beutenbergia*, a *Bilophila*, a *Blastococcus*, a *Blastomonas*, a *Bogoriella*, a *Bosea*, a *Brachymonas*, a *Brackiella*, a *Brenneria*, a *Brevibacillus*, a *Bulleidia*, a *Burkholderia*, a *Caenibacterium*, a *Caldicellulosiruptor*, a *Caldithrix*, a *Caloramator*, a *Caloranaerobacter*, a *Caminibacter*, a *Caminicella*, a *Carbophilus*, a *Carboxydibrachium*, a *Carboxydocella*, a *Carboxydothermus*, a *Catenococcus*, a *Catenuloplanes*, a *Cellulosimicrobium*, a *Chelatococcus*, a *Chlorobaculum*, a *Chryseobacterium*, a *Chrysiogenes*, a *Citricoccus*, a *Collinsella*, a *Colwellia*, a *Conexibacter*, a *Coprothermobacter*, a *Couchioplanes*, a *Crossiella*, a *Cryobacterium*, a *Cryptosporangium*, a *Dechloromonas*, a *Deferribacter*, a *Defluvibacter*, a *Dehalobacter*, a *Delftia*, a *Demetria*, a *Dendrosporobacter*, a *Denitrovibrio*, a *Dermacoccus*, a *Desemzia*, a *Desulfacinum*, a *Desulfitobacterium*, a *Desulfobacca*, a *Desulfobacula*, a *Desulfocapsa*, a *Desulfocella*, a *Desulfofaba*, a *Desulfofrigus*, a *Desulfofustis*, a *Desulfohalobium*, a *Desulfomusa*, a *Desulfonatronovibrio*, a *Desulfonatronum*, a *Desulfonauticus*, a *Desulfonispora*, a *Desulforegula*, a *Desulforhabdus*, a *Desulforhopalus*, a *Desulfospira*, a *Desulfosporosinus*, a *Desulfotalea*, a *Desulfotignum*, a *Desulfovirga*, a *Desulfurobacterium*, a *Desulfuromusa*, a *Dethiosulfovibrio*, a *Devosia*, a *Dialister*, a *Diaphorobacter*, a *Dichelobacter*, a *Dictyoglomus*, a *Dietzia*, a *Dolosicoccus*, a *Dorea*, an *Eggerthella*, an *Empedobacter*, an *Enhygromyxa*, an *Eremococcus*, a *Ferrimonas*, a *Filifactor*, a *Filobacillus*, a *Finegoldia*, a *Flexistipes*, a *Formivibrio*, a *Friedmanniella*, a *Frigoribacterium*, a *Fulvimonas*, a *Fusibacter*, a *Gallicola*, a *Garciella*, a *Gelidibacter*, a *Gelria*, a *Gemmatimonas*, a *Gemmobacter*, a *Geobacillus*, a *Geobacter*, a *Georgenia*, a *Geothrix*, a *Geovibrio*, a *Glaciecola*, a *Gluconacetobacter*, a *Gracilibacillus*, a *Granulicatella*, a *Grimontia*, a *Halanaerobacter*, a *Halanaerobium*, a *Haliangium*, a *Halobacillus*, a *Halocella*, a *Halonatronum*, a *Halothermothrix*, a *Halothiobacillus*, a *Helcococcus*, a *Heliophilum*, a *Heliorestis*, a *Herbidospora*, a *Hippea*, a *Holdemania*, a *Holophaga*, a *Hydrogenobacter*, a *Hydrogenobaculum*, a *Hydrogenophilus*, a *Hydrogenothermus*, a *Hydrogenovibrio*, a *Hymenobacter*, an *Ignavigranum*, an *Iodobacter*, an *Isobaculum*, a *Janibacter*, a *Kineococcus*, a *Kineosphaera*, a *Kitasatosporia*, a *Knoellia*, a *Kocuria*, a *Kozakia*, a *Kribbella*, a *Kutzneria*, a *Kytococcus*, a *Lachnobacterium*, a *Laribacter*, a *Lautropia*, a *Lechevalieria*, a *Leifsonia*, a *Leisingera*, a *Lentzea*, a *Leucobacter*, a *Limnobacter*, a *Listonella*, a *Lonepinella*, a *Luteimonas*, a *Luteococcus*, a *Macrococcus*, a *Macromonas*, a *Magnetospirillum*, a *Mannheimia*, a *Maricaulis*, a *Marinibacillus*, a *Marinitoga*, a *Marinobacterium*, a *Marinospirillum*, a *Marmoricola*, a *Meiothermus*, a *Methylocapsa*, a *Methylopila*, a *Methylosarcina*, a *Microbulbifer*, a *Microlunatus*, a *Micromonas*, a *Microsphaera*, a *Microvirgula*, a *Modestobacter*, a *Mogibacterium*, a *Moorella*, a *Moritella*, a *Muricauda*, a *Mycetocola*, a *Mycoplana*, a *Myroides*, a *Natroniella*, a *Natronincola*, a *Nautilia*, a *Nesterenkonia*, a *Nonomuraea*, a *Novosphingobium*, an *Oceanimonas*, an *Oceanobacillus*, an *Oceanobacter*, an *Octadecabacter*, an *Oenococcus*, an *Olelphilus*, an *Ohgotropha*, an *Olsenella*, an *Opitutus*, an *Orenia*, an *Ornithinicoccus*, an *Ornithinimicrobium*, an *Oxalicibacterium*, an *Oxalophagus*, an *Oxobacter*, a *Paenibacillus*, a *Pandoraea*, a *Papillibacter*, a *Paralactobacillus*, a *Paraliobacillus*, a *Parascardovia*, a *Paucimonas*, a *Pectobacterium*, a *Pelczaria*, a *Pelospora*, a *Pelotomaculum*, a *Peptomphilus*, a *Petrotoga*, a *Phascolarctobacterium*, a *Phocoenobacter*, a *Photorhabdus*, a *Pigmentiphaga*, a *Planomicrobium*, a *Planotetraspora*, a *Plantibacter*, a *Plesiocystis*, a *Polaribacter*, a *Prauserella*, a *Propioniferax*, a *Propionimicrobium*, a *Propionispora*, a *Propionivibrio*, a *Pseudaminobacter*, a *Pseudoalteromonas*, a *Pseudobutyrivibrio*, a *Pseudoramibacter*, a *Pseudorhodobacter*, a *Pseudospirillum*, a *Pseudoxanthomonas*, a *Psychroflexus*, a *Psychromonas*, a *Psychroserpens*, a *Ralstonia*, a *Ramlibacter*, a *Raoultella*, a *Rathayibacter*, a *Rhodothermus*, a *Roseateles*, a *Roseburia*, a *Roseiflexus*, a *Roseinatronobacter*, a *Roseospirillum*, a *Roseovarius*, a *Rubritepida*, a *Ruegeria*, a *Sagittula*, a *Salana*, a *Salegentibacter*, a *Salinibacter*, a *Salinivibrio*, a *Sanguibacter*, a *Scardovia*, a *Schineria*, a *Schwartzia*, a *Sedimentibacter*, a *Shewanella*, a *Shuttleworthia*, a *Silicibacter*, a *Skermania*, a *Slackia*, a *Sphingobium*, a *Sphingomonas*, a *Sphingopyxis*, a *Spirilliplanes*, a *Sporanaerobacter*, a *Sporobacter*, a *Sporobacterium*, a *Sporotomaculum*, a *Staleya*, a *Stappia*, a *Starkeya*, a *Stenotrophomonas*, a *Sterolibacterium*, a *Streptacidiphilus*, a *Streptomonospora*, a *Subtercola*, a *Succiniclasticum*, a *Succinispira*, a *Sulfitobacter*, a *Sulfurospirillum*, a *Suttonella*, a *Suttonella*, a *Syntrophobotulus*, a *Syntrophothermus*, a *Syntrophus*, a *Telluria*, a *Tenacibaculum*, a *Tepidibacter*, a *Tepidimonas*, a *Tepidiphilus*, a *Terasakiella*, a *Terracoccus*, a *Tessaracoccus*, a *Tetragenococcus*, a *Tetrasphaera*, a *Thal-* assomonas, a *Thauera*, a *Thermaerobacter*, a *Thermanaeromonas*, a *Thermanaerovibrio*, a *Thermicanus*, a *Thermithiobacillus*, a *Thermoanaerobacterium*, a *Thermobifida*, a *Thermobispora*, a *Thermobrachium*, a *Thermocrinis*, a *Thermocrispum*, a *Thermodesulforhabdus*, a *Thermodesulfovibrio*, a *Thermohydrogenium*, a *Thermomonas*, a *Thermosyntropha*, a *Thermoterrabacterium*, a *Thermovenabulum*, a *Thermovibrio*, a *Thialkalimicrobium*, a *Thialkalivibrio*, a *Thioalkalivibrio*, a *Thiobaca*, a *Thiomonas*, a *Tindallia*, a *Tolumonas*, a *Turicella*, a *Turicibacter*, an *Ureibacillus*, a *Verrucosispora*, a *Victivallis*, a *Virgibacillus*, a *Vogesella*, a *Weissella*, a *Williamsia*, a *Xenophilus*, a *Zavarzinia*, a *Zooshikella*, a *Zymobacter*, or a combination thereof.

Organisms of the eukaryotic Fungi Kingdom ("fungi," fungus") include organisms commonly referred to as a molds, morels, mildews, mushrooms, puffballs, rusts, smuts, truffles, and yeasts. A fungal organism typically comprises multicellular filaments that grow into a food supply (e.g., a carbon based polymer), but may become unicellular spore(s) in nutrient poor conditions. "Mold" may be used herein as a synonym for fungi, where the context permits, especially when referring to indoor contaminants. However, the term "mold" also, and more specifically, denotes certain types of fungi. For example, the plasmodial slime molds, the cellular slime molds, water molds, and the everyday common mold. True molds refer to filamentous fungi comprising the mycelium, specialized, spore-bearing structures called conidiophores, and conidia ("spores"). "Mildew" is another common name for certain fungi, including a powdery mildew and a downy mildew. "Yeasts" are unicellular members of the fungus family. For the purposes of the present disclosure, where any of the terms fungus, a mold, a morel, a mildew, a mushroom, a puffball, a rust, a smut, a truffle, and/or a yeast is used, the others are implied where the context permits.

A fungi cell wall typically comprises a beta-1,4-linked homopolymers of N-acetylglucosamine ("chitin") and a glucan. The glucan is usually an alpha-glucan, such as a polymer comprising an alpha-1,3- and alpha-1,6-linkage (Griffin, 1993). Some Ascomycota species (e.g., Ophiostomataceae) comprise a cell wall comprising a cellulose. Certain species of Chytridiomycota (e.g., Coelomomycetales) do not possess a cell wall. Examples of a fungi genus includes an *Aciculoconidium*, an *Agaricostilbum*, an *Ambrosiozyma*, an *Arxiozyma*, an *Arxula*, an *Ascoidea*, a *Babjevia*, a *Bensingtonia*, a *Blastobotrys*, a *Botryozyma*, a *Bullera*, a *Bulleromyces*, a *Candida*, a *Cephaloascus*, a *Chionosphaera*, a *Citeromyces*, a *Clavispora*, a *Cryptococcus*, a *Cystofilobasidium*, a *Debaiyomyces*, a *Dekkera*, a *Dipodascopsis*, a *Dipodascus*, an *Endomyces*, an *Eremothecium*, an *Erythrobasidium*, a *Fellomyces*, a *Filobasidiella*, a *Filobasidium*, a *Galactomyces*, a *Geotrichum*, a *Hanseniaspora*, a *Hyalodendron*, an *Issatchenkia*, an *Itersonilia*, a *Kloeckera*, a *Kluyveromyces*, a *Kockovaella*, a *Kurtzmanomyces*, a *Leucosporidium*, a *Lipomyces*, a *Lodderomyces*, a *Malassezia*, a *Metschnikowia*, a *Monihella*, a *Mrakia*, a *Myxozyma*, a *Nadsonia*, an *Oosporidium*, a *Pachysolen*, a *Phaffia*, a *Pichia*, a *Protomyces*, a *Pseudozyma*, a *Reniforma*, a *Rhodosporidium*, a *Rhodotorula*, a *Saccaromycopsis*, a *Saccharomyces*, a *Saccharomycodes*, a *Saitoella*, a *Saturnispora*, a *Schizoblastosporion*, a *Schizosaccharomyces*, a *Sporidiobolus*, a *Sporobolomyces*, a *Sporopachydermia*, a *Stephanoascus*, a *Sterigmatomyces*, a *Sterigmatosporidium*, a *Sympodiomyces*, a *Sympodiomycopsis*, a *Taphrina*, a *Tilletiaria*, a *Tilletiopsis*, a *Torulaspora*, a *Trichosporon*, a *Trichosporonoides*, a *Trigonopsis*, a *Tsuchiyaea*, a *Wickerhamia*, a *Wickerhamiella*, a *Williopsis*, a *Xanthophyllomyces*, a *Yarrowia*, a *Zygoascus*, a *Zygosaccharomyces*, a *Zygozyma*, or a combination thereof.

Examples of a fungal genus sometimes found in a building having excess indoor moisture comprises a Stachybotrys (e.g., a *Stachybotrys chartarum*), which is commonly found in nature growing on a cellulose-rich plant material and/or a water-damaged building material, such as ceiling tiles, wallpaper, sheet-rock and cellulose resin wallboard (e.g., a fiberboard). Depending on the particular conditions of temperature, pH and humidity in which the mold is growing, a Stachybotrys may produce mycotoxins, compounds that have toxic properties. Other examples of a common fungi that can grow in residential and commercial buildings comprise an *Aspergillus* species (sp.), a *Penicillium* sp., a *Fusarium* sp., an *Alternaria dianthicola*, an *Aureobasidium pullulans* (a.k.a. a *Pullularia pullulans*), a *Phoma pigmentivora* and/or a *Cladosporium* sp. An antibiological agent (e.g., a peptide composition) may be selected to treat an infestation, prevent infestation, inhibit growth, and/or kill, a particular species of a cell such as a fungus and/or for a broad spectrum antifungal activity.

Organisms of the Kingdom Protista ("protists") refer to a heterogenous set of eukaryotic unicellular, oligocellular and/or multicellular organisms that may not have been classified as belonging to the other eukaryotic Kingdoms, though they typically have features related to the Plant Kingdom (e.g., an algae, which generally are photosynthetic), the Fungi Kingdom (e.g., an Oomycota) and/or the Animal Kingdom (e.g., a protozoa). Organisms of certain Protista Phyla, particularly those organisms commonly known as "algae," comprise a cell wall, silica based shell and/or exoskeleton (e.g., a test, a frustule), or other durable material at the cell-external environment interface.

Examples of a Protista comprises an *Acetabularia*, an *Achnanthes*, an *Amphidinium*, an *Ankistrodesmus*, an *Anophiyoides*, an *Aphanomyces*, an *Astasia*, an *Asterionella*, a *Blepharisma*, a *Botrydiopsis*, a *Botrydium*, a *Botryococcus*, a *Bracteacoccus*, a *Brevilegnia*, a *Bulbochaete*, a *Caenomorpha*, a *Cephaleuros*, a *Ceratium*, a *Chaetoceros*, a *Chaetophora*, a *Characiosiphon*, a Chlamydomonas, a *Chlorella*, a *Chloridella*, a *Chlorobotrys*, a *Chlorococcum*, a *Chromulina*, a *Chroodactylon*, a *Chrysamoeba*, a *Chrysocapsa*, a *Cladophora*, a *Closterium*, a *Cocconeis*, a *Coelastrum*, a *Cohnilembus*, a *Colacium*, a *Coleps*, a *Colpidium*, a *Colpoda*, a *Cosmarium*, a *Cryptoglena*, a *Cyclidium*, a *Cyclotella*, a *Cylindrocystis*, a *Derbesia*, a *Dexiostoma*, a *Dictyosphaerium*, a *Dictyuchus*, a *Didinium*, a *Dinobryon*, a *Distigma*, a *Draparnaldia*, a *Dunaliella*, a *Dysmorphococcus*, an *Enteromorpha*, an *Entosiphon*, an *Eudorina*, an *Euglena*, an *Euplotes*, an *Eustigmatos*, a *Flintiella*, a *Fragilaria*, a *Fritschiella*, a *Glaucoma*, a *Gonium*, a *Gonyaulax*, a *Gymnodinium*, a *Gyropaigne*, a *Haematococcus*, a *Halophytophthora*, a *Heterosigma*, a *Hyalotheca*, a *Hydrodictyon*, a *Khawkinea*, a *Lagenidium*, a *Leptolegnia*, a *Mallomonas*, a *Mantoniella*, a *Melosira*, a *Menoidium*, a *Mesanophrys*, a *Mesotaenium*, a *Metopus*, a *Micrasterias*, a *Microspora*, a *Microthamnion*, a *Mischococcus*, a *Monodopsis*, a *Mougeotia*, a *Nannochloropsis*, a *Navicula*, a *Nephroselmis*, a *Nitzschia*, an *Ochromonas*, an *Oedogonium*, an *Ophiocytium*, an *Opisthonecta*, an *Oxyrrhis*, a *Pandorina*, a *Paramecium*, a *Paranophrys*, a *Paraphysomonas*, a *Parmidium*, a *Pediastrum*, a *Peranema*, a *Peridinium*, a *Peronophythora*, a *Petalomonas*, a *Phacus*, a *Pithophora*, a *Plagiopyla*, a *Plasmopara*, a *Platyophrya*, a *Plectospira*, a *Pleodorina*, a *Pleurochloris*, a *Pleurococcus*, a *Pleurotaenium*, a *Ploeotia*, a *Polyedriella*, a *Porphyridium*, a *Proro-*

*centrum*, a *Prototheca*, a *Pseudocharaciopsis*, a *Pseudocohnilembus*, a *Pyramimonas*, a *Pythiopsis*, a *Pythium*, a *Rhabdomonas*, a *Rhizochromulina*, a *Rhizoclonium*, a *Rhodella*, a *Rhodosorus*, a *Rhynchopus*, a *Saprolegnia*, a *Scenedesmus*, a *Scytomonas*, a *Selenastrum*, a *Skeletonema*, a *Spathidium*, a *Sphaerocystis*, a *Spirogyra*, a *Spirostomum*, a *Spondylosium*, a *Staurastrum*, a *Stauroneis*, a *Stentor*, a *Stephanodiscus*, a *Stephanosphaera*, a *Stichococcus*, a *Stigeoclonium*, a *Synedra*, a *Synura*, a *Tetracystis*, a *Tetraedron*, a *Tetrahymena*, a *Tetraselmis*, a *Thalassiosira*, a *Thaumatomastix*, a *Thraustotheca*, a *Trachelomonas*, a *Trebouxia*, a *Trentepohlia*, a *Tribonema*, a *Trimyema*, an *Ulothrix*, an *Uronema*, a *Vaucheria*, a *Vischeria*, a *Volvox*, a *Vorticella*, a *Xanthidium*, a *Zygnema*, or a combination thereof.

A diatom refers to a unicellular algae that possess a cell wall comprising silicon. Examples of a diatom include organisms of the phyla Chrysophyta and/or Bacillariphyta. A Chrysophyta ("golden algae," "golden-brown algae") typically comprises a freshwater diatom. Examples of a Chrysophyta includes a Chlorobotrys, a Chromulina, a Chrysamoeba, a Chrysocapsa, a Dinobryon, an Eustigmatos, a Heterosigma, a Mallomonas, a Monodopsis, a Nannochloropsis, an Ochromonas, a Paraphysomonas, a Pleurochloris, a Polyedriella, a Pseudocharaciopsis, a Rhizochromulina, a Synura, a Thaumatomastix, a Vischeria, or a combination thereof. A Bacillariphyta typically comprises a marine diatom. Examples of a Bacillariphyta includes an Achnanthes, an *Asterionella*, a Chaetoceros, a Cocconeis, a Cyclotella, a Fragilaria, a Melosira, a Navicula, a Nitzschia, a Skeletonema, a Stauroneis, a Stephanodiscus, a Synedra, a Thalassiosira, or a combination thereof.

A Xanthophyta ("yellow-green algae") is typically yellowish-green in color, with examples including a Botrydiopsis, a Botrydium, a Botryococcus, a Chloridella, a Mischococcus, an Ophiocytium, a Tribonema, a Vaucheria, or a combination thereof.

An Euglenophyta ("euglenoids") generally is unicellular, aquatic algae and comprises a pellicle, which comprises an outer membrane reinforced by proteins, rather than a cell wall. Examples of an Euglenophyta include an *Astasia*, a Colacium, a Cryptoglena, a Distigma, an Entosiphon, an Euglena, a Gyropaigne, a Khawkinea, a Menoidium, a Parmidium, a Peranema, a Petalomonas, a Phacus, a Ploeotia, a Rhabdomonas, a Rhynchopus, a Scytomonas, a Trachelomonas, or a combination thereof.

A Chlorophyta ("green algae") typically forms unicellular to oligocellular cluster(s), and comprises a cell wall comprising a cellulose. Examples of a Chlorophyta include a Volvox, a *Chlorella*, a *Pleurococcus*, a Spirogyra, a Chlamydomonas, a Gonium, a Mantoniella, a Nephroselmis, a Pyramimonas, a Tetraselmis, an Ulothrix, an Enteromorpha, a Cephaleuros, a Cladophora, a Pithophora, a Rhizoclonium, a Derbesia, an *Acetabularia*, a *Chlorella*, a Microthamnion, a Prototheca, a Stichococcus, a Trebowcia, an *Ankistrodesmus*, a Bracteacoccus, a Bulbochaete, a Chaetophora, a Characiosiphon, a Chlamydomonas, a Chlorococcum, a Coelastrum, a Dictyosphaerium, a Draparnaldia, a Dunaliella, a Dysmorphococcus, an Eudorina, a Fritschiella, a Gonium, a Haematococcus, a Hydrodictyon, an Oedogonium, a *microspora*, a Pandorina, a Pediastrum, a Pleodorina, a Scenedesmus, a Selenastrum, a Sphaerocystis, a Stephanosphaera, a Stigeoclonium, a Tetracystis, a Tetraedron, a Trentepohlia, an Uronema, a Volvox, a *closterium*, a Cosmarium, a Cylindrocystis, a Hyalotheca, a Mesotaenium, a Micrasterias, a Mougeotia, a Pleurotaenium, a Spirogyra, a Spondylosium, a Staurastrum, a Xanthidium, a Zygnema, or a combination thereof.

A Rhodophyta ("red algae") generally is multicellular and comprises a cell wall comprising a sulfated polysaccharide, such as, for example, an agar, a carrageenan, a cellulose, or a combination thereof. Examples of a Rhodophyta genera that are typically unicellular include a Chroodactylon, a Flintiella, a Porphyridium, a Rhodella, a Rhodosorus, or a combination thereof.

A Pyrrophyta ("fire algae," "dinoflagellate") generally is a unicellular marine organism possessing a cell wall comprising cellulose. A Pyrrophyta typically is red, and examples include a dinoflagellate genera such as an *Amphidinium*, a Ceratium, a Gonyaulax, a Gymnodinium, an Oxyrrhis, a Peridinium, a Prorocentrum, or a combination thereof.

A Ciliophora ("ciliate") generally is unicellular and comprises a pellicle. Examples of a Ciliophora includes an *Anophryoides*, a *Blepharisma*, a *Caenomorpha*, a *Cohnilembus*, a *Coleps*, a *Colpidium*, a *Colpoda*, a *Cyclidium*, a *Dexiostoma*, a *Didinium*, an *Euplotes*, a *Glaucoma*, a *Mesanophrys*, a *Metopus*, an *Opisthonecta*, a *Paramecium*, a *Paranophrys*, a *Plagiopyla*, a *Platyophrya*, a *Pseudocohnilembus*, a *Spathidium*, a *Spirostomum*, a *Stentor*, a *Tetrahymena*, a *Trimyema*, an *Uronema*, a *Vorticella*, or a combination thereof.

An Oomycota ("oomycete," "water mold") is a fungi-like organism, and is often listed in the fungal sections of biological culture collections. An Oomycota is typically unicellular but differ from a fungi by possessing a cell wall that comprises a cellulose and/or a glycan. Examples of an Oomycota an *Aphanomyces*, a *Brevilegnia*, a *Dictyuchus*, a *Halophytophthora*, a *Lagenidium*, a *Leptolegnia*, a *Peronophythora*, a *Plasmopara*, a *Plectospira*, a *Pythiopsis*, a *Pythium*, a *Saprolegnia*, a *Thraustotheca*, or a combination thereof.

Examples of a virus (e.g., an enveloped virus) that may be a target of an antibiological agent includes a DNA virus such as a Herpesviridae ("herpesviruses"), a Poxviridae ("poxviruse"), and/or a Baculoviridae ("baculooviruses"); an RNA virus such as a Flaviviridae ("flavivirus"), a Togaviridae ("togavirus"), a Coronaviridae ("coronavirus"; e.g., Severe Acute Respiratory Syndrome—"SARS"), a Deltaviridae ("deltavirus"; e.g., Hepatitis D), an Orthomyxoviridae ("orthomyxovirus"), a Paramyxoviridae ("paramyxovirus"), a Rhabdoviridae ("rhabdovirus"), a Bunyaviridae ("bunyavirus"), a Filoviridae ("filovirus"), and/or a Reoviridae ("Reovirus"); a retrovirus such as a Retroviridae ("retroviruses"), and/or a Hepadnaviridae ("hepadnavirus"); or a combination thereof.

A polymeric material (e.g., a plastic) will often comprise an antimicrobial agent. An antimicrobial agent typically comprises a biocide (e.g., a fungicide, a bactericide, a herbicide a mildewcide, an algaecide, a viricide, a germicide, a microbiocide, a slimicide) and/or a biostatic (e.g., a fungistatic, a bacteristatic, a mildewstatic, an algaestatic, a viristatic, a herbistatic, a germistatic, a microbiostatic, a slimistatic) to inhibit the growth of an organism such as a bacteria, a fungi, a mildew, an algae, a virus, a microorganism, or a combination thereof, on and/or within a material formulation. An antimicrobial agent within a polymeric material typically diffuses and/or travels to the surface of the polymeric material during normal service life to provide a more continuous activity at the surface in reducing microbial growth. Often, an antimicrobial agent comprises a carrier such as a liquid component (e.g., a solvent, a plasticizer), a resin, or a combination thereof. Specific examples of a carrier typically used as an antimicrobial agent carrier includes plasticizer (e.g., a diisodecyl phthalate, an epoxidized soybean oil), an oil, or a combination thereof. Examples of an antimicrobial agent commonly used in a polymeric material includes 2-n-octyl-4-ixothiazonin-3-1; 10,10-oxybisphenoxarsine ("OBPA"); zinc 2-pyridinethiol-1-oxide ("zinc-omadine"), trichlorophenoloxyphenol ("triclosan"), or a combination thereof, though a preservative used in a coating as well as an antimicrobial peptide are contemplated for use as an antimicrobial agent in a polymeric material, and such an antimicrobial agent may be used either alone or in combination with another antimicrobial agent in any composition, article, method, machine, etc. described herein in light of the present disclosures. An antimicrobial agent generally comprises about 0.000001% to about 1% of a polymeric material, and about 2% to about 10% of and antimicrobial agent and a carrier mixture, respectively, though given the inclusion of a biomolecule composition as part of a polymeric material and other compositions described herein, the content of an antimicrobial agent may be increased from about 0.000001% to about 10% or more. An antimicrobial agent often acts as a deodorant by reducing the growth of odor producing microorganism, particularly in a fiber (e.g., a textile) and/or a polymeric film application for packaging of food and/or trash.

A coating may comprise a preservative to reduce and/or prevent the deterioration of a coating and/or a film by an organism such as a microorganism. A microorganism may be considered a contaminant capable damaging a film and/or a coating to the point of suitable usefulness in a given embodiment. An undesirable growth of a microorganism is generally more prevalent in a waterborne coating, as the solvent component of a solvent-based coating usually acts as a preservative. However, a film is generally susceptible to such damage by growth of a microorganism after loss of a solvent (e.g., evaporation) during film formation. Additionally, various bacteria (e.g., *Bacillus* spp.) and fungi produce spores, which are cells that are relatively durable to unfavorable conditions (e.g., cold, heat, dehydration, a biocide) and may persist in a coating and/or film for months or years prior to germinating into a damaging colony of cells.

However, in certain embodiments, a biomolecule composition; particularly a microorganism based particulate material, may be used as a purposefully added coating component. A coating comprising a biomolecule composition (e.g., a cell-based particulate material) typically also comprises a preservative. The continued growth of a microorganism from a biomolecule composition often may be detrimental to a coating and/or a film, and a preservative may reduce and/or prevent such growth. A contaminating microorganism may use the biomolecule composition as a readily available source of nutrients for growth, and a preservative may reduce and/or prevent such growth. The amount of preservative added to a coating comprising a biomolecule composition may be increased relative to a preservative content of a similar coating lacking such an added biomolecule composition. In certain aspects, the amount of preservative may be increased about 1.01 to about 10-fold or more, the amount of an example of a preservative content described herein or used in the art, in light of the present disclosures.

Examples of preservatives include a biocide, which reduces and/or prevents the growth of an organism by killing the organism (e.g., a microorganism, a spore), a biostatic, which reduces and/or prevents the growth of an organism (e.g., a microorganism, a spore) but generally does not necessarily kill the organism, or a combination thereof (e.g., a combination of the effects). For example, a "fungicide" comprises a biocidal substance used to kill a specific microbial group, the fungi; while a "fungistatic" denotes a substance that prevents fungal microorganism from growing and/or reproducing, but do not result in substantial killing. Examples of a biocide include, for example, a microbiocide, a bactericide, a fungicide, an algaecide, a mildewcide, a molluskicide, a viricide, or a combination thereof. Examples of a biostatic include, for example, a microbiostatic, a bacteristatic, a fungistatic, an algaestatic, a mildewstatic, a molluskistatic, a viristatic, or a combination thereof. Examples of a bacteria commonly found to contaminate a coating and/or a film include a *Pseudomonas* spp., an *Aerobacter* spp., an *Enterobacter* spp., a *Flavobacterium* spp. (e.g., a *Flavobacterium marinum*), a *Bacillus* spp., or a combination thereof. Examples of a fungi commonly found to contaminate a coating and/or a film include an *Aureobasidium pullulans*, an *Alternaria dianthicola*, a *Phoma pigmentivora*, or a combination thereof. Examples of an algae commonly found to contaminate a coating and/or a film include an Oscillotoria sp., a Scytonema sp., a Protoccoccus sp., or a combination thereof. Techniques for determining microbial contamination of a coating and/or a coating component have been described (see, for example, "ASTM Book of Standards, Volume 06.01, Paint—Tests for Chemical, Physical, and Optical Properties; Appearance," ASTM International, West Conshohocken, Pennsylvania, U.S.A., D5588-97, 2002).

In addition to the disclosures herein, a preservative and use of a preservative in a coating is known in the art, and all such materials and techniques for using a preservative in a coating may be used (see, for example, Flick, E. W. Handbook of Paint Raw Materials, Second Edition" Noyes Data Corporation/Noyes Publications, Park Ridge, NJ, U.S.A., 263-285 and 879-998, 1989; in "Paint and Coating Testing Manual, Fourteenth Edition of the Gardner-Sward Handbook," (Koleske, J. V. Ed.), American Society for Testing and Materials, Philadelphia, PA, U.S.A., pp 261-267 and 654-661, 1995; in "Paint and Surface Coatings, Theory and Practice, Second Edition," (Lambourne, R. and Strivens, T. A. William, Eds) Andrew Publishing, Woodhead Publishing Ltd, Abington Hall, Abington, Cambridge CB1 6AH, England, pp. 193-194, 371-382 and 543-547, 1999; Wicks, Jr., Z. W., Jones, F. N., Pappas, S. P. "Organic Coatings, Science and Technology, Volume 1: Film Formation, Components, and Appearance," pp. 318-320, 1992; Wicks, Jr., Z. W., Jones, F. N., Pappas, S. P. "Organic Coatings, Science and Technology, Volume 2: Applications, Properties and Performance," pp. 145, 309, 319-323 and 340-341, 1992; and in "Paints, Coatings and Solvents, Second, Completely Revised Edition," (Stoye, D. and Freitag, W., Eds.)) Wiley-Vch, New York, U.S.A., pp 6, 127 and 165, 1998; and in "Handbook of Coatings Additives," pp. 177-224, 1987).

A coating, a film, a surface, or a combination thereof, may be detrimentally affected by the presence of a living organism (e.g., a microorganism). For example, a living microorganism may alter viscosity due to damage to a cellulosic viscosifier; alter a rheological property by increasing the gelling of a coating; produce a color alteration ("discoloration") by production of a colorizing agent; produce a gas and increase foam; produce an odor; lower pH; damage a preservative; produce slime; reduce adhesion by a film; increase corrosion of a metal surface by moisture production by an organism; increase corrosion of a metal surface by film damage; damage a wooden surface by colonization (e.g., fungal colonization); or a combination thereof. These changes may lead to the coating and/or the film becoming unsuitable for use.

The quality of a liquid coating mixture may suffer markedly if a microorganism (e.g., a mold) degrades one or more of the components during storage (e.g., in-can). Since many of the coating products in use today comprise ingredients that make it susceptible or prone to microorganism (e.g., fungal) infestation and growth, it is common practice to include a preservative. Although bacterial contamination may be a contributing factor, fungi may typically be a primary cause of deterioration of a liquid paint and/or a coating. Foul odor, discoloration, thinning and clumping of the coating product, and other signs of deterioration of components render the product commercially unattractive and/or unsatisfactory for the intended purpose. If the container will be opened and closed a number of times after its initial use, in some instances over a period of several months or years, it may inevitably be inoculated with a cell such as an ambient fungus organism and/or a spore subsequent to purchase by the consumer. The growth of a microorganism may be more prevalent in a waterborne coating, as the solvent component of a solvent based-coating usually acts as a preservative. However, a film may be susceptible to such damage by growth of a microorganism after loss of a solvent (e.g., evaporation) during film formation. Additionally, various bacteria (e.g., a *Bacillus* spp.) and fungi produce spore(s), which are cell(s) that are relatively durable to unfavorable condition(s) (e.g., cold, heat, dehydration, a biocide), and may persist in a coating and/or a film for month(s) and/or year(s) prior to germinating into a damaging colony of cells. To avoid spoilage, it may be desirable to ensure that the product will remain stable and usable for the foreseeable duration of storage and use by enhancing the long-term antimicrobial (e.g., antifungal) properties of the paint and/or coating with an antibiological agent (e.g., an antifungal peptide agent, an antimicrobial peptide, an antimicrobial enzyme). The in-can stability and prospective shelf life of a paint and/or coating mixture comprising an antibiological agent (e.g., a peptide agent) may be assessed using any appropriate method of the art using conventional microbiological techniques. For example, a fungus known to infect paint(s) and/or other coating(s) may be used as the challenging assay organism.

In certain embodiments, a preservative may comprise an in-can preservative, an in-film preservative, or a combination thereof. An in-can preservative comprises a composition that reduces and/or prevents the growth of a microorganism prior to film formation. Addition of an in-can preservative during a waterborne coating production typically occurs with the introduction of water to a coating composition. Typically, an in-can preservative may be added to a coating composition for function during coating preparation, storage, or a combination thereof. An in-film preservative comprises a composition that reduces or prevents the growth of a microorganism after film formation. In many embodiments, an in-film preservative comprises the same chemical as an in-can preservative, but added to a coating composition at a higher (e.g., about two-fold or more) concentration for continuing activity after film formation.

Examples of a preservative used in a coating include a metal compound (e.g., an organo-metal compound) biocide, an organic biocide, or a combination thereof. Examples of a metal compound biocide include a barium metaborate (CAS No. 13701-59-2), which may function as a fungicide and/or a bactericide; a copper(II) 8-quinolinolate (CAS No. 10380-28-6), which may function as a fungicide; a phenylmercuric acetate (CAS No. 62-38-4), a tributyltin oxide (CAS No. 56-35-9), which may be less selected for use against Gram-negative bacteria; a tributyltin benzoate (CAS No. 4342-36-3), which may function as a fungicide and a bactericide; a tributyltin salicylate (CAS No. 4342-30-7), which may function as a fungicide; a zinc pyrithione ("zinc 2-pyridinethiol-N-oxide"; CAS No. 13463-41-7), which may function as a fungicide; a zinc oxide (CAS No. 1314-13-2), which may function as a fungistatic, a fungicide and/or an algaecide; a combination of zinc-dimethyldithiocarbamate (CAS No. 137-30-4) and a zinc 2-mercaptobenzothiazole (CAS No. 155-04-4), which acts as a fungicide; a zinc pyrithione (CAS No. 13463-41-7), which may function as a fungicide; a metal soap; or a combination thereof. Examples of a metal comprised in a metal soap biocide include a copper, a mercury, a tin, a zinc, or a combination thereof. Examples of an organic acid comprised in a metal soap biocide include a butyl oxide, a laurate, a naphthenate, an octoate, a phenyl acetate, a phenyl oleate, or a combination thereof.

An example of an organic biocide that acts as an algaecide includes a 2-methylthio-4-tert-butylamino-6-cyclopropylamino-s-triazine (CAS No. 28159-98-0). Examples of an organic biocide that acts as a bactericide include a combination of a 4,4-dimethyl-oxazolidine (CAS No. 51200-87-4) and a 3,4,4-trimethyloxazolidine (CAS No. 75673-43-7); a 5-hydroxy-methyl-1-aza-3,7-dioxabicylco (3.3.0.) octane (CAS No. 59720-42-2); a 2(hydroxymethyl)-aminoethanol (CAS No. 34375-28-5); a 2-(hydroxymethyl)-amino-2-methyl-1-propanol (CAS No. 52299-20-4); a hexahydro-1,3,5-triethyl-s-triazine (CAS No. 108-74-7); a 1-(3-chloroallyl)-3,5,7-triaza-1-azonia-adamantane chloride (CAS No. 51229-78-8); a 1-methyl-3,5,7-triaza-1-azonia-adamantane chloride (CAS No. 76902-90-4); a p-chloro-m-cresol (CAS No. 59-50-7); an alkylamine hydrochloride; a 6-acetoxy-2,4-dimethyl-1,3-dioxane (CAS No. 828-00-2); a 5-chloro-2-methyl-4-isothiazolin-3-one (CAS No. 26172-55-4); a 2-methyl-4-isothiazolin-3-one (CAS No. 2682-20-4); a 1,3-bis(hydroxymethyl)-5,5-dimethylhydantoin (CAS No. 6440-58-0); a hydroxymethyl-5,5-dimethylhydantoin (CAS No. 27636-82-4); or a combination thereof. Examples of an organic biocide that acts as a fungicide include a parabens; a 2-(4-thiazolyl)benzimidazole (CAS No. 148-79-8); a N-trichloromethyl-thio-4-cyclohexene-1,2-dicarboximide (CAS No. 133-06-2); a 2-n-octyl-4-isothiazoline-3-one (CAS No. 26530-20-1); a 2,4,5,6-tetrachloro-isophthalonitrile (CAS No. 1897-45-6); a 3-iodo-2-propynyl butyl carbamate (CAS No. 55406-53-6); a N-(trichloromethyl-thio) phthalimide (CAS No. 133-07-3); a tetrachloroisophthalonitrile (CAS No. 1897-45-6); a potassium N-hydroxy-methyl-N-methyl-dithiocarbamate (CAS No. 51026-28-9); a sodium 2-pyridinethiol-1-oxide (CAS No. 15922-78-8); or a combination thereof. Examples of a parabens include a butyl parahydroxybenzoate (CAS No. 94-26-8); an ethyl parahydroxybenzoate (CAS No. 120-47-8); a methyl parahydroxybenzoate (CAS No. 99-76-3); a propyl parahydroxybenzoate (CAS No. 94-13-3); or a combination thereof. Examples of an organic biocide that acts as a bactericide and fungicide include a 2-mercaptobenzothiazole (CAS No. 149-30-4); a combination of a 5-chloro-2-methyl-3 (2H)-isothiazoline (CAS No. 26172-55-4) and a 2-methyl-3(2H)-isothiazolone (CAS No. 2682-20-4); a combination of a 4-(2-nitrobutyl)-morpholine (CAS No. 2224-44-4) and a 4,4'-(2-ethylnitrotrimethylene dimorpholine (CAS No. 1854-23-5); a tetra-hydro-3,5-di-methyl-2H-1,3,5-thiadiazine-2-thione (CAS No. 533-74-4); a potassium dimethyldithiocarbamate (CAS No. 128-03-0); or a combination thereof. An example of an organic biocide that acts as an algaecide and fungicide includes a diiodomethyl-p-tolysulfone (CAS No. 20018-09-1). Examples of an organic biocide that acts as an algaecide, a bactericide and a fungicide include a glutaraldehyde (CAS No. 111-30-8); a methylenebis(thiocyanate) (CAS No. 6317-18-6); a 1,2-dibromo-2,4-dicyanobutane (CAS No. 35691-65-7); a 1,2-benzisothiazoline-3-one ("1,2-benzisothiazolinone"; CAS No. 2634-33-5); a 2-(thiocyanomethyl-thio)benzothiazole (CAS No. 21564-17-0); or a combination thereof. An example of an organic biocide that acts as an algaecide, a bactericide, a fungicide and a molluskicide includes a 2-(thiocyanomethyl-thio)benzothiozole (CAS No. 21564-17-0) and/or a methylene bis(thiocyanate) (CAS No. 6317-18-6).

In some embodiments, an antifungal agent (e.g., a fungicide, a fungistatic) may comprise a copper (II) 8-quinolinolate (CAS No. 10380-28-6); a zinc oxide (CAS No. 1314-13-2); a zinc-dimethyl dithiocarbamate (CAS No. 137-30-4); a 2-mercaptobenzothiazole, zinc salt (CAS No. 155-04-4); a barium metaborate (CAS No. 13701-59-2); a tributyl tin benzoate (CAS No. 4342-36-3); a bis tributyl tin salicylate (CAS No. 22330-14-9), a tributyl tin oxide (CAS No. 56-35-9); a parabens: ethyl parahydroxybenzoate (CAS No. 120-47-8), a propyl parahydroxybenzoate (CAS No. 94-13-3); a methyl parahydroxybenzoate (CAS No. 99-76-3); a butyl parahydroxybenzoate (CAS No. 94-26-8); a methylenebis(thiocyanate) (CAS No. 6317-18-6); a 1,2-benzisothiazoline-3-one (CAS No. 2634-33-5); a 2-mercaptobenzothiazole (CAS No. 149-30-4); a 5-chloro-2-methyl-3(2H)-isothiazolone (CAS No. 57373-19-0); a 2-methyl-3(2H)-isothiazolone (CAS No. 57373-20-3); a zinc 2-pyridinethiol-N-oxide (CAS No. 13463-41-7); a tetra-hydro-3,5-dimethyl-2H-1,3,5-thiadiazine-2-thione (CAS No. 533-74-4); a N-trichloromethyl-thio-4-cyclohexene-1,2-dicarboximide (CAS No. 133-06-2); a 2-n-octyl-4-isothiazoline-3-one (CAS No. 26530-20-1); a 2,4,5,6-tetrachloro-isophthalonitrile (CAS No. 1897-45-6); a 3-iodo-2-propynyl butylcarbamate (CAS No. 55406-53-6); a diiodomethyl-p-tolylsulfone (CAS No. 20018-09-1); a N-(trichloromethyl-thio)phthalimide (CAS No. 133-07-3); a potassium N-hydroxy-methyl-N-methyl-dithiocarbamate (CAS No. 51026-28-9); a sodium 2-pyridinethiol-1-oxide (CAS No. 15922-78-8); a 2-(thiocyanomethylthio) benzothiazole (CAS No. 21564-17-0); a 2-4(-thiazolyl) benzimidazole (CAS No. 148-79-8); or a combination thereof [see, or example, V. M. King, "Bactericides, Fungicides, and Algicides," Ch. 29, pp. 261-267; and D. L. Campbell, "Biological Deterioration of Paint Films," Ch. 54, pp. 654-661; both in PAINT AND COATING TESTING MANUAL, 14th ed. of the Gardner-Sward Handbook, J. V. Koleske, Editor (1995), American Society for Testing and Materials, Ann Arbor, MI]. Additional biological products that may possess antifungal activity are described in the background discussion of U.S. Pat. Nos. 6,020,312; 5,602,097; and 5,885,782. U.S. Pat. No. 5,882,731 describes a number of common and proprietary chemical mildewcide-comprising products that have been investigated as additives for water-based latex mixtures.

In certain embodiments an environmental law or regulation may encourage the selection of an organic biocide such as a benzisothiazolinone derivative. An example of a benzisothiazolinone derivative comprises a Busan™ 1264 (Buckman Laboratories, Inc.), a Proxel™ GXL (BIT), a Proxel™ TN (BIT/Triazine), a Proxel™ XL2 (BIT), a Proxel™ BD20 (BIT) and a Proxel™ BZ (BIT/ZPT) (Avecia Inc.), a Preventol® VP OC 3068 (Bayer Corporation), and/or a Mergal® K10N (Troy Corp.) which comprises a 1,2-benzisothiazoline-3-one (CAS No. 2634-33-5). In the case of a Busan™ 1264, the primary use may be function as a bactericide and/or a fungicide at about 0.03% to about 0.5% in a waterborne coating, though a Busan™ may be used as a wood and/or a packaging preservative (e.g., a biocide, a mold inhibitor, a bactericide). A Proxel™ TN comprises a 1,2-benzisothiazoline-3-one (CAS No. 2634-33-5) and a hexahydro-1,3,5-tris(2-hydroxyethyl)-s-triazine ("triazine"; CAS No. 4719-04-4), a Proxel™ GXL, a Proxel™ XL2 and a Proxel™ BD20 comprises a 1,2-benzisothiazoline-3-one (CAS No. 2634-33-5), a Proxel™ BZ comprises a 1,2-benzisothiazoline-3-one (CAS No. 2634-33-5) and a zinc pyrithione (CAS No. 13463-41-7), and are typically used in an industrial coating and/or a water-based coating as a bactericide and/or a fungicide. A Mergal® K10N comprises a 1,2-benzisothiazoline-3-one (CAS No. 2634-33-5), and may be used in a waterborne coating as a bactericide and/or a fungicide.

Often, a preservative comprises a proprietary commercial formulation and/or a compound sold under a tradename. Examples include an organic biocide under the tradename Nuosept® (International Specialty Products, "ISP"), which are typically used in a waterborne coating, often as an antimicrobial agent. Specific examples of a Nuosept® biocide include a Nuosept® 95, which comprises a mixture of bicyclic oxazolidines, and may be added to about 0.2% to about concentration to a coating; a Nuosept® 145, which comprises an amine reaction product, and may be added to about 0.2% to about 0.3% concentration to a coating; a Nuosept® 166, which comprises a 4,4-dimethyloxazolidine (CAS No. 51200-87-4), and may be added to about to about 0.3% concentration to a basic pH waterborne coating; or a combination thereof. A further example comprises a Nuocide® (International Specialty Products) biocide(s), which are typically used fungicide(s) and/or algaecide(s). Examples of a Nuocide® biocide comprises Nuocide® 960, which comprises about 96% tetrachlorisophthalonitrile (CAS No. 1897-45-6), and may be used at about 0.5% to about 1.2% in a waterborne and/or a solvent based coating as a fungicide; a Nuocide® 2010, which comprises a chlorothalonil (CAS No. 1897-45-6) and an IPBC (CAS No. 55406-53-6) at about 30%, and may be used at about 0.5% to about 2.5% in a coating as a fungicide and/or an algaecide; a Nuocide® 1051 and a Nuocide® 1071, each which comprises about 96% N-cyclopropyl-N-(1-dimethylethyl)-6-(methylthio)-1,3,5-triazine-2,4-diamine (CAS No. 28159-98-0), and may be used as an algaecide in an antifouling coating at about 1.0% to about 6.0% or a water-based coating at about 0.05% to about 0.2%, respectively; and a Nuocide® 2002, which comprises a chlorothalonil (CAS No. 1897-45-6) and a triazine compound at about 30%, and may be used at about 0.5% to about 2.5% in a coating and/or a film as a fungicide and/or an algaecide; or a combination thereof.

An additional example of a tradename biocide for a coating includes a Vancide® (R. T. Vanderbilt Company, Inc.). Examples of a Vancide® biocide include a Vancide® TH, which comprises a hexahydro-1,3,5-triethyl-s-triazine (CAS No. 108-74-7), and may be used in a waterborne coating; a Vancide® 89, which comprises a N-trichloromethylthio-4-cyclohexene-1,2-dicarboximide (CAS No. 133-06-2) and related compounds such as a captan (CAS No. 133-06-2), and may be used as a fungicide in a coating; or a combination thereof. A bactericide and/or a fungicide for a coating, particularly a waterborne coating, comprises a Dowicil™ (Dow Chemical Company). Examples of a Dowicil™ biocide include a Dowicil™ QK-20, which comprises a 2,2-dibromo-3-nitrilopropionamide (CAS No. 10222-01-2), and may be used as a bactericide at about 100 ppm to about 2000 ppm in a coating; a Dowicil™ 75, which comprises a 1-(3-chloroallyl)-3,5,7-triaza-1-azoniaadamantane chloride (CAS No. 51229-78-8), and may be used as a bactericide at about 500 ppm to about 1500 ppm in a coating; a Dowicil™ 96, which comprises a 7-ethyl bicyclooxazolidine (CAS No. 7747-35-5), and may be used as a bactericide at about 1000 ppm to about 2500 ppm in a coating; a Bioban™ CS-1135, which comprises a 4,4-dimethyloxazolidine (CAS No. 51200-87-4), and may be used as a bactericide at about 100 ppm to about 500 ppm in a coating, or a combination thereof the forgoing. An additional example of a tradename preservative (e.g., a biocide) for a coating includes a Kathon® (Rohm and Haas Company). An example of a Kathon® biocide includes a Kathon® LX, which typically comprises a 5-chloro-2-methyl-4-isothiazolin-3-one (CAS no 26172-55-4) and a 2-methyl-4-isothiazolin-3-one (CAS no 2682-20-4) at about 1.5%, and may be added from about 0.05% to about 0.15% in a coating. Examples of tradename fungicide and/or an algaecide include those described for a Fungitrol® (International Specialty Products), which typically may be used as fungicide(s), and a Biotrend® (International Specialty Products), which often is used as biocide(s); and are often formulated for a solvent based and/or a waterborne coating, an in-can and/or a film preservation. An example comprises a Fungitrol® 158, which comprises about 15% tributyltin benzoate (CAS No. 4342-36-3) and about 21.2% alkylamine hydrochlorides, and may be used at about 0.35% to about 0.75% in a waterborne coating for in-can and/or a film preservation. An additional example comprises a Fungitrol® 11, which comprises a N-(trichloromethylthio) phthalimide (CAS No. 133-07-3), and may be used at about 0.5% to about 1.0% as a fungicide for solvent based coating. A further example comprises a Fungitrol® 400, which comprises about 98% a 3-iodo-2-propynyl N-butyl carbamate ("IPBC") (Cas No. 55406-53-6), and may be used at about 0.15% to about 0.45% as a fungicide for a waterborne and/or a solvent based coating.

Further examples of a tradename preservative (e.g., a biocide) for a coating includes various Omadine® and/or Triadine® product(s) (Arch chemicals, Inc.), a Densil™ P, Densil™ C404 (e.g., a chlorthalonil), a Densil™ DN (BU-BIT), a Densil™ DG20 and a Vantocil™ IB (Avecia Inc.), a Polyphase® 678, a Polyphase® 663, a Polyphase® CST, a Polyphase® 641, a Troysan® 680 (Troy Corp.), a Rocima® 550 (i.e., a preservative), a Rocima® 607 (i.e., a preservative), a Rozone® 2000 (i.e., a dry film fungicide), and a Skane™ M-8 (i.e., a dry film fungicide; Rohm and Haas Company) and a Myacide™ GDA, a Myacide™ GA 15, a Myacide™ Ga 26, a Myacide™ 45, a Myacide™ AS Technical, a Myacide™ AS 2, a Myacide™ AS 30, a Myacide™ AS 15, a Protectol™ PE, a Daomet™ Technical and/or a Myacide™ HT Technical (BASF Corp.). A zinc Omadine® ("zinc pyrithione"; CAS No. 13463-41-7) may function as a fungicide and/or an algaecide typically used as an in-film preservative and/or an anti-fouling preservative; a sodium Omadine® ("sodium pyrithione"; CAS No. 3811-73-2) may be used as a fungicide and/or an algaecide in-film preservative; a copper Omadine® ("copper pyrithione"; CAS No. 14915-37-8) may be used as a fungicide and/or an algaecide in-film preservative and/or an anti-fouling preservative; a Triadine® 174 ("triazine," "1,3,5-triazine-(2H,4H, 6H)-triethanol"; "hexahydro-1,3,5-tris(2-hydroxyethyl)-s-triazine"; Cas No. 4719-04-4) may function as a bacteria biostatic and/or a bactericide typically used in a waterborne coating; an omacide IPBC ("Iodopropynyl-butyl carbomate") may function as a fungicide; a Densil™ P comprises a dithio-2,2-bis(benzmethylamide) (CAS No. 2527-58-4) and may be used in an industrial coating, a water-based coating and/or a film as a fungicide and/or a bactericide; a Densil™ C404 comprises a 2,4,5,6-tetrachloroisophthalonitrile ("chlorothalonil"; CAS No. 1897-45-6) and may be used as a fungicide; a Densil™ DN and a Densil™ DG20 comprise a N-butyl-1,2-benzisothiazolin-3-one (CAS No. 4299-07-4), and each may be used as a fungicide; a Vantocil™ IB comprises a poly(hexamethylene biguanide) hydrochloride ("PHMB"; CAS No. 27083-27-8) and may function as a microbiocide; a Polyphase® 678 comprises carbendazim (CAS No. 10605-21-7) and a 3-iodo-2-propynyl butyl carbamate (CAS No. 55406-53-6), and may be used as an antimicrobial biocide for an exterior coating and/or a surface treatment; a Polyphase® 663 comprises a 3-iodo-2-propynyl butyl carbamate (CAS No. 55406-53-6), a carbendazim (CAS No. 10605-21-7) and a diuron (CAS No. 330-54-1) and may be used as a fungicide and/or an algaecide in an exterior coating; a Rocima® 550 comprises a 2-methyl-4-isothiazolin-3-one (CAS No. 2682-20-4), and may be used as a bactericide and/or a fungicide for a waterborne coating; a Rozone® 2000 comprises a 4,5-dichloro-2-N-octyl-3(2H)-isothiazolone (CAS No. 64359-81-5) and may be used as a microbiocide for a latex coating; a Skane™ M-8 comprises a 2-Octyl-4-isothiazolin-3-one (CAS No. 26530-20-1), and may be used as an in-film fungicide; a Myacide™ GDA Technical (50% Glutaraldehyde), a Myacide™ GA 15, a Myacide™ Ga 26 and a Myacide™ 45 each comprise a glutaraldehyde solution (CAS No. 111-30-8), and are typically used as an algaecide, a bactericide, and/or a fungicide; a Myacide™ AS Technical (Bronopol, solid), a Myacide™ AS 2, Myacide™ AS 30, a Myacide™ AS 15 each comprise a 2-bromo-2-nitropropane-1,3-diol solution ("bronopol"; Cas No. 52-51-7) and are typically used as an algaecide; a Protectol™ PE comprises a phenoxyethanol liquid (CAS No. 122-99-6) and may be used as a microbiocide and/or a fungicide; a Dazomet™ Technical comprises a 3,5-dimethyl-2H-1,3,5-thiadiazinane-2-thione solid ("dazomet"; CAS No. 533-74-4) and may be used as a microbiocide and/or a fungicide; a Myacide™ HT Technical comprises a 1,3,5-tris-(2-hydroxyethyl)-1,3,5-hexahydrotriazine liquid ("Triazine," CAS No. 4719-04-4) and may be used as a microbiocide and/or a fungicide. Additional examples of tradename preservatives (all from Cognis Corp., Ambler, PA) includes a Nopcocide® N400, which comprises a Cholorthalonil-40% solution; a Nopcocide® N-98, which comprises a Chlorothalonil-100%; a Nopcocide® P-20, which comprises an IPBC-20% solution; a Nopcocide® P-40, which comprises an IPBC-40% solution; a Nopcocide® P-100, which comprises an IPBC-100% active; or a combination thereof.

Determination of whether damage to a coating and/or a film may be due to a microorganism (e.g., a film algal defacement, a film fungal defacement), as well as the efficacy of addition of a preservative to a coating and/or a film composition in reducing microbial damage to a coating and/or a film, may be empirically determined [see, for example, Flick, E. W. "Handbook of Paint Raw Materials, Second Edition," 263-285 and 879-998, 1989; in "Paint and Coating Testing Manual, Fourteenth Edition of the Gardner-Sward Handbook," (Koleske, J. V. Ed.), pp 261-267 and 654-661, 1995; in "Paint and Surface Coatings, Theory and Practice, Second Edition," (Lambourne, R. and Strivens, T. A., Eds.), pp. 193-194, 371-382 and 543-547, 1999; Wicks, Jr. et al., "Organic Coatings, Science and Technology, Volume 1: Film Formation, Components, and Appearance," pp. 318-320, 1992; Wicks, Jr. et al., "Organic Coatings, Science and Technology, Volume 2: Applications, Properties and Performance," pp. 145, 309, 319-323 and 340-341, 1992; in "Paints, Coatings and Solvents, Second, Completely Revised Edition," (Stoye, D. and Freitag, W., Eds.) pp 6, 127 and 165, 1998. In conducting such tests, microorganisms such as, for example, Gram-negative Eubacteria including *Alcaligenes faecalis* (ATCC No. 8750), *Pseudomonas aeruginosa* (ATCC Nos. 10145 and 15442), *Pseudomonas fluorescens* (ATCC No. 13525), *Enterobacter aerogenes* (ATCC No. 13048), *Escherichia coli* (ATCC No. 11229), *Proteus vulgaris* (ATCC No. 8427), *Oscillatoria* sp. (ATCC No. 29135), and *Calothrix* sp. (ATCC No. 27914); Gram-positive Eubacteria including *Bacillus subtilis* (ATCC No. 27328), *Brevibacterium ammoniagenes* (ATCC No. 6871), and *Staphylococcus aureus* (ATCC No. 6538); filamentous fungi including *Aspergillus oryzae* (ATCC No. 10196), *Aspergillus flavus* (ATCC No. 9643), *Aspergillus niger* (ATCC Nos. 9642 and 6275), *Aureobasidium pullulans* (ATCC No. 9348), *Penicillium* sp. (ATCC No. 12667), *Penicillium citrinum* (ATCC No. 9849), *Penicillium funiculosum* (ATCC No. 9644), *Cladosporium cladosporoides* (ATCC No. 16022), *Trichoderma viride* (ATCC No. 9645), *Ulocladium atrum* (ATCC No. 52426), *Alternaria alternate* (ATCC No. 52170), and *Stachybotrys chartarum* (ATCC No. 16026); yeast including *Candida albicans* (ATCC No. 11651); and *protista* including *Chlorella* sp. (ATCC No. 7516), *Chlorella vulgaris* (ATCC No. 11468), *Chlorella pyrenoidosa* (UTEX No. 1230), Chlorococcum oleofaciens (UTEX No. 105), *Ulothrix acuminata* (UTEX No. 739), *Ulothrix gigas* (ATCC No. 30443), *Scenedesmus quadricauda* (ATCC No. 11460), *Trentepohlia aurea* (UTEX No. 429), and *Trentepohlia odorata* (CCAP No. 483/4); have been used as positive control contaminants of a coating.

In additional aspects, a poor and/or a low microorganism/biological resistance rating for a coating may be denoted as a colony recovery/growth rating of 2 to 4, a discoloration/disfigurement rating of 0 to 5, a fouling resistance ("F.R.") or antifouling film ("A.F") rating of 0 to 70, and observed growth (e.g., fungal growth) on specimens of 2 to 4, respectively, as described in "ASTM Book of Standards, Volume 06.01, Paint—Tests for Chemical, Physical, and Optical Properties; Appearance," D3274-95, D2574-00, D3273-00, D5589-97 and D5590-00, 2002; and in "ASTM Book of Standards, Volume 06.02, Paint—Products and Applications; Protective Coatings; Pipeline Coatings," ASTM International, West Conshohocken, Pennsylvania, U.S.A., D3623-78a, 2002. An additional example of a standard microorganism/biological resistance assay may be described in "ASTM Book of Standards, Volume 06.01, Paint—Tests for Chemical, Physical, and Optical Properties; Appearance," D4610-98 and D3456-86, 2002; in "ASTM Book of Standards, Volume 06.02, Paint—Products and Applications; Protective Coatings; Pipeline Coatings," D4938-89, D4939-89, D5108-90, D5479-94, D6442-99, D6632-01, D4940-98 and D5618-94, 2002; and "ASTM Book of Standards, Volume 06.03, Paint—Pigments, Drying Oils, Polymers, Resins, Naval Stores, Cellulosic Esters, and Ink Vehicles," (2002) ASTM International, West Conshohocken, Pennsylvania, U.S.A., D912-81 and D964-65, 2002.

As used herein, a coating ("coat," "surface coat," "surface coating") refers to "a liquid, liquefiable or mastic composition that is converted to a solid protective, decorative, or functional adherent film after application as a thin layer" ("Paint and Coating Testing Manual, Fourteenth Edition of the Gardner-Sward Handbook" (Koleske, J. V. Ed.), p. 696, 1995; and in "ASTM Book of Standards, Volume 06.01, Paint—Tests for Chemical, Physical, and Optical Properties; Appearance," D16-00, 2002). A coating comprising a preservative described herein in embodiments is generally thinner than many common types of coatings (e.g., a typical architectural paint), and in many embodiments, may be from about a molecular layer (e.g., about 32 picometer ("pm") to about 10,000 pm) to about 5 µm thick.

A biomolecule composition may be incorporated upon and/or within (e.g., embedded) a material formulation used in the manufacture of an article, a device, a composition, etc. via methods described herein or as would be known to one of ordinary skill in the art in light of the present disclosure. These methods include, for example, application of a surface treatment (e.g., a coating) to the surface of a manufactured article, a device, and/or a composition, etc.; direct addition to a material formulation, incorporation as a component of a de novo formulation during preparation, post preparation absorption, in situ incorporation, post-polymerization incorporation, or a combination thereof, and may be used a substitute for, or in combination with, the other techniques described herein for processing and incorporation of such a composition into a material formulation. For a purpose such as ease of production, a material formulation may be provided as a single premixed formulation. In some embodiments, the components of a material formulation may be stored separately prior to combining for use. For example, for a purpose such as to optimize the initial activity (e.g., the activity of a biomolecule composition component) and/or extend the useful lifetime of the material formulation and/or the activity of a biomolecule composition, a biomolecule composition may be packaged separately from the other components of a material formulation into which the biomolecule composition may be added/incorporated/admixed. Thus, in certain embodiments, one or more components of a material formulation may be stored separately (e.g., a kit of components) prior to combining. The components may be stored in two or more containers ("pot") (e.g., about 2 to about 20 containers) in a multipack kit. In preferred embodiments, the biomolecule composition is incorporated into a surface treatment (e.g., a coating) that is applied to the surface of a material that will be at least a part or all of a manufactured article, a device, a composition, etc.

In specific embodiments, an antibiological enzyme comprises a glycosylase (EC 3.2). In more specific embodiments, the enzyme comprises a glycosidase (EC 3.2.1), which comprises an enzyme that hydrolyses an O-glycosyl compound, a S-glycosyl compound, or a combination thereof. In particular aspects, the glycosidase acts on an O-glycosyl compound, and examples of such an enzyme include a lysozyme, an agarase, a cellulase, a chitinase, or a combination thereof. In other embodiments, an antibiological enzyme include a lysozyme, a lysostaphin, a libiase, a lysyl endopeptidase, a mutanolysin, a cellulase, a chitinase, an α-agarase, an β-agarase, a N-acetylmuramoyl-L-alanine amidase, a lytic transglycosylase, a glucan endo-1,3-β-D-glucosidase, an endo-1,3(4)-β-glucanase, a β-lytic metalloendopeptidase, a 3-deoxy-2-octulosonidase, a peptide-N4-(N-acetyl-β-glucosaminyl)asparagine amidase, a mannosyl-glycoprotein endo-β-N-acetylglucosaminidase, a ι-carrageenase, a κ-carrageenase, a λ-carrageenase, an α-neoagaro-oligosaccharide hydrolase, an endolysin, an autolysin, a mannoprotein protease, a glucanase, a mannose, a zymolase, a lyticase. a lipolytic enzyme, or a combination thereof. Such antibiological enzymes are described, for example, in U.S. patent application Ser. Nos. 12/696,651, 12/696,651, 12/474,921 and 12/882,563, each specifically incorporated herein by reference. In some aspects, such an antibiological biomolecule composition may possess a biocidal and/or a biostatic activity. An antibiological biomolecule composition may be combined with any other antibiological agent described herein and/or known in the art, such as a preservative and/or an antimicrobial agent (e.g., a chemical biocide, a chemical biostatic, a fungicide, a fungistatic, a bactericide, an algaecide, etc.) (see, for example, U.S. Pat. No. 8,618,066).

An antibiological agent may be incorporated in a thermoplastic and/or applied to a surface of a thermoplastic. A thermoplastic comprises a thermoplastic polymer, and may be described as "plastics capable of being repeatedly softened or melted by increases in temperature and hardened by decreases in temperature. These changes are physical rather than chemical." [Handbook of Plastics, Elastomers, & Composites Fourth Edition" (Harper, C. A. Ed.) McGraw-Hill Companies, Inc, New York, p. 780, 2002]. In certain embodiments, the thermoplastic polymeric material comprises a biodegradable polymer [e.g., a natural polymer, a synthetic polymer, a photodegradable polymer, a biomedical polymer such as a poly(alkylene oxalate), a polyamino acid, a pseudo-polyamino acid, a polyanhydride, a polycaprolactone, a polycyanoacrylate, a polydioxanone, a polyglycolide, a poly(hexamethylene-co-trans-1,4-cyclohexane dimethylene oxalate), a polyhydroxybutyrate, a polyhydroxyvalerate, a polylactide, a poly(ortho ester), a poly (p-dioxanone), a polyphosphazene, a poly(propylene fumarate), a polyvinyl alcohol, a polyacrylate [e.g., a polymethacrylate, a poly(ethylene glycol-monomethacrylate)], a gelatin, a dextrin (e.g., a maltodextrin), an acacia, a poly aminotriazole, an albumin, a collagen, a fibrinogen, a fibrin, a gelatin, a polysaccharide; etc.], a cellulosic polymer (e.g., a cellulose acetate, a cellulose triacetate, a cellulose acetate butyrate, a cellulose acetate propionate, a cellulose methylcellulose, a methylcellulose, a cellulosehydroxyethyl, an ethylcellulose, a hydroxypropylcellulose, a nitrocellulose, a regenerated cellulose, etc.), a fluoropolymer (e.g., an ethylene chlorotrifluoroethylene, an ethylene tetrafluoroethylene, a fluoridated ethylene propylene, a polyvinylidene fluoride, a polychlorotrifluoroethylene, a polytetrafluoroethylene, a tetrachloroethylene-perfluorovinyl ether copolymer, a polyvinyl fluoride, etc.), a polyether (e.g., a polyaryl ether, a chlorinated polyether, a polyoxymethylene, a polyoxyethylene, a polyoxypropylene, etc.), a polyamide (e.g., an aromatic polyamide, a polyphthalamide, etc.), a polyacrylonitrile, a polyamide-imide, a polyarylate, a polybenzimidazole, a polybutylene, a polycarbonate, a thermoplastic polyester (e.g., a liquid crystal polyester, a polybutylene terephthalate, a polycyclohexylenedimethylene terephthalate, a polyethylene terephthalate, a polyethylene naphthalene, etc.), a polyetherimide, a polyethylene (e.g., a very low-density polyethylene, a low-density polyethylene, a linear low-density polyethylene, a medium-density polyethylene, a high-density polyethylene, an ultrahigh molecular weight polyethylene, a chlorinated polyethylene, a phosphorylated polyethylene, an ethylene-acrylic acid copolymer, an ethylene-methyl acrylate copolymer, an ethylene-ethyl acrylate copolymer, an ethylene-n-butyl acrylate copolymer, an ethylene-vinyl acetate copolymer, an ethylene-vinyl alcohol copolymer, etc.), a polyimide, a polyketone, an acrylic, a polymethylpentene, a polyphenylene oxide, a polyarylene sulphide, a polypropylene, a polyurethane, a polystyrene (e.g., a styrene-acrylonitrile copolymer, a styrene-butadiene copolymer, an acrylonitrile butadiene styrene terpolymer, an acrylonitrile-chlorinated polyethylene-styrene terpolymer, an acrylic styrene acrylonitrile terpolymer, a styrene-acrylic copolymer, a styrene-divinylbenzene copolymer, a styrene-maleic anhydride copolymer, a reactive polystyrene, etc.), a polysulfone resin (e.g., a polysulfone, a polyaryl sulfone, a polyether sulfone, a polyphenyl sulfone, etc.), a polyterpene, a polyvinyl acetal, a polyvinyl acetate, a thermoplastic vinyl ester, a polyvinyl ether, a polyvinyl carbazole, a polyvinyl chloride (e.g., a chlorinated polyvinyl chloride, etc.), a polyvinylidene chloride, a polyimidazopyrrolone, a polyacrolein, a polyvinylpyridine, a polyvinylamide, a polyurea, a polyquinoxaline, or a combination thereof.

The antibiological agent may be incorporated in a thermoset and/or applied to a surface of a thermoset. A thermoset ("thermoset plastic," "thermoset material") may be described as a "material that will undergo, and/or has undergone, a chemical reaction by the action of heat, catalysts, ultraviolet light, and the like, leading to a relatively infusible state that will not remelt after setting" [Handbook of Plastics, Elastomers, & Composites Fourth Edition" (Harper, C. A. Ed.) McGraw-Hill Companies, Inc, New York, 109, 2002]. A thermoset material generally comprises a resin ("thermoset resin," "thermosetting resin"), often described as "any class of solid, semi-solid, or liquid organic material, generally the product of natural or synthetic origin with a high molecular weight and no melting point" [Handbook of Plastics, Elastomers, & Composites Fourth Edition" (Harper, C. A. Ed.) McGraw-Hill Companies, Inc, New York, 109, 2002]. An example of a thermoset resin includes an alkyd resin, an allyl resin, an amino resin, a bismaleimide resin, an epoxy resin, a phenolic resin, a polyester resin, a polyimide resin, a polyurethane resin, a silicon resin, a vinyl ester resin, a casein, or a combination thereof.

The antibiological agent may be incorporated in an elastomer and/or applied to the surface of an elastomer. As used herein, an elastomer ("elastomeric material") comprises a "macromolecular material that returns rapidly to approximately the initial dimensions and shape after substantial deformation by a weak stress and release of the stress" while a rubber comprises a material "capable of recovering from a large deformation quickly and forcibly, and can be, and/or are already is, modified to a state in which it is essentially insoluble (but can swell) in a solvent." A rubber retracts within about one minute to less than about 1.5 times its original length after being held for about one minute at about twice its length at room temperature, while an elastomer retracts within about five minutes to within about 10% original length after being held for about five minutes at about twice its length at room temperature. In contrast, a plastic possesses plasticity, where application of a force that exceeds the material's yield value deforms the material continuously and permanently without rupture. An example of an elastomer includes a thermoplastic elastomer (e.g., an elastomeric polyolefin, a thermoplastic vulcanizate, a styrenic thermoplastic elastomer, a styrene-butadiene rubber, a thermoplastic polyurethane elastomer, a thermoplastic copolyester elastomer, a polyamide thermoplastic elastomer, etc.), a melt processable rubber, a synthetic rubber [e.g., a nitrile butadiene rubber, a butadiene rubber, a butyl rubber, a chlorosulfonated polyethylene, an epichlorohydrin, an ethylene propylene copolymer, a fluoroelastomer, a polyacrylate rubber, a poly(ethylene acrylic), a polychloroprene, a polyisoprene, a polysulfide rubber, a styrene butadiene rubber, a silicone rubber, etc.], a natural rubber, a propylene oxide elastomer, an ethylene-isoprene elastomer, an ethylene-vinyl acetate elastomer, a non-polymeric elastomer (e.g., a vulcanized oil), or a combination thereof.

The antibiological agent may be incorporated in an adhesive and/or a sealant; and/or applied to a surface of an adhesive and/or a sealant. An adhesive refers to a composition capable of attachment to one or more surfaces ("substrates") of one or more objects ("adherents"), wherein the composition comprises a solid or is capable of converting into the solid, wherein the solid is capable of holding a plurality of objects ("adherents") together by attachment to the surface of the objects while withstanding a normal operating stress load placed upon the objects and the solid. An adhesive typically comprises a solid or a liquid, but converts into a solid final form ("set") during normal use with desired attachment and material strength properties. A sealant comprises a composition capable of attachment to a plurality of surfaces to fill a space and/or a gap between the plurality of surfaces and form a barrier to a gas, a liquid, a solid particle, an insect, or a combination thereof. An adhesive generally functions to prevent movement of the adherents, while a sealant typically functions to seal adherents that move. An adhesive comprises a material (e.g., a coating such as a clear coating or a paint; or a mold release agent such a plastic release film) applied to a surface to inhibit adhesion/sticking of an additional material to the adhesive and/or a surface the adhesive covers. A "film adhesive" refers to a dry layer of an adhesive at the thickness of a polymeric film ("adhesive film") and/or a sheet ("adhesive sheet") generally capable of being cured by heat and/or pressure.

An adhesive may be classified by composition as a thermoplastic adhesive, a thermoset adhesive ("thermosetting adhesive"), an elastomeric adhesive, or a combination thereof (e.g., "alloy blend adhesive," "alloy adhesive," "blend adhesive"). Examples of adhesive include a thermoplastic adhesive, a thermoset adhesive, an elastomeric adhesive, an alloy adhesive, a non-polymeric adhesive, or a combination thereof. Examples of an adhesive includes a cellulosic adhesive, a cyanoacrylate adhesive, a dextrin adhesive, an ethylene-vinyl acetate copolymer adhesive, a melamine formaldehyde adhesive, a natural rubber adhesive, a neoprene/phenolic adhesive, a neoprene rubber adhesive, a nitrile rubber adhesive, a nitrile/phenolic adhesive, a phenolic adhesive, a phenol/resorcinol formaldehyde adhesive, a phenoxy adhesive, a polyamide adhesive, a polybenzimidazole adhesive, a polyethylene adhesive, a polyester adhesive, a polyimide adhesive, a polyisobutylene adhesive, a polysulfide adhesive, a polyurethane adhesive, a polyvinyl acetal adhesive, a polyvinyl acetal/phenolic adhesive, a polyvinyl acetate adhesive, a polyvinyl alcohol adhesive, a reclaimed rubber adhesive, a resorcinol adhesive, a silicone adhesive, a styrenic TPE adhesive, a styrene butadiene adhesive, a vinyl phenolic adhesive, a vinyl vinylidene adhesive, an acrylic acid diester adhesive, an epoxy adhesive, an epoxy/phenolic adhesive, an epoxy/polysulfide adhesive, an urea formaldehyde adhesive, an urea formaldehyde/melamine formaldehyde adhesive, an urea formaldehyde/phenol resorcinol adhesive, or a combination thereof. Examples of a thermosetting adhesive comprise an acrylic adhesive, an acrylic acid diester adhesive, a cyanoacrylate adhesive, a cyanate ester adhesive, an epoxy adhesive, a melamine formaldehyde adhesive, a phenolic adhesive, a polybenzimidazole adhesive, a polyester adhesive, a polyimide adhesive, a polyurethane adhesive, a resorcinol adhesive, an urea formaldehyde adhesive, or a combination thereof. Examples of a thermoplastic adhesive comprise an acrylic adhesive, an ethylene-vinyl acetate copolymer adhesive, a carbohydrate adhesive (e.g., a dextrin adhesive, a starch adhesive, etc.), a cellulosic adhesive (e.g., a cellulose acetate adhesive, cellulose acetate butyrate adhesive, cellulose nitrate adhesive, etc.), a polyethylene adhesive, a phenoxy adhesive, a polyamide adhesive, a polyvinyl acetal adhesive, a polyvinyl acetate adhesive, a polyvinyl alcohol adhesive, a protein adhesive (e.g., an animal adhesive, a soybean adhesive, a blood adhesive, a fish adhesive, a casein adhesive, etc.), a vinyl vinylidene adhesive, or a combination thereof. Examples of an elastomeric adhesive comprise a butyl rubber adhesive, a natural rubber adhesive, a neoprene rubber adhesive, a nitrile rubber adhesive, a polyisobutylene adhesive, a polysulfide adhesive, a reclaimed rubber adhesive, a silicone adhesive, a styrenic TPE adhesive, a styrene butadiene adhesive, or a combination thereof. Examples of an alloy adhesive comprise an epoxy/polyamide adhesive, an epoxy/phenolic adhesive, an epoxy/polysulfide adhesive, a neoprene/phenolic adhesive, a nitrile/phenolic adhesive, a phenol/resorcinol formaldehyde adhesive, a polyvinyl acetal/phenolic adhesive, a vinyl/phenolic adhesive, an urea formaldehyde/phenol resorcinol adhesive, a urea formaldehyde/melamine formaldehyde adhesive, or a combination thereof. Examples of a non-polymeric adhesive include a mucilage adhesive.

The antibiological agent may be incorporated in a foamed material formulation and/or applied to a surface of a foamed material formulation. Foaming modifies a solid material formulation (e.g., a polymeric material) to comprise voids ("cells") by the action of a blowing agent, though mechanical action may be used to whip a gas (e.g., air) into a material formulation prior to curing and/or solidification. In context, a plastic that has undergone foaming may be referred to as a "cellular plastic," "foam," etc, an elastomer that has undergone foaming may be known herein as a "cellular elastomer," "foamed elastomer," etc., a polymeric material that has undergone foaming may be known herein as a "cellular polymeric material" "foamed polymeric material," etc., and so forth.

The antibiological agent may be applied to a polymeric material comprising a reinforcement and/or applied to surface of a polymeric material comprising a reinforcement. Examples of a polymeric material comprising a reinforcement include a reinforced polymeric material (e.g., a reinforced plastic, a reinforced thermoset, a reinforced thermoplastic, a reinforced elastomer, etc.), a composite, a laminate, a honeycomb, a coated fabric, or a combination thereof. A reinforced polymeric material comprises a polymer and a reinforcing filler. A reinforced polymeric material may be initially prepared in the form of a molding compound, which refers to a moldable solid and/or semisolid form of a reinforced polymeric material. Examples of a polymeric material comprising a reinforcement include a reinforced polymeric material (e.g., a reinforced plastic), a composite, a laminate, a honeycomb, a coated fabric, or a combination thereof. A sheet molding compound ("SMC") may be prepared using a conveyor belt moving a plastic film (e.g., a PP film) covered with a layer of a molding compound resin (e.g., an unsaturated polyester resin, a vinyl ester resin, a polyurethane, etc.) being layered with a reinforcement (e.g., a fiberglass such as a roving, usually up to about 30% to about 40% glass fiber), and that layer of molding compound and reinforcement covered by another layer of molding compound and a plastic film. A sheet may be produced, for example, comprising layers of a plastic film, a molding compound, and a plastic film, often up to about 6.5 mm thick, that may be cut into a desired size. A bulk molding compound ("BMC," "high-strength compound") generally comprises a thermoset resin (e.g., an alkyd resin, an allyl resin, an amino resin, an epoxy resin, a phenolic resin, a polyester resin, a vinyl ester resin, a silicon resin, etc.) and a reinforcement (e.g., a fiber up to about 2.6 cm), a filler, an additive, or a combination thereof, and may be prepared by mixing at low intensity to reduce reinforcement degradation.

A composite ("composite material") comprises a polymer in the form of an infusible polymer matrix and a reinforcement, wherein the identities and properties of the polymer and the reinforcement are retained. The reinforcement may be held, bound, bonded, resides, and/or embedded within the matrix. A composite may be classified by the matrix material, and examples of a composite includes a polymer matrix composite, a metal (e.g., an aluminum, a titanium, etc.) composite, a ceramic (e.g., an alumina, a glass, a silicon carbide, etc.) composite, a carbon (e.g., an amorphous carbon) composite, or a combination thereof.

A type of composite comprises a laminate, which may be created by stacking and binding a plurality of layers of one or more materials, wherein each layer comprises a reinforcement and/or a polymer matrix material. A layer of material in a laminate may comprise a polymeric film and/or a sheet of a polymeric material (e.g., a composite, a plastic, an elastomer, etc.), a reinforcement (e.g., a metal, a wood, a glass, etc.), or a combination thereof. A multilayered plastic film and/or a multilayered plastic sheet may be produced by coextrusion rather than creation of a laminate, due to the ease of processing.

Processing of a polymeric material refers to manipulation of the material into a desired form of shape, size, consistency (e.g., a solid), etc. Often a polymeric material undergoes drying to removed moisture and/or a volatile liquid component (e.g., water) prior to processing to allow production of a suitable product. A polymeric material may comprise an additive, such as one or more antimicrobial agent(s), to confer and/or modify a property of the polymeric material formulation. An additive ("modifier") used in a polymeric material may be incorporated ("compounded"), such as by being admixed, absorbed, etc. into the polymeric material and/or a precursor material (e.g., a monomer, a prepolymer). It is contemplated that any additives described herein (e.g., a coating additive) or that would be known to one of ordinary skill in the art may be incorporated into a polymeric material, with non-limiting examples including an adhesion promoter, an anti-aging additive, an anti-blocking agent, an anti-fogging agent, an antioxidant, an antiozonant, an anti-static agent, a blowing agent, a coupling agent, a crosslinking agent, a curing agent (e.g., a catalyst), a colorant, a defoamer, a degrading agent, a deodorant, a diluent, a dispersant, a filler, a flame retardant, a flux (i.e., a processing flow enhancer such as a coumarone-indene resin for use in a vinyl polymer), an impact modifier, an inhibitor, an initiator, a low-profile additive, a lubricant, an antimicrobial agent, a plasticizer, a promoter, a slip agent, a processing aid, a thickening agent, a thinner, a mold release agent, a thixotrope, a nucleating agent, a stabilizer (e.g., a heat stabilizer, a light stabilizer such as an UV stabilizer also known as a "UV protector"), a surfactant, an odorant, a wetting agent, or a combination thereof.

It is contemplated that any processing technique for a polymeric material described herein or that would be known to one of ordinary skill in the art may be used to form an article of manufacture, a device, a material formulation, etc. which may be coated and/or incorporate an antibiological agent. Non-limiting examples of such processing techniques include: injection molding, injection compression that may be used to prepare a thin walled part, continuous chain injection molding, co-injection molding, reciprocating-screw injection molding, screw plasticating injection molding, transfer molding, injection blow molding, blow molding, compression molding, vacuum bag molding, pressure bag molding, autoclaved molding, calendaring, solvent casting, solution casting, solvent molding, dip casting ("dip molding"), thermoforming, stretch forming, skiving, cold drawing, cold forming, forging ram extrusion, extrusion coextrusion, rotational molding, slush molding, spinning melt spinning, foam molding, integrated skin molding, steam molding, sandwich molding, in situ foam molding, in mold assembly, injection molding hybridization, potting encapsulation casting, or a combination thereof.

In some embodiments, polymeric material processing techniques that use lower temperatures are preferred (e.g., solvent casting, solution casting, cold drawing, cold forming, etc.) for use when incorporating and/or applying the antibiological agent and/or a surface treatment (e.g., a coating, a textile finish) comprising an antibiological agent, during or immediately after the processing technique. For example, coating (e.g., clear coating, painting) of the device and/or the sub-device may occur as well in the in-mold assembly to improve efficiency of manufacture. For example, a surface of a laminate [e.g., a material layer ("substrate layer")-foam-skin laminate] may be coated as part of an in-mold assembly process. Reaction injection molding typically involves injecting a chemically reactive component (e.g., a prepolymer of a thermoset) into a mold to undergo production of a polymeric material, often as part of an in mold assembly process (e.g., a reaction to produce a foam layer in association with a skin).

In some embodiments, an article of manufacture, a device, a material formulation, etc. such as one comprising a polymeric material such as a plastic, reinforced polymeric material, composite (e.g., a laminate), or a combination thereof, may be further processed by standard processing/manufacturing techniques known to those of ordinary skill in the art, after release from a mold and/or being fashioned (e.g., die cut, knife cut, etc.) into a desired shape, size, and/or material properties. A polymeric material object may be further altered through tooling and machining such as abrasion, grinding, grit blasting, drilling, threading, welding (e.g., friction welding, ultrasonic welding, heat welding, heated tool welding, resistance wire welding, induction welding, infrared welding, hot-gas welding, laser welding, vibration welding, spin welding, stitching, etc.), cutting, tapping, reaming, sawing, milling, turning, routing, wire brushing, etc, often to allow assembly with other component(s). For example, an article and/or a device comprising a polymeric material may be produced by fabrication, which involves machining a polymeric material, often in the form of a sheet, a tube, and/or a rod, into a desired form, and assembled as desired with other component(s) using such processes as ashing, blanking, buffing, cementing, drawing, drilling, filing, forming, flame treatment of a polymeric material surface, grinding, milling, piercing, polishing (e.g., flame polishing a thermoplastic), sanding, sawing, tumbling, routing, turning, trimming, or a combination thereof. An adhesive may be used to bind such items and/or components as desired. A polymeric film and/or a sheet may be cut to desired size to produce a tape, and combined with an adhesive. An insert may be incorporated in and/or upon the polymeric material, typically through welding.

A surface treatment (e.g., a coating, a textile finish) may be added to the surface of a material (e.g., a polymeric material, glass, a surface already treated or coated with a surface treatment, etc.), and in some embodiments the surface treatment comprises an upper layer of material (e.g., a top-coat). The antibiological agent and/or a surface treatment comprising the antibiological agent may also be applied to the surface of a material that has not been treated with another surface treatment. For example, various coating techniques, including machine-based coating techniques, as described herein or as would be known to one of ordinary skill in the art may be used. For example, roll coating may use a roll to move a polymeric sheet and/or a polymeric film through a coating in a pan to coat the polymeric sheet and/or the polymeric film. Vapor curing may be used to coat a material and involves contacting an uncrosslinked coating with a vaporized curing agent in an enclosed chamber to produce a cured coating upon the material.

Numerous assays described herein or as would be known to one of ordinary skill in the art for determining the properties of a manufactured article, a device, etc. comprising a polymeric material (e.g., a plastic) are available to aid in preparation, processing, post cure processing, and/or completion of manufacture of the manufactured article, a device, etc. For example, an assay may be used to tailor one or more properties of an article, a device, a composition, etc. made from a polymeric material as desired, particularly in formulating a polymeric material comprising an antibiological agent (e.g., via incorporation, applying the antibiological agent to the surface, applying a surface treatment comprising an antibiological agent to a surface, etc.).

The properties of an antibiological agent in and/or upon a manufactured article, a device, a material formulation, etc. may be empirically determined by techniques described herein or as would be known to one of ordinary skill in the art. For example, a coating, such as one comprising an antibiological agent described herein, with a desired set of properties for a particular use may be prepared by varying the ranges and/or combinations of coating component(s), including a biomolecule composition (e.g., a bio-based antibiological agent) described herein, and such coating selection and preparation may be done in light of the present disclosures. For example, a variety of assays are available to measure various properties of a coating, a coating application technique, and/or a film to determine the degree of suitability of a coating composition for use in a particular use (see, for example, in "Hess's Paint Film Defects: Their Causes and Cure," Springer Netherlands, 1979). In a further example, the physical properties (e.g., purity, density, solubility, volume solids and/or specific gravity, rheology, viscometry, and particle size) of the resulting a liquid coating product (e.g., on comprising a biomolecule composition), can be assessed using standard techniques of the art and/or as described in PAINT AND COATING TESTING MANUAL, 14$^{th}$ ed. of the Gardner-Sward Handbook, J. V. Koleske, Editor (1995), American Society for Testing and Materials (ASTM), Ann Arbor, MI and applicable published ASTM assay methods. Alternatively, any other suitable assay method of the art, may be employed for assessing physical properties of the coating mixture comprising an above-described antibiological agent. A paint and/or a coating comprising an antibiological agent may then be assayed and used as described elsewhere herein, or the product may be employed for any other suitable purpose in the art in light of this disclosure.

For example, weathering resistance refers to a film's ability to endure and/or protect a surface from an external environmental condition. Examples of environmental conditions that may damage a film and/or a surface include contact with varying conditions of temperature, moisture, sunlight (e.g., UV resistance), pollution, biological organisms, or a combination thereof. Examples of a standard technique for determining the weathering resistance of a film (e.g., a film on a manufactured article) by evaluating the degree of damage (e.g., fungal growth, color alteration, dirt accumulation, gloss loss, chalking, cracking, blistering, flaking, erosion, surface rust), are described in "ASTM Book of Standards, Volume 06.01, Paint—Tests for Chemical, Physical, and Optical Properties; Appearance," D4141-01, D1729-96, D660-93, D661-93, D662-93, D772-86, D4214-98, D3274-95, D714-02, D1654-92, D2244-02, D523-89, D1006-01, D1014-95, and D1186-01, 2002; "ASTM Book of Standards, Volume 06.02, Paint—Products and Applications; Protective Coatings; Pipeline Coatings," D3719-00, D610-01, D1641-97, D2830-96, and D6763-02, 2002; and "Paint and Coating Testing Manual, Fourteenth Edition of the Gardner-Sward Handbook," (Koleske, J. V. Ed.), pp. 619-642, 1995. Additionally, standard techniques in the art for determining the resistance of a film to artificial weathering (e.g., heat, moisture, light, UV irradiation) at an accelerated timetable are described in "ASTM Book of Standards, Volume 06.01, Paint—Tests for Chemical, Physical, and Optical Properties; Appearance," D822-01, D4587-01, D5031-01, D6631-01, D6695-01, D5894-96, and D4141-01, 2002; "ASTM Book of Standards, Volume 06.02, Paint—Products and Applications; Protective Coatings; Pipeline Coatings," D5722-95, D3361-01 and D3424-01, 2002; and "Paint and Coating Testing Manual, Fourteenth Edition of the Gardner-Sward Handbook" (Koleske, J. V. Ed.), pp. 643-653, 1995.

Standard procedures for determining the visual appearance of a coating component, a coating and/or a film (e.g., reflectance, retroreflectance, fluorescence, photoluminescent light transmission, color, tinting strength, whiteness, gloss, measurement instruments, computerized data analysis) have been described, for example, in "ASTM Book of Standards, Volume 06.01, Paint—Tests for Chemical, Physical, and Optical Properties; Appearance," E284-02b, E312-02, E805-01a, E179-96, E991-98, E1247-92, E308-01, E313-00, E808-01, E1336-96, E1341-96, E1347-97, E1360-90, D332-87, D387-00, E1455-97, E1477-98a, E1478-97 E1164-02, E1331-96, E1345-98, E1348-02, E1349-90, D5531-94, D3964-80, E1651-94, E1682-96, E1708-95, E1767-95, E1808-96, E1809-01, E2022-01, E2072-00, E2073-02, E2152-01, E2153-01, D1544-98, E259-98, D3022-84, D1535-01, E2175-01, E2214-02, D4449-90, E167-96, E430-97, D4039-93, D5767-95, and E2222-02, 2002; "ASTM Book of Standards, Volume 06.02, Paint—Products and Applications; Protective Coatings; Pipeline Coatings," D4838-88, D3928-00a, and D5326-94a, 2002; and "ASTM Book of Standards, Volume 06.03, Paint—Pigments, Drying Oils, Polymers, Resins, Naval Stores, Cellulosic Esters, and Ink Vehicles," D2090-98, D2090-98 and D6166-97, 2002. Specific techniques for matching two or more colored coatings and/or coating components to reduce differences (e.g., metamerism) have been described, for example, in "ASTM Book of Standards, Volume 06.01, Paint—Tests for Chemical, Physical, and Optical Properties; Appearance," D4086-92a, E1541-98 D2244-02 2002. Specific techniques for determining differences in the color of a coating and/or a coating component, particularly to insure color consistency of a coating composition, have been described, for example, in "ASTM Book of Standards, Volume 06.01, Paint—Tests for Chemical, Physical, and Optical Properties; Appearance," D1729-96, D2616-96, E1499-97, and D3134-97, 2002.

As used herein, "bioactivity resistance" refers to the ability of a biomolecule composition to confer a desired property during and/or after contact with a stress condition normally assayed for in a standard assay procedure for a material formulation. Examples of such a stress condition includes, for example, a temperature (e.g., a baking condition), contact with a material formulation component (e.g., an organic liquid component), contact with a chemical reaction (e.g., thermosetting film formation), contact with damaging agent to a material formulation (e.g., weathering such as UV irradiation via sunlight, detergents, and/or solvents such as automotive chemicals and/or petroleum products), etc. In specific facets, wherein a biomolecule composition comprises a desired biomolecule (e.g., a bio-based antibiological agent), a biomolecule may possess a greater bioactivity resistance such as determined with such an assay procedure, and a particular coating formulation may be optimized for a desired range of bioactivity resistance.

Such bioactivity resistance may be determined using a standard procedure for material formulation described herein or in the art, in light of the present disclosures. For example, any assay described herein or in the art in light of the present disclosures may be used to determine the bioactivity resistance wherein an enzyme retains detectable enzymatic activity upon contact with a condition typically encountered in a standard assay. Additionally, in certain aspects, it is contemplated that a material formulation comprising an enzyme may lose part or all of a detectable, desirable bioactivity during the period of time of contact with standard assay condition, but regain part or all of the enzymatic bioactivity after return to non-assay conditions. An example of this process is the thermal denaturation of an enzyme at an elevated temperature range into a configuration with lowered or absent bioactivity, followed by refolding of an enzyme, upon return to a more suitable temperature range for the enzyme, into a configuration possessing part or all of the enzymatic bioactivity detectable prior to contact with the elevated temperature. In another example, an enzyme may demonstrate such an increase in bioactivity upon removal of a solvent, a chemical, etc.

In some embodiments, an enzyme identified as having a desirable enzymatic property for one or more target substrates may be selected for incorporation into a material formulation. The determination of an enzymatic property may be conducted using any technique described herein or in the art, in light of the present disclosures. For example, the determination of the rate of cleavage of a substrate, with or without a competitive or non-competitive enzyme inhibitor, can be utilized in determining the enzymatic properties of an enzyme, such as $V_{max}$, $K_m$, $K_{cat}/K_m$ and the like, using analytical techniques such as Lineweaver-Burke analysis, Bronsted plots, etc Brockerhoff, Hans and Jensen, Robert G. “Lipolytic Enzymes”, pp 10-24, 1974; Dumas, D. P. et al., *Biotech. Appl. Biochem.* 11:235-243, 1989; Dumas, D. P. et al., *The Journal of Bio. Chem.* 264(33):19659-19665, 1989; Dumas, D. P. et al., *Arch. Biochem. Biophys.* 277:155-159, 1990; Caldwell, S. R. and Raushel, F. M., *Biochem.* 30:744-7450, 1991; Donarski, W. J. et al., *Biochemistry* 28:4650-4655, 1989; Raveh, L. et al., *Biochemical Pharmacology* 44(2):397-400, 1992 Shim, H. et al., *J. Biol. Chem.* 273(28): 17445-17450, 1998; Watkins, L. M. et al., *J. Biol. Chem.* 272(41):25596-25601, 1997; Hill, C. M. et al., *Bioorganic Medicinal Chemistry Letters* 2000; Hartleib, J. and Ruterjans, H *Biochim et Biophys Acta* 1546:312-324, 2001; Lineweaver, H. and Burke, D. “*J. Am. Chem. Soc.* 56:658-666, 1934; Segel, I. H. Biochemical Calculations: How to Solve Mathematical Problems in General Biochemistry $2^{nd}$ Edition, John Wiley & Sons, Inc., New York, 1976). Such analysis may be used to identify an enzyme with a specifically enzymatic property for one or more substrates, given that use of an assay for an enzyme's activity may be incorporated with identification of a proteinaceous molecule as having enzymatic activity.

For example, lipolytic enzymes and phosphoric triester hydrolases have demonstrated the ability to degrade a wide variety of lipids and OP compounds, respectively. Methods for measuring the ability of an enzyme to degrade a lipid or an OP compound are described herein as well as in the art. Any such technique may be utilized to determine enzymatic activity of a composition for a particular lipid or an OP compound. For example, techniques for measuring the enzymatic degradation for various lipids comprising an ester and/or other hydrolysable moiety, including a triglyceride such as a triolein, an olive oil, and/or a tributyrin; a chromogenic substrate such as 4-methylumbelliferone, and/or a 4-methylumbelliferone; and/or a radioactively labeled glycerol ester substrate, such as a glycerol [$^3$H]oleic acid esters; may be used (see, for example, Brockerhoff, Hans and Jensen, Robert G. “Lipolytic Enzymes.” pp-25-34, 1974). To measure a lipolytic enzyme's activity against a substrate, a molecular monolayer of a lipid substrate may be used to control variables such as pressure, charge potential, density, interfacial characteristics, enzyme binding, and/or the effects of an inhibitor, in measuring lipolytic enzyme kinetics [see for example, Gargouri, Y. et al., *Eur J Biochem.,* 180(2):367-371, 1989; Melo, E. P. et al., *Biochemistry,* 34(5):1615-1621, 1995; In “Methods and Molecular Biology, Volume 109 Lipase and Phospholipase Protocols.” (Mark Doolittle and Karen Reue, Eds.), Humana Press, pp. 157-164, 177-186, 203-213, 279-302, 1999].

In an additional example, measuring the activity, stability, and other property(s) of an enzyme may be conducted using techniques in the art. For example, methods for measuring the activity of a phospholipase $A_2$ and a phospholipase C by the thin layer chromatography product separation, the fluorescence change of a labeled substrate (e.g., a dansyl-labeled glycerol, a pyrene-PI, a pyrene-PG), the release of product(s) from a radiolabeled substrate (e.g., [$^3$H]Plasmenylcholine) have been described [see for example, in “Methods and Molecular Biology, Volume 109 Lipase and Phospholipase Protocols.” (Mark Doolittle and Karen Reue, Eds.), Humana Press, pp. 1-17, 31-48, 1999]. Similarly, the release of fluorogenic product(s) from substrate(s) such as, for example, a 1-trinitrophenyl-aminododecanoyl-2-pyrenedecanoyl-3-O-hexadecyl-sn-glycerol, or a radioactive product(s) from radiolabeled substrate(s) such as, for example, a [$^3$H]triolein; glycerol tri[9,10(n)-[$^3$H]oleate; cholesterol-[1-$^{14}$C]-oleate; a 1(3)-mono-[$^3$H]oleoyl-2-O-mono-oleylglycerol (a.k.a. [$^3$H]-MOME) and a 1(3)-mono-oleoyl-2-O-mono-oleylglycerol (a.k.a. MOME); by lipolytic enzyme(s) that catalyze hydrolysis of a tri, a di, or a monoacylglycerol(s) and/or sterol ester(s) may be used to measure such enzymes' activity [see for example, in “Methods and Molecular Biology, Volume 109 Lipase and Phospholipase Protocols.” (Mark Doolittle and Karen Reue, Eds.), Humana Press, pp. 18-30, 59-121, 1999]. Other assays using radiolabeled *E. coli* membranes to measure phospholipase activity in comparison to photometric and other assays has also been described [In “Esterases, Lipases, and Phospholipases from Structure to Clinical Significance.” (Mackness, M. I. and Clerc, M., Eds.), HAFTAD Engelska, pp 263-272, 1994]. Additional assays for the bioactivity of enzymes in a material formulation (e.g., a coating) are described in U.S. patent application Ser. Nos. 12/696,651, 12/474,921 and 12/882,563, each specifically incorporated herein by reference.

In some cases, these techniques may be modified by replacement a biomolecule composition prepared by different techniques with another (e.g., a purified enzyme replace with an immobilized enzyme) in the material formulation, and assaying the bioactivity of such a material formulation. Such measurements of the enzymatic activity of compositions may be used to select a material formulation with the desired activity properties of stability, activity, and such like, in different environmental conditions (e.g., weathering, pressure, interfacial characteristics, the effects of an inhibitor, temperature, detergent, organic solvent, etc.) and/or after contact with different substrate(s) (e.g., contact with substrates mimicking vegetable oil properties vs. those for a sterol when assaying for a lipolytic enzyme) to assess properties such as the antibiological activity, substrate preference, enantiomeric specificity, kinetic properties, etc. of a material formulation.

It is contemplated that a coating comprising an antibiological agent may be applied as a coating layer upon another coating, including clear coatings and paints as described herein or as would be known in the art for various applications. In some embodiments, particularly for a commonly used clear coating or paint, a thin layer for such a coating comprises about 5 µm to about 1500 µm thick (e.g., about 15 µm to about 150 µm thick), though the coating comprising an antibiological agent may also be of this thickness in some embodiments. Further, the coating comprising an antibiological agent may comprise any component for a coating described herein or as would be known to one of ordinary skill in the art in light of the present disclosures. In an alternative embodiment, a material formulation (e.g., a paint or clear coating) may be prepared that lacks sufficient antibiological agent to produce a desired amount of antibiological agent propertiesr, but still possesses other properties suitable for use in other applications.

A clear-coating refers to a coating that is not opaque (e.g., transparent, semi-transparent, translucent) and/or does not produce an opaque solid film after application and cure, but may coating may be colored or non-colored. Hiding power refers to the ability of a coating and/or a film (e.g., an opaque coating or film) to prevent light from being reflected from a surface. Examples of a clear-coating include, a lacquer, a varnish, a shellac, a stain, a water repellent coating, or a combination thereof. A paint refers to a "pigmented liquid, liquefiable or mastic composition designed for application to a substrate in a thin layer which is converted to an opaque solid film after application used for protection, decoration or identification, or to serve some functional purpose such as the filling or concealing of surface irregularities, the modification of light and heat radiation characteristics, etc." ["Paint and Coating Testing Manual, Fourteenth Edition of the Gardner-Sward Handbook" (Koleske, J. V. Ed.), p. 696, 1995]. It is contemplated that various formulations of paints known in the art may be converted to suitable clear coating by removal of components, such as colorants, that produce hiding power, opacity, or a combination thereof. Standard techniques for determining the hiding power of a coating and/or a film (e.g., paint, a powder coating) are described, for example, in "ASTM Book of Standards, Volume 06.01, Paint—Tests for Chemical, Physical, and Optical Properties; Appearance," E284-02b, D344-97, D2805-96a, D2745-00 and D6762-02a 2002; "ASTM Book of Standards, Volume 06.02, Paint—Products and Applications; Protective Coatings; Pipeline Coatings," D5007-99, D5150-92 and D6441-99, 2002; and "Paint and Coating Testing Manual, Fourteenth Edition of the Gardner-Sward Handbook" (Koleske, J. V. Ed.), pp. 481-506, 1995.

A coating generally comprises one or more component materials that contribute to the properties of the coating, the ability of a coating to be applied to a surface, the ability of the coating to undergo film formation, and/or the properties of the produced film. Examples of such a coating component include a binder, a liquid component, a colorant, an additive, or a combination thereof, and such materials are contemplated for used in a coating.

A binder ("polymer," "resin," "film former") comprises a molecule capable of film formation. Film formation refers to a physical and/or a chemical change of a binder in a coating, wherein the change converts the coating into a film. Often, a binder converts into a film through a polymerization reaction, wherein a first binder molecule (e.g., a monomer) covalently bonds with at least a second binder molecule (e.g., a monomer) to form a polymer. A thermoplastic binder and/or a coating reversibly softens and/or liquefies when heated. Film formation for a thermoplastic coating generally comprises a physical process, typically the loss of the volatile (e.g., liquid) component from a coating. A thermosetting binder undergoes film formation by a chemical process, typically the crosslinking of a binder into a network polymer. Examples of a binder include an oil-based binder (e.g., an oil; an alkyd resin such as an oil length alkyd binder, a high solid alkyd, an uralkyd, a waterborne alkyd; an oleoresinous binder, a fatty acid epoxy ester, etc.), a polyester resin, a modified cellulose binder, a polyamide binder, an amidoamine binder, an amino resin, an urethane binder (e.g., a waterborne urethane, an urethane powder, etc.), a phenolic resin (e.g., a resole, a novolac, an epoxy resin, an ambient condition curing epoxy, a bake curing epoxy, an electrodeposition epoxy, a powder coating epoxy, an cycloaliphatic epoxy, etc.), a polyhydroxyether binder, an acrylic resin (e.g., a thermoplastic acrylic resin, a waterborne thermoplastic acrylic, a thermosetting acrylic resin such as an acrylic-epoxy combination, an acrylic-amino combination, an acrylic-urethane combination, a waterborne thermosetting acrylic, etc.), a polyvinyl binder (e.g., a plastisol, an organosol, etc.), a rubber resin (e.g., chlorinated rubber resin, a synthetic rubber resin, etc.), a bituminous binder, a polysulfide binder, a silicone binder, or a combination thereof.

A liquid component comprises a chemical composition in a liquid state (e.g., a liquid state while comprised in a coating, a film, a material formulation, etc.). A liquid component may be added to a coating formulation, for example, to improve a rheological property for ease of application, alter the period of time that thermoplastic film formation occurs, alter an optical property (e.g., color, gloss, etc.) of a film, alter a physical property of a coating (e.g., reduce flammability) and/or a film (e.g., increase flexibility), participate in a chemical reaction of a coating component (e.g., a water molecule hydrolyzing a silane molecule into a silanol molecule), dissolve and/or suspend a coating component (e.g., water dissolving a biomolecule composition into a coating formulation), or a combination thereof. In general aspects, the liquid component comprises a solvent, a thinner, a diluent, a plasticizer, or a combination thereof. A solvent comprises a liquid component used to dissolve one or more components of a material (e.g., a coating). A thinner comprises a liquid component used to reduce the viscosity of a coating, and may aid dissolving a coating component (e.g., act as a cosolvent) and/or increase miscibility of two or more coating component. A diluent comprises a liquid component that does not dissolve a binder. In other aspects, the liquid component comprises a liquid organic compound, an inorganic compound, water, or a combination thereof. Examples of a liquid organic compound includes a hydrocarbon (e.g., an aliphatic hydrocarbon, a cycloaliphatic hydrocarbon, a terpene, an aromatic hydrocarbon, etc.), an oxygenated compound (e.g., an alcohol, a ketone, an ester, a glycol ether, a ketone, an ether, etc.), a chlorinated hydrocarbon, a nitrated hydrocarbon, a miscellaneous organic liquid component, a plasticizer, or a combination thereof. In some embodiments, water may not be used to in a coating formulation, such as wherein a particular biomolecule composition can be dissolved and/or suspended in a non-aqueous liquid component.

A colorant ("colorizing agent") comprises a composition that confers an optical property to a coating. Examples of an optical property, depending upon the application, include a reflection property, a light absorption property, a light scattering property, or a combination thereof. A colorant that increases the reflection of light may increase gloss. A colorant that increased light scattering may increase the opacity and/or confer a color to a coating and/or a film. Light scattering of a broad spectrum of wavelengths may confer a white color to a coating and/or a film. Scattering of a certain wavelength may confer a color associated with the wavelength to a coating and/or a film. Light absorption also affects opacity and/or color, such as broad-spectrum light absorption conferring a black color to a coating and/or a film. Absorbance of a certain wavelength may eliminate the color associated with the wavelength from the appearance of a coating and/or a film. Examples of a colorant include a pigment, a dye, an extender, or a combination thereof. A colorant (e.g., a pigment, a dye) and procedures for determining the optical properties and physical properties (e.g., hiding power, transparency, light absorption, light scattering, tinting strength, color, particle size, particle dispersion, pigment content, color matching) of a colorant, a coating component, a coating and/or a film are described in, for example, (in "Industrial Color Testing, Fundamentals and Techniques, Second, Completely Revised Edition," 1995; "Colorants for Non-Textile Applications," 2000; "Colour Index International," $3^{rd}$ Ed. Society of Dyers and Colourists American Association of Textile Chemists and Colorists, 1971; and "Colour Index International," $3^{rd}$ Ed. *Pigment and Solvent Dyes*, Society of Dyers and Colourists American Association of Textile Chemists and Colorists, 1997). Pigments possess a variety of properties in addition to color, with examples including a tinctorial property (i.e., the ability to produce a color), an insolubility property (i.e., the ability to remain a solid upon contact with a coating component such as, a liquid component), a corrosion resistance property (i.e., the ability to reduce the damage of a chemical such as water that contacts a metal), a durability property, a heat resistance property, an opacity property, a transparency property, or a combination thereof. A camouflage pigment refers to a pigment typically selected to camouflage a surface (e.g., a military surface) from visual and, in specific facets, infrared detection. A color property refers to the ability of a composition to confer a visual color and/or metallic appearance, with examples of a color property pigment includes a black pigment, a brown pigment, a white pigment, a pearlescent pigment, a violet pigment, a blue pigment, a green pigment, a yellow pigment, an orange pigment, a red pigment, a metallic pigment, an extender pigment, or a combination thereof. A dye comprises a composition that is soluble in the other component(s) of a coating, and further confers a color property to the coating. In some embodiments, a colorant may comprise a biomolecule composition (e.g., a bio-based antibiological agent).

A coating additive comprises any material added to a coating to confer a property other than that described for a binder, a liquid component, a colorizing agent, or a combination thereof. Examples of a coating additive include a biomolecule composition (e.g., a bio-based antibiological agent), an accelerator, an adhesion promoter, an antioxidant, an anti-skinning agent, an anti-floating agent, an antiflooding agent, an antifoaming agent, an anti-settling agent, an anti-skinning agent, an anti-insect additive, a buffer, a catalyst (e.g., a drier, an acid, a base, a urethane catalyst, etc.), a coalescing agent, a corrosion inhibitor, a defoamer, a dehydrator, a dispersant, a drier, an electrical additive, an emulsifier, a film-formation promoter, a fire retardant, a flow control agent, a gloss aid, a leveling agent, a light stabilizer (e.g., a UV absorber, a radical scavenger, etc.), a marproofing agent, a matting agent, a neutralizing agent, an antibiological substance (e.g., a bio-based antibiological agent, a chemical preservative, etc.), a rheology modifier, a slip agent, a thickening agent, a wetting agent, a viscosity control agent, or a combination thereof. The content for an individual coating additive in a coating may be about to about 20.0%. However, in many embodiments, the concentration of a single additive in a coating may comprise between 0.000001% and about 10.0%. In some embodiments, a polymeric material additive may be used in a coating.

A coating may be applied to a surface using any technique described herein or as would be known to one of ordinary skill in the art. In the context of a coating, "application," "apply," or "applying" refers to the process of transferring of a coating to a surface to produce a layer of coating upon the surface. As known herein in the context of a coating, an "applicator" refers to a devise that may be used to apply the coating to a surface. Examples of an applicator include an machine or device, such as an coating machine (e.g., an optical coating application machine), a brush, a roller, a pad, a rag, a spray applicator, etc. Examples of application techniques include dipping, pouring, siphoning, brushing, rolling (e.g., roll coating), padding, ragging, spraying (e.g., spraying by a robot), anodizing, electrodeposition, an electrostatic technique, electroplating, vapor curing, and/or laminating of a film onto a surface, or a combination thereof. In certain embodiments, the layer of coating undergoes film formation ("curing," "cure"), which refers to the physical and/or chemical change of a coating to a solid when in the form of a layer upon the surface. In certain aspects, a coating may be prepared, applied and/or cured at an ambient condition, a baking condition, or a combination thereof, within the ability of biomolecule composition (e.g., a bio-based antibiological agent) to retain bioactivity. An ambient condition comprises a temperature range between about −10° C. to about 40° C., while a "baking condition" or "baking" comprises contacting a material formulation with a temperature above about 40° C. and/or raising the temperature of a material formulation above about 40° C. (e.g., about 40° C. to about 300° C., about 40° C. to about 130° C.).

A coating may comprise a volatile coating component (e.g., a coalescing agent, a solvent such as water or a non-water solvent, a thinner, a diluent, etc.), a non-volatile coating component (i.e., a component that remains upon a surface after cure such as a binder, a colorizing agent, a plasticizer, a coating additive, etc.), or a combination thereof. A coating component may undergo a chemical change to form a film, such as binder undergoes a cross-linking and/or a polymerization reaction (e.g., an oxidative and/or free radical chemical reaction) to produce a film. A chemical film formation reaction may be promoted by irradiating the coating (e.g., irradiating the coating to electromagnetic radiation such as UV radiation, visible light, infrared radiation; particle radiation such as electron-beam radiation, etc.), heating the coating, or a combination thereof. In some alternate embodiments, a coating known herein as a non-film forming coating undergoes a reduced amount of film formation than such a solid film is not produced during the period of time it may be used on a surface. In other alternative embodiments, a coating may undergo film formation, but produce a film whose properties makes it more suited for a temporary use, and is known herein as a temporary film.

A plurality of coating layers (e.g., 1 to about 30 layers), known herein as a "multicoat system" ("multicoating system"), may be applied upon a surface, and one or more of the coating layers may differ in composition and/or properties, with examples of coating layers including a sealer, a water repellent, a primer, an undercoat, a topcoat, or a combination thereof. A topcoat is the uppermost coating layer, regardless of whether it is part of a multicoat system or a single coating layer upon a surface, and in many embodiments a topcoat comprising an antibiological agent.

A coating may be classified by its end use, including, for example, as an architectural coating, an industrial coating, a specification coating, or a combination thereof, and such coatings are described, for example, in "Paint and Surface Coatings: Theory and Practice" 2nd Edition, pp. 190-192, 1999; in "Paints, Coatings and Solvents" 2nd Edition, pp. 330-410, 1998; in "Organic Coatings: Science and Technology, Volume 1: Film Formation, Components, and Appearance" 2 nd Edition, by Zeno W. Wicks Jr., Frank N. Jones, S. Peter Pappas, Publisher: Wiley-Interscience (John Wiley & Sons, Inc. 605 Third Avenue, New York, NY) pp. 138 and 317-318. An architectural coating refers to "an organic coating intended for on-site application to interior or exterior surfaces of residential, commercial, institutional, or industrial buildings, in contrast to industrial coatings. They are protective and decorative finishes applied at ambient conditions" ["Paint and Coating Testing Manual, Fourteenth Edition of the Gardner-Sward Handbook" (Koleske, J. V. Ed.), p. 686, 1995)]. Examples of an architectural coating includes a wood coating, a masonry coating, a artist's coating, a plastic coating, a metal coating, a glass coating, or a combination thereof. Artist coatings refer to a coating used by artists for a decorative purpose.

An industrial coating refers to a coating applied to a surface of a manufactured product in a factory setting, typically for a protective and/or aesthetic purpose. Examples of an industrial coating comprises an automotive coating, a can coating, a sealant coating, or a combination thereof. Can coatings refer to coatings used on a container (e.g., an aluminum container, a steel container), such as for a food, a chemical, or a combination thereof. Sealant coatings refer to coatings used to fill a joint (e.g., a coating that bridges by contact a gap between two or more surfaces) to reduce or prevent passage of a gas (e.g., air), water, a small material (e.g., dust), a temperature change, or a combination thereof. A marine coating comprises a coating used on a surface that contacts water and/or a surface that comprises part of a structure continually near water (e.g., a ship vehicle, a dock, a drilling platform for fossil fuels, etc).

A specification coating ("specification finish coating") refers to a coating formulated to a "precise statement of a set of requirements to be satisfied by a material, produce, system, or service that indicates the procedures for determining whether each of the requirements are satisfied" with various sources for specification coating requirements and procedures for determining the suitability of a coating (e.g., an aircraft coating) described in ["Paint and Coating Testing Manual, Fourteenth Edition of the Gardner-Sward Handbook" (Koleske, J. V. Ed.), pp. 683-695, 891-893, 1995]. Examples of a specification finish coating include a military specified coating (e.g., a chemical agent resistant coatings ("CARC"), a camouflage coating), a Federal agency (e.g., Department of Transportation) specified coating, a state specified coating, a pipeline coating, a traffic marker coating, an aircraft coating, a nuclear power plant coating, or a combination thereof. A camouflage coating comprises a coating that may be formulated with a material (e.g., a pigment) that reduces the differences in visible light or non-visible light (e.g., infrared radiation) detection between a coated surface relative to the surrounding environment. A pipeline coating is applied to pipes, such as ones used to convey a fossil fuel. A traffic marker coating comprises a coating (e.g., a paint) used to visibly convey information on a surface usually subjected to weathering and abrasion (e.g., a pavement). An aircraft coating protects and/or decorates a surface of an aircraft vehicle. A nuclear power plant, which generally possesses particular properties (e.g., gamma radiation resistance, chemical resistance, etc.).

An enzyme usually comprises a folded protein having binding site (e.g., a crevice) that arises from this specific folding may form a catalytic site for the enzyme, and may bind a substrate and/or a product (Berg, J. M., Tymoczko, J. L., Stryer, L., Biochemistry 5th Ed. Freeman Company. New York 2001). An enzyme may be capable of catalyzing a reaction in both directions (a "reversible reaction"), and the net direction of such a reversible reaction generally depends on the concentration of the substrate(s) and/or product(s) and the reaction environment (Dixon M. and Webb E. C., Enzymes, 2nd Ed. Academic Press Inc. New York 1964). The kinetics of enzyme catalyzed reactions are commonly described by the Michealis-Menten model (Berg, J. M., Tymoczko, J. L., Stryer, L., Biochemistry $5^{th}$ Ed. Freeman Company. New York 2001; Dixon M., Webb E. C., Enzymes, $2^{nd}$ Ed. Academic Press Inc. New York 1964).

Enzymes are identified by a numeric classification system such as the International Union of Biochemistry and Molecular Biology ("IUBMB") which identifies enzymes by the type of reaction catalyzed and enumerates a sub-class by a designated enzyme commission number ("EC"). Thus, an enzyme may comprise an oxidoreductase (EC 1), a transferase (EC 2), a hydrolase (EC 3), a lyase (EC 4), an isomerase (EC 5), a ligase (EC 6), or a combination thereof. An enzyme may be able to catalyze multiple reactions, and thus have activities of multiple EC classifications.

An oxidoreductase catalyzes an oxido-reduction of a substrate, wherein the substrate comprises either a hydrogen donor and/or an electron donor. An oxidoreductase may be classified by the substrate moiety of the donor and/or the acceptor. Examples of an oxidoreductase include an oxidoreductase that acts on a donor CH—OH moiety, (EC 1.1); a donor aldehyde or a donor oxo moiety, (EC 1.2); a donor CH—CH moiety, (EC 1.3); a donor CH—$NH_2$ moiety, (EC 1.4); a donor CH—NH moiety, (EC 1.5); a donor nicotinamide adenine dinucleotide ("NADH") or a donor nicotinamide adenine dinucleotide phosphate ("NADPH"), (EC 1.6); a donor nitrogenous compound, (EC 1.7); a donor sulfur moiety, (EC 1.8); a donor heme moiety, (EC 1.9); a donor diphenol and/or a related moiety as donor, (EC 1.10); a peroxide as an acceptor, (EC 1.11); a donor hydrogen, (EC 1.12); a single donor with incorporation of molecular oxygen ("oxygenase"), (EC 1.13); a paired donor, with incorporation or reduction of molecular oxygen, (EC 1.14); a superoxide radical as an acceptor, (EC 1.15); an oxidoreductase that oxidises a metal ion, (EC 1.16); an oxidoreductase that acts on a donor $CH_2$ moiety, (EC 1.17); a donor iron-sulfur protein, (EC 1.18); a donor reduced flavodoxin, (EC 1.19); a donor phosphorus or donor arsenic moiety, (EC 1.20); an oxidoreductase that acts on an X—H and an Y—H to form an X—Y bond, (EC 1.21); as well as an other oxidoreductase, (EC 1.97); or a combination thereof.

A transferase catalyzes the transfer of a moiety from a donor compound to an acceptor compound. A transferase may be classified based on the chemical moiety transferred. Examples of a transferase include a transferase that catalyzes the transfer of an one-carbon moiety, (EC 2.1); an aldehyde and/or a ketonic moiety, (EC 2.2); an acyl moiety, (EC 2.3); a glycosyl moiety, (EC 2.4); an alkyl and/or an aryl moiety other than a methyl moiety, (EC 2.5); a nitrogenous moiety, (EC 2.6); a phosphorus-containing moiety, (EC 2.7); a sulfur-containing moiety, (EC 2.8); a selenium-containing moiety, (EC 2.9); or a combination thereof.

A hydrolase catalyzes the hydrolysis of a chemical bond. A hydrolase may be classified based on the chemical bond cleaved or the moiety released or transferred by the hydrolysis reaction. Examples of a hydrolase include a hydrolase that catalyzes the hydrolysis of an ester bond, (EC 3.1); a glycosyl released/transferred moiety, (EC 3.2); an ether bond, (EC 3.3); a peptide bond, (EC 3.4); a carbon-nitrogen bond, other than a peptide bond, (EC 3.5); an acid anhydride, (EC 3.6); a carbon-carbon bond, (EC 3.7); a halide bond, (EC 3.8); a phosphorus-nitrogen bond, (EC 3.9); a sulfur-nitrogen bond, (EC 3.10); a carbon-phosphorus bond, (EC 3.11); a sulfur-sulfur bond, (EC 3.12); a carbon-sulfur bond, (EC 3.13); or a combination thereof.

Examples of an esterase (EC 3.1) include a carboxylic ester hydrolase (EC 3.1.1); a thioester hydrolase (EC 3.1.2); a phosphoric monoester hydrolase (EC 3.1.3); a phosphoric diester hydrolase (EC 3.1.4); a triphosphoric monoester hydrolase (EC 3.1.5); a sulfuric ester hydrolase (EC 3.1.6); a diphosphoric monoester hydrolase (EC 3.1.7); a phosphoric triester hydrolase (EC 3.1.8); an exodeoxyribonuclease producing a 5'-phosphomonoester (EC 3.1.11); an exoribonuclease producing a 5'-phosphomonoester (EC 3.1.13); an exoribonuclease producing a 3'-phosphomonoester (EC 3.1.14); an exonuclease active with a ribonucleic acid and/or a deoxyribonucleic acid and producing a 5'-phosphomonoester (EC 3.1.15); an exonuclease active with a ribonucleic acid and/or a deoxyribonucleic acid and producing a 3'-phosphomonoester (EC 3.1.16); an endodeoxyribonuclease producing a 5'-phosphomonoester (EC 3.1.21); an endodeoxyribonuclease producing a 3'-phosphomonoester (EC 3.1.22); a site-specific endodeoxyribonuclease specific for an altered base (EC 3.1.25); an endoribonuclease producing a 5'-phosphomonoester (EC 3.1.26); an endoribonuclease producing a 3'-phosphomonoester (EC 3.1.27); an endoribonuclease active with a ribonucleic acid and/or a deoxyribonucleic acid and producing a 5'-phosphomonoester (EC 3.1.30); an endoribonuclease active with a ribonucleic acid and/or a deoxyribonucleic acid and producing a 3'-phosphomonoester (EC 3.1.31); or a combination thereof.

Examples of a carboxylic ester hydrolase (EC 3.1.1) include a carboxylesterase (EC 3.1.1.1); an arylesterase (EC 3.1.1.2); a triacylglycerol ipase (EC 3.1.1.3); a phospholipase A2 (EC 3.1.1.4); a lysophospholipase (EC 3.1.1.5); an acetylesterase (EC 3.1.1.6); an acetylcholinesterase (EC 3.1.1.7); a cholinesterase (EC 3.1.1.8); a tropinesterase (EC 3.1.1.10); a pectinesterase (EC 3.1.1.11); a sterol esterase (EC 3.1.1.13); a chlorophyllase (EC 3.1.1.14); a L-arabinonolactonase (EC 3.1.1.15); a gluconolactonase (EC 3.1.1.17); an uronolactonase (EC 3.1.1.19); a tannase (EC 3.1.1.20); a retinyl-palmitate esterase (EC 3.1.1.21); a hydroxybutyrate-dimer hydrolase (EC 3.1.1.22); an acylglycerol lipase (EC 3.1.1.23); a 3-oxoadipate enol-lactonase (EC 3.1.1.24); a 1,4-lactonase (EC 3.1.1.25); a galactolipase (EC 3.1.1.26); a 4-pyridoxolactonase (EC 3.1.1.27); an acylcarnitine hydrolase (EC 3.1.1.28); an aminoacyl-tRNA hydrolase (EC 3.1.1.29); a D-arabinonolactonase (EC 3.1.1.30); a 6-phosphogluconolactonase (EC 3.1.1.31); a phospholipase A1 (EC 3.1.1.32); a 6-acetylglucose deacetylase (EC 3.1.1.33); a lipoprotein lipase (EC 3.1.1.34); a dihydrocoumarin hydrolase (EC 3.1.1.35); a limonin-D-ring-lactonase (EC 3.1.1.36); a steroid-lactonase (EC 3.1.1.37); triacetate-lactonase (EC 3.1.1.38); an actinomycin lactonase (EC 3.1.1.39); an orsellinate-depside hydrolase (EC 3.1.1.40); a cephalosporin-C deacetylase (EC 3.1.1.41); a chlorogenate hydrolase (EC 3.1.1.42); a α-amino-acid esterase (EC 3.1.1.43); a 4-methyloxaloacetate esterase (EC 3.1.1.44); a carboxymethylenebutenolidase (EC 3.1.1.45); a deoxylimonate A-ring-lactonase (EC 3.1.1.46); a 1-alkyl-2-acetylglycerophosphocholine esterase (EC 3.1.1.47); a fusarinine-C ornithinesterase (EC 3.1.1.48); a sinapine esterase (EC 3.1.1.49); a wax-ester hydrolase (EC 3.1.1.50); a phorbol-diester hydrolase (EC 3.1.1.51); a phosphatidylinositol deacylase (EC 3.1.1.52); a sialate O-acetylesterase (EC 3.1.1.53); an acetoxybutynylbithiophene deacetylase (EC 3.1.1.54); an acetylsalicylate deacetylase (EC 3.1.1.55); a methylumbelliferyl-acetate deacetylase (EC 3.1.1.56); a 2-pyrone-4,6-dicarboxylate lactonase (EC 3.1.1.57); a N-acetylgalactosaminoglycan deacetylase (EC 3.1.1.58); a juvenile-hormone esterase (EC 3.1.1.59); a bis(2-ethylhexyl)phthalate esterase (EC 3.1.1.60); a protein-glutamate methylesterase (EC 3.1.1.61); a 11-cis-retinyl-palmitate hydrolase (EC 3.1.1.63); an all-trans-retinyl-palmitate hydrolase (EC 3.1.1.64); a L-rhamnono-1,4-lactonase (EC 3.1.1.65); a 5-(3,4-diacetoxybut-1-ynyl)-2,2'-bithiophene deacetylase (EC 3.1.1.66); a fatty-acyl-ethyl-ester synthase (EC 3.1.1.67); a xylono-1,4-lactonase (EC 3.1.1.68); a cetraxate benzylesterase (EC 3.1.1.70); an acetylalkylglycerol acetylhydrolase (EC 3.1.1.71); an acetylxylan esterase (EC 3.1.1.72); a feruloyl esterase (EC 3.1.1.73); a cutinase (EC 3.1.1.74); a poly(3-hydroxybutyrate) depolymerase (EC 3.1.1.75); a poly(3-hydroxyoctanoate) depolymerase (EC 3.1.1.76); an acyloxyacyl hydrolase (EC 3.1.1.77); a polyneuridine-aldehyde esterase (EC 3.1.1.78); a hormone-sensitive lipase (EC 3.1.1.79); an acetylajmaline esterase (EC 3.1.1.80); a quorum-quenching N-acyl-homoserine lactonase (EC 3.1.1.81); a pheophorbidase (EC 3.1.1.82); a monoterpene c-lactone hydrolase (EC 3.1.1.83); or a combination thereof.

Examples of an enzyme that acts on a carbon-nitrogen bond, other than a peptide bond (EC 3.5) include an enzyme acting on a linear amide (EC 3.5.1); a cyclic amide (EC 3.5.2); a linear amidine (EC 3.5.3); a cyclic amidine (EC 3.5.4); a nitrile (EC 3.5.5); an other compound (EC 3.5.99); or a combination thereof. Examples of an enzyme that catalyzes a reaction on a carbon-nitrogen bond of a non-peptide linear amide (EC 3.5.1) include an asparaginase (EC 3.5.1.1); a glutaminase (EC 3.5.1.2); a w-amidase (EC 3.5.1.3); an amidase (EC 3.5.1.4); a urease (EC 3.5.1.5); a β-ureidopropionase (EC 3.5.1.6); a ureidosuccinase (EC 3.5.1.7); a formylaspartate deformylase (EC 3.5.1.8); an arylformamidase (EC 3.5.1.9); a formyltetrahydrofolate deformylase (EC 3.5.1.10); a penicillin amidase (EC 3.5.1.11); a biotinidase (EC 3.5.1.12); an aryl-acylamidase (EC 3.5.1.13); an aminoacylase (EC 3.5.1.14); an aspartoacylase (EC 3.5.1.15); an acetylornithine deacetylase (EC 3.5.1.16); an acyl-lysine deacylase (EC 3.5.1.17); a succinyl-diaminopimelate desuccinylase (EC 3.5.1.18); a nicotinamidase (EC 3.5.1.19); a citrullinase (EC 3.5.1.20); a N-acetyl-β-alanine deacetylase (EC 3.5.1.21); a pantothenase (EC 3.5.1.22); a ceramidase (EC 3.5.1.23); a choloylglycine hydrolase (EC 3.5.1.24); a N-acetylglucosamine-6-phosphate deacetylase (EC 3.5.1.25); a N4-((3-N-acetylglucosaminyl)-L-asparaginase (EC 3.5.1.26); a N-formylmethionylaminoacyl-tRNA deformylase (EC 3.5.1.27); a N-acetylmuramoyl-L-alanine amidase (EC 3.5.1.28); a 2-(acetamidomethylene)succinate hydrolase (EC 3.5.1.29); a 5-aminopentanamidase (EC 3.5.1.30); a formylmethionine deformylase (EC 3.5.1.31); a hippurate hydrolase (EC 3.5.1.32); a N-acetylglucosamine deacetylase (EC 3.5.1.33); a D-glutaminase (EC 3.5.1.35); a N-methyl-2-oxoglutaramate hydrolase (EC 3.5.1.36); a glutamin-(asparagin-)ase (EC 3.5.1.38); an alkylamidase (EC 3.5.1.39); an acylagmatine amidase (EC 3.5.1.40); a chitin deacetylase (EC 3.5.1.41); a nicotinamide-nucleotide amidase (EC 3.5.1.42); a peptidyl-glutaminase (EC 3.5.1.43); a protein-glutamine glutaminase (EC 3.5.1.44); a 6-aminohexanoate-dimer hydrolase (EC 3.5.1.46); a N-acetyldiaminopimelate deacetylase (EC 3.5.1.47); an acetylspermidine deacetylase (EC 3.5.1.48); a formamidase (EC 3.5.1.49); a pentanamidase (EC 3.5.1.50); a 4-acetamidobutyryl-CoA deacetylase (EC 3.5.1.51); a peptide-N4-(N-acetyl-β-glucosaminyl)asparagines amidase (EC 3.5.1.52); a N-carbamoylputrescine amidase (EC 3.5.1.53); an allophanate hydrolase (EC 3.5.1.54); a long-chain-fatty-acyl-glutamate deacylase (EC 3.5.1.55); a N,N-dimethylformamidase (EC 3.5.1.56); a tryptophanamidase (EC 3.5.1.57); a N-b enzyloxycarbonylglycine hydrolase (EC 3.5.1.58); a N-carbamoylsarcosine amidase (EC 3.5.1.59); a N-(long-chain-acyl)ethanolamine deacylase (EC 3.5.1.60); a mimosinase (EC 3.5.1.61); an acetylputrescine deacetylase (EC 3.5.1.62); a 4-acetamidobutyrate deacetylase (EC 3.5.1.63); a Nα-benzyloxycarbonylleucine hydrolase (EC 3.5.1.64); a theanine hydrolase (EC 3.5.1.65); a 2-(hydroxymethyl)-3-(acetamidomethylene)succinate hydrolase (EC 3.5.1.66); a 4-methyleneglutaminase (EC 3.5.1.67); a N-formylglutamate deformylase (EC 3.5.1.68); a glycosphingolipid deacylase (EC 3.5.1.69); an aculeacin-A deacylase (EC 3.5.1.70); a N-feruloylglycine deacylase (EC 3.5.1.71); a D-benzoylarginine-4-nitroanilide amidase (EC 3.5.1.72); a carnitinamidase (EC 3.5.1.73); a chenodeoxycholoyltaurine hydrolase (EC 3.5.1.74); a urethanase (EC 3.5.1.75); an arylalkyl acylamidase (EC 3.5.1.76); a N-carbamoyl-D-amino acid hydrolase (EC 3.5.1.77); a glutathionylspermidine amidase (EC 3.5.1.78); a phthalyl amidase (EC 3.5.1.79); a N-acetylgalactosamine-6-phosphate deacetylase (EC 3.5.1.80); a N-acyl-D-amino-acid deacylase (EC 3.5.1.81); a N-acyl-D-glutamate deacylase (EC 3.5.1.82); a N-acyl-D-aspartate deacylase (EC 3.5.1.83); a biuret amidohydrolase (EC 3.5.1.84); a (S)—N-acetyl-1-phenylethylamine hydrolase (EC 3.5.1.85); a mandelamide amidase (EC 3.5.1.86); a N-carbamoyl-L-amino-acid hydrolase (EC 3.5.1.87); a peptide deformylase (EC 3.5.1.88); a N-acetylglucosaminylphosphatidylinositol deacetylase (EC 3.5.1.89); an adenosylcobinamide hydrolase (EC 3.5.1.90); a N-substituted formamide deformylase (EC 3.5.1.91); a panteheine hydrolase (EC 3.5.1.92); a glutaryl-7-aminocephalosporanic-acid acylase (EC 3.5.1.93); a γ-glutamyl-γ-aminobutyrate hydrolase (EC 3.5.1.94); a N-malonylurea hydrolase (EC 3.5.1.95); a succinylglutamate desuccinylase (EC 3.5.1.96); an acyl-homoserine-lactone acylase (EC 3.5.1.97); a histone deacetylase (EC 3.5.1.98); or a combination thereof. Examples of an enzyme that catalyzes a reaction on a carbon-nitrogen bond of a non-peptide cyclic amide (EC 3.5.2) include a barbiturase (EC 3.5.2.1); a dihydropyrimidinase (EC 3.5.2.2); a dihydroorotase (EC 3.5.2.3); a carboxymethylhydantoinase (EC 3.5.2.4); an allantoinase (EC 3.5.2.5); a β-lactamase (EC 3.5.2.6); an imidazolonepropionase (EC 3.5.2.7); a 5-oxoprolinase (ATP-hydrolysing) (EC 3.5.2.9); a creatininase (EC 3.5.2.10); a L-lysine-lactamase (EC 3.5.2.11); a 6-aminohexanoate-cyclic-dimer hydrolase (EC 3.5.2.12); a 2,5-dioxopiperazine hydrolase (EC 3.5.2.13); a N-methylhydantoinase (ATP-hydrolysing) (EC 3.5.2.14); a cyanuric acid amidohydrolase (EC 3.5.2.15); a maleimide hydrolase (EC 3.5.2.16); a hydroxyisourate hydrolase (EC 3.5.2.17); an enamidase (EC 3.5.2.18); or a combination thereof.

Examples of an enzyme that acts on an acid anhydride (EC 3.6) include an enzyme acting on: a phosphorus-containing anhydride (EC 3.6.1); a sulfonyl-containing anhydride (EC 3.6.2); an acid anhydride catalyzing transmembrane movement of a substance (EC 3.6.3); an acid anhydride involved in cellular and/or subcellular movement (EC 3.6.4); a GTP involved in cellular and/or subcellular movement (EC 3.6.5); or a combination thereof.

A lyase catalyzes the cleavage of a chemical bond by reactions other than hydrolysis and/or oxidation. A lyase may be classified based on the chemical bond cleaved. Examples of a lyase include a lyase that catalyzes the cleavage of a carbon-carbon bond, (EC 4.1); a carbon-oxygen bond, (EC 4.2); a carbon-nitrogen bond, (EC 4.3); a carbon-sulfur bond, (EC 4.4); a carbon-halide bond, (EC 4.5); a phosphorus-oxygen bond, (EC 4.6); an other lyase, (EC 4.99); or a combination thereof.

An isomerase catalyzes a change within one molecule. Examples of an isomerase include a racemase and/or an epimerase, (EC 5.1); a cis-trans-isomerase, (EC 5.2); an intramolecular isomerase, (EC 5.3); an intramolecular transferase, (EC 5.4); an intramolecular lyase, (EC 5.5); an other isomerases, (EC 5.99); or a combination thereof.

A ligase catalyzes the formation of a chemical bond between two substrates with the hydrolysis of a diphosphate bond of a triphosphate such as ATP. A ligase may be classified based on the chemical bond created. Examples of a lyase include a ligase that form a carbon-oxygen bond, (EC 6.1); a carbon-sulfur bond, (EC 6.2); a carbon-nitrogen bond, (EC 6.3); a carbon-carbon bond, (EC 6.4); a phosphoric ester bond, (EC 6.5); or a combination thereof.

A lipolytic enzyme comprises an enzyme that catalyzes a reaction or series of reactions on a lipid substrate. In many embodiments, a lipolytic enzyme produces one or more products that are more soluble in a polar liquid component (e.g., an aqueous media, water, a water comprising detergent) than the substrate, which may promote ease of removal such as from a surface of a material formulation (e.g., a coated surface, a polymeric material incorporating an enzyme). Examples of a lipid include a triglyceride; a diglyceride; a monoglyceride; a phospholipid; a glycolipid (e.g., galactolipid); a steroid (e.g., cholesterol); a wax; a fat-soluble vitamin (e.g., vitamin A, D, E, K, etc.); a petroleum based material, such as, for example, a hydrocarbon composition such as gasoline, a crude petroleum oil, a petroleum grease, etc.; or a combination thereof. Lipolytic enzymes have been identified in cells across the phylogenetic categories, and purified for analysis and/or use in commercial applications (Brockerhoff, Hans and Jensen, Robert G. "Lipolytic Enzymes," 1974). Further, numerous nucleotide sequences for lipolytic enzymes have been isolated, the encoded protein sequence determined, and in many cases the nucleotide sequences recombinantly expressed for high level production of a lipolytic enzyme (e.g., a lipase), particularly for isolation, purification and subsequent use in an industrial/commercial application such as laundry detergents ["Lipases their Structure, Biochemistry and Application" (Paul Woolley and Steffen B. Peterson, Eds.) 1994].

Examples of a lipolytic esterase and a ceramidase include a carboxylesterase (EC 3.1.1.1), a lipase (EC 3.1.1.3), a lipoprotein lipase (EC 3.1.1.34), an acylglycerol lipase (EC 3.1.1.23), a hormone-sensitive lipase (EC 3.1.1.79), a phospholipase $A_1$ (EC 3.1.1.32), a phospholipase $A_2$ (EC 3.1.1.4), a phosphatidylinositol deacylase (EC 3.1.1.52), a phospholipase C (EC 3.1.4.3), a phospholipase D (EC 3.1.4.4), a phosphoinositide phospholipase C (EC 3.1.4.11), a phosphatidate phosphatase (EC 3.1.3.4), a lysophospholipase (EC 3.1.1.5), a sterol esterase (EC 3.1.1.13), a galactolipase (EC 3.1.1.26), a sphingomyelin phosphodiesterase (EC 3.1.4.12), a sphingomyelin phosphodiesterase D (EC 3.1.4.41), a ceramidase (EC 3.5.1.23), a wax-ester hydrolase (EC 3.1.1.50), a fatty-acyl-ethyl-ester synthase (EC 3.1.1.67), a retinyl-palmitate esterase (EC 3.1.1.21), a 11-cis-retinyl-palmitate hydrolase (EC 3.1.1.63), an all-trans-retinyl-palmitate hydrolase (EC 3.1.1.64), a cutinase (EC 3.1.1.74), an acyloxyacyl hydrolase (EC 3.1.1.77), a petroleum lipolytic enzyme, or a combination thereof. In some aspects, a series of enzyme reactions releases a fatty acid and/or degrades a lipid, such as in the case of a combination of a sphingomyelin phosphodiesterase that produces a N-acylsphingosine from a sphingomyelin phospholipid, followed by a ceramidase hydrolyzing an amide bond in a N-acylsphingosine to produce a free fatty acid and a sphingosine.

Carboxylesterase (EC 3.1.1.1) catalyzes the reaction: carboxylic ester+$H_2O$=an alcohol+a carboxylate (e.g., a fatty acid of about 10 or less carbons, to differentiate its preferred substrate and classification from a lipase), with structural and sequence information known in the art (e.g., Protein database bank entries 1AUO, 1AUR, 1CI8, 1CI9, 1EVQ, 1JJI, 1K4Y, 1L7Q, 1L7R, 1MX1, 1MX5, 1MX9, 1QZ3, 1R1D, 1TQH, 1U4N, 1YA4, 1YA8, 1YAH, 1YAJ, 2C7B, 2DQY, 2DQZ, 2DR0, 2FJ0, 2H1I, 2H7C, 2HM7, 2HRQ, 2HRR, 2JEY, 2JEZ, 2JF0, 2O7R, 2O7V, 2OGS, 2OGT, 2R11, etc.).

Lipase (EC 3.1.1.3) catalyzes the reaction: triacylglycerol+$H_2O$=diacylglycerol+a carboxylate (e.g., a fatty acid about 12C or greater), with structural and sequence information known in the art (e.g., Protein database bank entries 1AKN, 1BU8, 1CRL, 1CUA, 1CUB, 1CUC, 1CUD, 1CUE, 1CUF, 1CUG, 1CUH, 1CUT, 1CUJ, 1CUU, 1CUV, 1CUW, 1CUX, 1CUY, 1CUZ, 1CVL, 1DT3, 1DT5, 1DTE, 1DU4, ZEIN, 1ETH, 1EX9, 1F6W, 1FFA, 1FFB, 1FFC, 1FFD, 1FFE, 1GPL, 1GT6, 1GZ7, 1HLG, 1HPL, 1HQD, 1I6W, 1ISP, 1JI3, 1JMY, 1K8Q, 1KU0, 1LBS, 1LBT, 1LGY, 1LLF, 1LPA, 1LPB, 1LPM, 1LPN, 1LPO, 1LPP, 1LPS, 1N8S, 1OIL, 1QGE, 1R4Z, 1R50, 1RP1, 1T2N, 1T4M, 1TAH, 1TCA, 1TCB, 1TCC, 1TGL, 1THG, 1TIA, 1TIB, 1TIC, 1TRH, 1YS1, 1YS2, 2DSN, 2ES4, 2FX5, 2HIH, 2LIP, 2NW6, 2ORY, 2OXE, 2PPL, 2PVS, 2QUA, 2QUB, 2QXT, 2QXU, 2VEO, 2Z5G, 2Z8X, 2Z8Z, 3D2A, 3D2B, 3D2C, 3LIP, 3TGL, 4LIP, 4TGL, 5LIP, 5TGL, etc.).

Phospholipase $A_1$ (EC 3.1.1.32) catalyzes the reaction: phosphatidylcholine+$H_2O$=2-acylglycerophosphocholine+a carboxylate, with structural and sequence information known in the art (e.g., Protein database bank entries 1FW2, 1FW3, 1ILD, 1ILZ, 1IM0, 1QD5, 1QD6, etc.).

Phospholipase $A_2$ (EC 3.1.1.4) catalyzes the reaction: phosphatidylcholine+$H_2O$=1-acylglycerophosphocholine+a carboxylate, with structural and sequence information known in the art (e.g., Protein database bank entries 1A2A, 1A3F, 1AOK, 1AYP, 1BBC, 1BJJ, 1BK9, 1BPQ, 1BVM, 1C74, 1CJY, 1CLP, 1DB5, 1DPY, 1FDK, 1FX9, 1GOZ, 1G4I, 1GMZ, 1GP7, 1IJL, 1IT4, 1J1A, 1JLT, 1JQ9, KPM, 1KVO, 1KVX, 1L8S, 1LE7, 1LWB, 1M8 S, 1MF4, 1MH2, 1MH8, 1MKT, 1MKV, 1N29, 1O3W, 1OWS, 1OXR, 1OZ6, 1P2P, 1PA0, 1PIR, 1PO8, 1POB, 1POD, 1PP2, 1PSH, 1PWO, 1Q7A, 1RGB, 1S6B, 1S8H, 1SFV, 1SKG, 1SV3, 1SXK, 1T37, 1TD7, 1TG1, 1TGM, 1TJ9, 1TJQ, 1TP2, 1U73, 1VAP, 1VKQ, 1XXS, 1Y38, 1Y60, 1Y75, 1YXL, 1ZL7, 1ZM6, 1ZWP, 2ARM, 2AZZ, 2B01, 2B04, 2B96, 2BCH, 2DO2, 2DV8, 2G58, 2H4C, 2NOT, 2OLI, 2OSH, 2OTF, 2OUB, 2OYF, 2PHI, 2PVT, 2PYC, 2QHD, 2QHW, 2QU9, 2QVD, 2ZBH, 3BP2, 3P2P, 4P2P, 5P2P, etc.).

Phospholipase C (EC 3.1.4.3) catalyzes the reaction: phosphatidylcholine+$H_2O$=1,2-diacylglycerol+choline phosphate, with structural and sequence information known in the art (e.g., Protein database bank entries 1AH7, 1CA1, 1GYG, 1IHJ, 1OLP, 1P5X, 1P6D, 1P6E, 1QM6, 1QMD, 2FFZ, 2FGN, 2HUC, etc.).

Phospholipase D (EC 3.1.4.4) catalyzes the reaction: phosphatidylcholine+$H_2O$=choline+a phosphatidate, with structural and sequence information known in the art (e.g., Protein database bank entries: 1F0I, 1V0R, 1V0S, 1V0T, 1V0U, 1V0V, 1V0W, 1V0Y, 2ZE4, 2ZE9, etc.).

Phosphoinositide phospholipase C (EC 3.1.4.11) catalyzes the reaction: 1-phosphatidyl-1D-myo-inositol 4,5-bisphosphate+$H_2O$=1D-myo-inositol 1,4,5-trisphosphate+diacylglycerol, with structural and sequence information known in the art (e.g., Protein database bank entries 1DJG, 1DJH, 1DJI, 1DJW, 1DJX, 1DJY, 1DJZ, 1HSQ, 1JAD, 1MAI, 1QAS, 1QAT, 1Y0M, 1YWO, 1 YWP, 2C5L, 2EOB, 2FCI, 2FJL, 2FJU, 2HSP, 2ISD, 2K2J, 2PLD, 2PLE, 2ZKM, etc.).

Lysophospholipase (EC 3.1.1.5) catalyzes the reaction: 2-lysophosphatidylcholine+$H_2O$=glycerophosphocholine+a carboxylate, with structural and sequence information known in the art (e.g., Protein database bank entries 1G86, 1HDK, 1IVN, 1J00, 1JRL, 1LCL, 1QKQ, 1U8U, 1V2G, 2G07, 2G08, 2G09, 2G0A, etc.).

Sterol esterase (EC 3.1.1.13) catalyzes the reaction: steryl ester+$H_2O$=a sterol+a fatty acid, with structural and sequence information known in the art (e.g., Protein database bank entries 1AQL, 2BCE, etc.).

Such an enzyme and/or a series of enzyme(s) and/or protein(s) that improves a petroleum hydrocarbon's solubility may be known herein as a "petroleum lipolytic enzyme" to differentiate it from a lipolytic enzyme that acts on a non-petroleum substrate described herein. For example, Pseudomonas putida alkane degradation pathway encoded by an alkBFGHIJKL operon, a petroleum alkane substrate undergoes catalysis by a plurality of enzymes and/or proteins (e.g., an alkane hydroxylase, a rubredoxins, an aldehyde dehydrogenase, an alcohol dehydrogenase, an acyl-CoA synthetase) and proteins (e.g., an outer membrane protein, a methyl-accepting transducer protein), that convert the alkane into an aldehyde and an acid with the participation of additional enzymes and proteins not encoded by the operon. A membrane bound monooxygenase, a rubredoxin, and a soluble rubredoxin add an alcohol moiety to the petroleum alkane by shunting electrons through a NADH compound to a hydroxylase. These enzymatic activities that result in improvement of solubility by addition of an alcohol may be used to select an enzyme. The alcohol may be further catalyzed into an aldehyde, then an acid, before entering regular cellular metabolic pathways (e.g., energy production). Other pathways are thought to use a dioxygenase to initially produce a n-alkyl hydroperoxide that may be converted into an aldehyde, using a flavin adenine dinucleotide, but not a NADPH or a rubredoxin (Van Hamme, J. D. Microbiology and molecular biology reviews, 67(4):503-549, 2003).

Another example of petroleum degradation comprises a polycyclic aromatic hydrocarbon having oxygenated moiety(s) added by the enzymes and proteins expressed from the nahAaAbAcAdBFCED operon for naphthalene degradation. These enzymes and proteins include: a reductase (nahAa), a ferredoxin (nahAb), an iron sulfur protein large subunit (nahAc), an iron sulfur protein small subunit (nahAd), a cis-naphthalene dihydrodiol dehydrogenase (nahB), a salicyaldehyde dehydrogenase (nahF), a 1,2-dihydroxynaphthalene oxygenase (nahC), a 2-hydroxybenzalpyruvate aldolase (nahE), a 2-hydroxychromene-2-carboxylate isomerase (nahD). The nahAa to nahAd genes encode a naphthalene dioxygenase. *Pseudomonas putida* strains may also have the salicylate degradation pathway, which includes the following enzymes: a salicylate hydroxylase (nahG), a chloroplast-type ferredoxin (nahT), a catechol oxygenase (nahH), a 2-hydroxymuconic semialdehyde dehydrogenase (nahI), a 2-hydroxymuconic semialdehyde dehydrogenase (nahN), a 2-oxo-4-pentenoate hydratase (nahL), a 4-hydroxy-2-oxovalerate aldolase (nahO), an acetaldehyde dehydrogenase (nahM), a 4-oxalocrotonate decarboxylase (nahK), and/or a 2-hydroxymuconate tautomerase (nahJ). Both operons are regulated by salicylate induction of the nahR gene from another operon (Van Hamme, J.D. Microbiology and molecular biology reviews, 67(4):503-549, 2003).

A peptidase catalyzes a reaction on a peptide bond (e.g., a proteinaceous molecule's peptide bond to degrade the proteinaceous molecule for antibiological activity and/or ease of removal from a surface, though other secondary reactions (e.g., an esterase activity) may also be catalyzed in some cases. A peptidase generally may be categorized as either an exopeptidase (EC 3.4.11-19) or an endopeptidase (EC 3.4.21-24 and EC 3.4.99). Examples of a peptidase include an alpha-amino-acyl-peptide hydrolase (EC 3.4.11), a peptidyl-amino-acid hydrolase (EC 3.4.17), a dipeptide hydrolase (EC 3.4.13), a peptidyl peptide hydrolase (EC 3.4), a peptidylamino-acid hydrolase (EC 3.4), an acylamino-acid hydrolase (EC 3.4), an aminopeptidase (EC 3.4.11), a dipeptidase (EC 3.4.13), a dipeptidyl-peptidase (EC 3.4.14), a tripeptidyl-peptidase (EC 3.4.14), a peptidyldipeptidase (EC 3.4.15), a serine-type carboxypeptidase (EC 3.4.16), a metallocarboxypeptidase (EC 3.4.17), a cysteine-type carboxypeptidase (EC 3.4.18), an omega peptidase (EC 3.4.19), a serine endopeptidase (EC 3.4.21), a cysteine endopeptidase (EC 3.4.22), an aspartic endopeptidase (EC 3.4.23), a metalloendopeptidase (EC 3.4.24), a threonine endopeptidase (EC 3.4.25), an endopeptidase of unknown catalytic mechanism (EC 3.4.99), or a combination thereof. Examples of a serine endopeptidase (EC 3.4.21) includes a chymotrypsin (EC 3.4.21.1); a chymotrypsin C (EC 3.4.21.2); a metridin (EC 3.4.21.3); a trypsin (EC 3.4.21.4); a thrombin (EC 3.4.21.5); a coagulation factor Xa (EC 3.4.21.6); a plasmin (EC 3.4.21.7); an enteropeptidase (EC 3.4.21.9); an acrosin (EC 3.4.21.10); an a-Lytic endopeptidase (EC 3.4.21.12); a glutamyl endopeptidase (EC 3.4.21.19); a cathepsin G (EC 3.4.21.20); a coagulation factor VIIa (EC 3.4.21.21); a coagulation factor IXa (EC 3.4.21.22); a cucumisin (EC 3.4.21.25); a prolyl oligopeptidase (EC 3.4.21.26); a coagulation factor XIa (EC 3.4.21.27); a brachyurin (EC 3.4.21.32); a plasma kallikrein (EC 3.4.21.34); a tissue kallikrein (EC 3.4.21.35); a pancreatic elastase (EC 3.4.21.36); a leukocyte elastase (EC 3.4.21.37); a coagulation factor XIIa (EC 3.4.21.38); a chymase (EC 3.4.21.39); a complement subcomponent C (EC 3.4.21.41); a complement subcomponent C (EC 3.4.21.42); a classical-complement-pathway C3/C5 convertase (EC 3.4.21.43); a complement factor I (EC 3.4.21.45); a complement factor D (EC 3.4.21.46); an alternative-complement-pathway C3/C5 convertase (EC 3.4.21.47); a cerevisin (EC 3.4.21.48); a hypodermin C (EC 3.4.21.49); a lysyl endopeptidase (EC 3.4.21.50); an endopeptidase La (EC 3.4.21.53); a y-renin (EC 3.4.21.54); a venombin AB (EC 3.4.21.55); a leucyl endopeptidase (EC 3.4.21.57); a tryptase (EC 3.4.21.59); a scutelarin (EC 3.4.21.60); a kexin (EC 3.4.21.61); a subtilisin (EC 3.4.21.62); an oryzin (EC 3.4.21.63); a peptidase K (EC 3.4.21.64); a thermomycolin (EC 3.4.21.65); a thermitase (EC 3.4.21.66); an endopeptidase So (EC 3.4.21.67); a t-plasminogen activator (EC 3.4.21.68); a protein C (activated) (EC 3.4.21.69); a pancreatic endopeptidase E (EC 3.4.21.70); a pancreatic elastase II (EC 3.4.21.71); an IgA-specific serine endopeptidase (EC 3.4.21.72); a u-plasminogen activator (EC 3.4.21.73); a venombin A (EC 3.4.21.74); a furin (EC 3.4.21.75); a myeloblastin (EC 3.4.21.76); a semenogelase (EC 3.4.21.77); a granzyme A (EC 3.4.21.78); a granzyme B (EC 3.4.21.79); a streptogrisin A (EC 3.4.21.80); a streptogrisin B (EC 3.4.21.81); a glutamyl endopeptidase II (EC 3.4.21.82); an oligopeptidase B (EC 3.4.21.83); a limulus clotting factor (EC 3.4.21.84); a limulus clotting factor (EC 3.4.21.85); a limulus clotting enzyme (EC 3.4.21.86); a repressor LexA (EC 3.4.21.88); a signal peptidase I (EC 3.4.21.89); a togavirin (EC 3.4.21.90); a flavivirin (EC 3.4.21.91); an endopeptidase Clp (EC 3.4.21.92); a proprotein convertase 1 (EC 3.4.21.93); a proprotein convertase 2 (EC 3.4.21.94); a snake venom factor V activator (EC 3.4.21.95); a lactocepin (EC 3.4.21.96); an assemblin (EC 3.4.21.97); a hepacivirin (EC 3.4.21.98); a spermosin (EC 3.4.21.99); a sedolisin (EC 3.4.21.100); a xanthomonalisin (EC 3.4.21.101); a C-terminal processing peptidase (EC 3.4.21.102); a physarolisin (EC 3.4.21.103); a mannan-binding lectin-associated serine protease-2 (EC 3.4.21.104); a rhomboid protease (EC 3.4.21.105); a hepsin (EC 3.4.21.106); a peptidase Do (EC 3.4.21.107); a HtrA2 peptidase (EC 3.4.21.108); a matriptase (EC 3.4.21.109); a C5a peptidase (EC 3.4.21.110); an aqualysin 1 (EC 3.4.21.111); a site-1 protease (EC 3.4.21.112); a pestivirus NS3 polyprotein peptidase (EC 3.4.21.113); an equine arterivirus serine peptidase (EC 3.4.21.114); an infectious pancreatic necrosis birnavirus Vp4 peptidase (EC 3.4.21.115); a SpoIVB peptidase (EC 3.4.21.116); a stratum corneum chymotryptic enzyme (EC 3.4.21.117); a kallikrein 8 (EC 3.4.21.118); a kallikrein 13 (EC 3.4.21.119); an oviductin (EC 3.4.21.120); or a combination thereof.

Trypsin (EC 3.4.21.4) catalyzes the reaction: a preferential cleavage at an Arg and/or a Lys residue, with structural and sequence information known in the art [e.g., KEGG sequences HSA—5644(PRSS1); 5645(PRSS2); 436522 (Try10); MDO—100010059; XLA—379460(MGC64344); Dmel_CG10587; Dmel_CG11668; Dmel_CG12385(theta-Try); Dmel_CG16705(SPE); Dmel_CG18681(epsilonTry); Dmel_CG30371; Dmel_CG31822; Dmel_CG32755; Dmel_CG34409; Dmel_CG5255; Dmel_CG7754(iotaTry); Dmel_CG9372; Dpse_GA14937; ANI—AN2366.2, SMA—SAV_2443; Protein database bank entries: 1A0J; LAND; 1AZ8; 1BTP; 1C1N; 1C1T; 1C2I; 1C5Q; 1C9P; 1B2; 1EZX; 1FMG; 1FY8; 1GDN; 1GI5; 1J15; 1K1L; 1MAY; 1NC6; 1O2O; 1O2X; 1O36; 1O3F; 1O3O; 1PPC; 1QB1; 1RXP; 1S84; 1SMF; 1TNJ; 1TX7; 1UTP; 1V2Q; 1XUG; 1Y3W; 1YLC; 2AGE; 2BY6; 2F3C; 2FX6; 2O9Q; 2STA; 2ZDL; 3BTG; 3TGI; 5PTP, etc.].

Chymotrypsin (EC 3.4.21.1) generally cleaves peptide bonds at the carboxyl side of amino acids, with a preference for a substrate comprising a Tyr, a Trp, a Phe, and/or a Leu, with structural and sequence information known in the art [e.g., KEGG sequences HSA—1504(CTRB1), 440387 (CTRB2); PTR—736467(CTRB1); MCC—711100, 713851 (CTRB1); MMU—66473(Ctrb1); RNO—24291(Ctrb1); CFA—479649(CTRB2), 479650(CTRB1), 610373; BTA—504241(CTRB1); XLA—379495, 379607(MGC64417), 444360; XTR—496968(ctrl), 548358(ctrb1); DRE—322451(ctrb1), 562139; NVE—NEMVE_v1g140545; DME—Dmel_CG10472, Dmel_CG11529, Dmel_CG11911, Dmel_CG16996, Dmel_CG16997, Dmel_CG17234, Dmel_CG17477, Dmel_CG18179, Dmel_CG18180, Dmel_CG31362(Jon99Ciii), Dmel_CG3916, Dmel_CG6298(Jon74E), Dmel_CG6457 (yip7), Dmel_CG6467(Jon65Aiv), Dmel_CG6592, Dmel_CG7142, Dmel_CG7170(Jon66Cii), Dmel_CG7542, Dmel_CG8329, Dmel_CG8579(Jon44E), Dmel_CG8869 (Jon25Bii); DPO—Dpse_GA19618, Dpse_GA21380; Protein database bank entries 1AB9, 1ACB, 1AFQ, 1CA0, 1CBW, 1CHO, 1DLK, 1EQ9, 1EX3, 1GCD, 1GCT, 1GG6, 1GGD, 1GHA, 1GHB, 1GL0, 1GL1, 1GMC, 1GMD, 1GMH, 1HJA, 1K2I, 1KDQ, 1MTN, 1N8O, 1OXG, 1P2M, 1P2N, 1P2O, 1P2Q, 1T7C, 1T8L, 1T8M, 1T8N, 1T8O, 1VGC, 1YPH, 2CHA, 2GCH, 2GCT, 2GMT, 2JET, 2P8O, 2VGC, 3BG4, 3GCH, 3GCT, 3VGC, 4CHA, 4GCH, 4VGC, 5CHA, 5GCH, 6CHA, 6GCH, 7GCH, 8GCH, etc.].

Chymotrypsin C (EC 3.4.21.2) hydrolyzes a peptide bond, particularly those comprising a Leu, a Tyr, a Phe, a Met, a Trp, a Gln, and/or an Asn, with structural and sequence information known in the art [e.g., Protein database bank entries: HSA*-*11330(CTRC); PTR*-*739685 (CTRC); MCC*-*700270, 700762(CTRC); MMU*-*76701 (Ctrc); RNO*-*362653(Ctrc); CFA*-*478220(CTRC); BTA*-*514047(CTRC); etc.].

Subtilisin (EC 3.4.21.62) comprises a serine endopeptidase, and hydrolyzes a peptide bond, particularly those comprising a bulky uncharged P1 residue; as well as hydrolyzes a peptide amide bond, with structural and sequence information known in the art [e.g., KEGG sequences DME—Dmel_CG7169(S1P); OSA—4334194 (Os03g0761500); ANG—An09g03780(pepD); PFA—PFE0370c; PEN—PSEEN4433; CPS—CPS_0751; AZO—azo1237(subC); GSU—GSU2075; GME—Gmet_0931; RLE—RL1858; BRA—BRADO0807; RDE—RD1_4002 (apr); BSU—BSU10300(aprE); BHA—BH0684(alp) BH0855; BTL—BALH_4378; BLI—BL01111(apr); BLD—BLi01109; BCL—ABC0761(aprE); DRM—Dred_0089; MTA—Moth 2027; MPU—MYPU_6550; MHJ—MHJ_0085; RHA—RHA1_ro08410; SEN—SACE_7133(aprE); RBA—RB841; AVA—Ava_2018, Ava_4060; Protein database bank entries: 1A2Q, 1AF4, 1AK9, 1AV7, 1AVT, 1BFK, 1C3L, 1C9N, 1GCI, 1IAV, 1MPT, 1OYV, 1SBC, 1SBN, 1SCD, 1SIB, 1SUA, 1SUD, 1SVN, 1TM3, 1TM7, 1TO2, 1VSB, 1Y34, 1Y3D, 1Y4A, 2E1P, 2Z2X, 2Z30, 2Z58, 3CNQ, 3SIC, 5SIC, etc.].

Lysozyme (EC 3.2.1.17) catalyzes the reaction: in a peptidoglycan, hydrolyzes a (1,4)-β-linkage between N-acetylmuramic acid and a N-acetyl-D-glucosamine; in a chitodextrin (a polymer of (1,4)-β-linked N-acetyl-D-glucosamine monomers), hydrolyzes the (1,4)-β-linkage, with structural and sequence information known in the art [e.g., Protein database bank entries 102l, 103l, 104l, 107l, 108l, 109l, 110l, 111l, 112l, 113l, 114l, 115l, 116l, 118l, 119l, 120l, 122l, 123l, 125l, 126l, 127l, 128l, 129l, 130l, 171l; KEEG sequences HSA—4069(LYZ); PTR—450190(LYZ); MCC—718361(LYZ); MMU—17105(Lyz2) 17110(Lyz1); RNO—25211(Lyz2); DPO—Dpse_GA11118 Dpse_GA20595; AGA—AgaP_AGAP005717 AgaP_A-GAP007343 AgaP_AGAP007344 AgaP_AGAP007345 AgaP_AGAP007347 AgaP_AGAP007385; PPH—Ppha_0875Protein; etc.).

Lysostaphin (EC 3.4.24.75) catalyzes the reaction: in a staphylococcal (e.g., S. aureus) peptidoglycan, hydrolyzes a -GlyGly- bond in a pentaglycine inter-peptide link (e.g., cleaves the polyglycine cross-links in the peptidoglycan layer of the cell wall of a Staphylococcus sp.), with structural and sequence information known in the art [e.g., Protein database bank entries 1QWY, 2B0P, 2B13, 2B44; HAR: HEAR2799; SAU: SA0265(lytM); SAV: SAV0276(lytM); SAW: SAHV_0274(lytM); SAM: MW0252(lytM); SAR: SAR0273(lytM); AM1_B0175; etc].

Lysyl endopeptidase (EC 3.4.21.50) catalyzes the peptide cleavage reaction: at a Lys, including -LysPro-, with structural and sequence information known in the art (e.g., Protein database bank entries 1arb, 1arc; KEEG sequences SRU: SRU_1622; etc.).

Cellulase (EC 3.2.1.4) catalyzes the reaction: in a cellulose, endohydrolysis of a (1,4)-β-D-glucosidic linkage; in a lichenin, endohydrolysis of a (1,4)-β-D-glucosidic linkage; and/or in a cereal β-D-glucan, endohydrolysis of a (1,4)-β-D-glucosidic linkage, with structural and sequence information known in the art [e.g., Protein database bank entries 1A39; 1A3H; 1AIW; 1CEC; 1CEM; 1CEN; 1CEO; 1CLC; 1CX1; 1DAQ; 1DAV; 1DYM; 1DYS; 1E5J; 1ECE; 1EDG; 1EG1; 1EGZ; 1F9D; 1F9O; 8A3H; KEEG sequences DFRU: 144551(NEWSINFRUG00000162829) 157531 (NEWSINFRUG00000148215) 180346(NEWSIN-FRUG00000163275); DBMO: Bmb020157; CNE: CNH00790; CNB: CNBL0740; DPCH: 121193 (e_gwh2.5.359.1) 129325(e_gwh2.2.646.1) 139079 (e_gww2.2.208.1); LBC: LACBIDRAFT_294705 LAC-BIDRAFT_311963; DDI: DDB_0215351(celA) DDB_0230001; DPKN: KCR: Kcr_0883 Kcr_1258; etc.].

Chitinase (EC 3.2.1.14) catalyzes the reaction: random hydrolysis of a N-acetyl-β-D-glucosaminide (1→4)-β-linkage in a chitin; and random hydrolysis of a N-acetyl-β-D-glucosaminide (1→4)-β-linkage in a chitodextrin, with structural and sequence information known in the art [e.g., Protein database bank entries: 1CNS; 1CTN; 1D2K; 1DXJ; 1E6Z; 3 CQL; KEEG sequences HSA: 1118(CHIT1) 27159 (CHIA); PTR: 457641(CHIT1); MCC: 703284(CHIA) 703286(CHIT1); HAU: Haur_2750; etc.].

β-agarase (EC 3.2.1.81) catalyzes the reaction: in agarose, hydrolysis of a 1,413-D-galactosidic linkage, producing a tetramer, with structural and sequence information known in the art [e.g., Protein database bank entries 1O4Y, 1O4Z, 1URX; KEEG sequences PPF: Pput_1162; PAT: Patl_1904 Patl_1971 Patl_2341 Patl_2640 Patl_2642; SDE: Sde_1175 Sde_1176 Sde_2644 Sde_2650 Sde_2655; RPB: RPB_3029; RPD: RPD_2419; RPE: RPE_4620; SCO: SCO3471(dagA); RBA: RB3421(agrA); etc.].

N-acetylmuramoyl-L-alanine amidase (EC 3.5.1.28) catalyzes the reaction: hydrolysis of a link between a L-amino acid residue and a N-acetylmuramoyl residue in some cell-wall glycopeptides, with structural and sequence information known in the art [e.g., Protein database bank entries 1 ARO, 1GVM, 1H8G, 1HCX, 1J3G, 1JWQ, 1LBA, 1X60, 1XOV, 2AR3, 2BGX, 2BH7, 2BML; KEEG sequences HSA: 114770(PGLYRP2) 114771(PGLYRP3) 57115 (PGLYRP4) 8993 (PGLYRP1); PTR: 455797(PGLYRP2) 737434 (PGLYRP3) 737562(PGLYRP4); MCC: 714583

(LOC714583) 718287(PGLYRP2) 718480(LOC718480); MMU: 21946(Pglyrp1) 242100(Pglyrp3) 57757(Pglyrp2); MMA: MM_2290; etc.].

A lytic transglycosylase ("lytic murein transglycosylase," EC 3.2.1.-) demonstrates exo-N-acetylmuramidase activity, and can cleave a glycan strand comprising linked a peptide and/or a glycan strand that lack linked peptides with similar efficiency, with structural and sequence information known in the art [e.g., Protein database bank entries 1Q2R, 1Q2S, 2PJJ, 2PIC, 1QSA, 2PNW, 1QTE, 1QUS, 1QUT, 1QDR, 1SLY, 1D0K, 1D0L, 1D0M, 3BKH, 3BKV, 2AE0; KEEG sequences ECO: b2701(mltB); ECJ: JW2671(mltB); ECE: Z4004(mltB); ECS: ECs3558; ECC: c3255(mltB); YPY: YPK_1464; YEN: YE1242(mltB); SYP: SYNPCC7002_A2370(mltA); etc.].

Glucan endo-1,3-β-D-glucosidase ("glucoamylase") (EC 3.2.1.39) catalyzes the reaction: hydrolysis of a (1,3)-β-D-glucosidic linkage in a (1,3)-β-D-glucan, with structural and sequence information known in the art [e.g., Protein database bank entries 1GHS, 2CYG, 2HYK, 3DGT; KEEG sequences DBMO: Bmb007310; ATH: AT3G57260(BGL2); DPOP: 769807(fgenesh4_pg.C_LG_X001297); FJO: Fjoh_2435; etc.].

Endo-1,3(4)-β-glucanase (EC 3.2.1.6) catalyzes the reaction: endohydrolysis of a (1,3)-linkage in a β-D-glucan and/or a (1,4)-linkage in a β-D-glucan, wherein the hydrolyzed link's glucose residue is substituted at a C-3 of the reducing moiety that is part of the substrate chemical linkage, with structural and sequence information known in the art [e.g., Protein database bank entries 1UP4, 1UP6, 1UP7, 2CL2; KEEG sequences NCR: NCU04431 NCU07076; PAN: PODANSg699 PODANSg9033; FGR: FG04768.1 FG06119.1 FG08757.1; and/or NPH: NP4306A (celM); etc.].

Peptide-$N^4$—(N-acetyl-β-glucosaminyl)asparagine amidase (EC 3.5.1.52) catalyzes the reaction: hydrolysis of a $N^4$-(acetyl-β-D-glucosaminyl)asparagine residue, with structural and sequence information known in the art [e.g., Protein database bank entries 1PGS, 1PNF, 1PNG, 1X3W, 1X3Z, 2D5U, 2F4M, 2F4O, 2G9F, 2G9G, 2HPJ, 2HPL, 2I74; KEEG sequences HSA: 55768(NGLY1); PTR: 460233(NGLY1); MCC: 700842(LOC700842); DECB: 100059456(LOC100059456); OAA: 100075786 (LOC100075786); GGA: 420655(NGLY1); DRE: 553627 (zgc:110561); and/or DTPS: 35410(e_gw1.7.250.1); etc.].

Mannosyl-glycoprotein endo-β-N-acetylglucosaminidase (EC 3.2.1.96) catalyzes the reaction: a N,N'-diacetylchitobiosyl unit endohydrolysis in a high-mannose glycoprotein and/or a glycopeptide comprising a -[Man(GlcNAc)$_2$]Asn-structure, wherein the intact oligosaccharide is released and a N-acetyl-D-glucosamine residue is still attached to the protein, with structural and sequence information known in the art [e.g., Protein database bank entries 1C3F, 1C8X, 1C8Y, 1C90, 1C91, 1C92, 1C93, 1EDT, 1EOK, 1EOM, 2EBN; KEEG sequences HSA: 64772(FLJ21865); OAA: 100089364(LOC100089364); DCIN: 254322(gw1.55.22.1); and/or CHU: CHU_1472(flgJ); etc.].

ι-carrageenase (EC 3.2.1.157) catalyzes the reaction: in an ι-carrageenan, endohydrolysis of a 1,4-β-D-linkage between a 3,6-anhydro-D-galactose-2-sulfate and a D-galactose 4-sulfate, with structural and sequence information known in the art (e.g., Protein database bank entries 1H80, 1KTW, etc.).

κ-carrageenase (EC 3.2.1.83) catalyzes the reaction: in a κ-carrageenans, endohydrolysis of a 1,4-β-D-linkage between a 3,6-anhydro-D-galactose and a D-galactose 4-sulfate, with structural and sequence information known in the art (e.g., Protein database bank entries 1DYP; KEEG sequences RBA: RB2702; etc.).

Other antibiological/antimicrobial enzymes, proteins, peptides, and other biomolecules may be used herein. Beta mannanase ("endo-1, 4-ß-mannanase," "beta-mannosidase") is identified by enzyme commission number EC 3.2.1.25 and catalyzes the hydrolysis of terminal, non-reducing β-D-mannose residues in β-D-mannosides; with structural and sequence information known in the art with examples including Protein database bank entries (e.g., 1BQC; 2WHK; 5JTS; 3WSU; etc.). Chymosin is a protease identified by enzyme commission number EC 3.4.23.4; with structural and sequence information known in the art with examples including Protein database bank entries (e.g., 4AA8; 1CMS; 4AUC; 4AA9; etc.). Glucose oxidase catalyses the oxidation of glucose to hydrogen peroxide and D-glucono-1,5-lactone and is identified by enzyme commission number EC 1.1.3.4; with structural and sequence information known in the art with examples including Protein database bank entries 5NIT; 5NIW; 3RJ8; 3RJA; 1GPE; etc.). A peroxidase (e.g., a horseradish peroxidase) catalyzes the reaction 2 phenolic donor+$H_2O_2$=2 phenoxyl radical of the donor+$2H_2O$ and is identified by enzyme commission number EC 1.11.1.7; with structural and sequence information known in the art with examples including Protein database bank entries (e.g., 1GZA; 2RM5; 3DWV; 1B85; 1MNP; 1ATJ; 1QGJ; 1GWU; 1H58; etc.). A laccase catalyzes the reaction 4 benzenediol+$O_2$=4 benzosemiquinone+ $2H_2O$ and is identified by enzyme commission number EC 1.10.3.2; with structural and sequence information known in the art with examples including Protein database bank entries (e.g., 3CG8; 5E9N; 2HRH; 2XU9; 3FPX; 3 TAS; 6F5K; etc.). A polygalacturonase catalyzes the reaction hydrolysis of (1→4)-α-D-galactosiduronic linkages in a galacturonan and or pectate and is identified by enzyme commission number EC 3.2.1.15; with structural and sequence information known in the art with examples including Protein database bank entries (e.g., 1IA5; 2IQ7; 1BHE; 1CZF; 1IB4; 1OGQ; 1NHC; etc.). A thermolysin catalyzes the reaction cleavage at leucine and phenylalanine and is identified by enzyme commission number EC 3.4.24.27; with structural and sequence information known in the art with examples including Protein database bank entries (e.g., 1TLX; 1KEI; 5DLH; 1LNB; 1LNF; 4OW3; 4TNL; etc.). An alpha amylase ("α-amylase") catalyzes the reaction cleavage endohydrolysis of (1→4)-α-D-glucosidic linkages in trimers and longer polymers and is identified by enzyme commission number EC 3.2.1.1; with structural and sequence information known in the art with examples including Protein database bank entries (e.g., 1BLI; 1PIF; 1W9X; 1AQH; 1DHK; 1AMY; 1WZA; 2J4U; etc.). An alginate lyase ("mannuronate-specific alginate lyase") catalyzes the reaction alginate cleavage to produce oligosaccharides with their reducing ends having β-D-mannuronate and/or 4-deoxy-α-L-erythro-hex-4-enuronosyl groups and is identified by enzyme commission number EC 4.2.2.3; with structural and sequence information known in the art with examples including Protein database bank entries (e.g., 1HV6; 1J1T; 5GMT; 4OZV; 4OZX; etc.). A lactoferrin sequesters iron and produces peroxides, with structural and sequence information known in the art with examples including Protein database bank entries (e.g., 1B0L; 1BIY; 1FCK; 1BLF; 1N76; etc.). A melittin may alter cellular membranes, with structural and sequence information known in the art with examples including Protein database bank entries (e.g., 2MLT; 3QRX; 2MW6; etc.). A bacteriocin such as an enterocin and nisin may have antibiological activity by various mechanisms such as altering cellular membranes, inhibition of peptidoglycan, other mechanisms with structural and sequence information known in the art with examples including Protein database bank entries (e.g., 2M5Z; 2M60; 2MP8; etc.). A nisin is a polycyclic peptide (Cas no. 1414-45-5). A monolaurin is an ester of a fatty acid, lauric acid, and glycerol.

In certain embodiments, a material formulation comprises an esterase identified by enzyme commission number EC 3.1.8, the phosphoric triester hydrolases, such as a phosphoric triester hydrolase includes an aryldialkylphosphatase (EC 3.1.8.1) and/or an diisopropyl-fluorophosphatase (EC 3.1.8.2). An aryldialkylphosphatase (EC 3.1.8.1) ("organophosphorus hydrolase," "paraoxonase") and a catalyzes the following reaction: aryl dialkyl phosphate+$H_2O$=an aryl alcohol+dialkyl phosphate, with structural and sequence information known in the art with examples including Protein database bank entries [e.g., 1JGM, 1DPM, 1PSC, 1PTA, 1EYW, 1EZ2, 1HZY, 1I0B, 1I0D, 1JGM, 1P6B, 1P6C, 1P9E, 1QW7, 1V04, 2D2G, 2D2H, 2D2J, 2O4M, 2O4Q, 2OB3, 2OQL, 2R1K, 2R1L, 2R1M, 2R1N, 2R1P, 2VC5, 2VC7, 2ZC1, 3C86, 3CAK, 3E3H); KEEG sequences (e.g., HSA—5444(PON1), 5445(PON2), 5446 (PON3); PTR—463547(PON1), 463548(PON3), 463549 (PON2); and/or RXY—Rxyl_2340]; Genbank sequences (e.g., Genbank accession no. M20392, M22863, AY043245, AJ426431, M29593, M63012, etc.); and Entrez databank sequences (e.g., Entrez nos. AAK85308, CAD19996, AAA98299, AAA24931, AAA24930, AAB59538, etc.). A diisopropyl-fluorophosphatase (EC 3.1.8.2) catalyzes the following reaction: diisopropyl fluorophosphate+$H_2O$=fluoride+diisopropyl phosphate, with structural and sequence information known in the art (e.g., Protein database bank entries 1E1A, 1PJX, 2GVU, 2GVV, 2GVW, 2GVX, 2IAO, 2IAP, 2IAQ, 2IAR, 2IAS, 2IAT, 2IAU, 2IAV, 2IAW, 2IAX, 2W43, 3BYC; GeneBank accession no. AX018860, U28937; Entrez databank AAC52721; etc.). Organophosphorus acid anhydrolases ("OPAA") are also included in E.C.3.1.8.2, with structural and sequence information known in the art (e.g., GeneBank accession nos. U29240, U56398; Entrez databank nos. AAB05590, AAA99824; ATCC 23821; etc.).

In certain aspects, a biomolecule (e.g., a proteinaceous molecule) for a biomolecule composition may be biologically produced in a cell, a tissue and/or an organism including but not limited to being endogenously and/or recombinantly produced and/or synthesized (e.g., a chemically synthesized peptide) using any method or technique in the art. [In "Molecular Cloning" (Sambrook, J., and Russell, D. W., Eds.) 3rd Edition, Cold Spring Harbor, New York: Cold Spring Harbor Laboratory Press, 2001; In "Current Protocols in Molecular Biology" (Chanda, V. B. Ed.) John Wiley & Sons, 2002; In "Current Protocols in Cell Biology" (Morgan, K. Ed.) John Wiley & Sons, 2002; In "Current Protocols in Nucleic Acid Chemistry" (Harkins, E. W. Ed.) John Wiley & Sons, 2002; In "Current Protocols in Protein Science" (Taylor, G. Ed.) John Wiley & Sons, 2002; In "Current Protocols in Pharmacology" (Taylor, G. Ed.) John Wiley & Sons, 2002; In "Current Protocols in Cytometry" (Robinson, J. P. Ed.) John Wiley & Sons, 2002; In "Current Protocols in Immunology" (Coico, R. Ed.) John Wiley & Sons, 2002]. A biological cell (e.g., a microorganism), a virus, a tissue, and/or an organism (e.g., a plant) may be obtained from an environmental source using procedures of the art [see, for example, "Environmental Biotechnology Isolation of Biotechnological Organisms From Nature (Labeda, D. P., Ed.), 1990]. Such biological materials and information about appropriate growth conditions may be obtainable from the biological culture collection and/or commercial vendor that stores the biological material, and the location of a specific biological material may be identified using a database such as that maintained by the World Data Center for Microorganisms (National Institute of Genetics, WFCC-MIRCEN World Data Center for Microorganisms, 1111 Yata, Mishima, Shizuoka, 411-8540 JAPAN). Specific examples of biological culture collections referred to herein include the American Type Culture Collection ("ATCC"; P.O. Box 1549, Manassas, VA 20108-1549, U.S.A), the Culture Collection of Algae and Protozoa ("CCAP"; CEH Windermere, The Ferry House, Far Sawrey, Ambleside, Cumbria LA22 0LP, United Kingdom), the Collection de l'Institut Pasteur ("CIP"; Institut Pasteur, 28 Rue du Docteur Roux, 75724 Paris Cedex 15, France), the Deutsche Sammlung von Mikroorganismen und Zellkulturen ("DSMZ"; GmbH, Mascheroder Weg 1B, D-38124 Braunschweig, Germany), the THEM Biomedical Fungi and Yeasts Collection ("THEM"; Scientific Institute of Public Health—Louis Pasteur, Mycology Section, Rue J. Wytsmanstraat 14, B-1050 Brussels), the Japan Collection of Microorganisms ("JCM"; Institute of Physical and Chemical Research (RIKEN), Wako, Saitama 351-0198, Japan), the Collection of the Laboratorium voor Microbiologie en Microbiele Genetica ("LMG"; Rijksuniversiteit, Ledeganckstraat 35, B-9000, Gent, Belgium), the MUCL (Agro) Industrial Fungi & Yeasts Collection ("MUCL," Mycothèque de l'Universite catholique de Louvain, Place Croix du Sud 3, B-1348 Louvain-la-Neuve), the Pasteur Culture Collection of Cyanobacteria ("PCC"; Unité de Physiologie Microbienne, Institut Pasteur, 28 rue du Docteur Roux, 75724 Paris Cedex 15, France), the All-Russian Collection of Microorganisms ("VKM"; Russian Academy of Sciences, Institute of Biochemistry and Physiology of Microorganisms, 142292 Pushchino, Moscow Region, Russia), and the University of Texas ("UTEX"; Department of Botany, The University of Texas at Austin, Austin, TX 78713-7640). Selection of certain cell(s) and/or virus(es) are capable of growth in environmental conditions typically harmful to many other types of cells ("extremophiles"), such as conditions of extreme temperature, salt and/or pH. A biomolecule derived from such a cell and/or a virus may be useful in certain embodiments for durability, activity, or other property of a material formulation comprising a biomolecule composition (e.g., a bio-based antibiological agent) that undergoes conditions similar to (e.g., the same or overlapping ranges) as those found in the cell's and/or the virus's growth environment. A "hyperthermophile" or "thermophile" typically grows in temperatures greater than about 40° C., often up to about 120° C. or more. A "psychrophile" typically grows at about −10° C. to about 20° C., and a "mesophile" typically grows at about 20° C. to about 40° C., and an "extreme halophile" may be capable of living in salt-water conditions of about 1.5 M (8.77% w/v) sodium chloride to about 2.7 M (15.78% w/v) or more sodium chloride. An "extreme acidophile" may be capable of growing in about pH 1 to about pH 6, while an "extreme alkaliphile" may be capable of growing in about pH 8 to about pH 14.

A biomolecule may be derived from a non-biological source, such as the case of a proteinaceous and/or a nucleotide sequence engineered by the hand of man. For example, a nucleotide sequence encoding a synthetic peptide sequence from a peptide library. In some aspects, one or more peptides may be prepared as a peptide library, which typically comprises a plurality (e.g., about 2 to about $10^{10}$ peptides). A peptide library may comprise a D-amino acid, an L-amino acid, a cyclic amino acid, a common amino acid, an uncommon amino acid (e.g., a non-naturally occurring amino acid), a stereoisomer (e.g., a D-amino acid stereoisomer, an L-amino acid stereoisomer), or a combination thereof. A peptide library may comprise a synthetically produced peptide and/or a biologically produced peptide (e.g., a recombinantly produced peptide, see for example U.S. Pat. No. 4,935,351). In particular aspects, an antimicrobial biomolecule composition comprise a peptide (e.g., ProteCoat®, Reactive Surfaces, Ltd., LLP.; also described in U.S. Pat. Nos. 6,020,312; 5,885,782; and 5,602,097, and patent application Ser. Nos. 10/884,355 and 11/368,086; e.g., SEQ ID no. 40).

It is possible to alter a proteinaceous molecule (e.g., an enzyme, an antibody, a receptor, a peptide, a polypeptide) with a defined amino acid sequence and/or length for one or more properties. Examples of a property, in the context of a proteinaceous molecule, includes, but is not limited to, a ligand binding property, a catalytic property, a stability property, a property related to environmental safety, a charge property, or a combination thereof. As used herein, a wild-type proteinaceous molecule refers to an amino acid sequence that functions as an enzyme and matches the sequence encoded by an isolated gene from a natural source. A proteinaceous molecule (e.g., an enzyme, an antibody, a receptor, a peptide, a polypeptide) comprising a chemical modification and/or a sequence modification that functions the same or similar (e.g., a modified enzyme of the same EC classification as the unmodified enzyme) comprises a "functional equivalent" to, and "in accordance" with, an unmodified proteinaceous molecule. For example, various amino acids have been given a numeric quantity based on the characteristics of charge and hydrophobicity, called the hydropathic index (Kyte, J. and Doolittle, R. F. *J. Mol. Biol.,* 157:105-132, 1982), as well as a value has based on hydrophilicity (seem for example, U.S. Pat. No. 4,554,101), and an amino acid may be substituted for a different amino acid having a similar hydropathic and/or hydrophobicity value (e.g., generally within +/−2, within +/−1, and/or within +/−0.5), and retain similar if not identical biological activity. In some cases a proteinaceous molecule may be 70%, 80%, 90%, up to 100% similar in sequence identity and/or length and retain similar if not identical biological activity. Functional equivalents are that may be used are described, for example, in U.S. patent application Ser. Nos. 12/696,651, 12/474,921 and 12/882,563, each specifically incorporated herein by reference.

In some embodiments, after production of a biomolecule by a living cell, the composition comprising the biomolecule may undergo one or more processing procedure(s) to prepare a biomolecule composition (e.g., a bio-based antibiological agent). Examples of such procedures include concentrating, drying, applying physical force, extracting, resuspending, controlling temperature, permeabilizing, disrupting, chemically modifying, encapsulating, proteinaceous molecule purification, immobilizing, or a combination thereof. Sterilizing ("inactivating") kills living matter (e.g., a cell, a virus), while attenuation reduces the virulence of a living matter. Examples of sterilizing and/or attenuating may include contacting the living matter with a toxin, a solvent and/or a chemically reactive material formulation component, irradiating the living matter (e.g., infrared ("IR") radiation, ionizing radiation, microwave radiation, ultraviolet ("UV") radiation, particle radiation such as alpha radiation, electron beam/beta radiation, neutron radiation, proton radiation), heating the living matter above a temperature suitable for life (e.g., 100° C. in many cases, more for an extremophile), or a combination thereof. or a combination thereof. Concentrating refers to any process reducing the volume of a composition, an article, etc. An undesired component that comprises the excess volume is removed and/or the desired composition may be localized to a reduced volume. Concentrating may be by any method known in the art, including, for example, washing, filtrating, a gravitational force, a gravimetric force (e.g., centrifugation), or a combination thereof. Drying (e.g., freeze-drying, lyophilizing, spray drying) may remove an undesired liquid, and may produce a material that is more stable (e.g., enzymatic activity retention during storage) than an undried material. Physical force (e.g., grinding, milling, shearing) may alter the average particle size of a material, such as producing a powder form of a material (e.g., a powdered enzyme). An underside or desired material (e.g., an enzyme) may be partly or fully removed, a cellular material may be permeabilized (e.g., cell wall permeabilized), a materials solubility may be altered, or a combination thereof, by extraction with appropriate solvents. Permeabilization [e.g., contacting with a permeabilizing agent such as dimethyl sulfoxide ("DMSO"), EDTA, tributyl phosphate, contact with a solvent, pressure such as processing through a French press, sonication, mechanical shearing, homogenization, sonication, freeze drying, spray drying, freezing then thawing, contact with a porin and/or an enzyme such as a lysozyme, etc.] of a biomolecule composition comprising a cell membrane and/or a cell wall may promote the separation of cells, reduce the average particle size of the material, allow greater access to a biomolecule in a cell (e.g., to promote ease of extraction), or a combination thereof.

The form of a biomolecule composition (e.g., a bio-based antibiological agent) may varied through processing techniques to optimize a desired property such as bioactivity and/or bioactivity resistance upon and/or within a particular material formulation. In certain aspects, the total content of desired biomolecule may range from about 0.0000001% to about 99.9999% of a material prepared from a biological cell, by volume and/or dry weight. A whole cell material refers to particulate material the majority (i.e., greater than 50% by weight or volume) resembles an intact living cell upon microscopic examination, while if less than the majority is does not resemble intact living cells such material is referred to as cell-fragment material. In some cases, the presence of cellular material (e.g., a cell wall biomolecule) other than the desired biomolecule (e.g., an enzyme) may provide a protective effect from a material formulation's component (e.g., a solvent, a binder, a polymer, a crosslinking agent, a reactive chemical such as a peroxide, an additive, etc.); a material formulation related chemical reaction (e.g., thermosetting reaction); a potentially damaging agent that a material formulation may contact (e.g., a chemical, a solvent, a detergent, etc.); or a combination thereof. A purified biomolecule composition (e.g., a purified enzyme, a purified peptide, etc.) comprises a desired biomolecule that has been removed in any degree from other extraneous materials (e.g., cellular material, nutrient or culture medium used in growth and/or expression, etc), such as wherein the concentration of a desired biomolecule has been enhanced about 2 to about 1,000,000-fold or more, from its original concentration in a material (e.g., a recombinant cell, a nutrient or culture medium, a chemical synthesis reaction composition, etc). In other embodiments, a purified biomolecule may comprise about 0.0000001% to about 100% of a composition comprising a biomolecule. Non-limiting techniques for purification in addition to other techniques described herein or as would be known to one of ordinary skill in the art include ammonium sulfate precipitation, ultrafiltration, polyethylene glycol suspension, hexanol extraction, methanol precipitation, Triton X-100 extraction, acrinol treatment, isoelectric focusing, alcohol treatment, acid treatment, acetone precipitation, affinity chromatography (e.g., antibody affinity chromatography, lectin affinity chromatography), fast protein liquid chromatography, high performance liquid chromatography "HPLC"), ion-exchange chromatography, exclusion chromatography; and/or electrophoretic (e.g., polyacrylamide gel electrophoresis, isoelectric focusing) methods, precipitation using antibodies, salts, heat denaturation, centrifugation, dialyzing, etc. Commercially available preparations of a purified biomolecule composition often comprise about 90% to about 100% of a specific biomolecule.

Chemical modification of a biomolecule composition (e.g., a bio-based antibiological agent) may be used to alter a physical (e.g., hydrophobicity, hydrophilicity, dispersal of particulate material, etc.) and/or a chemical property (e.g., reactivity with a material formulation's component) to enhance suitability in a material formulation. Non-limiting examples of such modifications include acylatylation; amination; hydroxylation; phosphorylation; methylation; adding a detectable label such as a fluorescein isothiocyanate; covalent attachment of a poly ethylene glycol; a derivation of an amino acid by a sugar moiety, a lipid, a phosphate, a farnysyl group; or a combination thereof, as well as others in the art [see, Greene, T. W. and Wuts, P. G. M. "Productive Groups in Organic Synthesis," Second Edition, pp. 309-315, John Wiley & Sons, Inc., USA, 1991; U.S. patent application Ser. No. 10/655,345; in "Molecular Cloning," (Sambrook, J., and Russell, D. W., Eds.) 3rd Edition, Cold Spring Harbor, New York: Cold Spring Harbor Laboratory Press, 2001; "Current Protocols in Molecular Biology," 2002]. Encapsulation (e.g., microencapsulation) of a biomolecule composition may enhance and/or confer the particulate nature of the biomolecule composition; provide protection to the biomolecule composition; stabilize a biomolecule composition; increase the average particle size to a desired range; allow slow and/or controlled release from the encapsulating material of a component of a biomolecule composition (e.g., a an enzyme, an antimicrobial peptide, etc.) and/or an additional encapsulated material (e.g., a chemical preservative/pesticide, an isolated biomolecule, etc.); alter surface charge, hydrophobicity, hydrophilicity, solubility and/or dispersability of a biomolecule composition (e.g., a particulate material) and/or an additional encapsulated material; or a combination thereof. Examples of microencapsulation (e.g., microsphere) compositions (e.g., a gelatin, a hydrogenated vegetable oil, a maltodextrin, a polyurea, a sucrose, an acacia, an amino resin, an ethylcellulose, a polyester, etc.) and techniques are described in, for example, U.S. Pat. Nos. 4,324,683, 4,839,046, 4,988,623, 5,026,650, 5,153,131, 6,485,983, 5,627,021 and 6,020,312. Other microencapsulation methods which may be employed are those described in U.S. Pat. Nos. 5,827,531; 6,103,271; and 6,387,399. A biomolecule composition may be resuspended (e.g., converted into a suspension, an emulsion, etc.) and/or dissolved in a liquid component (e.g., one comprising a cryopreservative, a xeroprotectant, a biomolecule stabilizer, etc.), typically for storage, further processing, and/or addition to a material formulation. During processing, the temperature may be maintained at or less than the optimum temperature for the activity of a living organism and/or a biomolecule that may detrimentally affect a biomolecule. Immobilization refers to attachment (i.e., by covalent and/or non-covalent interactions) of a biomolecule (e.g., an enzyme, a peptide) to a solid support ("carrier") and/or crosslinking an enzyme (e.g., a CLEC). A method of immobilization includes, for example, absorption, ionic binding, covalent attachment, crosslinking, entrapment into a gel, entrapment into a membrane compartment, or a combination thereof (Kurt Faber, "Biotransformations in Organic Chemistry, a Textbook, Third Edition." Springer-verlag Berlin Heidelberg, pp. 345-356, 1997). For example, immobilization of an enzyme to a material formulation's surface at the molecular level or scale, to limit conformational changes in the presence of a solvent that result in loss of activity, prevent enzyme aggregation, improve enzyme resistance to proteolytic digestion by limiting conformational change(s) and/or exposure of cleavage site(s), to increase the surface area of an exposed enzyme to a substrate for catalytic activity, or a combination thereof. Various reactive moieties of a proteinaceous molecule may be used in immobilization (e.g., covalent immobilization), such as lysine amino moiety, an aspartate carboxyl moiety a glutamate carboxyl moiety, the C-terminal carboxylic acid, the N-terminal amine, etc. Absorption may be used, for example, to attach a proteinaceous molecule onto a material where it may be held by a non-covalent (e.g., hydrogen bonding, Van der Waals forces) interaction. In some embodiments, a proteinaceous molecule may be stabilized in a material formulation (e.g., a polymeric material, a surface treatment) by immobilization to another molecule ("carrier molecule") within the material formulation.

In addition to the sources described herein for a biomolecule, a reagent, a living cell, etc., such a material and/or a chemical formula thereof may be obtained from convenient source such as a public database, a biological depository, and/or a commercial vendor. For example, various nucleotide sequences, including those that encode amino acid sequences, may be obtained at a public database, such as the Entrez Nucleotides database, which includes sequences from other databases including GenBank (e.g., CoreNucleotide), RefSeq, and PDB. Another example of a public databank for nucleotide and amino acid sequences includes the Kyoto Encyclopedia of Genes and Genomes ("KEGG") (Kanehisa, M. et al. Nucleic Acids Res. 36:D480-D484, 2008; Kanehisa, M. et al. Nucleic Acids Res. 34:D354-357, 2006; Kanehisa, M. and Goto, S. Nucleic Acids Res. 28:27-30, 2000). In another example, various amino acid sequences may be obtained at a public database, such as the Entrez databank, which includes sequences from other databases including SwissProt, PIR, PRF, PDB, Gene, GenBank, and RefSeq. Numerous nucleic acid sequences and/or encoded amino acid sequences can be obtained from such sources. In a further example, a biological material comprising, or are capable of comprising such a biomolecule (e.g., a living cell, a virus), may be obtained from a depository such as the American Type Culture Collection ("ATCC"), P.O. Box 1549 Manassas, VA 20108, USA. Many chemical compositions may be further identified by a Chemical Abstracts Service registration number ("CAS No."). In an additional example, a biomolecule, a chemical reagent, a biological material, and/or an equipment may be obtained from a commercial vendor such as Amersham Biosciences®, 800 Centennial Avenue, P.O. Box 1327, Piscataway, NJ 08855-1327 USA"; BD Biosciences®, including Clontech®, Discovery Labware®, Immunocytometry Systems® and Pharmingen®, 1020 East Meadow Circle, Palo Alto, CA 94303-4230 USA"; Invitrogen™, 1600 Faraday Avenue, PO Box 6482, Carlsbad, California 92008 USA"; New England Biolabs®, 32 Tozer Road, Beverly, MA 01915-5599 USA"; Merck®, One Merck Drive, P.O. Box 100, Whitehouse Station, NJ 08889-0100 USA"; Novagene®, 441 Charmany Dr., Madison, WI 53719-1234 USA"; Promega®, 2800 Woods Hollow Road, Madison WI 53711 USA"; Pfizer®, including Pharmacia®, 235 East 42nd Street, New York, NY 10017 USA"; Quiagen®, 28159 Avenue Stanford, Valencia, CA 91355 USA"; Sigma-Aldrich®, including Sigma, Aldrich, Fluka, Supelco and Sigma-Aldrich Fine Chemicals, PO Box 14508, Saint Louis, MO 63178 USA"; Wako Pure Chemical Industries, Ltd, 1-2 Doshomachi 3-Chome, Chuo-ku, Osaka 540-8605, Japan; TCI America, 9211 N. Harborgate Street, Portland, OR 97203, U.S.A.; Reactive Surfaces, Ltd, 300 West Avenue Ste #1316, Austin, TX 78701; Stratagene®, 11011N. Torrey Pines Road, La Jolla, CA 92037 USA, etc. In a further example, a biomolecule, a chemical reagent, a biological material, and/or an equipment may be obtained from commercial vendors such as Amersham Biosciences®, 800 Centennial Avenue, P.O. Box 1327, Piscataway, NJ 08855-1327 USA"; Allen Bradley, 1201 South Second Street, Milwaukee, WI 53204-2496, USA"; BD Biosciences®, including Clontech®, Discovery Labware®, Immunocytometry Systems® and Pharmingen®, 1020 East Meadow Circle, Palo Alto, CA 94303-4230 USA"; Baker, Mallinckrodt Baker, Inc., 222 Red School Lane, Phillipsburg NJ 08865, U.S.A."; Bioexpression and Fermentation Facility, Life Sciences Building, 1057 Green Street, University of Georgia, Athens, GA 30602, USA"; Bioxpress Scientific, PO Box 4140, Mulgrave Victoria 3170"; Boehringer Ingelheim GmbH, Corporate Headquarters, Binger Str. 173, 55216 Ingelheim, Germany Chem Service, Inc, PO Box 599, West Chester, PA 19381-0599, USA"; Chemko, a.s. Strážske, Priemyselná 720, 072 22 Strážske, Slovikia, Hungary; Difco, Voigt Global Distribution Inc., P.O. Box 1130, Lawrence, KS 66044-8130, USA"; Fisher Scientific, 2000 Park Lane Drive, Pittsburgh, PA 15275, USA"; Invitrogen™, 1600 Faraday Avenue, PO Box 6482, Carlsbad, California 92008 USA"; Ferro Pfanstiehl Laboratories, Inc., 1219 Glen Rock Avenue, Waukegan, IL 60085-0439, USA"; New England Biolabs®, 32 Tozer Road, Beverly, MA 01915-5599 USA"; Merck®, One Merck Drive, P.O. Box 100, Whitehouse Station, NJ 08889-0100 USA"; Novozymes North America Inc., PO BOX 576, 77 Perry Chapel Church Road, Franklinton NC 27525 United States; Millipore Corporate Headquarters, 290 Concord Rd., Billerica, MA 01821, USA"; Nalgene® Labware, Nalge Nunc International, International Department, 75 Panorama Creek Drive, Rochester, NY 14625. U.S.A."; New Brunswick Scientific Co., Inc., 44 Talmadge Road, Edison, New Jersey 08817 USA"; Novagene®, 441 Charmany Dr., Madison, WI 53719-1234 USA"; NCSRT, Inc., 1000 Goodworth Drive, Apex, NC 27539, USA"; Promega®, 2800 Woods Hollow Road, Madison WI 53711 USA"; Pfizer®, including Pharmacia®, 235 East 42nd Street, New York, NY 10017 USA"; Quiagen®, 28159 Avenue Stanford, Valencia, CA 91355 USA"; SciLog, Inc., 8845 South Greenview Drive, Suite 4, Middleton, Wisconsin 53562, USA"; Sigma-Aldrich®, including Sigma, Aldrich, Fluka, Supelco, and Sigma-Aldrich Fine Chemicals, PO Box 14508, Saint Louis"; USB Corporation, 26111 Miles Road, Cleveland, Ohio 44128, USA"; Sherwin Williams Company, 101 Prospect Ave., Cleveland, Ohio, USA"; Lightnin, 135 Mt. Read Blvd., Rochester, NY 14611 U.S.A."; Amano Enzyme, USA Co., Ltd. 2150 Point Boulevard Suite 100 Elgin, IL 60123 U.S.A."; Novozymes North America Inc., 77 Perry Chapel Church Road, Franklinton, N.C. 27525, U.S.A."; and WB Moore, Inc., 1049 Bushkill Drive, Easton, PA 18042. For example, a lipase may be obtained from a commercial vendor, such as a type VII lipase from *Candida rugosa* (Sigma-Aldrich product no. L1754; ≥700 unit/mg solid; CAS No. 9001-62-1); a Lipolase (Novozymes; Lipolase® 100 L, Type EX), which typically comprises about 2% (w/w) lipase from *Thermomyces lanuginosus* (CAS No. 9001-62-1).

Of course, an antibiological agent (e.g., an antimicrobial agent, an antifouling agent, an enzyme, a peptide) may be combined with another biomolecule composition (e.g., an enzyme, a cell based particulate material), for the purpose to confer an additional property (e.g., a catalytic activity, a binding property) other than one related to antimicrobial and/or antifouling function. Examples of another biomolecule composition include an enzyme such as a lipolytic enzyme, though some lipolytic enzymes may have antimicrobial and/or antifouling activity; a phosphoric triester hydrolase; a sulfuric ester hydrolase; a peptidase, some of which may have an antimicrobial and/or antifouling activity; a peroxidase, or a combination thereof. Alternatively, in several embodiments, a biomolecule composition may be used with little or no antimicrobial and/or antifouling function. For example, a material formation may comprise a combination of active enzymes with little or no active antibiological (e.g., anti-marine, anti-fouling, anti-microbial, etc.) enzyme present.

In various embodiments, an article, a device, a composition, a method, etc. may comprise one or more selected biomolecules (e.g., 1 to 1000 or more different selected biomolecules of interest), in various combinations thereof (e.g., an enzyme, an antibody, a peptide, etc.). In some embodiments, the concentration of any individual selected biomolecule comprises about 0.000000001% to about 100%, of the material formulation (e.g., about 0.000000001% to about 50%, about 1% to about 50%) by weight or number of molecules (e.g., cured 1:1 coupling agent to enzyme in a cured molecular coating after loss of volatile liquid components).

The general effectiveness of various embodiments is demonstrated in the following Examples. Some methods for preparing compositions are illustrated, and starting materials are made according to procedures known in the art or as illustrated herein. The following Examples are provided so that the embodiments might be more fully understood. These Examples are illustrative only and should not be construed as limiting in any way, as various material formulation(s) comprising biomolecule composition(s) (e.g., a coating formulation comprising a bio-based antibiological agent applied to a manufactured article or device) may be prepared in light of the disclosures herein.

Example 1: This Example demonstrates the ability of a lysozyme to survive the incorporation process into a coating, demonstrates lysozyme hydrolytic activity in a coating environment, and demonstrates the ability of lysozyme to survive in-can conditions for 48 hours. A Sherwin-Williams Acrylic Latex paint was used. Materials, reagents and equipment used are shown in the tables below.

TABLE 1

Materials and Reagents 0.1M potassium phosphate buffer, pH 6.4
*Micrococcus lysodeikticus* (Worthington Biochemicals, #8736)
Sherwin-Williams Acrylic Latex paint
Lysozyme (chicken egg white) (Sigma Product #L 6876,

TABLE 1-continued

Materials and Reagents

CAS 12650-88-3)
15 mL plastic test tubes

TABLE 2

Equipment

Paint spreader (1-8 mil)
Polypropylene blocks
Lightnin Labmaster Mixer
Rotator shaker
Pipettes and Pipetteman
Klett-Sumerson Colorimeter (Filter D35: 540 nm)

The reagents prepared included a *Micrococcus* cell suspension comprising 9 mg *M. lysodeikticus* in 25 mL sodium phosphate buffer, and a lysozyme solution comprising a 5 mg/mL stock solution. The paint formulations used are shown in the table below.

TABLE 3

Paint Preparation

Sherwin-Williams Acrylic Latex Control (no additive)
Sherwin-Williams Acrylic Latex with 1 mg/mL lysozyme The paint was mixed with a glass stirring rod and a paint mixer. Each film was immediately drawn onto polypropylene surfaces with a thickness of 8 mil. Cure time for the Sherwin-Williams was 72 hrs. To demonstrate in-can durability, the Sherwin-Williams Acrylic Latex comprising lysozyme wet paint was sealed and shelf stored at ambient temperature. After 48 hrs in-can, films were drawn onto polypropylene surfaces with a thickness of 8 mils and were allowed to cure 72 hrs prior to assay. Coupons were generated as free films from the polypropylene surface. Films were generated in three sizes: 2 cm$^2$: 1 cm by 2 cm; 4 cm$^2$: 1 cm by 4 cm; or 6 cm$^2$: 1 cm by 6 cm.

For qualitative assessment, individual films were placed into labeled 15 mL tubes. Films of each size (2, 4 and 6 cm$^2$) were evaluated in triplicate. In addition to a control paint with no additive, two other controls were utilized, a positive control and a negative control. The positive control comprised: lysozyme in buffer added to each of three 15 mL tubes in concentrations approximating the amount of lysozyme in the films (i.e., 40 μg, 80 μg, and 120 μg). Each amount was assayed in triplicate. The negative control comprised: 5 mL of 0.36 mg/mL *M. lysodeikticus* cell suspension pipetted into a single 15 mL tube. 5 mL 0.36 mg/mL *Micrococcus lysodeikticus* cell suspension was added to all reaction tubes to begin the reaction. The tubes were placed on a rocker at ambient conditions for approximately 22 hours. Where possible, the films were removed from the suspension and determine opacity using the Klett-Summerson Colorimeter (turbidity unit: Klett Unit or KU).

Particulate matter in the samples interfered with quantitation; photographs of each set of 2 cm$^2$ paint films and controls following 22-hour contact to *M. lysodeikticus* cell suspension were taken, and observations recorded in the Tables below.

TABLE 4

Qualitative Observations (visual assessments)

| Sample[1] | Lysozyme (μg) | Film Size (cm$^2$) | Clarity |
|---|---|---|---|
| Suspension/Solution Controls | | | |
| *M. lysodeikticus* | — | — | Translucent |
| Lysozyme | 40 | — | Transparent[2] |
| | 80 | — | Transparent |
| | 120 | — | Transparent |
| Control Films | | | |
| S-W | | 2, 4, 6 | Translucent |
| Films Comprising Lysozyme | | | |
| S-W | | 2, 4, 6 | Transparent |

[1]Each evaluation was performed in triplicate;
[2]Thinned in opacity, with some suspended particulate matter.

The strips comprising lysozyme of all three sizes of coupons cleared the *M. lysodeikticus* suspension, indicating that the lysozyme maintains activity in the coating environment. Cleared suspensions (lysozyme comprising coupons and controls) comprised large particles which interfere with the quantitation of the cleared suspensions. The particulate matter was less detectable in the 2 cm$^2$ set comprising lysozyme, so this size coupon was used for the quantitative demonstrations.

TABLE 5

Quantiative Assessment of Lysozyme In-Film Activity (2 cm$^2$ film, 4 hr time point, 3 independent assays, each performed in triplicate.)

| | | Replicate 1 | | Replicate 2 | | Replicate 3 | |
|---|---|---|---|---|---|---|---|
| Formulation | In-can (hrs) | KU | Cell lysis | KU | Cell lysis | KU | Cell lysis |
| Suspension Controls | | | | | | | |
| *M. lysodeikticus* | | 81.5 | 0.0% | 101 | 0% | | |
| Lysozyme | | 17 | | 27 | | | |
| S-W Acrylic Latex Control Films | | | | | | | |
| | — | 75 | 18% | 74 | 19% | 71 | 22% |
| | — | 79 | 13% | 82 | 10% | 76 | 17% |
| | — | 83 | 9% | 81 | 11% | 73 | 20% |
| Films Comprising Lysozyme | | | | | | | |
| | — | 8 | 91% | 20 | 78% | 11 | 88% |
| | — | 13 | 86% | 11 | 88% | 15 | 84% |
| | — | 13 | 86% | 5 | 95% | 0 | 100% |
| Control Films | 48 hrs | 82 | 10% | 65 | 29% | 68 | 25% |
| Films Comprising Lysozyme | 48 hrs | 36 | 61% | 26 | 72% | 37 | 59% |

KU = Klett Units, measure of turbidity at 540 nm.

A lysozyme in Sherwin-Williams Acrylic Latex was able to lyse about 88% of the *M. lysodeikticus* culture over 4 hours, relative to the control which exhibited about a 15% drop in opacity. After in-can shelving for 48 hrs (i.e., the lysozyme was mixed into the Sherwin-Williams Acrylic Latex, capped and shelved for 48 hrs prior to drawing down the films), the lysozyme remained active, lysing about 64% of the *M. lysodeikticus* culture relative to the about 21% lysis exhibited by the control panels.

Example 2: This Example demonstrates the retention of lysozyme activity after in-can storage in a paint coating for 48 hours; followed by film formation and activity measurements after enzyme loss due to leaching in a paint film in a saturated condition at 1, 2 and 24 hours after submersion. Materials, reagents and equipment used are shown in the tables below.

TABLE 6

Materials and Reagents 0.1M potassium phosphate buffer, pH 6.4
*Micrococcus lysodeikticus* (Worthington Biochemicals, #8736)
Lysozyme (chicken egg white) (Sigma Product #L 6876, CAS 12650-88-3)
Sherwin-Williams Acrylic Latex paint
15 mL plastic test tubes

TABLE 7

Equipment

Paint spreader (1-8 mil)
Polypropylene blocks
Lightnin Labmaster Mixer
Rotator shaker
Pipetter and tips
Klett-Sumerson Colorimeter (Filter D35: 540 nm)

The reagents prepared included a *Micrococcus* cell suspension comprising 9 mg *M. lysodeikticus* in 25 mL sodium phosphate buffer, and a lysozyme solution comprising a 5 mg/mL stock solution.

The paint formulations that were prepared included a Sherwin-Williams Acrylic Latex Control (no additive), and a Sherwin-Williams Acrylic Latex comprising 1 mg/mL lysozyme. Each paint was mixed with a glass stirring rod and a paint mixer. Each film was immediately drawn onto polypropylene surfaces with a thickness of 8 mil. Cure time was 120 hrs. The Sherwin-Williams Acrylic Latex comprising a lysozyme wet paint was sealed and shelf stored at ambient temperature. After 48 hrs in-can storage, films were drawn onto polypropylene surfaces with a thickness of 8 mils and were allowed to cure 72 hrs prior to assay. Materials for assay were generated from the polypropylene surface as a 2 cm$^2$ (1×2 cm) free film.

The assay procedure included placing individual films into labeled 15 mL tubes. 24 hours prior to addition of *Micrococcus lysodeikticus* cell suspension, 5 mL KPO$_4$ buffer was added to the 24-hour control and coupon comprising a lysozyme tube, as well as one tube comprising 41 ng lysozyme solution (positive control) and one tube comprising 5 mL of the *M. lysodeikticus* cell suspension (negative control). These tubes were placed on the shaker for 24 hrs.

2 hours prior to addition of *M. lysodeikticus*, 5 mL potassium phosphate buffer was added to the 2-hour control and lysozyme tubes each comprising a coupon, as well as one tube comprising 41 ng lysozyme solution (positive control) and one tube comprising 5 mL of the *M. lysodeikticus* cell suspension (negative control). These tubes were placed on the shaker for 2 hrs.

1 hour prior to addition of *M. lysodeikticus* cell suspension, 5 mL potassium phosphate buffer was added to 1-hour control and coupon comprising a lysozyme tubes, as well as one tube comprising 41 ng lysozyme solution (positive control) and one tube comprising 5 mL of the *M. lysodeikticus* cell suspension (negative control). These tubes were placed on the shaker for one hour.

The paint coupons were then transferred from each tube to a second reaction tube. 5 mL of the *M. lysodeikticus* cell suspension was added to both film and KPO$_4$ buffer incubation buffer. The tubes were placed on the rotating shaker horizontally and shaken for approximately 4 hours, at which time each tube was measured in a Klett-Summerson Photoelectric Colorimeter to determine opacity.

TABLE 8

Assessment of lysis and enzyme leaching (free film) after 1, 2 and 24 hr, relative to the internal control (i.e., the no lysozyme films).

| Formulation | Time (hrs) | Replicate 1 KU | Replicate 1 Cell lysis (dKU) | Replicate 2 KU | Replicate 2 Cell lysis (dKU) | Replicate 3 KU | Replicate 3 Cell lysis (dKU) | Average KU | Average Cell Lysis (dKU) |
|---|---|---|---|---|---|---|---|---|---|
| KPO$_4$ Buffer | | | | | | | | | |
| Control | 1 hr | 110 | 0% | 90 | 0% | 104 | 0% | 101 | 0% |
| Lysozyme | 1 hr | 62 | 39% | 42 | 59% | 52 | 49% | 52 | 49% |
| Control | 2 hr | 92 | 0% | 102 | 0% | 106 | 0% | 100 | 0% |
| Lysozyme | 2 hr | 74 | 26% | 65 | 35% | 65 | 35% | 68 | 32% |
| Control | 24 hr | 95 | 0% | 95 | 0% | 92 | 0% | 94 | 0% |
| Lysozyme | 24 hr | 80 | 15% | 62 | 34% | 55 | 41% | 66 | 30% |
| Film | | | | | | | | | |
| Control | 1 hr | 64 | 0% | 54 | 0% | 38 | 0% | 52 | 0% |
| Lysozyme | 1 hr | 3 | 94% | 40 | 23% | 4 | 92% | 16 | 81% |
| Control | 2 hr | 63 | 0% | 73 | 0% | 72 | 0% | 69 | 0% |
| Lysozyme | 2 hr | 10 | 86% | 23 | 67% | 45 | 35% | 26 | 54% |
| Control | 24 hr | 65 | 0% | 65 | 0% | 68 | 0% | 66 | 0% |
| Lysozyme | 24 hr | 30 | 55% | 52 | 21% | 52 | 21% | 45 | 32% |

KU = Klett Unit, measure of turbidity at 540 nm

At the three time points assayed, lysozyme leached out of films that comprised a lysozyme. The ability of the films comprising a lysozyme to lyse *M. lysodeikticus* was inversely related to the time the coupon was submerged. Over the first 2 hrs the films lost approximately 21%±3% of the lytic activity per hour. This loss decreased substantially over the following 22 hrs, with the loss slowing to approximately 3% per hour. After 24 hours of liquid submersion, approximately one-third of the activity of a coupon comprising a lysozyme was retained. Though reduction of activity due to leaching may continue, activity may also be permanently retained in the films. The total percentage lysis by coupon and buffer pairs decreased with increasing leaching time.

Example 3: This Example demonstrate selection method for selecting a biomolecule composition as an antibiological agent for use in a material formulation prior to curing, by detection of bioactivity in the material formulation after undergoing a curing process.

As the bioactivity of a candidate antibiological agent must survive within a material formulation pre-curing (e.g., a thermoset plastic prior to solidification, a coating during in-can storage prior to film formation, etc.) for that bioactivity to be detectable after curing in the material formulation, it is contemplated that any assay for activity (e.g., enzymatic activity, antibacterial activity, anti-metabolic activity, etc.) described herein or as would be known to one of ordinary skill in the art for cured material formulation (e.g., a film produced from a cured coating, etc.) may be used to identify candidate antibiological agent for the pre-cured material formulation (e.g., a coating during in-can storage, etc.).

Example 4: This Example demonstrates the surface efficacy of paint films comprising a lysozyme in actively lyse *M. lysodeikticus* in a minimally hydrated environment. Materials, reagents and equipment used are shown in the tables below.

TABLE 9

Materials and Reagents 0.1M potassium phosphate buffer, pH 6.4
*Micrococcus lysodeikticus* (Worthington Biochemicals, #8736)
Lysozyme (chicken egg white) (Sigma Product #L 6876, CAS 12650-88-3)
Sherwin-Williams Acrylic Latex paint
15 mL plastic test tubes

TABLE 10

Equipment

Paint spreader (1-8 mil)
Polypropylene blocks
Lightnin Labmaster Mixer
Rotator shaker
Pipetter and tips
Klett-Sumerson Colorimeter (Filter D35: 540 nm)

The reagents prepared included a *Micrococcus* cell suspension comprising 9 mg *Micrococcus* lysodeikticus in 25 mL sodium phosphate buffer, and a lysozyme solution comprising a 5 mg/mL stock solution.

The paint formulations prepared for the assay included a Sherwin-Williams Acrylic Latex Control (no additive), and a Sherwin-Williams Acrylic Latex with 1 mg/mL lysozyme. Each paint was mixed with a glass stirring rod and a paint mixer. Each film was immediately drawn onto polypropylene surfaces with a thickness of 8 mil. Cure time was 72 hrs. Assay materials were generated from the polypropylene surface as a 2 cm² (1×2 cm) free film.

The assay procedure included placing individual coupons into separate Petri dishes. Each set of control coupons and coupons comprising a lysozyme was assayed in triplicate.

Two controls were set up for this experiment: a *M. lysodeikticus* suspension control comprising 90 µL 20 mg/mL *M. lysodeikticus* cell suspension that was pipetted into a petri dish; and a 1 mg/mL lysozyme control comprising 40.64 µL 1 mg/mL lysozyme solution (an amount approximately equal to the amount of lysozyme in the 2 cm² coupon comprising a lysozyme) that was pipetted into a petri dish. *M. lysodeikticus* cell suspension was distributed onto the surface of each individual coupon in a minimal volume (90 Petri dishes were kept on a flat surface. After 4 hours, $KPO_4$ buffer was added to all samples to recover the unlysed portion of the *M. lysodeikticus* cell suspension. The suspension was removed from each dish with a pipette and placed into individual test tubes. Each suspension was read in the Klett-Summerson Photoelectric Colorimeter, using potassium phosphate buffer as a control.

TABLE 11

Surface Efficacy of Films comprising lysozyme in a low hydration environment.

| Formulation | Replicate 1 | | Replicate 2 | | Replicate 3 | | Average | |
|---|---|---|---|---|---|---|---|---|
| | KU* | Cell lysis | KU | Cell lysis | KU | Cell lysis | KU | Cell Lysis |
| Suspension/Solution Controls | | | | | | | | |
| *M. lysodeikticus* | 80 | | | | | | | |
| Lysozyme | 10 | | | | | | | |
| S-W Acrylic Latex | | | | | | | | |
| Control Films | 75 | 6% | 70 | 13% | 78 | 3% | 74 | 7% |
| Lysozyme Films | 35 | 56% | 19 | 76% | 31 | 61% | 28 | 65% |

*KU = Klett units, measure of turbidity at 540 nm.

The paint comprising a lysozyme contacted with 0.18 mg of a *M. lysodeikticus* suspension for 4 hours lysed 65%±10% of the *Micrococcus* cells, compared to only 7%±5% of cells lysed by the paint controls. This demonstrated that lysozyme can function in the low water (i.e., a minimally hydrated) environment of a coating. It is contemplated that a biological assay including a spray application of an assay organism would also demonstrate biostatic and/or biocidal activity.

Example 5: This Example demonstrates the effectiveness of lysozyme in lysing the bacterium *Micrococcus* lysodeikticus. *M. lysodeikticus* was used as a lysozyme substrate in a liquid suspension in the assay. The assay measured the rate of decrease in the absorbance as a relative measure of the amount/availability/activity of a lysozyme present in a material. As cell lysis occurs, the turbidity of a cell suspension decreased, and therefore, the absorbance of a cell suspension decreased. Materials and reagents that were used are shown in the table below.

TABLE 12

Materials and Reagents 2M sodium phosphate buffer ($NaH_2PO_4$), pH 6.4, or Tris-HCL Buffer, pH 7.0
*Micrococcus lysodeikticus* cell (Worthington Biochemicals, #8736)
Lysozyme (chicken egg white) (Sigma Product #L 6876, CAS 12650-88-3)
96-well plate
Thermo Multiskan Ascent Plate Reader
Pipettes and Pipetteman
Microtubes The reagents that were prepared included a *M. lysodeikticus* cell suspension comprising 9 mg *M. lysodeikticus* in 25 mL sodium phosphate buffer, and a lysozyme solution comprising a 5 mg/mL stock solution.

The assay procedure included diluting the lysozyme stock solution with buffer to create the following samples: 5 mg/mL (undiluted); 2.5 mg/mL; 1 mg/mL; 0.5 mg/mL; 0.1 mg/mL; 0.05 mg/mL; 0.01 mg/mL; 0.005 mg/mL; 0.001 mg/mL; 0.0005 mg/mL; 0.0001 mg/mL; and 0.00005 mg/mL. Control samples included: 3 replicates of 200 µL *M. lysodeikticus* cell suspension and 3 replicates of 200 µL buffer that were pipetted into 6 wells total in a 96-well microplate. A 194 µL *Micrococcus* cell suspension was pipetted into 3 rows of 12 wells each. 6 µL of each lysozyme concentration assayed was then added to the *M. lysodeikticus* cell suspension using a multi-pipette and mixed. The plate was immediately placed into the Thermo Multiskan Ascent Plate Reader; each well was read every 10 seconds for 30 minutes to determine the absorbance at 450 nm.

TABLE 13

Lysis of *M. lysodeikticus* (Ml) over a concentration range of lysozyme

| Lysozyme (mg × $10^{-3}$) | Abs | Time (sec) | dAbs | dAbs/sec | Ml lysed (mg × $10^{-6}$)/sec |
|---|---|---|---|---|---|
| 0.01 | 0.37 | 1800 | 0.015 | $8.33 \times 10^{-6}$ | 1.6 |
| 0.02 | 0.35 | 1800 | 0.035 | $1.94 \times 10^{-5}$ | 3.6 |
| 0.1 | 0.31 | 1800 | 0.075 | $4.17 \times 10^{-5}$ | 7.8 |
| 0.2 | 0.22 | 1800 | 0.165 | $9.17 \times 10^{-5}$ | 17.1 |
| 1 | 0.275 | 300 | 0.11 | $3.67 \times 10^{-4}$ | 68.6 |
| 2 | 0.13 | 520 | 0.255 | $4.9 \times 10^{-4}$ | 91.7 |
| 10 | 0.26 | 2 | 0.125 | $6.25 \times 10^{-2}$ | 11688.3 |
| 20 | 0.23 | 2 | 0.155 | $7.75 \times 10^{-2}$ | 14493.5 |
| 100 | 0.165 | 2 | 0.22 | $1.1 \times 10^{-1}$ | 20571.4 |

TABLE 14

Summary of Activity

| Abs | 0.38 |
|---|---|
| [Ml] | 0.36 mg/ml |
| Vol | 0.2 ml |
| | 0.187 dmg/dOD |
| Rate | 0.047 dmg Ml/sec/mg lysozyme |

The results for the lysozyme assay under the conditions as described: 1 mg of lysozyme was able to lyse 0.047 mg of *M. lysodeikticus* per sec. The lysozyme was effective in lysing *M. lysodeikticus* cells, and these results were consistent under both conditions evaluated (Tris vs $NaH_2PO_4$)

Example 6: This Example demonstrates the ability of a chymotrypsin to survive the incorporation process into a coating and demonstrates chymotrypsin activity in a coating environment. A chymotrypsin free film assay was used for determining the activity of chymotrypsin, as measured by ester hydrolysis (esterase) activity of a p-nitrophenyl acetate substrate, in free-films using a plate reader. A functioning vent hood was used for the assay when appropriate for material handling. A Sherwin-Williams Acrylic Latex paint was used. Equipment and reagents that were used are shown in the tables below.

TABLE 15

Equipment

Plate Reader
2 ml microtubes

TABLE 16

Reagents

α-Chymotrypsin from bovine pancreas, Type II (Sigma Cat# C4129)
4-Nitrophenyl acetate, MW 181.15 (Sigma Cat# N8130)
Trizma base (Sigma Cat# T1503)

Sample preparation included: 14.5 mM p-nitrophenyl acetate (66 mg/25 ml) in isopropyl alcohol, and 200 mM TRIS; pH 7.1 (adjust to pH 7.1 with HCl).

The paint formulations that were prepared included a Sherwin-Williams Acrylic Latex control (no additive), and a Sherwin-Williams Acrylic Latex comprising 200 mg/mL α-Chymotrypsin. Each paint was mixed with a glass stirring rod and a paint mixer. Each film was immediately drawn onto polypropylene surfaces with a thickness of 8 mil. Cure time was 24 days. Materials for assay were generated from the polypropylene surface as 1 $cm^2$, 2 $cm^2$ and 3 $cm^2$ free films.

The plate reader assay comprised: cutting free films into appropriate size pieces; adding 600 µL double distilled $H_2O$ ("dd$H_2O$") into a 2 ml microtube; then adding 750 µL 200 mM TRIS to each microtube; adding 150 µL of 14.5 mM p-nitrophenyl acetate to each tube; and taking the 0 time sample, then adding the free film to the tube (control sample is free film with no chymotrypsin).

The analysis included: taking out 100 µl and reading the absorbance at 405 nm, at the appropriate time points; and determining the initial rate slope by plotting absorbance vs. time to calculate chymotrypsin activity.

TABLE 17A

Absorbance at 405 nm Chymotrypsin in Sherwin-Williams Acrylic Latex

| Time | Blank | | | 3 cm × 1 cm Control | | |
|---|---|---|---|---|---|---|
| 0 | 0.0480 | 0.0429 | 0.0446 | 0.0480 | 0.0429 | 0.0446 |
| 15 | 0.0482 | 0.0489 | 0.0479 | 0.0518 | 0.0541 | 0.0541 |
| 30 | 0.0571 | 0.0558 | 0.0555 | 0.0596 | 0.0612 | 0.0609 |
| 45 | 0.0608 | 0.0617 | 0.0617 | 0.0679 | 0.0709 | 0.0690 |
| 60 | 0.0683 | 0.0690 | 0.0679 | 0.0773 | 0.0826 | 0.0781 |
| Slope | 0.0004 | 0.0004 | 0.0004 | 0.0005 | 0.0006 | 0.0005 |

TABLE 17B

Absorbance at 405 nm Chymotrypsin in Sherwin-Williams Acrylic Latex

| Time | 3 cm × 1 cm Enzyme | | | 2 cm × 1 cm Enzyme | | |
|---|---|---|---|---|---|---|
| 0 | 0.0480 | 0.0429 | 0.0446 | 0.0480 | 0.0429 | 0.0446 |
| 15 | 0.2364 | 0.2356 | 0.2347 | 0.1690 | 0.1801 | 0.1749 |
| 30 | 0.4504 | 0.4375 | 0.4208 | 0.3040 | 0.3149 | 0.3172 |
| 45 | 0.6395 | 0.6267 | 0.6441 | 0.4348 | 0.4579 | 0.4474 |
| 60 | 0.8358 | 0.7957 | 0.7970 | 0.5682 | 0.5942 | 0.5930 |
| Slope | 0.0132 | 0.0126 | 0.0128 | 0.0087 | 0.0092 | 0.0091 |

TABLE 17C

Absorbance at 405 nm Chymotrypsin in Sherwin-Williams Acrylic Latex

| Time | 1 cm × 1 cm Enzyme | | |
|---|---|---|---|
| 0 | 0.0480 | 0.0429 | 0.0446 |
| 15 | 0.1156 | 0.1155 | 0.1164 |
| 30 | 0.1886 | 0.1932 | 0.1872 |
| 45 | 0.2688 | 0.2745 | 0.2684 |
| 60 | 0.3427 | 0.3479 | 0.3578 |
| Slope | 0.0050 | 0.0051 | 0.0052 |

TABLE 18A

Absorbance Averages Chymotrypsin in Sherwin-Williams Acrylic Latex

| | | Absorbance Average | | |
|---|---|---|---|---|
| Time | Blank | Control 3 cm$^2$ | Chymotrypsin 3 cm$^2$ | Chymotrypsin 2 cm$^2$ | Chymotrypsin 1 cm$^2$ |
| 0 | 0.0452 | 0.0452 | 0.0452 | 0.0452 | 0.0452 |
| 15 | 0.0483 | 0.0533 | 0.2356 | 0.1747 | 0.1158 |
| 30 | 0.0561 | 0.0606 | 0.4362 | 0.3120 | 0.1897 |
| 45 | 0.0614 | 0.0693 | 0.6368 | 0.4467 | 0.2706 |
| 60 | 0.0684 | 0.0793 | 0.8095 | 0.5851 | 0.3495 |

TABLE 18B

Absorbance Averages Standard Deviations Chymotrypsin in Sherwin-Williams Acrylic Latex

| | | Absorbance Standard Deviation | | |
|---|---|---|---|---|
| Time | Blank | Control 3 cm$^2$ | Chymotrypsin 3 cm$^2$ | Chymotrypsin 2 cm$^2$ | Chymotrypsin 1 cm$^2$ |
| 0 | 0.0026 | 0.0026 | 0.0026 | 0.0026 | 0.0026 |
| 15 | 0.0005 | 0.0013 | 0.0009 | 0.0056 | 0.0005 |
| 30 | 0.0009 | 0.0009 | 0.0148 | 0.0071 | 0.0031 |
| 45 | 0.0005 | 0.0015 | 0.0090 | 0.0116 | 0.0034 |
| 60 | 0.0006 | 0.0029 | 0.0228 | 0.0147 | 0.0077 |

TABLE 19

Absorbance vs. Time Slope

| Sample | Slope (A/min) | U (umol/min) | U Average | U Deviation |
|---|---|---|---|---|
| Blank | 0.0004 | 0.0776 | 0.09 | 0.01 |
| | 0.0004 | 0.0949 | | |
| | 0.0004 | 0.0881 | | |
| Control 3 cm$^2$ | 0.0005 | 0.1090 | 0.12 | 0.02 |
| | 0.0006 | 0.1404 | | |
| | 0.0005 | 0.1195 | | |
| Chymotrypsin 3 cm$^2$ | 0.0132 | 2.8876 | 2.82 | 0.06 |
| | 0.0126 | 2.7679 | | |
| | 0.0128 | 2.7935 | | |
| Chymotrypsin 2 cm$^2$ | 0.0087 | 1.9062 | 1.97 | 0.06 |
| | 0.0092 | 2.0145 | | |
| | 0.0091 | 1.9983 | | |
| Chymotrypsin 1 cm$^2$ | 0.0050 | 1.0837 | 1.11 | 0.03 |
| | 0.0051 | 1.1222 | | |
| | 0.0052 | 1.1359 | | |

A chymotrypsin in Sherwin-Williams Acrylic Latex was able to hydrolyze the model substrate at rate 20× faster than the control. The test coupons demonstrate a dose response which corresponds to a hydrolytic capacity of 0.86 μmol/min/cm$^2$, as formulated in this demonstration.

Quality control included reading and become familiar with the operating instructions for equipment used in the analysis. Operating instructions and preventive maintenance records were placed near the relevant equipment, and kept in a labeled central binder in the work area. Working solutions which are out of date or prepared incorrectly were disposed of and not used.

Safety procedures and precautions included wearing a full length laboratory coat; and not eating, drinking, smoking, use of tobacco products or application of cosmetics near the procedure. Consumables and disposable items that come in contact with or are used in conjunction with samples disposal were in the proper hazard containers. This includes, but is not limited to, pipette tips, bench-top absorbent paper, diapers, KimWipes™, test tubes, etc. Biohazard containers were considered full when their contents reach three-quarters of the way to the top of the bag or box. Bench-top biohazard bags were placed into a large biohazard burn box when full. Biohazard containers were not filled to overflowing. Biohazard bags were disposed of by closing with autoclave tape, and autoclaving immediately. Spills and spatters were immediately cleaned from durable surfaces by applying 70% ethanol (for bacteriological spills) to the spill, followed by wiping or blotting. All equipment used in sample analyses were wiped down on a daily basis or whenever tests were performed. Absorbent pads were placed under samples when useful. Hands were washed with antibacterial soap before exiting the room, when a test was finished, and before the end of the day. The Material Safety Data Sheet ("MSDS") applicable to each chemical was read. MSDS documents have been prominently posted in the laboratory. During a fire alarm during laboratory operations, evacuation procedures were followed. Nitrile protective gloves were worn whenever handling organophosphates. All organophosphate waste was disposed of properly.

Example 7: This Example demonstrates the ability of a cellulase to survive the incorporation process into a coating and demonstrates cellulase activity in a coating environment. A Glidden Latex paint was used. A plate reader was used to assay a free-film comprising a cellulase for the enzyme's activity. Equipment and reagents that were used are shown in the table below.

TABLE 20

Equipment and Reagents

Equipment

Plate Reader
Reagents

Sodium Acetate (Sigma Cat# S8625)
4-Nitrophenyl β-D-cellobioside (Sigma Cat# N5759)
Cellulase (TCI Cat# C0057)
Sodium Hydroxide Sample preparation included: 14.5 mM 4-Nitrophenyl β-D-cellobioside in ddH$_2$O; 50 mM sodium acetate buffer; pH 5.0 (adjust to pH 5.0 with HCl); and 2 N NaOH in ddH$_2$O.

The plate reader assay comprised: placing free films into 2 ml microtubes; add 1.2 ml 50 mM sodium acetate buffer, 0.15 ml 14.5 mM 4-Nitrophenyl β-D-cellobioside and 0.15 ml ddH$_2$O, in the 2 ml microtube; placing tubes on rocker; taking out 100 μl from the tubes into a 96-well plate at desired time points; adding 200 μl of 2 N NaOH and reading the absorbance at 405 nm; and determining the initial rate slope by plotting absorbance vs. time to calculate cellulase activity.

The paint formulations that were prepared included a Sherwin-Williams Acrylic Latex control (no additive), and a Sherwin-Williams Acrylic Latex comprising 100 g/gal, 200 g/gal and 300 g/gal cellulase. Each paint was mixed with a glass stirring rod and a paint mixer. Each film was immediately drawn onto polypropylene surfaces with a thickness of 8 mil. Cure time was 24 hrs. Materials for assay were generated from the polypropylene surface as a 3 cm² free film.

TABLE 21A

Glidden Latex Cellulase Free Films - Dose Response - pNP Absorbance at 405 nm

| Time (min) | Blank | | Control | | | 100 g/gal | |
|---|---|---|---|---|---|---|---|
| 0 | 0.0600 | 0.0600 | 0.0600 | 0.0600 | 0.0600 | 0.0600 | 0.0600 |
| 30 | 0.0496 | 0.0588 | 0.0488 | 0.0476 | 0.0744 | 0.0753 | 0.0716 |
| 60 | 0.0496 | 0.0605 | 0.0505 | 0.0532 | 0.0975 | 0.1158 | 0.1007 |
| 120 | 0.0507 | 0.0519 | 0.0522 | 0.0514 | 0.1691 | 0.1823 | 0.1672 |
| 180 | 0.0550 | 0.0643 | 0.0583 | 0.0511 | 0.2351 | 0.2312 | 0.2073 |
| 240 | 0.0512 | 0.0614 | 0.0518 | 0.0548 | 0.2876 | 0.2919 | 0.2720 |
| 300 | 0.0491 | 0.0574 | 0.0601 | 0.0575 | 0.3187 | 0.3123 | 0.3083 |
| 360 | 0.0528 | 0.0680 | 0.0540 | 0.0655 | 0.3322 | 0.3215 | 0.3309 |
| Slope (A/min) | −0.0001 | −0.0001 | 0.0000 | 0.0000 | 0.0009 | 0.0011 | 0.0009 |

TABLE 21B

Glidden Latex Cellulase Free Films - Dose Response - pNP Absorbance at 405 nm

| Time (min) | 200 g/gal | | | 300 g/gal | | |
|---|---|---|---|---|---|---|
| 0 | 0.0600 | 0.0600 | 0.0600 | 0.0600 | 0.0600 | 0.0600 |
| 30 | 0.0986 | 0.0866 | 0.0927 | 0.1207 | 0.1170 | 0.1146 |
| 60 | 0.1387 | 0.1341 | 0.1432 | 0.1637 | 0.1711 | 0.1670 |
| 120 | 0.2285 | 0.2219 | 0.2364 | 0.2864 | 0.2685 | 0.2965 |
| 180 | 0.2891 | 0.2740 | 0.3071 | 0.3304 | 0.3262 | 0.3833 |
| 240 | 0.3174 | 0.3281 | 0.3270 | 0.3543 | 0.3638 | 0.4118 |
| 300 | 0.3449 | 0.3467 | 0.3511 | 0.3759 | 0.3891 | 0.4051 |
| 360 | 0.3714 | 0.3588 | 0.3632 | 0.3808 | 0.3964 | 0.3651 |
| Slope (A/min) | 0.0014 | 0.0014 | 0.0015 | 0.0019 | 0.0017 | 0.0020 |

TABLE 22A

Glidden Latex Cellulase Free Films - Dose Response - pNP Absorbance at 405 nm Averages

| | | | Average | | |
|---|---|---|---|---|---|
| Time (min) | Blank | Control | 100 g/gal | 200 g/gal | 300 g/gal |
| 0 | 0.0600 | 0.0600 | 0.0600 | 0.0600 | 0.0600 |
| 30 | 0.0496 | 0.0517 | 0.0738 | 0.0926 | 0.1189 |
| 60 | 0.0496 | 0.0547 | 0.1047 | 0.1387 | 0.1674 |
| 120 | 0.0507 | 0.0518 | 0.1729 | 0.2289 | 0.2775 |
| 180 | 0.0550 | 0.0579 | 0.2245 | 0.2901 | 0.3283 |
| 240 | 0.0512 | 0.0560 | 0.2838 | 0.3242 | 0.3591 |
| 300 | 0.0491 | 0.0583 | 0.3131 | 0.3476 | 0.3825 |
| 360 | 0.0528 | 0.0625 | 0.3282 | 0.3645 | 0.3886 |

TABLE 22B

Glidden Latex Cellulase Free Films—Dose Response—pNP Absorbance at 405 nm Averages' Deviations

| | | Deviation | | |
|---|---|---|---|---|
| Time (min) | Control | 100 g/gal | 200 g/gal | 300 g/gal |
| 0 | 0.0000 | 0.0000 | 0.0000 | 0.0000 |
| 30 | 0.0061 | 0.0019 | 0.0060 | 0.0026 |
| 60 | 0.0052 | 0.0098 | 0.0046 | 0.0052 |
| 120 | 0.0004 | 0.0082 | 0.0073 | 0.0127 |
| 180 | 0.0066 | 0.0151 | 0.0166 | 0.0030 |
| 240 | 0.0049 | 0.0105 | 0.0059 | 0.0067 |
| 300 | 0.0015 | 0.0052 | 0.0032 | 0.0093 |
| 360 | 0.0075 | 0.0058 | 0.0064 | 0.0110 |

A cellulase in a Glidden Latex was able to hydrolyze the model substrate at a rate approximately 100× faster than the control. Quality control and safety procedures were as described in Example 6.

Example 8: This Example demonstrates preparation of technical papers coated with a latex coating comprising an antimicrobial enzyme additive, an antimicrobial peptide additive, or a combination thereof. The additives may be embedded in the coating. The antimicrobial enzyme additive comprised lysozyme, and the antimicrobial peptide additive comprised ProteCoat® (Reactive Surfaces, Ltd.; also described in U.S. patent application Ser. Nos. 10/884,355; 11/368,086; and Ser. No. 11/865,514, each incorporated by reference). Materials that were used are shown in the tables below.

TABLE 23

Materials 30 mM Potassium Phosphate Buffer, was prepared by weighing out 416 mg of potassium phosphate into 2 × 50 mL conical tubes, and adding 50 mL of water to each tube.
*Micrococcus lysodeikticus* (Worthington Biochemicals, #8736), was prepared by weighing out 18 mg of *Micrococcus* into a single 50 mL conical tube, adding KP0₄ buffer to 50 mLs, and mixing by inversion.
Lysozyme from chicken egg white (Sigma Product #L 6876; CAS no. 12650-88-3), was prepared by weighing out 1 g, 0.5 g and 0.1 g lysozyme into 3 × 2 mL eppendorf tubes.
Dilute Acetic Acid Solution was prepared by measuring 1 mL of glacial acetic acid into 11 mLs of water into a 15 mL conical tube, and adding 50 µl of the dilute acetic acid to 1 mL of water.
ProteCoat ® was used at 125 mg ProteCoat ® per g coating, dispensed as 250 mg
ProteCoat ®, and resuspended in 2 mL dilute acetic acid solution as appropriate.
5 × 15 mL conical tubes, glass stir rod
P1000 and P200 Pipetteman and Tips
5 × 15 mL conical tubes Paint formulations comprising enzyme were prepared as follows: 1 g lysozyme per 100 g coating; 0.5 g lysozyme per 100 g coating; 0.19 lysozyme per 100 g coating; and a negative control (no additive). Paint formulations comprising a peptide additive were prepared as follows: 125 mg ProteCoat® per 1 g coating; 250 mg ProteCoat® per 1 g coating; 375 mg ProteCoat® per 1 g coating; or a negative control (no additive). Paint formulations comprising peptide and lysozyme were prepared as follows: 375 mg ProteCoat® per 1 g lysozyme (1 g) coating; 250 mg ProteCoat® per 1 g lysozyme (0.5 g) coating; 375 mg ProteCoat® per 1 g lysozyme (0.1 g) coating, and a negative Control (no additive). All paint formulations were mixed well. The paper was cut into quarters, coatings drawn onto paper surfaces with a spreader, and wet weight determined. The coated paper was dried at about 37.8° C. for approximately 10 min, and dry weight determined.

A single coating material and one paper stock was evaluated. The paper comprised cellulosic fibers typically used in technical paper applications, and had an acrylic latex coating added to the fibers.

TABLE 24

Coating dry components added to paper

| Ingredient | % Dry Weight |
|---|---|
| Kaolin Clay (filler/pigment) | About 0.000000001% to about 90% |
| Titanium Dioxide (pigment) | About 0.000000001% to about 90% |
| Calcium Carbonate (filler/pigment) | About 0.000000001% to about 90% |
| Acrylic Latex (Binder) | About 0.000000001% to about 80% |

To prepare the antimicrobial paper ("AM-Paper"), the antimicrobial additives were formulated for each coating on percentage dry weight to standardize the coating for comparison. The antimicrobial additives are listed in the table below.

TABLE 25

Formulation details for antimicrobial papers

| Antimicrobial | Designation | Additive Formulation | Final Dry Weight (gsm) | Additive (%) |
|---|---|---|---|---|
| Control | | | 17.6 | None |
| | | | 21 | None |
| Enzymatic | A | Powder | 21.9 | 0.2% |
| | B | Powder | 19.4 | 1% |
| | C | Powder | 23.2 | 2% |
| | D | Suspension | 23 | 0.2% |
| | E | Suspension | 23 | 1% |
| | F | Suspension | 20.7 | 2% |
| ProteCoat ® | G | Suspension | 18.6 | 1% |
| | H | Powder | 23.9 | 2.5% |
| | I | Suspension | 20.6 | 0.5% |
| | J | Powder | 20.9 | 1.25% |
| | K | Powder | 20.9 | 0.25% |
| | L | Powder | 20.7 | 0.75% |
| Enzyme + ProteCoat ® | | Powder | 22.5 | 2% + 0.5% |
| | | Powder | 21.9 | 1% + 0.25% |

The antimicrobial additives were weighed out, added to pre-weighed coating suspensions and mixed by hand for 10 to 20 minutes. After mixing, the coating was applied by draw down, in which approximately 3-5 mL of coating was applied along one 8.5" edge of an 8.5"×11" pre-weighed paper, and then spread evenly over the surface of the paper with a calibrated rod by drawing the rod down the full length of the paper. The coated paper was then placed into a 100° C. oven for 10 to 15 minutes to dry. After drying, the coated paper was weighed to determine the amount of coating on each sheet.

To conduct an assay to qualitatively assess antimicrobial activity, a paper strip of approximately 1 cm×5 cm was cut from the control and each antimicrobial paper. 5 mL of the *M. lysodeikticus* suspension was poured into each of 4×15 mL conical tubes. The prepared strip was dropped into the suspension, and mixed occasionally by inversion. Clearing changes were observed.

Example 9: This Example demonstrates and provides a standard spectrophotometric assay procedure for lysozyme activity in a plate reader. Equipment and reagents that were used are shown in the table below.

TABLE 26

Equipment and Reagents

Equipment

Thermo Multiskan Ascent Plate Reader
96-well assay plates
Multi-channels and single-channel pipettes and tips
Reagents Tris(hydroxymethyl)aminomethane hydrochloride (Tris-HCl):
[Sigma, cat # T3253,
Molecular Formula: $NH_2C(CH_2OH)_3 \cdot HCl$, Molecular Weight: 157.60,
CAS Number 1185-53-1, pKa (25° C.) 8.1]
*Micrococcus Lysodeikticus* cell (Worthington Biochemicals, cat #8736)
Lysozyme: chicken egg white, Sigma cat #L6876; 50,000 U/mg;
CAS 12650-88-3; molecular weight: 14.3 kD; solubility ($H_2O$)
10 mg/mL; stability - 1 month at 2-8° C. Standard: 25 μl of a 500,000 units (10 mg)/mL (10 mM Tris-HCl) will typically lyse
*E. coli* from > 1 mL of culture media cell pellet resuspended in 350 μl buffer (10 mM Tris HCl, pH 8.0, with 0.1 M NaCl, 1 mM EDTA, and 5% [w/v] Triton X-100).
Typical incubation conditions for lysis are 30 min at 37° C.

*Micrococcus lysodeikticus* cell suspension was made by adding 9 mg *Micrococcus lysodeikticus* to 25 mL 10 mM Tris-HCl, pH 8.0 and mixing well. Lysozyme solution was prepared by adding 10 mg lysozyme in 1 mL 10 mM Tris-HCl, pH 8.0, and mixing well. Reaction buffer was 10 mM Tris-HCl, pH 8.0, with an alternative reaction buffer being 0.1 M $KPO_4$ pH 6.4.

A standard curve of the *M. lysodeikticus* was prepared. The lysozyme stock solution was diluted with the reaction buffer to create the following series: 10 mg/mL (undiluted); 5.0 mg/mL; 2.5 mg/mL; 1 mg/mL; 0.5 mg/mL; 0.1 mg/mL; 0.05 mg/mL; 0.01 mg/mL; 0.005 mg/mL; 0.001 mg/mL; 0.0005 mg/mL; 0.0001 mg/mL, and 0 mg/mL. The controls included 3 replicates of 194 μL *M. lysodeikticus* cell suspension plus 6 μL buffer; and 3 replicates of 200 μL buffer.

Analysis of samples included determining activity by monitoring the clearing of the cell suspension at 570 nm and determining the best fit to a standard curve. For a 200 μL assay, 180 μL *M. lysodeikticus* in reaction buffer was added to each well 1 to 12 of 3 rows. The reaction was started by adding 20 μL of each lysozyme dilution to each well in the triplicate series. The plate was immediately placed into the reader, and the changes in absorbance at 570 nm (OD570) recorded. The number of reads may be 10-20 with second intervals. The plate reader's velocity table contained data for reaction rate in mOD/min. This assay can be scaled by increasing each suspension proportionately (e.g., a 2 mL reaction is used for material strip analysis).

Analysis of the data included calculating the initial velocities for the recorded slopes: [$mOD_{540}$/min]/[slope standard curve (mOD/mg *M. lysodeikticus*]/[lysozyme].

TABLE 27

Assay Standardization

| Coupon Size | None |
|---|---|
| Test Organism | *Micrococcus lysodeikticus* |
| Contamination level | $2.5 \times 10^8$ cells/mL |
| Assay Time | 4 hr |

TABLE 28

Standardization of Assay

| [Lysozyme], (μg/mL)[a] | OD$_{570}$ | % Lysis |
| --- | --- | --- |
| 0 | 0.3 | 0.00 |
| 0.78 | 0.26 | 13.33 |
| 1.56 | 0.07 | 76.67 |
| 3.13 | 0.02 | 93.33 |
| 6.25 | 0.005 | 98.33 |
| 12.5 | 0.005 | 98.33 |
| 25 | 0.011 | 96.33 |
| 50 | 0.065 | 78.33 |

[a]μg/mL = ppm

The *M. lysodeikticus* assay as described can detect lytic activity down to the fractional to low ppm range. The rate of lysis, in suspension, is 32% (about 8.0×10$^7$ cells) of the *M. lysodeikticus* suspension per μg lysozyme.

Example 10: This Example demonstrates a spectrophotometric assay for antimicrobial paper with a lytic additive. Lysozyme was used as the lytic additive. Equipment and reagents that were used are shown in the table below.

TABLE 29

Equipment and Reagents

Equipment

Spectrophotometer (Thermo Multiskan Ascent Plate Reader)
Cuvettes (96-well assay plates)
Multi-channels and single-channel pipettes and tips
Reagents Tris(hydroxymethyl)aminomethane hydrochloride (Tris-HCl):
[Sigma, cat # T3253,
Molecular Formula: $NH_2C(CH_2OH)_3 \cdot HCl$, Molecular Weight: 157.60,
CAS Number 1185-53-1, pKa (25° C.) 8.1]
*Micrococcus Iysodeikticus* cell (Worthington Biochemicals, cat #8736)
Lysozyme: chicken egg white, Sigma cat #L6876; 50,000 U/mg;
CAS 12650-88-3; molecular weight: 14.3 kD; solubility ($H_2O$)
10 mg/mL; stability - 1 month at 2-8° C. Standard: 25 μl of a 500,000
units (10 mg)/mL (10 mM Tris-HCl) will typically lyse
*E. coli* from > 1 mL of culture media cell pellet resuspended in
350 μl buffer (10 mM Tris HCl, pH 8.0, with 0.1 M NaCl,
1 mM EDTA, and 5% [w/v] Triton X-100).
Typical incubation conditions for lysis are 30 min at 37° C.

*Micrococcus lysodeikticus* cell suspension was made by adding 9 mg *M. lysodeikticus* to 25 mL 10 mM Tris-HCl, pH 8.0 and mixing well. Lysozyme solution was prepared by adding 10 mg lysozyme in 1 mL 10 mM Tris-HCl, pH 8.0, and mixing well. Reaction buffer was 10 mM Tris-HCl, pH 8.0, with an alternative reaction buffer being 0.1 M KPO$_4$ pH 6.4. Antimicrobial paper coated with a coating comprising lysozyme and control paper was prepared in accordance with Example 8.

A standard curve of the *M. lysodeikticus* was prepared. The lysozyme stock solution was diluted with the reaction buffer to create the following series: 10 mg/mL (undiluted); 5.0 mg/mL; 2.5 mg/mL; 1 mg/mL; 0.5 mg/mL; 0.1 mg/mL; 0.05 mg/mL; 0.01 mg/mL; 0.005 mg/mL; 0.001 mg/mL; 0.0005 mg/mL; 0.0001 mg/mL and 0 mg/ml. The controls included 3 replicates of 194 μL *M. lysodeikticus* cell suspension plus 6 μL buffer; and 3 replicates of 200 μL buffer. Pipet tips used fitted the pipette (e.g., multichannel pipettes). The liquid level was correct in the tips, as air bubbles, etc may alter volume. Quality control and safety procedures were as described in Example 6.

Antimicrobial paper was cut into appropriately sized strips from both the antimicrobial and control paper. For a 5 mL assay in a 15 mL tube, standard sizes included 5×10 mm, 5×20 mm, and 5×40 mm. These strips could be combined to provide a desired step series.

Analysis of samples included determining activity by monitoring the clearing of the cell suspension at OD$_{570}$ and determining the best fit to a standard curve. For a 5 mL assay, *M. lysodeikticus* was added in reaction buffer to an OD$_{600}$ of 0.5. The reaction was started with the addition of the stripes. The tubes were immediately placed at 28° C. for a designated time (e.g., 4 hr and 24 hr). The absorbance at 570 nm was recorded.

Analysis of the data included calculating the initial velocities for the recorded slopes: [OD$_{600}$ min]/[slope standard curve (OD/mg *M. lysodeikticus*]/[lysozyme]

Example 11: This Example demonstrates a biological assay for antimicrobial activity of paper strips comprising an antimicrobial enzyme additive against a microorganism. The antimicrobial enzyme additive comprised lysozyme, the microorganism used was vegetative, gram-positive *M. lysodeikticus*. The assay was adapted from ASTM 02020-92, Method A, Standard Test for Mildew (Fungus) Resistance of Paper and Paperboard (Reapproved 2003). Equipment and reagents that were used are shown in the table below.

TABLE 30

Equipment and Reagents

Equipment:

Petri Plates
Reagents:

Nutrient Yeast Extract (NBY) NBY Soft Agar
Lysozyme: chicken egg white, Sigma cat #L6876;
50,000 U/mg; CAS 12650-88-3;
molecular weight: 14.3 kD; solubility ($H_2O$) 10 mg/mL;
stability - 1 month at 2-8° C.
Standard: 25 μl of a 500,000 units (10 mg)/mL
(10 mM Tris-HCl) will typically lyse
*E. coli* from > 1 mL of culture media cell pellet
resuspended in 350 μl buffer (10 mM
Tris HCl, pH 8.0, with 0.1 M NaCl, 1 mM EDTA,
and 5% [w/v] Triton X-100).
Typical incubation conditions for lysis are 30 min at 37° C.

*Micrococcus lysodeikticus* cell suspension was made by adding 9 mg *Micrococcus lysodeikticus* to NBY and mixing well, with OD$_{600}$ about 0.5. Antimicrobial paper coated with a latex coating comprising lysozyme and control paper was prepared in accordance with Example 8.

The assay include cutting appropriated sized strips of both antimicrobial and control papers (e.g., a. 10×10 mm, 20×20 mm, 40×40 mm, or 50×50 mm). 100 μL of the prepared *M. lysodeikticus* suspension was transferred to 15 mL tube containing 5 mL NBY Soft Agar, held molten at 55° C., and mixed well. Pipet tips used fitted the pipette (e.g., multichannel pipettes). The liquid level was correct in the tips, as air bubbles, etc may alter volume. The mixture was immediately poured over a prepared sterile agar plate, rotating the dish to completely cover the agar with the *M. lysodeikticus* overlay. The dish was covered and allowed to solidify on level surface. The prepared antimicrobial paper(s) were placed (face down) on the soft agar overlay. Coupon(s) up to 20×20 mm were able to be paired with a control on a single petri dish. The dishes were left at 28° C. overnight, and visually evaluated for a zone of clearance around the antimicrobial coupon(s) relative to the control. Quality control and safety procedures were as described in Example 6.

Example 12: This Example demonstrates a biological assay for the antimicrobial activity of a paper strip comprising ProteCoat® against fungal spores. The assay was adapted from ASTM 02020-92, Method A, Standard Test for Mildew (Fungus) Resistance of Paper and Paperboard (Reapproved 2003). Equipment and reagents that were used are shown in the table below.

TABLE 31

Equipment and reagents

Equipment:

Petri Plates
Incubator
Autoclave
Preval Sprayer
Reagents:

Nutrient Yeast Extract (NBY)
NBY Soft Agar
*Micrococcus lysodeikticus* cell (Worthington Biochemicals, cat #8736)
ProteCoat ® was used at 125 mg ProteCoat ® per g coating, dispensed as 250 mg ProteCoat ®, and resuspended in 2 mL dilute acetic acid solution as appropriate.

*Fusarium oxysporum* spores were prepared by maintaining cultures of *Fusarium oxysporum* f. sp. *lycoperici* race 1 (RM-1)[FOLRM-1 on Potato Dextrose Agar (PDA) slants. Microconidia of the *Fusarium oxysporum* f. sp. *lycoperici*, were obtained by isolating a small portion of an actively growing culture from a PDA plate and transferring to 50 ml a mineral salts medium FLC (Esposito and Fletcher, 1961). The culture was incubated with shaking (125 rpm) at 25° C. After 960 h the fungal slurry consisting of mycelia and microconidia were strained twice through eight layers of sterile cheese cloth to obtain a microconidial suspension. The microconidial suspension was then calibrated with a hemacytometer. All fungal inocula were tested for the absence of contaminating bacteria before their use in experiments. Antimicrobial paper coated with a latex coating comprising ProteCoat® and control paper was prepared in accordance with Example 8.

The assay procedure included: cutting appropriated sized strips of both antimicrobial and control papers (e.g., 40×40 mm or 50×50 mm); centering the strips on a sterile Potato Dextrose Agar plate, treated side up; diluting spores to $2 \times 10^3$ per mL Potato Dextrose broth; transferring to a calibrated preval sprayer (i.e., dispense 50 µL per single pump action); dispersing spores in a hood onto the agar and paper surface with a single pump action (delivers approximately 100 spores to the area); covering and leaving at ambient conditions; and observing growth over several days, though time of assay will depend on organism. Pipet tips fitted the pipette (e.g., multichannel pipettes). The liquid level was correct in the tips, as air bubbles, etc may alter volume. Quality control and safety procedures were as described in Example 6.

Example 13: This Example demonstrates a paper coating comprising an antimicrobial enzyme additive. The antimicrobial enzyme comprised a lysozyme. Assay standardization and data are shown in the following tables.

TABLE 32

Assay Enzymatic Additive - Lysozyme

| Example Techniques Used | Examples 8 and 10 |
| Coupon Size | Variable, 200-600 mm² |

TABLE 32-continued

Assay Enzymatic Additive - Lysozyme

| Paper Age | 3 months |
| Test Organism | *Micrococcus lysodeikticus* |
| Contamination level | $2.5 \times 10^8$ cells/mL |
| Assay Time | 4 and 24 hrs |

TABLE 33A

Test Strips and Data

| Paper Type | Paper coupon (mm × mm) | Area (mm²) | [lysozyme], µg |
|---|---|---|---|
| 0 | | 0 | |
| 0.2% | 5 × 40 | 200 | 8.76 |
| 1.0% | 5 × 40 | 200 | 38.80 |
| 2.0% | 5 × 40 | 200 | 92.80 |
| 2.0% | 5 × 40 + 5 × 10 | 250 | 116.00 |
| 2.0% | 5 × 40 + 5 × 20 | 300 | 139.20 |
| 2.0% | 5 × 40 + 5 × 40 | 400 | 185.00 |
| 2.0% | 5 × 40 + 5 × 40 + 5 × 10 | 450 | 208.80 |
| 2.0% | 5 × 40 + 5 × 40 + 5 × 20 | 500 | 232.00 |
| 2.0% | 5 × 40 + 5 × 40 + 5 × 40 | 600 | 278.40 |

TABLE 33B

Antimicrobial Strips and Data

| Paper Type | Paper coupon (mm × mm) | 4 hrs | | 24 hrs | |
|---|---|---|---|---|---|
| | | OD$_{570}$ | % Lysis | OD$_{570}$ | % Lysis |
| 0 | | 0.305 | 0.00 | 0.27 | 0.00 |
| 0.2% | 5 × 40 | 0.301 | 1.31 | 0.275 | −1.85 |
| 1.0% | 5 × 40 | 0.277 | 9.18 | 0.2 | 25.93 |
| 2.0% | 5 × 40 | 0.172 | 43.61 | 0.0015 | 99.44 |
| 2.0% | 5 × 40 + 5 × 10 | 0.099 | 67.54 | 0.001 | 99.63 |
| 2.0% | 5 × 40 + 5 × 20 | 0.136 | 55.41 | 0.0025 | 99.07 |
| 2.0% | 5 × 40 + 5 × 40 | 0.017 | 94.43 | 0.005 | 99.81 |
| 2.0% | 5 × 40 + 5 × 40 + 5 × 10 | 0.023 | 92.46 | 0.001 | 99.63 |
| 2.0% | 5 × 40 + 5 × 40 + 5 × 20 | 0.024 | 92.13 | 0.001 | 99.63 |
| 2.0% | 5 × 40 + 5 × 40 + 5 × 40 | 0.015 | 95.08 | 0.0015 | 99.44 |

The rate of lysis upon contact with a coupon cut from antimicrobial treated paper, is approximately 0.5% (1.35× $10^7$ cells) per µg lysozyme. This corresponds to a reduction in activity, per µg of lysozyme, of approximately 65% over that observed in suspension. Treated papers of identical size with antimicrobial loadings of 0.2%, 1.0% and 2.0%, demonstrated antimicrobial function. The antimicrobial concentration on a per unit of area for those loadings, is provided in the following table.

TABLE 34

Antimicrobial concentration per unit area

| | | | Lysozyme | | |
|---|---|---|---|---|---|
| Paper | Coating (gsm) | % lysozyme | g/m² | µg/m² | µg/mm² |
| A | 21.9 | 0.2% | 0.0438 | 4.38 ×10⁻⁸ | 0.0438 |
| B | 19.4 | 1.0% | 0.194 | 1.94 ×10⁻⁷ | 0.194 |
| C | 23.2 | 2.0% | 0.464 | 4.64 ×10⁻⁷ | 0.464 |

Example 14: This Example qualitatively demonstrates an antimicrobial enzyme additive combined with an antimicrobial peptide additive to provide antimicrobial functionality to a paper coating formulation. An adaptation of ASTM 02020-92 was used as the assay to demonstrate the growth of a microorganism in a petri dish was inhibited by contact with the treated paper. The antimicrobial enzyme additive comprised lysozyme, and the antimicrobial peptide additive comprised ProteCoat® Reactive Surfaces, Ltd.; also described in U.S. patent application Ser. Nos. 10/884,355; 11/368,086; and Ser. No. 11/865,514, each incorporated by reference).

The spectrophotometric lysozyme assay uses *Micrococcus lysodeikticus* bacterial cells as a substrate, and measures the change in the turbidity of the cell suspension as described in Example 9 and Example 10. The efficacy of an antimicrobial peptide (e.g., ProteCoat®) may be monitored biologically. Though the contemplated mechanism of action for an antimicrobial or antifouling peptide is similar, i.e. disruption of the structural components of the microbial cell, the cell wall may remain relatively intact. As an antifungal or antimicrobial peptide's biocidal or biostatic activity inhibits the cell, the cell may not lyse for detection of a change in turbidity. Biological assay conditions are shown in the table below.

TABLE 35

Enzymatic Additive - Lysozyme (Qualitative)

| | |
|---|---|
| Example Techniques Used | Example 11 |
| Coupon Size | 100 mm$^2$ |
| Paper Age | 3 months |
| Test Organism | *Micrococcus lysodeikticus* |
| Growth Conditions | 28° C. |

A zone of clearing was seen around the antimicrobial paper in contact with a petri dish covered by *M. lysodeikticus*, whereas the control paper had no such zone. The coupon of paper was about half the size of the smallest coupons in the quantitative *M. lysodeikticus* assay, yet growth inhibition was seen.

Assay conditions for *Fusarium oxysporum* is shown at the table below.

TABLE 36

Enzymatic Additive - ProteCoat (Qualitative)

| | |
|---|---|
| Example Techniques Used | Example 12 |
| Coupon Size | 40 × 40 mm |
| Paper Age | 3 months |
| Test Organism | *Fusarium oxysporum* |
| Contamination level | 100 spore, aerosol delivery |
| Growth Conditions | Ambient |

Overgrowth of both test and control ProteCoat® paper by the fungus, *Fusarium oxysporum*, was observed. The developmental state of the mycelium on the antimicrobial paper was retarded over that seen in the control paper, indicative of biostatic, and possibly biocide activity.

Example 15: This Example demonstrates synergism between an antimicrobial enzyme additive combined with an antimicrobial peptide additive in a coating applied to papers, and to demonstrate antimicrobial activity of a paper comprising the antimicrobial peptide. The antimicrobial enzyme additive comprised lysozyme, and the antimicrobial peptide additive comprised ProteCoat® (Reactive Surfaces, Ltd.; also described in U.S. patent application Ser. Nos. 10/884,355; 11/368,086; and 11/865,514, each incorporated by reference). Assay conditions are shown at the tables below.

TABLE 37

Enzymatic Additive- 2% Lysozyme + 0.5% ProteCoat ® (Titration Assay)

| | |
|---|---|
| Example Techniques Used | Example 10 |
| Coupon Size | Variable, 0-400 mm$^2$ |
| Paper Age | 3 months |
| Test Organism | *Micrococcus lysodeikticus* |
| Contamination level | 2.5 × 10$^8$ cells/mL |
| Assay Time | 3 and 20 hrs |

TABLE 38A

Activity in Treated Papers

| Paper | Strips (mm × mm) | Area (mm$^2$) | Lysozyme mg | Lysozyme µg/mL | ProteCoat® mg | ProteCoat® µg/mL |
|---|---|---|---|---|---|---|
| 2% Lysozyme | | 0 | 0 | | | |
| | 5 × 5 | 25 | 11.60 | 2.90 | 0.00 | 0.00 |
| | 5 × 10 | 50 | 23.20 | 5.80 | 0.00 | 0.00 |
| | 5 × 20 | 100 | 46.40 | 11.60 | 0.00 | 0.00 |
| | 5 × 40 | 200 | 92.80 | 23.20 | 0.00 | 0.00 |
| | 5 × 40 + 5 × 5 | 225 | 104.40 | 26.10 | 0.00 | 0.00 |
| | 5 × 40 + 5 × 10 | 250 | 116.00 | 29.00 | 0.00 | 0.00 |
| | 5 × 40 + 5 × 20 | 300 | 139.20 | 34.80 | 0.00 | 0.00 |
| | 5 × 40 + 5 × 40 | 400 | 185.60 | 46.40 | 0.00 | 0.00 |
| 2% Lysozyme + 0.5% ProteCoat® | | 0 | | | | |
| | 5 × 5 | 25 | 11.60 | 2.90 | 2.90 | 0.73 |
| | 5 × 10 | 50 | 23.20 | 5.80 | 5.80 | 1.45 |
| | 5 × 20 | 100 | 46.40 | 11.60 | 11.60 | 2.90 |
| | 5 × 40 | 200 | 92.80 | 23.20 | 23.20 | 5.80 |
| | 5 × 40 + 5 × 5 | 225 | 104.40 | 26.10 | 26.10 | 6.53 |
| | 5 × 40 + 5 × 10 | 250 | 116.00 | 29.00 | 29.00 | 7.25 |
| | 5 × 40 + 5 × 20 | 300 | 139.20 | 34.80 | 34.80 | 8.70 |
| | 5 × 40 + 5 × 40 | 400 | 185.60 | 46.40 | 46.40 | 11.60 |

TABLE 38B

Activity in Treated Papers

| Paper | Strips (mm × mm) | Area (mm$^2$) | 3 hrs OD$_{600}$ | 3 hrs % Lysis | 20 hrs OD$_{600}$ | 20 hrs % Lysis |
|---|---|---|---|---|---|---|
| 2% Lysozyme | | 0 | 0.266 | 0.00 | 0.258 | 0.00 |
| | 5 × 5 | 25 | 0.259 | 2.63 | 0.25 | 3.10 |
| | 5 × 10 | 50 | 0.259 | 2.63 | 0.23 | 10.85 |
| | 5 × 20 | 100 | 0.256 | 3.76 | 0.145 | 43.80 |
| | 5 × 40 | 200 | 0.228 | 14.29 | 0.038 | 85.27 |
| | 5 × 40 + 5 × 5 | 225 | 0.199 | 25.19 | 0.019 | 92.64 |
| | 5 × 40 + 5 × 10 | 250 | 0.148 | 44.36 | 0.011 | 95.74 |
| | 5 × 40 + 5 × 20 | 300 | 0.177 | 33.46 | 0.013 | 94.96 |
| | 5 × 40 + 5 × 40 | 400 | 0.09 | 66.17 | 0.012 | 95.35 |
| 2% Lysozyme + 0.5% ProteCoat® | | 0 | 0.266 | 0.00 | 0.258 | 0.00 |
| | 5 × 5 | 25 | 0.255 | 4.14 | 0.23 | 10.85 |
| | 5 × 10 | 50 | 0.248 | 6.77 | 0.057 | 77.91 |
| | 5 × 20 | 100 | 0.237 | 10.90 | 0.016 | 93.80 |
| | 5 × 40 | 200 | 0.195 | 26.69 | 0.012 | 95.35 |
| | 5 × 40 + 5 × 5 | 225 | 0.199 | 25.19 | 0.012 | 95.35 |
| | 5 × 40 + 5 × 10 | 250 | 0.15 | 43.61 | 0.012 | 95.35 |
| | 5 × 40 + 5 × 20 | 300 | 0.124 | 53.38 | 0.01 | 96.12 |
| | 5 × 40 + 5 × 40 | 400 | 0.031 | 88.35 | 0.012 | 95.35 |

The concentration of lysozyme in the papers corresponded to between 2 and 50 ppm, whereas ProteCoat® was between 0.5 and 12 ppm. The comparison of lysis between the 2% lysozyme paper, and the combined paper which contained 2% lysozyme and 0.5% ProteCoat® indicates synergism between the additives. For example, the 100 mm$^2$ coupon size exhibited 44% lysis, whereas the combined paper exhibited 93%. This is an observed/expected (93/44+0) of 2.1, indicative of significant synergism. To further demonstrate this activity, the assay was repeated by titrating the 2% lysozyme paper with individual swaths of 2.5% ProteCoat® paper. 5×10, 5×20, and 5×40 mm² lysozyme paper strips with increasing amount of Protecoat® paper were added to tubes in 4 ml total volume 2.5×10⁸ *Micrococcus* cells/ml. The assay conditions are shown at the tables below.

TABLE 39

Enzymatic Additive- 2% Lysozyme & 2.5% ProteCoat ® (Titration)

| | |
|---|---|
| Example Techniques Used | Example 10 |
| Coupon Size | Variable |
| Lysozyme | 0-200 mm² |
| ProteCoat ® | 0-200 mm² |
| Paper Age | 3 months |
| Test Organism | *Micrococcus lysodeikticus* |
| Contamination level | 2.5 × 10⁸ cells/mL |
| Assay Time | 4 and 22 hrs |

TABLE 40

Activity of Protecoat ® paper with 50, 100 and 200 mm² Lysozyme paper against *Micrococcus lysodeikticus*

| Paper | Strips (mm × mm) | Square area (mm²) Lysozyme | Square area (mm²) Protecoat ® | [lysozyme] (ug/ml) | [Protecoat ®] (ug/ml) |
|---|---|---|---|---|---|
| Control | 0 | 0 | 0 | 0 (0) | 0 (0) |
| 2% Lysozyme | 5 × 10 | 50 | 0 | 23.2 (5.8) | 0 (0) |
| 2.5% Protecoat ® | 5 × 5 | 50 | 25 | 23.2 (5.8) | 15 (3.75) |
| | 5 × 10 | 50 | 50 | 23.2 (5.8) | 30 (7.5) |
| | 5 × 20 | 50 | 100 | 23.2 (5.8) | 60 (15) |
| | 5 × 40 | 50 | 200 | 23.2 (5.8) | 120 (30) |
| | 5 × 40 × 2 | 50 | 400 | 23.2 (5.8) | 240 (60) |
| Control | 0 | 0 | 0 | 0 (0) | 0 (0) |
| 2% Lysozyme | 5 × 20 | 100 | 0 | 46.4 (11.6) | 0 (0) |
| 2.5% Protecoat ® | 5 × 5 | 100 | 25 | 46.4 (11.6) | 15 (3.75) |
| | 5 × 10 | 100 | 50 | 46.4 (11.6) | 30 (7.5) |
| | 5 × 20 | 100 | 100 | 46.4 (11.6) | 60 (15) |
| | 5 × 40 | 100 | 200 | 46.4 (11.6) | 120 (30) |
| | 5 × 40 × 2 | 100 | 400 | 46.4 (11.6) | 240 (60) |
| 2% Lysozyme | 5 × 40 | 200 | 0 | 92.8 (23.2) | 0 (0) |
| 2.5% Protecoat ® | 5 × 5 | 200 | 25 | 92.8 (23.2) | 15 (3.75) |
| | 5 × 10 | 200 | 50 | 92.8 (23.2) | 30 (7.5) |
| | 5 × 20 | 200 | 100 | 92.8 (23.2) | 60 (15) |
| | 5 × 40 | 200 | 200 | 92.8 (23.2) | 120 (30) |
| | 5 × 40 × 2 | 200 | 400 | 92.8 (23.2) | 240 (60) |

An example of a calculation for the lysozyme content in 2% lysozyme paper was: $23.2 \times 2\%$ g/m² = 0.464 g/m² = 0.464 μg/mm². An example of a calculation for the Protecoat® content in 2.5% Protecoat® paper was: $23.9 \times 2.5\%$ g/m² = 0.60 g/m² = 0.60 μg/mm².

TABLE 41

Activity of Protecoat ® paper with 50, 100 and 200 mm2 Lysozyme paper against *Micrococcus lysodeikticus*

| | Strips | 4 hrs | | 23 hrs | |
|---|---|---|---|---|---|
| Paper | (mm × mm) | OD$_{600}$ | % Lysis | OD$_{600}$ | % Lysis |
| Control | 0 | 0.278 | 0 | 0.276 | 0 |
| 2% Lysozyme | 5 × 10 | 0.269 | 3.24 | 0.206 | 25.36 |
| 2.5% | 5 × 5 | 0.264 | 5.04 | 0.235 | 14.86 |
| Protecoat ® | 5 × 10 | 0.268 | 3.60 | 0.213 | 22.83 |
| | 5 × 20 | 0.269 | 3.24 | 0.197 | 28.62 |
| | 5 × 40 | 0.266 | 4.32 | 0.172 | 37.68 |
| | 5 × 40 × 2 | 0.24 | 13.67 | 0.027 | 90.22 |
| Control | 0 | 0.254 | 0 | 0.229 | 0 |
| 2% Lysozyme | 5 × 20 | 0.224 | 11.81 | 0.026 | 88.65 |
| 2.5% Protecoat ® | 5 × 5 | 0.22 | 13.39 | 0.023 | 89.96 |
| | 5 × 10 | 0.204 | 19.69 | 0.013 | 94.32 |
| | 5 × 20 | 0.212 | 16.54 | 0.019 | 91.70 |
| | 5 × 40 | 0.178 | 29.92 | 0.014 | 93.89 |
| | 5 × 40 × 2 | 0.194 | 23.62 | 0.027 | 88.21 |
| 2% Lysozyme | 5 × 40 | 0.203 | 20.08 | 0.019 | 91.70 |
| 2.5% Protecoat ® | 5 × 5 | 0.181 | 28.74 | 0.009 | 96.07 |
| | 5 × 10 | 0.175 | 31.10 | 0.01 | 95.63 |
| | 5 × 20 | 0.165 | 35.04 | 0.012 | 94.76 |
| | 5 × 40 | 0.128 | 49.61 | 0.012 | 94.76 |
| | 5 × 40 × 2 | 0.145 | 42.91 | 0.019 | 91.70 |

TABLE 42A

% Lysis (relative to control without Protecoat® added) at given time

| Square Area | 4 hr | | |
|---|---|---|---|
| (mm²) of Protecoat® paper | 50 mm² Lysozyme paper | 100 mm² Lysozyme paper | 200 mm² Lysozyme paper |
| 0 | 3.24 | 11.81 | 20.08 |
| 25 | 5.04 | 13.39 | 28.74 |
| 50 | 3.60 | 19.69 | 31.10 |
| 100 | 3.24 | 16.54 | 35.04 |
| 200 | 4.32 | 29.92 | 49.61 |
| 400 | 13.67 | 23.62 | 42.91 |

TABLE 42B

% Lysis (relative to control without Protecoat® added) at given time

| Square Area | 22 hr | | |
|---|---|---|---|
| (mm2) of Protecoat® paper | 50 mm² Lysozyme paper | 100 mm² Lysozyme paper | 200 mm² Lysozyme paper |
| 0 | 25.36 | 88.65 | 91.70 |
| 25 | 14.86 | 89.96 | 96.07 |
| 50 | 22.83 | 94.32 | 95.63 |
| 100 | 28.62 | 91.70 | 94.76 |
| 200 | 37.68 | 93.89 | 94.76 |
| 400 | 90.22 | 88.21 | 91.70 |

The assay was repeated by titrating the 2% lysozyme paper with individual swaths of 2.5% ProteCoat® paper. Lysozyme in technical papers added to an assay at concentrations greater than 10 ppm exhibited antimicrobial activity in the *M. lysodeikticus* assay. Lysozyme at approximately 5 ppm in the assay did not exhibit significant antimicrobial activity over the course of the assay (20 hrs). The addition of ProteCoat® papers, with between 3 and 60 ppm ProteCoat® to the assay significantly enhanced the lytic activity of lysozyme, or possibly the reverse. This was also true with the 5 ppm lysozyme, in which the lytic activity was doubled by the addition of between 3 and 60 ppm ProteCoat® to the assay. The peptide additive may be enhancing the activity of the enzyme, or the enzyme enhancing the activity of the peptide, or both, to produce these results.

Example 16: This Example demonstrates a spectrophotometric assay for an antimicrobial coating with a lytic additive. The lytic additive comprised a lysozyme. The antimicrobial coatings were created using acrylic latex, commercially available paints. Equipment and reagents that were used are shown in the table below.

TABLE 43

Equipment and Reagents

Equipment

Spectrophotometer (Thermo Multiskan Ascent Plate Reader)
Cuvettes (96-well assay plates)
Multi-channels and single-channel pipettes and tips
Reagents Tris(hydroxymethyl)aminomethane hydrochloride (Tris-HCI):
[Sigma, cat # T3253, Molecular Formula: $NH_2C(CH_2OH)_3 \cdot HCI$,
Molecular Weight: 157.60, CAS Number 1185-53-1, pKa (25° C.) 8.1]
*Micrococcus lysodeikticus* cell (Worthington Biochemicals, cat #8736)

TABLE 43-continued

Equipment and Reagents

Lysozyme: chicken egg white {Sigma cat #L6876;
50,000 U/mg; CAS 12650-88-3; molecular weight: 14.3 kD;
solubility ($H_2O$) 10 mg/mL; stability - 1 month at 2-8° C.
Standard: 25 µl of a 500,000 units (10 mg)/mL (10 mM
Tris-HCI) will typically lyse *E. coli* from > 1 mL of culture media
cell pellet resuspended in 350 µl buffer (10 mM Tris
HCI, pH 8.0, with 0.1 M NaCI, 1 mM EDTA, and 5% [w/v] Triton
X-100). Typical incubation conditions for lysis are 30 min at 37° C.}

A *Micrococcus lysodeikticus* cell suspension was made by adding 1.5 mg *Micrococcus lysodeikticus* to 1 mL 10 mM Tris pH 8.0 and mixing well. A lysozyme solution was prepared by adding 10 mg lysozyme in 1 mL $ddH_2O$, and mixing well.

The lysozyme stock solution was mixed into Sherwin Williams Acrylic (SW) or Glidden latex paint (1 part water:7 part paint). 4 mil, 6 mil, and 8 mil free films were created from Sherwin Williams paint comprising a lysozyme, a Glidden paint comprising a lysozyme, and controls for both. The plate controls included 3 replicates of 50 µL *M. lysodeikticus* cell suspension plus 50 µL buffer; and 3 replicates of 100 µL buffer. Pipet tips used fitted the pipette (e.g., multichannel pipettes). The liquid level was correct in the tips, as air bubbles, etc may alter volume. Quality control and safety procedures were as described in Example 6.

The antimicrobial films were cut into appropriately sized strips from both the antimicrobial and control coating. For a 5 mL assay in a 15 mL tube, standard size was 1×1 cm.

Analysis of samples included determining activity by monitoring the clearing of the cell suspension at $OD_{405}$ and determining the best fit to a standard curve. The reaction was started with the addition of 5 ml of the *M. lysodeikticus* stock. The tubes were immediately placed on a rocker for 3 hr; 100 µl samples were taken at 3 hr, and the absorbance at 405 nm was recorded.

TABLE 44

Sample Lysis Averages and Deviations

| Sample | | Avg. % Lysis at 3 hr | Standard Deviation |
|---|---|---|---|
| SW Control | 4 mils | 11.1057 | 0.5752 |
| | 6 mils | 12.2932 | 0.3812 |
| | 8 mils | 12.2802 | 0.5752 |
| SW Lysozyme | 4 mils | 65.0651 | 1.3638 |
| | 6 mils | 74.5744 | 3.8272 |
| | 8 mils | 84.2325 | 4.1432 |
| Glidden Control | 4 mils | 4.8514 | 0.4912 |
| | 6 mils | 5.1005 | 0.0569 |
| | 8 mils | 5.1749 | 0.6266 |
| Glidden Lysozyme | 4 mils | 18.3760 | 0.5846 |
| | 6 mils | 23.1840 | 3.6201 |
| | 8 mils | 29.1666 | 1.9095 |

Analysis of the data included calculating the initial velocities for the recorded slopes: [$OD_{405}$ min]/[slope standard curve (OD/mg *M. lysodeikticus*]/[lysozyme], Example 17: This Example demonstrates a biological assay for antimicrobial activity of coatings comprising an antimicrobial enzyme additive against a microorganism. The antimicrobial enzyme additive comprised lysozyme, the microorganism used comprised vegetative, gram-positive *M. lysodeikticus*. The assay was adapted from ASTM 02020-92, Method A, Standard Test for Mildew (Fungus) Resistance of Paper and Paperboard (Reapproved 2003). Equipment and reagents that were used are shown in the table below.

TABLE 45

Equipment and Reagents

Equipment:

Petri Plates
Reagents:

Luria Broth Agar (LBA)
Lysozyme: chicken egg white, Sigma cat #L6876; 50,000 U/mg;
CAS 12650-88-3; molecular weight: 14.3 kD; solubility ($H_2O$)
10 mg/mL; stability - 1 month at 2-8° C.
Standard: 25 µl of a 500,000 units (10 mg)/mL
(10 mM Tris-HCI) will typically lyse $E.\ coli$
from > 1 mL of culture media cell pellet resuspended in 350 µl
buffer (10 mM Tris HCI, pH 8.0, with 0.1 M NaCI, 1 mM
EDTA, and 5% [w/v] Triton X-100). Typical
incubation conditions for lysis are 30 min at 37° C.

A *Micrococcus lysodeikticus* cell suspension was made by adding 1.5 mg *M. lysodeikticus* to 10 mM Tris, pH 8.0, and mixing well. A lawn of *M. lysodeikticus* was generated by spreading 200 µl of this suspension onto a LBA plate, using a glass spreading rod. An antimicrobial latex coating comprising lysozyme and a control film was prepared in accordance with Example 16.

The assay include cutting appropriated sized strips of both antimicrobial and control latex films (e.g., a 1×1 cm). In triplicate the free films are carefully placed onto the surface of the petri dishes spaced out equally. This procedure was repeated for each of the paint film types/thicknesses.

The paint films comprising a lysozyme were active in lysing *M. lysodeikticus*, producing circular zones of clearing. The difference in Zone of Clearing Diameter between the different thicknesses of film was deemed negligible.

TABLE 46

Diameter (cm) of Zones of Clearing

| Sample | 4 mils | 6 mils | 8 mils |
|---|---|---|---|
| Glidden Lysozyme | 2.8 | 2.8 | 2.8 |
|  | 2.8 | 2.9 | 2.8 |
|  | 2.7 | 2.9 | 2.9 |
| Glidden Control | 0 | 0 | 0 |
|  | 0 | 0 | 0 |
|  | 0 | 0 | 0 |
| Sherwin Williams Lysozyme | 2.1 | 1.9 | 2.2 |
|  | 2.1 | 1.9 | 1.9 |
|  | 2 | 2 | 1.8 |
| Sherwin Williams Lysozyme | 0 | 0 | 0 |
|  | 0 | 0 | 0 |

Example 18: This Example demonstrates a qualitative biological assay for survivability of an antimicrobial latex coating comprising an antimicrobial enzyme additive against a microorganism. The antimicrobial enzyme additive comprised lysozyme, the microorganism used comprised vegetative, gram-positive *M. lysodeikticus*. The assay was adapted from ASTM 02020-92, Method A, Standard Test for Mildew (Fungus) Resistance of Paper and Paperboard (Reapproved 2003). Equipment and reagents that were used are shown in the table below.

TABLE 47

Equipment and Reagents

Equipment:

Petri Plates
Reagents:

Luria Broth Agar (LBA)
Lysozyme: chicken egg white, Sigma cat #L6876; 50,000
U/mg; CAS 12650-88-3; molecular weight: 14.3 kD; solubility
($H_2O$) 10 mg/mL; stability-1 month at 2-8° C. Standard: 25µl
of a 500,000 units (10 mg)/mL (10 mM Tris-HCI) will
typically lyse $E.\ coli$ from >1 mL of culture media cell pellet
resuspended in 350 µl buffer (10 mM Tris HCI, pH 8.0,
with 0.1 M NaCI, 1 mM EDTA, and 5% [w/v] Triton X-100).
Typical incubation conditions for lysis are 30 min at 37° C.

A *Micrococcus lysodeikticus* cell suspension was made by adding 1.5 mg *M. lysodeikticus* to 10 mM Tris, pH 8.0, and mixing well. A lawn of *M. lysodeikticus* was generated by spreading 200 µl of this suspension onto a LBA plate, using a glass spreading rod.

The paint formulations that were prepared included a Sherwin-Williams Acrylic Latex or a Glidden Acrylic Latex as controls (no additive), and both a Sherwin-Williams Acrylic Latex or a Glidden Acrylic Latex comprising 10 mg/mL Lysozyme (dd$H_2O$). Each paint was made by adding 1 part additive to 7 parts paint, and then mixed with a glass stirring rod and a paint mixer. Each film was immediately drawn onto polypropylene surfaces with a thickness of 4 mil, 6 mil, and 8 mil. Cure time was 24 days. Materials for assay were generated from the polypropylene surface as 1 $cm^2$ free films.

The assay include cutting appropriately sized strips of both antimicrobial and control latex films (e.g., a 1×1 cm). In triplicate the free films were carefully placed onto the surface of the petri dishes spaced out equally. This procedure was repeated for each of the paint film types/thicknesses.

After 24 hrs incubation, the diameter of the zones of clearing was measured for each film. Using sterile tweezer, the films were removed and transfer to a new LBA plate spread with *M. lysodeikticus* in the same orientation as the plates the films were removed from. Repeat the procedure of measuring the zones of clearing through transfer to a new plate every day for 5 days.

TABLE 48

Average Diameter (cm) of Zones of Clearing

|  |  | 4 mils | Standard Deviation | 6 mils | Standard Deviation | 8 mils | Standard Deviation |
|---|---|---|---|---|---|---|---|
| Day 1 | Glidden Control | N/A | N/A | N/A | N/A | 0 | 0 |
|  | Glidden Lysozyme | 2.5667 | 0.0577 | 2.5333 | 0.0577 | 2.7000 | 0.0000 |
| Day 2 | Glidden Control | N/A | N/A | N/A | N/A | 0 | 0 |
|  | Glidden Lysozyme | 2.0000 | 0.0000 | 2.0000 | 0.0000 | 2.2000 | 0.0000 |

TABLE 48-continued

| | | 4 mils | Standard Deviation | 6 mils | Standard Deviation | 8 mils | Standard Deviation |
|---|---|---|---|---|---|---|---|
| | Average Diameter (cm) of Zones of Clearing | | | | | | |
| Day 3 | Glidden Control | N/A | N/A | N/A | N/A | 0 | 0 |
| | Glidden Lysozyme | 1.4667 | 0.0577 | 1.6667 | 0.0577 | 1.9000 | 0.0000 |
| Day 4 | Glidden Control | N/A | N/A | N/A | N/A | 0 | 0 |
| | Glidden Lysozyme | 1.4333 | 0.1155 | 1.5667 | 0.0577 | 1.8000 | 0.0000 |
| Day 5 | Glidden Control | N/A | N/A | N/A | N/A | 0 | 0 |
| | Glidden Lysozyme | 1.2667 | 0.0577 | 1.4500 | 0.0707 | 1.6333 | 0.0577 |

[1] N/A in this chart just means not available/not applicable.

There were no 4 mil or 6 mil controls tested due to a limited LBA plate supply, though 8 mil control films were tested. The standard deviations for the 8 mil controls to 0, because all 3 controls produced a 0 cm zone of clearing in each case.

The paint films comprising lysozyme were active in lysing *M. lysodeikticus*, producing circular zones of clearing, for five cycles of contaminant control. The difference in Zone of Clearing Diameter between the different thicknesses of each film appeared negligible.

Example 19: This Example demonstrates a sulfatase's activity in free-films using a plate reader. Equipment and reagents used are shown in the table below.

TABLE 49

Equipment and Reagents

Equipment

Plate Reader
96-well plate
2ml microtubes

Reagents

Sulfatase from Aerobacter aerogenes ( Sigma Cat #51629-50UN)
Potassium 4-Nitrophenyl sulfate (MW 257.27; Sigma Cat #N3877)
Trizma base (Sigma Cat #T1503)

Samples preparation procedure included preparing: 14.5 mM potassium 4-nitrophenyl sulfate in isopropyl alcohol; and 200 mM TRIS, adjusted to pH 7.1 with HCl.

The paint formulations that were prepared included a Sherwin-Williams Acrylic Latex control (no additive), and a Sherwin-Williams Acrylic Latex comprising sulfatase. 63 enzyme units of sulfatase was admixed with 1 part water, then added to 7 parts paint. Each paint was mixed with a glass stirring rod and a paint mixer. Each film was immediately drawn onto polypropylene surfaces with a thickness of 8 mil. Cure time was 24 hours. Materials for assay were generated from the polypropylene surface as 3 cm² free films.

The plate reader assay included: cutting free films into appropriate size pieces; adding 1350 uL 200 mM TRIS into each microtube; adding 150 uL of 14.5 mM potassium 4-nitrophenyl sulfate to each tube; taking the 0 time sample; then adding the free films to the tubes, with the control sample being free film with no sulfatase. Quality control and safety procedures were as described in Example 6, including use of a hood for material handling as appropriate.

Analysis included: taking 100ul at the appropriate time points from each microtube and reading the absorbance at 405 nm; and determining the initial rate slope by plotting absorbance vs. time to calculate sulfatase activity.

TABLE 50A

| | Absorbance at 405 nm | | |
|---|---|---|---|
| Time | | Blank | |
| 0 | 0.0410 | 0.0408 | 0.0401 |
| 15 | 0.0414 | 0.0409 | 0.0408 |
| 30 | 0.0411 | 0.0400 | 0.0410 |
| 60 | 0.0405 | 0.0410 | 0.0410 |
| 120 | 0.0428 | 0.0409 | 0.0412 |
| Slope | 0.0000 | 0.0000 | 0.0000 |

TABLE 50B

| | Absorbance at 405 nm | | | | | |
|---|---|---|---|---|---|---|
| Time | 3 cm × 1 cm Control | | | 3 cm × 1 cm Enzyme | | |
| 0 | 0.0410 | 0.0408 | 0.0401 | 0.0410 | 0.0408 | 0.0401 |
| 15 | 0.0420 | 0.0408 | 0.0407 | 0.0595 | 0.0592 | 0.0607 |
| 30 | 0.0450 | 0.0414 | 0.0413 | 0.0800 | 0.0819 | 0.0818 |
| 60 | 0.0421 | 0.0448 | 0.0500 | 0.1243 | 0.1307 | 0.1291 |
| 120 | 0.0415 | 0.0422 | 0.0430 | 0.2024 | 0.2138 | 0.2159 |
| Slope | 0.0000 | 0.0000 | 0.0000 | 0.0014 | 0.0015 | 0.0015 |

TABLE 51A

| | Average Absorbance at 405 nm | | |
|---|---|---|---|
| | | Absorbance Average | |
| Time | Blank | Control 3 cm² | Sulfatase 3 cm² |
| 0 | 0.0406 | 0.0406 | 0.0406 |
| 15 | 0.0410 | 0.0412 | 0.0598 |
| 30 | 0.0407 | 0.0426 | 0.0812 |
| 60 | 0.0408 | 0.0456 | 0.1280 |
| 120 | 0.0416 | 0.0422 | 0.2107 |

TABLE 51B

Average Absorbance at 405 nm
Standard Deviations

| Time | Absorbance Blank | Standard Control 3 cm² | Deviation Sulfatase 3 cm² |
|---|---|---|---|
| 0 | 0.0005 | 0.0005 | 0.0005 |
| 15 | 0.0003 | 0.0007 | 0.0008 |
| 30 | 0.0006 | 0.0021 | 0.0011 |
| 60 | 0.0003 | 0.0040 | 0.0033 |
| 120 | 0.0010 | 0.0008 | 0.0073 |

TABLE 52

Absorbance vs. Time Slope Activity Data

| Sample | Slope (A/min) | U (umol/min) | U Average | U Deviation |
|---|---|---|---|---|
| Blank | 0.0000 | 0.0028 | 0.0016 | 0.0012 |
|  | 0.0000 | 0.0005 |  |  |
|  | 0.0000 | 0.0015 |  |  |
| Control 3cm² | 0.0000 | −0.0009 | 0.0036 | 0.0045 |
|  | 0.0000 | 0.0038 |  |  |
|  | 0.0000 | 0.0080 |  |  |
| Sulfatase 3cm² | 0.0014 | 0.2971 | 0.3133 | 0.0141 |
|  | 0.0015 | 0.3200 |  |  |
|  | 0.0015 | 0.3229 |  |  |

Example 20: This Example demonstrates a phosphodiesterase I assay using a plate reader. The equipment and reagents used are shown in the table below.

TABLE 53

Equipment and reagents

Equipment

Plate Reader
96-well plate
Reagents

Phosphodiesterase I from *Crotalus adamanteus* Venom (Worthington Cat# LS003926)
Thymidine 5-monophosphate p-nitrophenyl ester sodium salt (MW 465.3; Sigma Cat# T4510)
Trizma base (Sigma Cat# T1503)

Samples prepared included: 14.5 mM Thymidine 5-monophosphate p-nitrophenyl ester sodium salt in ddH₂O; a 124U/ml ddH₂O enzyme solution; and 200 mM TRIS (adjusted to pH 7.1 with HCl).

The plate reader assay comprised: diluting enzyme solution 1:1 and 1:3; adding 16 ul of each enzyme dilution in triplicate into a 96-well plate, with a control sample prepared by adding 16 ul ddH₂O; adding 24 ul ddH₂O into each well; adding 50 ul 200 mM TRIS to each well; and adding 10 uL of 14.5 mM Thymidine 5-monophosphate p-nitrophenyl ester sodium salt in ddH₂O to each well. Quality control and safety procedures were as described in Example 6, including use of a hood for material handling as appropriate.

The analysis included: taking 500 readings every 10 seconds at 405 nm; and determining the initial rate slope by plotting absorbance vs. time to calculate phosphodiesterase I activity. Summary results are below.

TABLE 54

Phosphodiesterase Activity

| Sample | Slope (A/min) | U (umol/min) | U Average | U Deviation |
|---|---|---|---|---|
| 2U | 0.1069 | 23.39 | 20.48 | 2.58 |
|  | 0.0895 | 19.60 |  |  |
|  | 0.0844 | 18.47 |  |  |
| 1U | 0.0764 | 16.73 | 15.27 | 1.69 |
|  | 0.0715 | 15.64 |  |  |
|  | 0.0613 | 13.42 |  |  |

TABLE 55

Phosphodiesterase Activity

| Sample | Slope (A/min) | U (umol/min) | U Average | U Deviation |
|---|---|---|---|---|
| 0.5U | 0.0508 | 11.12 | 10.62 | 0.54 |
|  | 0.0488 | 10.69 |  |  |
|  | 0.0459 | 10.05 |  |  |
| Control | −0.0002 | −0.04 | −0.04 | 0.03 |
|  | −0.0004 | −0.08 |  |  |
|  | −0.0001 | −0.01 |  |  |

Example 21: This Example demonstrates a phosphodiesterase I activity assay in free-films using a plate reader.

TABLE 56

Equipment and reagents

Equipment

Plate Reader
96-well plate
2 ml microtubes
Reagents

Phosphodiesterase I from Crotalus adamanteus Venom
(Worthington Cat #LS003926) Thymidine 5-monophosphate
p-nitrophenyl ester sodium salt (MW 465.3; Sigma
Cat #T4510) Trizma base (Sigma Cat #T1503)

Samples prepared included: 14.5 mM Thymidine 5-monophosphate p-nitrophenyl ester sodium salt in ddH₂O; and 200 mM TRIS (adjusted to pH 7.1 with HCl).

The paint formulations that were prepared included a Sherwin-Williams Acrylic Latex control (no additive), and a Sherwin-Williams Acrylic Latex comprising phosphodiesterase I. 113 enzyme units of phosphodiesterase I was admixed with 1 part water, then added to 7 parts paint. Each paint was mixed with a glass stirring rod and a paint mixer. Each film was immediately drawn onto polypropylene surfaces with a thickness of 8 mil. Cure time was 24 hours. Materials for assay were generated from the polypropylene surface as 1 cm², 2 cm² and 3 cm² free films.

The plate reader assay comprised: cutting free films into appropriate sized pieces and place them into microtubes, though blank samples have no paint film inside the microtube; adding 600ul ddH$_2$O into each microtube; adding 750ul 200 mM TRIS into each microtube; and adding 150 uL of 14.5 mM Thymidine 5-monophosphate p-nitrophenyl ester sodium salt in ddH$_2$O into each microtube. Quality control and safety procedures were as described in Example 6, including use of a hood for material handling as appropriate.

Analysis included: taking out 100ul from each microtube at the appropriate time points, and reading the absorbance at 405 nm; and determining the initial rate slope by plotting absorbance vs. time to calculate phosphodiesterase I activity.

TABLE 57A

Phosphodiesterase I Sample absorbance at 405 nm

| Time (min) | Blank | | | 3cm × 1 cm Control | | |
|---|---|---|---|---|---|---|
| 0 | 0.0432 | 0.0401 | 0.0438 | 0.0432 | 0.0401 | 0.0438 |
| 30 | 0.0385 | 0.0388 | 0.0384 | 0.0425 | 0.0441 | 0.0409 |
| 60 | 0.0412 | 0.0395 | 0.0391 | 0.0485 | 0.0402 | 0.0431 |
| 120 | 0.0408 | 0.0398 | 0.0394 | 0.0443 | 0.0408 | 0.0410 |
| 240 | 0.0410 | 0.0396 | 0.0442 | 0.0411 | 0.0421 | 0.0411 |
| 1200 | 0.0464 | 0.0411 | 0.0420 | 0.0433 | 0.0418 | 0.0416 |
| Slope (A/min) | 0.0000 | 0.0000 | 0.0000 | 0.0000 | 0.0000 | 0.0000 |

TABLE 57B

Phosphodiesterase I Sample absorbance at 405 nm

| Time (min) | 3 cm × 1 cm Enzyme | | | 2 cm × 1 cm Enzyme | | |
|---|---|---|---|---|---|---|
| 0 | 0.0432 | 0.0401 | 0.0438 | 0.0432 | 0.0401 | 0.0438 |
| 30 | 0.0582 | 0.0567 | 0.0598 | 0.0515 | 0.0486 | 0.0497 |
| 60 | 0.0807 | 0.0787 | 0.0822 | 0.0671 | 0.0628 | 0.0648 |
| 120 | 0.1459 | 0.1348 | 0.1424 | 0.1093 | 0.0997 | 0.1076 |
| 240 | 0.2720 | 0.2534 | 0.2663 | 0.2058 | 0.1854 | 0.1985 |
| 1200 | 0.6818 | 0.6674 | 0.6647 | 0.6234 | 0.5894 | 0.6073 |
| Slope (A/min) | 0.0010 | 0.0009 | 0.0010 | 0.0007 | 0.0006 | 0.0007 |

TABLE 57C

Phosphodiesterase I Sample absorbance at 405 nm

| Time (mm) | 1 cm × 1 cm Enzyme | | |
|---|---|---|---|
| 0 | 0.0432 | 0.0401 | 0.0438 |
| 30 | 0.0459 | 0.0451 | 0.0455 |
| 60 | 0.0547 | 0.0509 | 0.0543 |
| 120 | 0.0800 | 0.0714 | 0.0793 |
| 240 | 0.1420 | 0.1151 | 0.1204 |
| 1200 | 0.4900 | 0.4191 | 0.4146 |
| Slope (A/min) | 0.0004 | 0.0003 | 0.0003 |

TABLE 58A

Phosphodiesterase I Sample absorbance Average at 405 nm

| Time (min) | Blank | 3 cm² Control | 3 cm² Phosphodiesterase I | 2 cm² Phosphodiesterase I | 1 cm² Phosphodiesterase I |
|---|---|---|---|---|---|
| 0 | 0.0424 | 0.0424 | 0.0424 | 0.0424 | 0.0424 |
| 30 | 0.0386 | 0.0425 | 0.0582 | 0.0499 | 0.0455 |
| 60 | 0.0399 | 0.0439 | 0.0805 | 0.0649 | 0.0533 |
| 120 | 0.0400 | 0.0420 | 0.1410 | 0.1055 | 0.0769 |
| 240 | 0.0416 | 0.0414 | 0.2639 | 0.1966 | 0.1258 |

TABLE 58B

Phosphodiesterase I Sample absorbance Deviation at 405 nm

| Time (min) | Blank | 3 cm² Control | 3 cm² Phosphodiesterase I | 2 cm² Phosphodiesterase I | 1 cm² Phosphodiesterase I |
|---|---|---|---|---|---|
| 0 | 0.0020 | 0.0020 | 0.0020 | 0.0020 | 0.0020 |
| 30 | 0.0002 | 0.0016 | 0.0016 | 0.0015 | 0.0004 |
| 60 | 0.0011 | 0.0042 | 0.0018 | 0.0022 | 0.0021 |
| 120 | 0.0007 | 0.0020 | 0.0057 | 0.0051 | 0.0048 |
| 240 | 0.0024 | 0.0006 | 0.0095 | 0.0103 | 0.0142 |

TABLE 59

Phosphodiesterase I Activity

| Sample | Slope (A/min) | U (umol/min) | U Average | U Deviation |
|---|---|---|---|---|
| Blank | 0.0000 | −0.0004 | 0.00 | 0.00 |
|  | 0.0000 | 0.0001 |  |  |
|  | 0.0000 | 0.0024 |  |  |
| Control 3 cm² | 0.0000 | −0.0024 | 0.00 | 0.00 |
|  | 0.0000 | 0.0005 |  |  |
|  | 0.0000 | −0.0018 |  |  |
| Phosphodiesterase 3 cm² | 0.0010 | 0.2151 | 0.21 | 0.01 |
|  | 0.0009 | 0.1987 |  |  |
|  | 0.0010 | 0.2081 |  |  |
| Phosphodiesterase 2 cm² | 0.0007 | 0.1530 | 0.15 | 0.01 |
|  | 0.0006 | 0.1362 |  |  |
|  | 0.0007 | 0.1468 |  |  |
| Phosphodiesterase 1 cm² | 0.0004 | 0.0937 | 0.08 | 0.01 |
|  | 0.0003 | 0.0703 |  |  |
|  | 0.0003 | 0.0738 |  |  |

Example 22: This Example describes identification and isolation of additional proteinaceous sequence(s) that may be used, such as a sequence possessing an antibiological activity.

Although a synthetically obtained peptidic agent (i.e., a peptide, polypeptide, a protein, an antifungal peptide) identified and produced as described herein (e.g., SEQ ID Nos. 1 to 47) may be used, it is also possible to employ suitable naturally produced peptidic agent (e.g., a microbe that produces a peptidic agent), as a component of a material formulation (e.g., an additive in a paint, a coating additive). A proteinaceous molecule, such as one possessing an antibiological activity, may be identified using an assay as described herein and/or the art. A number of such naturally occurring peptides are listed in the Table below, with reference citations often including activity assay(s) used in identification.

TABLE 60

Examples of Antibiological Peptides

| Name | Source | Seq. ID | Activity | Reference |
|---|---|---|---|---|
| | Synthetic | 1 | Fungi | U.S. Pat. No. 5,885,782 |
| | Synthetic | 2 | Fungi | U.S. Pat. No. 5,885,782 |
| | Synthetic | 3 | Fungi | U.S. Pat. No. 5,885,782 |
| | Synthetic | 4 | Fungi | U.S. Pat. No. 5,885,782 |
| | Synthetic | 5 | Fungi | U.S. Pat. No. 5,885,782 |
| | Synthetic | 6 | Fungi | U.S. Pat. No. 5,885,782 |
| | Synthetic | 7 | Fungi | U.S. Pat. No. 5,885,782 |
| | Synthetic | 8 | Fungi | U.S. Pat. No. 5,885,782 |
| | Synthetic | 9 | Fungi | U.S. Pat. No. 5,885,782 |
| | Synthetic | 10 | Fungi | U.S. Pat. No. 5,885,782 |
| | Synthetic | 11 | Fungi | U.S. Pat. No. 5,885,782 |
| | Synthetic | 12 | Fungi | U.S. Pat. No. 5,885,782 |
| | Synthetic | 13 | Fungi | U.S. Pat. No. 5,885,782 |
| | Synthetic | 14 | Fungi | U.S. Pat. No. 5,885,782 |
| | Synthetic | 15 | Fungi | U.S. Pat. No. 5,885,782 |
| | Synthetic | 16 | Fungi | U.S. Pat. No. 5,885,782 |
| | Synthetic | 17 | Fungi | U.S. Pat. No. 5,885,782 |
| | Synthetic | 18 | Fungi | U.S. Pat. No. 5,885,782 |
| | Synthetic | 19 | Fungi | U.S. Pat. No. 5,885,782 |
| | Synthetic | 20 | Fungi | U.S. Pat. No. 5,885,782 |
| | Synthetic | 21 | Fungi | U.S. Pat. No. 5,885,782 |
| | Synthetic | 22 | Fungi | U.S. Pat. No. 5,885,782 |
| | Synthetic | 23 | Fungi | U.S. Pat. No. 5,885,782 |
| | Synthetic | 24 | Fungi | U.S. Pat. No. 5,885,782 |
| | Synthetic | 25 | Fungi | U.S. Pat. No. 5,885,782 |
| | Synthetic | 26 | Fungi | U.S. Pat. No. 5,885,782 |
| | Synthetic | 27 | Fungi | U.S. Pat. No. 5,885,782 |
| | Synthetic | 28 | Fungi | U.S. Pat. No. 5,885,782 |
| | Synthetic | 29 | Fungi | U.S. Pat. No. 5,885,782 |
| | Synthetic | 30 | Fungi | U.S. Pat. No. 5,885,782 |
| | Synthetic | 31 | Fungi | U.S. Pat. No. 5,885,782 |
| | Synthetic | 32 | Fungi | U.S. Pat. No. 5,885,782 |
| | Synthetic | 33 | Fungi | U.S. Pat. No. 5,885,782 |
| | Synthetic | 34 | Fungi | U.S. Pat. No. 5,885,782 |
| | Synthetic | 35 | Fungi | U.S. Pat. No. 5,885,782 |
| | Synthetic | 36 | Fungi | U.S. Pat. No. 5,885,782 |
| | Synthetic | 37 | Fungi | U.S. Pat. No. 5,885,782 |
| | Synthetic | 38 | Fungi | U.S. Pat. No. 5,885,782 |
| | Synthetic | 39 | Fungi | U.S. Pat. No. 5,885,782 |
| | Synthetic | 40 | Fungi | U.S. Pat. No. 5,885,782 |
| | Synthetic | 41 | Fungi | U.S. Pat. No. 5,885,782 |
| | Synthetic | 42 | Fungi | U.S. Pat. No. 5,885,782 |
| | Synthetic | 43 | Fungi | U.S. Pat. No. 5,885,782 |
| | Synthetic | 44 | Fungi | U.S. Pat. No. 5,885,782 |
| | Synthetic | 45 | Fungi | U.S. Pat. No. 5,885,782 |
| | Synthetic | 46 | Fungi | U.S. Pat. No. 5,885,782 |
| | Synthetic | 47 | Fungi | U.S. Pat. No. 5,885,782 |
| Tachystatin A | Horseshoe Crab | 48 | Gram + & Gram-, Fungi | Fujitani et al., J. Biol. Chem. 277; 23651, 2002. |
| Androctonin | Androctonus Australis | 49 | Gram + & Gram-, Fungi | Mandard et al., Biomol. J. Struct. Dyn. 17; 367, 1999. |
| Tritrpticin | Synthetic | 50 | Gram + & Gram-, Fungi | Schibli et al., Biochemistry 38; 16749, 1999. |
| HNP-3 Defensin | Human | 51 | Gram + & Gram-, Virus, Fungi | Hill et al./ Science 251; 1481-85, 1991. |
| Anti-fungal protein 1 (pafp-s) | Phytolacca Americana | 52 | Fungi | Gao et al., Biochemistry 40 (37); 10973-78, 2001. |
| Magainin 2 | Synthetic construct | 53 | Gram + & Gram-, Fungi | Hara et al., Biopolymers 58(4); 437-46, 2001. |
| Indolicidin | Bos Taurus | 54 | Gram + & Gram-, Virus, Fungi | Rozek et al., Biochemistry 39; 15765, 2000. |
| Defensin heliomicin | Heliothis virescens | 55 | Fungi | Lamberty et al., Biochemistry 40; 11995, 2001. |

TABLE 60-continued

Examples of Antibiological Peptides

| Name | Source | Seq. ID | Activity | Reference |
|---|---|---|---|---|
| Defensin heliomicin | Heliothis virescens | 56 | Gram + & Gram-, Fungi | Lamberty et al., J. Biol. Chem. 376; 4085-92, 2001. |
| Sativum defensin 1 (psd1) | Seed of Pea | 57 | Fungi | Almeida et al., J. Mol. Biol. 315(4); 749-57, 2002. |
| Gomesin | Synthetic | 58 | Gram + & Gram-, Fungi, Mammalian cells | Mandard et al., Eur. J. Biochem. 269; 1190, 2002. |
| Lactoferricin B | Bovine | 59 | Gram + & Gram-, Virus, Fungi, Cancer cells | Hwang et al., Biochemistry 37; 4288, 1998. |
| PW2 | Synthetic | 60 | Fungi | Tinoco et al., VOL.277, No. 39; 36351-56, 2002. |
| Hepcidin 20 | Human | 61 | Fungi | Hunter et al., J. Biol. Chem. 277; 35797, 2002. |
| Hepcidin 25 | Human | 62 | Fungi | Hunter et al., J. Biol. Chem. 277; 35797, 2002. |
| AC-AMP2 | Amaranthus caudatus | 63 | Gram +, Fungi | Martins et al., J. Mol. Biol. 258; 322, 1996. |
| NK-Lysin | Sus scrofa | 64 | Gram + & Gram-, Fungi | Liepinsh et al., Nat Struct Biol. 4; 793, 1997. |
| Magainin 2 | African clawed frog | 65 | Gram + & Gram-, Fungi, cancer cells | Gesell et al., J. Biomol. NMR 9; 127, 1997. |
| Melittin B | Honey bee venom | 66 | Gram + & Gram-, Fungi, Mammalian cells | Terwilliger et al. J. Biol. Chem. 257 (11): 6016-6022, 1982. |
| Thanatin | Podisus maculiventris | 67 | Gram + & Gram-, Fungi | Mandard et al., Eur J. Biochem. 256; 404, 1998. |
| Antimicrobial peptide 1 | Common ice plant | 68 | Gram + & Gram-, Fungi | Michalowski et al., submitted to EMBL GenBank DDBJ databases, 1998 |
| Melanotropin alpha (Alpha-MSH) | Bovine | 69 | Gram +, Fungi | Cutuli et al., J Leukoc Biol. 27(2); 233-39, 2000. |
| CORTICOSTATIN III (MCP-1) | Rabbit | 70 | Gram + & Gram-, Virus, Fungi | Selsted et al., Proc. Natl. Acad. Sci. USA 85; 592-96, 1988. |
| CORTICOSTATIN III (MCP-1) | Rabbit | 71 | Gram + & Gram-, Virus, Fungi | Selsted et al., Proc. Natl. Acad. Sci. USA 85; 592-96, 1988. |
| Cecropin B | Chinese oak silk moth | 72 | Gram + & Gram-, Fungi | Qu et al., Eur. J. Biochem. 127; 219-24, 1982. |
| Seminalplasmin | Bovine | 73 | Gram + & Gram-, Fungi, Mammalian cells | Theil et al., EMBO J. 2; 1159-63, 1983. |
| NP-3A defensin | Rabbit | 74 | Gram + & Gram-, Virus, Fungi | Zhu et al, Endocrinology 130; 1413-23, 1992. |
| HNP-1 Defensin | Human | 75 | Gram + & Gram-, Virus, Fungi | Zhang et al., Biochemistry 31; 11348-56, 1992. |

TABLE 60-continued

Examples of Antibiological Peptides

| Name | Source | Seq. ID | Activity | Reference |
|---|---|---|---|---|
| HNP-2 Defensin | Human | 76 | Gram + & Gram-, Virus, Fungi | Selsted et al., J. Biol Chem. 264; 4003-07, 1989. |
| HNP-4 Defensin | Human | 77 | Gram + & Gram-, Fungi | Wilde et al., J. Biol. Chem. 264; 11200-03, 1989. |
| Histatin 5 | Human | 78 | Gram + & Gram-, Fungi | Raj et al., Biopolymers 45 (1);51-67;1998. |
| Histatin 3 | Human | 79 | Gram + & Gram-, Fungi | Oppenheim et al., J. Biol. Chem. 263; 7472-77, 1988. |
| Histatin 8 | | 80 | Gram + & Gram-, Fungi | Yin et al., Arch Oral Biol. 48(5); 361-68, 2003. |
| Tracheal antimicrobial peptide | Bovine | 81 | Gram + & Gram-, Fungi | Zimmermann et al., Biochemistry 34;13663, 1995. |
| AMP1 (MJ-AMP1) | Garden four-o'clock | 82 | Gram +, Fungi | Cammue et al., J. Biol. Chem. 267; 2228-33, 1992. |
| AMP2 (MJ-AMP2) | Garden four-o'clock | 83 | Gram +, Fungi | Cammue et al., J. Biol. Chem. 267; 2228-33, 1992. |
| MBP-1 | Maize | 84 | Gram + & Gram-, Fungi | Duvick et al., J. Biol. Chem. 267; 18814-20, 1992. |
| AFP2 | Rape | 85 | Fungi | Terras et al., FEBS Lett. 316; 233-40, 1993. |
| AFP1 | Turnip | 86 | Fungi | Terras et al., FEBS Lett. 316; 233-40, 1993. |
| AFP2 | Turnip | 87 | Fungi | Terras et al., FEBS Lett. 316; 233-40, 1993. |
| ADENOREGULIN | Two coloured leaf frong | 88 | Gram + & Gram-, Fungi | Mor et al., Eur J Biochem 219(1-2); 145-54, 1994. |
| Protegrin 2 | Pig | 89 | Gram + & Gram-, Virus, Fungi | Kokryakov et al., FEBS Lett. 327; 231-36, 1993. |
| Protegrin 3 | Pig | 90 | Gram + & Gram-, Virus, Fungi | Kokryakov et al., FEBS Lett. 327; 231-36, 1993. |
| Histatin 1 | Crab eating macaque | 91 | Gram + & Gram-, Fungi | Xu et al., J. Dent. Res 69; 1717-23, 1990. |
| Peptide PGQ | African clawed frog | 92 | Gram + & Gram-, Fungi | Moore et al., J. Biol. Chem. 266; 19851-57, 1991. |
| Ranalexin | Bull frog | 93 | Gram + & Gram-, Fungi | Halverson et al., Peptides 21; 469-76, 2000. |
| GNCP-2 | Guinea pig | 94 | Gram + & Gram-, Virus, Fungi | Nagaoka et al., FEBS Lett. 280; 287-91, 1991. |
| Protegrin 4 | Pig | 95 | Gram + & Gram-, Virus, Fungi | Zhao et al., FEBS Lett. 346; 285-88, 1994. |
| Protegrin 5 | Pig | 96 | Gram + & Gram-, Virus, Fungi | Zhao et al., FEBS Lett. 368; 197-202, 1995. |
| BMAP-27 | Bovine | 97 | Gram + & Gram-, Fungi | Skerlavaj et al., J. Blot Chem. 271; 28375-81, 1996. |
| BMAP-28 | Bovine | 98 | Gram + & Gram-, Fungi | Skerlavaj et al., J. Blot Chem. 271; 28375-81, 1996. |

TABLE 60-continued

Examples of Antibiological Peptides

| Name | Source | Seq. ID | Activity | Reference |
|---|---|---|---|---|
| Buforin I | Asian toad | 99 | Gram + & Gram-, Fungi | Park et al., Biochem. Biophys. Res. Commun. 218; 408-13, 1996. |
| Buforin II | Asian toad | 100 | Gram + & Gram-, Fungi | Yi et al., FEBS Lett. 398; 87-90, 1996. |
| BMAP-34 | Bovine | 101 | Gram + & Gram-, Fungi | Scocchi et al., FEBS Lett. 417:311-315, 1997. |
| Tricholongin | Trichoderma longibrachiatum | 102 | Gram + & Gram-, Fungi | Rebuffat et al., Eur. J. Biochem. 201; 661-74, 1991. |
| Dermaseptin 1 | Sauvage's leaf frog | 103 | Gram + & Gram-, Fungi | Mor et al., Proc. Natl. Acad. Sci. USA 91; 10295-99, 1994. |
| Pseudo-hevein (Minor hevin) | Para rubber tree | 104 | Fungi | Soedjanaatmadja et al., Biochim. Biophys. Acta 1209; 144-48, 1994. |
| Gaegurin-1 | Wrinkled frog | 105 | Gram + & Gram-, Fungi | Park et al., Biochem. Biophys. Res. Commun. 205; 948-54, 1994. |
| Skin peptide tyrosine-tyrosine | Two-colore leaf frog | 106 | Gram + & Gram-, Fungi | Mor et al., Eur J Biochem 219(1-2); 145-54, 1994. |
| Penaeidin-1 | Penoeid shrimp | 107 | Gram + & Gram-, Fungi | Destoumieux et al., Cell. Mol. Life Sci. 57; 1260-71, 2000. |
| Neutrophil defensin 1 (HANP-1) | Golden hamster | 108 | Gram +, Fungi | Mak et al., Infect. Immun. 64; 4444-49, 1997. |
| Neutrophil defensin 3 (HANP-3) | Golden hamster | 109 | Gram +, Fungi | Mak et al., Infect. Immun. 64; 4444-49, 1997. |
| Misgurin | Oriental weatherfish | 110 | Gram + & Gram-, Fungi | Park et al., FEBS Lett. 411; 173-78, 1997. |
| PN-AMP | Japenese morning glory | 111 | Gram +, Fungi | Koo et al., Biochim. Biophys. Acta 1382; 80-90, 1998. |
| Histone H2B-1 (HLP-1) (Fragment) | Rainbow trout | 112 | Gram + & Gram-, Fungi | Robinette et al., Cell. Mol. Life Sci. 54; 467-75, 1998. |
| Histone H2b-3 (HLP-3) (Fragment) | Rainbow trout | 113 | Fungi | Robinette et al., Cell. Mol. Life Sci. 54; 467-75, 1998. |
| Neutrophil defensin 2 (RMAD-2) | Rhesus macaque | 114 | Gram + & Gram-, Fungi | Tang et al., Infect. Immun. 67; 6139-44, 1999. |
| Termicin | Pseudacanthotermes spiniger | 115 | Gram +, Fungi | Lamberty et al., J. Biol. Chem. 376; 4085-92, 2001. |
| Spingerin | Pseudacanthotermes spiniger | 116 | Gram + & Gram-, Fungi | Lamberty et al., J. Biol. Chem. 376; 4085-92, 2001. |
| Aurein 1.1 | Southern bell frog | 117 | Gram + & Gram-, Fungi | Rozek et al., Eur. J. Biochem. 267; 5330-41, 2000. |
| Ponericin G! | Ponerine ant | 118 | Gram + & Gram-, Fungi | Orivel et al., J. Biol. Chem. 276; 17823-29, 2001. |
| Brevinin-1BB | Rio Grande leopard frog | 119 | Gram + & Gram-, Fungi | Goraya et al., Eur. J. Biochem. 267; 894-900, 2000. |
| Ranalexin-lCB | Gree frog | 120 | Gram + & Gram-, Fungi | Halverson et al., Peptides 21; 469-76, 2000. |
| Ranatuerin-2CA | Green frog | 121 | Gram + & Gram-, Fungi | Halverson et al., Peptides 21; 469-76, 2000. |

TABLE 60-continued

Examples of Antibiological Peptides

| Name | Source | Seq. ID | Activity | Reference |
|---|---|---|---|---|
| Ranatuerin-2CB | Green frog | 122 | Gram + & Gram-, Fungi | Halverson et al., Peptides 21; 469-76, 2000. |
| Ginkbilobin | Ginkgo | 123 | Gram + & Gram-, Virus, Fungi | Wang et al., Biochem. Biophys. Res. Commun. 279; 407-11, 2000. |
| Alpha-basrubrin (Fragment) | Malabar spinach | 124 | Virus, Fungi | Wang et al., Biochem. Biophys. Res. Commun. 288; 765-70, 2001. |
| Pseudin 1 | Paradoxical frog | 125 | Gram + & Gram-, Fungi | Olson et al., Biochem. Biophys. Res. Commun. 288; 1001-05, 2001. |
| Parabutoporin | Scorpion | 126 | Gram + & Gram-, Fungi, Mammalian cells | Moerman et al., Eur. J. Biochem. 269:4799-4810, 2002. |
| Opistoporin 1 | African yellow leg scorpion | 127 | Gram + & Gram-, Fungi, Mammalian cells | Moerman et al., Eur. J. Biochem. 269:4799-4810, 2002. |
| Opistoporin 2 | African yellow leg scorpion | 128 | Gram + & Gram-, Fungi, Mammalian cells | Moerman et al., Eur. J. Biochem. 269:4799-4810, 2002. |
| Histone H2A (fragment) | Rainbow trout | 129 | Gram +, Fungi | Fernandes et al., Biochem. J. 368; 611-20, 2002. |
| Dolabellanin B2 | Sea hare | 130 | Gram + & Gram-, Fungi | Iijima et al., Dev. Comp. Immunol. 0; 2002. |
| Cecropin A | Nocutuid moth | 131 | Gram + & Gram-, Fungi | Bulet et al., submitted to SWISS-PROT data bank; 2002. |
| HNP-5 Defensin | Human | 132 | Gram + & Gram-, Fungi | Jones et al., J. Biol. Chem. 367; 23216-25, 1992. |
| HNP-6 Defensin | Human | 133 | Gram + & Gram-, Fungi | Jones et al., FEBS Lett. 315; 187-92, 1993. |
| Holotricin 3 | Holotrichia diomphalia | 134 | Fungi | Lee et al., Biol. Pharm. Bull. 18; 1049-52, 1995. |
| Lingual antimicrobial peptide | Bovine | 135 | Gram + & Gram-, Fungi | Schonwetter et al., Science 267; 1645-48, 1995. |
| RatNP-3 | Rat | 136 | Gram + & Gram-, Virus, Fungi | Yount et al., J. Immunol. 155; 4476-84, 1995. |
| GNCP-1 | Guinea pig | 137 | Gram + & Gram-, Virus, Fungi | Nagaoka et al., DNA Seq. 4; 123-28, 1993. |
| Penaeidin-4a | Penoeid shrimp | 138 | Gram + & Gram-, Fungi | Destoumieux et al., Cell. Mol. Life Sci. 57; 1260-71, 2000. |
| Hexapeptide | Bovine | 139 | Gram + & Gram-, Virus, Fungi, Cancer cells | Vogle et al., Biochem. Cell Biol. 80; 49-63, 2002. |
| P-18 | | 140 | Gram + & Gram-, Fungi, Cancer cells | Lee et al., Protein Pept Lett 9(5); 395-402, 2002. |
| MUC7 20-Mer | Human | 141 | Gram + & Gram-, | Bobek et al., Antimicrob Agents |

TABLE 60-continued

Examples of Antibiological Peptides

| Name | Source | Seq. ID | Activity | Reference |
|---|---|---|---|---|
| | | | Fungi | Chemother 47(2); 643-52, 2003. |
| Nigrocin 2 | Rana nigromaculata | 142 | Gram + & Gram-, Fungi | Park et al., FEBS Lett 507(1); 95-100, 2001. |
| Nigrocin 1 | Rana nigromaculata | 143 | Gram + & Gram-, Fungi | Park et al., FEBS Lett 507(1); 95-100, 2001. |
| Lactoferrin (Lf) peptide 2 | | 144 | Fungi | Ueta et al., J Pept Res 2001 57(3); 240-49, 2001. |
| Ib-AMP3 | Impatiens balsamina | 145 | Gram +, Fungi | Ravi et al., J. Biol. Chem. 272; 24480-87, 1997. |
| Ib-AMP4 | Impatiens balsamina | 146 | Gram + Fungi | Ravi et al., J. Biol. Chem. 272; 24480-87, 1997. |
| Dhvar4 | Synthesis | 147 | Gram + & Gram-, Fungi | Ruissen et al., Peptides 2002 23(8); 1391-99, 2002. |
| Dhvar5 | Synthesis | 148 | Gram + & Gram-, Fungi | Ruissen et al., Peptides 2002 23(8); 1391-99, 2002. |
| | Synthetic | 149 | Fungi | U. S. application Ser. No. 10/601,207 |
| | Synthetic | 150 | Fungi | U. S. application Ser. No. 10/601,207 |
| | Synthetic | 151 | Fungi | U. S. application Ser. No. 10/601,207 |
| | Synthetic | 152 | Fungi | U. S. application Ser. No. 10/601,207 |
| | Synthetic | 153 | Fungi | U. S. application Ser. No. 10/601,207 |
| | Synthetic | 154 | Fungi | U. S. application Ser. No. 10/601,207 |
| | Synthetic | 155 | Fungi | U. S. application Ser. No. 10/601,207 |
| | Synthetic | 156 | Fungi | U. S. application Ser. No. 10/601,207 |
| | Synthetic | 157 | Fungi | U. S. application Ser. No. 10/601,207 |
| | Synthetic | 158 | Fungi | U. S. application Ser. No. 10/601,207 |
| | Synthetic | 159 | Fungi | U. S. application Ser. No. 10/601,207 |
| | Synthetic | 160 | Fungi | U. S. application Ser. No. 10/601,207 |
| | Synthetic | 161 | Fungi | U. S. application Ser. No. 10/601,207 |
| | Synthetic | 162 | Fungi | U. S. application Ser. No. 10/601,207 |
| | Synthetic | 163 | Fungi | U. S. application Ser. No. 10/601,207 |
| | Synthetic | 164 | Fungi | U. S. application Ser. No. 10/601,207 |
| | Synthetic | 165 | Fungi | U. S. application Ser. No. 10/601,207 |
| | Synthetic | 166 | Fungi | U. S. application Ser. No. 10/601,207 |
| | Synthetic | 167 | Fungi | U. S. application Ser. No. 10/601,207 |
| | Synthetic | 168 | Fungi | U. S. application Ser. No. 10/601,207 |
| | Synthetic | 169 | Fungi | U. S. application Ser. No. 10/601,207 |
| | Synthetic | 170 | Fungi | U. S. application Ser. No. 10/601,207 |
| | Synthetic | 171 | Fungi | U. S. application Ser. No. 10/601,207 |
| | Synthetic | 172 | Fungi | U. S. application Ser. No. 10/601,207 |
| | Synthetic | 173 | Fungi | U. S. application Ser. No. 10/601,207 |
| | Synthetic | 174 | Fungi | U. S. application Ser. No. 10/601,207 |
| | Synthetic | 175 | Fungi | U. S. application Ser. No. 10/601,207 |
| | Synthetic | 176 | Fungi | U. S. application Ser. No. 10/601,207 |
| | Synthetic | 177 | Fungi | U. S. application Ser. No. 10/601,207 |
| | Synthetic | 178 | Fungi | U. S. application Ser. No. 10/601,207 |
| | Synthetic | 179 | Fungi | U. S. application Ser. No. 10/601,207 |
| | Synthetic | 180 | Fungi | U. S. application Ser. No. 10/601,207 |
| | Synthetic | 181 | Fungi | U. S. application Ser. No. 10/601,207 |
| | Synthetic | 182 | Fungi | U. S. application Ser. No. 10/601,207 |
| | Synthetic | 183 | Fungi | U. S. application Ser. No. 10/601,207 |
| | Synthetic | 184 | Fungi | U. S. application Ser. No. 10/601,207 |
| | Synthetic | 185 | Fungi | U. S. application Ser. No. 10/601,207 |
| | Synthetic | 186 | Fungi | U. S. application Ser. No. 10/601,207 |
| | Synthetic | 187 | Fungi | U. S. application Ser. No. 10/601,207 |
| | Synthetic | 188 | Fungi | U. S. application Ser. No. 10/601,207 |
| | Synthetic | 189 | Fungi | U. S. application Ser. No. 10/601,207 |
| | Synthetic | 190 | Fungi | U. S. application Ser. No. 10/601,207 |
| | Synthetic | 191 | Fungi | U. S. application Ser. No. 10/601,207 |
| | Synthetic | 192 | Fungi | U. S. application Ser. No. 10/601,207 |
| | Synthetic | 193 | Fungi | U. S. application Ser. No. 10/601,207 |
| | Synthetic | 194 | Fungi | U. S. application Ser. No. 10/601,207 |
| | Synthetic | 195 | Fungi | U. S. application Ser. No. 10/601,207 |
| | Synthetic | 196 | Fungi | U. S. application Ser. No. 10/601,207 |
| | Synthetic | 197 | Fungi | U. S. application Ser. No. 10/601,207 |
| | Synthetic | | Gram + & Gram-, Fungi | U. S. application Ser. No. 10/601,207 |

TABLE 60-continued

Examples of Antibiological Peptides

| Name | Source | Seq. ID | Activity | Reference |
|------|--------|---------|----------|-----------|
|  | Synthetic | 198 | Gram + & Gram-, Fungi | U. S. application Ser. No. 10/601,207 |
|  | Synthetic | 199 | Gram + & Gram-, Fungi | U. S. application Ser. No. 10/601,207 |

A natural source may provide additional sequences to be used for a material formulation (e.g., a coating additive). In some embodiments, the use of a natural antifungal products isolated in commercial quantity from a microorganism may use a large-scale cell culture (e.g., culture of an antifungal agent-producing microorganism) for the production and purification of the peptidic (e.g., an antifungal) product. In some aspects, the cultural isolate responsible for the production of the endogenously produced proteinaceous molecule (e.g., an antifungal peptidic agent) may be batch-cultured. In some facets, a purification technique and/or strategy, such as those described herein and/or in the art, may be used purify the active product to a reasonable (e.g., desired) level of homogeneity. However, in some aspects, a naturally derived peptidic agent (e.g., an antifungal agent) may co-purify with an unwanted microbial byproducts, especially a byproduct which may be undesirably toxic. Purification of an endogenously produced proteinaceous composition may result in a racemized mixture wherein one or more stereoisomer(s) are active, and/or wherein a disulfide linkage may occur (e.g., a disulfide linkage between peptide monomers). When a desirable naturally occurring proteinaceous molecule (e.g., an antifungal protein, an antifungal polypeptide, an antifungal peptide) may be isolated, for example, and the amino acid sequences at least partially identified, synthesis of the native molecule, or portions thereof, may use a specific disulfide bond formation, a high histidine requirement, and so forth. Of course, once a proteinaceous molecule is sequence is identified, and/or a nucleotide sequence for a proteinaceous molecule is isolated, it then may be recombinantly expressed using techniques described herein and/or in the art.

Example 23: This Example describes assay protocols for evaluating antifungal coatings. It is contemplated that such assays may be adapted to also assay other types of material formulations comprising various biomolecule composition(s) and activity against other types of biological cells.

A suitable assay protocol for evaluating a coating comprising an antifungal agent which may be applied in assaying an antifungal peptide is described by the American Society for Testing and Materials (ASTM) in D-5590-94 ("Standard Test Method for Determining the Resistance of Paint Films and Related Coatings to Fungal Defacement by Accelerated Four-Week Agar Plate Assay"). The assay method may be modified as indicated below, and generally comprises: preparing a set of four 1×10 cm aluminum coupons approximately 1/32 in thick will be prepared as follows: (1) blank Al coupon; (2) Al coupon coated with an aqueous solution of a peptide produced and identified as described herein, and allowed to dry; (3) Al coupon coated on both sides with a base paint composition, allowed to dry, and then the paint film will be coated with a like amount of the same test peptide solution as applied to coupon 2; and (4) Al coupon painted with a paint mixture comprising the same base paint composition as for coupon 3 and a like amount of the peptide, as for coupons 2 and 3. Duplicate or triplicate sets of these specimens may be prepared. Optionally, a conventional biocide may be included as a positive control. The base paint composition may be any suitable water-based latex paint, without biocides, which is available from a number of commercial suppliers.

Each of the specimens from (a) will be placed on a bed of nutrient agar and uniformly innoculated with a fungal suspension. An example test organism comprises a *Fusarium oxysporum*. The fungal suspension may be applied by atomizer or by pipet, however a thin layer of nutrient agar mixed with the fungal inoculum may be used. The specimens are incubated at about 28° C. under 85 to 90% relative humidity for 4 weeks. Fungal growth on each specimen is often rated weekly as follows: None=0; traces of growth (<10% coverage)=1; light growth (10-30%)=2; moderate growth (30-60%)=3; and heavy growth (60% to complete coverage)=4.

Another suitable assay protocol for testing the antifungal properties of a coating or paint film containing an antifungal peptide is described by the ASTM in D-5590-94 ("Standard Test Method for Resistance to Growth of Mold on the Surface of Interior Coatings in an Environmental Chamber"). The testing protocol generally includes:

Preparation of the Coated Surface. Duplicate or triplicate sets of approximately ½ in. thick, 3×4 in. untreated wooden or gypsum board panels will be prepared as follows: (1) blank panel; (2) coated with an aqueous solution of a peptide produced and identified as described herein, and allowed to dry; (3) coated on both sides with a base paint composition, allowed to dry, and then the paint film is coated with a like amount of the same test peptide solution as applied to panel 2; and (4) painted with a paint mixture containing the same base paint composition as for panel 3 and a like amount of the peptide, as for panels 2 and 3. Optionally, a conventional biocide may be included as a positive control.

Contamination: The panels will be randomly arranged and suspended in an environmental cabinet above moist soil that has been inoculated with the desired fungus, usually a *Fusarium oxysporum*. Enough free space is provided to allow free circulation of air and avoiding contact between the panels and the walls of the cabinet.

Incubation: The panels will be incubated for two weeks at 30.5-33.5° C. and 95-98% humidity.

Scoring: A set of panels (test, control, and, optionally, a positive control) will be removed for analysis at intervals, usually weekly. The mold growth on the specimen panels may be rated as described above.

Alternatively, one or more equivalent testing protocols may be employed, and field assays of coating compositions containing laboratory-identified antifungal peptide(s) and/or candidate peptide(s) may be carried out in accordance with conventional methods of the art.

Example 24: This Example describes assay protocols for evaluating a latex paint comprising an antifungal peptidic agent. It is contemplated that such assays may be adapted to also assay other types of material formulations comprising various biomolecule composition(s) and activity against other types of biological cells.

Both the interior latex (Olympic Premium, flat, ultra white, 72001) and acrylic paints (Sherwin Williams DTM, primer/finish, white, B66W1; 136-1500) appeared to be toxic to both *Fusarium* and *Aspergillus*. Therefore, eight individual wells (48-well microtito plate) of each paint type were extracted on a daily basis with 1 ml of phosphate buffer for 5 days (1-4 & 6) and then allowed the plates were allowed to dry before running the assay. Each well contained 16 ul of respective paint.

Extract testing: The extract from two wells each of the two paints for each day was tested for toxicity by mixing the extract 1:1 with 2× medium and inoculating with spores ($10^4$) of *Aspergillus* or *Fusarium*. The extracts had no affect on growth of either test fungus.

Well testing: The extracted and non-extracted wells for each of the paints were tested with a range of inoculum levels in growth medium using the two different fungi. For *Fusarium* the range was $10^1$-$10^4$ and for *Aspergillus* $10^2$-$10^5$.

Well Testing of Acrylic Paint Plates: Both *Fusarium* and *Aspergillus* grew in all extracted wells at all inoculum levels. Only *Aspergillus* grew in non-extracted wells at the $10^5$ level and not at lower levels indicative of an inherent biocidal capability.

Well Testing of Latex Paint Plates: *Fusarium* grew in the extracted wells only at the $10^4$ inoculum level but not at $10^1$-$10^3$. *Aspergillus* grew in all extracted wells showing an inoculum level effect. No growth was observed for either *Fusarium* or *Aspergillus* in non-extracted wells.

Conclusion: Extraction of the toxic factor(s) found in both paints was possible. However, it appeared that it may be less extractable from the latex paint.

Evaluation of peptide activity in presence of acrylic and latex paints: It was established that it was possible to extract both acrylic and latex paints dried in a 48-well format to make them non-toxic to the test microorganisms—*Fusarium* and *Aspergillus*. Using that information an experiment was designed to determine the effect the paint has on peptide activity against two test organisms.

Experimental design: Coat 48-well plastic plates with 16 µl of acrylic or latex paint. Dry for two days under hood. Extract designated wells with 1-ml phosphate buffer changing the buffer on a daily basis for 7 days. Control wells were not extracted to confirm paint toxicity. Add 20 µl of peptide series in duplicate to designated dry paint coated wells. Peptide, SEQ ID No. 41, series were added in a two-fold dilution series to wells and allowed to dry. The concentration of peptide added ranged from 200 µg/20 µl to 1.5 µg/20 µl.

Inoculated paint-coated plates as follows: Extracted control wells received 180 µl of medium+20 µl of spore suspension ($10^4$ spores/20 µl of medium). Inoculum was either *Fusarium* or *Aspergillus* in each case. Non-extracted control wells received 180 µl of medium+20 µl of spore suspension ($10^4$ spores/20 µl of medium). Extract wells with dried peptide series received 180 µl of medium+20 µl of spore suspension ($10^4$ spores/20 µl of medium). In duplicate. Extract wells that did not have dried peptide series received 160 µl of medium+20 µl of spore suspension ($10^4$/20 µl of medium)+20 µl peptide series as above. In duplicate. Plates were observed for growth over a 5-day period.

Growth and peptide controls: Use sterile non-paint coated 48 well plastic plates. Growth control wells for each test fungus received 180 µl of medium+20 µl of spore suspension ($10^4$ spores/20W of medium). Peptide activity controls received 160 µl of medium+20 µl of spore suspension ($10^4$ spores/20 µl of medium)+20 µl peptide series as above. Peptide series were added in a two-fold dilution series to wells and range from 200 µg/20 µl to 1.5 µg/20 µl. Therefore, the range of peptide tested was 200 µg/200 µl or 1.0 µg/µl (1000 µg/ml) to 0.0075 µg/µl (7.5 µg/ml). Uninoculated medium served as blank for absorbance readings taken at 24, 48, 72, 96 and 120h.

Results: Unextracted wells containing either latex or acrylic paint inhibited growth of both *Fusarium* and *Aspergillus*. Extracted wells containing either latex or acrylic paint allowed growth of both *Fusarium* and *Aspergillus*. The calculated MIC for *Fusarium* in peptide activity control experiments was 15.62 µg/ml. For *Aspergillus* the calculated MIC was 61.4 µg/ml.

For extracted acrylic-coated plates the following results were obtained. Controls as stated in above. For *Fusarium* with dried peptide, inhibition was seen at 1000 and 500 pg/ml after 5 days. Spores exposed to liquid peptide added to dry paint wells were inhibited at 1000, 500 and 250 µg/ml after 4 days, and 1000 and 500 µg/ml after 5 days. For *Aspergillus* with dried peptide, inhibition was seen at 1000 µg/ml after 5 days. Spores exposed to liquid peptide added to dry paint wells were inhibited at 1000 and 500 µg/ml after 5 days.

For extracted latex-coated plates the following results were obtained. Controls as stated above. For *Fusarium* with dried peptide, inhibition was seen at 1000 µg/ml after 5 days. Spores exposed to liquid peptide added to dry paint wells were inhibited at 1000 µg/ml after 5 days. For *Aspergillus* with dried peptide, inhibition was seen at 1000 µg/ml after 5 days. Spores exposed to liquid peptide added to dry paint wells were inhibited at 1000 µg/ml after 5 days.

Example 25: This Example describes combinations of an antibiological proteinaceous composition and an antibiological agent such as a standard preservative.

A material formulation (e.g., a paint composition) comprising one or more conventional antibiological substance(s) (e.g., a preservative, an antimicrobial agent, an antifungal substance) may be modified by addition of one or more of the antibiological proteinaceous composition(s) (e.g., an antifungal peptide) described herein. For example, combining a non-peptidic antibiological agent (e.g., antifungal agent) with one or more antibiological proteinaceous molecule(s) (e.g., an antifungal peptide) may provide antifungal activity over and above that seen with either the proteinaceous or the non-peptidic agent alone. The expected additive inhibitory activity of the combination is calculated by summing the inhibition levels of each component alone. The combination is then assayed on the assay organism to derive an observed additive inhibition. If the observed additive inhibition is greater than that of the expected additive inhibition, synergy is exhibited. For example, a synergistic combination of a proteinaceous molecule (e.g., an aliquot of a peptide library, a peptide) comprising at least one antibiological proteinaceous molecule (e.g., an antifungal peptide) occurs when two or more cell (e.g., fungal cell) growth-inhibitory substances distinct from the proteinaceous molecule are observed to be more inhibitory to the growth of an assay organism than the sum of the inhibitory activities of the individual components alone.

An example of an assay method for determining additive or synergistic combinations comprises first creating a synthetic peptide combinatorial library. Each aliquot of the library represents an equimolar mixture of peptides in which at least the two C-terminal amino acid residues are known. Using the testing methods described in one or more of U.S. Pat. Nos. 6,020,312, 5,885,782, and 5,602,097 it is possible to determine for each such aliquot of the synthetic peptide combinatorial library, a precisely calculated concentration at which it will inhibit an assayed fungus in a coating. Next, the aliquot of the synthetic peptide combinatorial library is mixed with at least one non-peptide antifungal compound to create an assay mixture. As with the peptide component of the mixture, the baseline ability of the non-peptide antifungal substance to inhibit the test fungus is determined initially. Next, the assay fungus is contacted with the assay mixture, and the inhibition of growth of the assay organism is measured as compared to at least one untreated control. More controls are desirable, such as a control for each individual component of the mixture. Similarly, where there are more than two components being tested, the number of controls to be used must be increased in a manner in the art of growth inhibition assays. From the separate assay results for the peptidic and the non-peptidic agent(s) the expected additive effect on inhibition of growth is determined using standard techniques. After the growth inhibition assay(s) are complete for the combination of peptidic and the non-peptidic agent(s), the actual or observed effect on the inhibition of growth is determined. The expected additive effect and the observed effect are then compared to determine whether a synergistic inhibition of growth of the test fungus has occurred. The methods used to detect synergy may utilize non-peptide antimicrobial agents in combination with the inhibitory peptides described herein.

Example 26: This Example describes coating a surface to inhibit fungus infestation and growth.

When anchorage, food and moisture are available, a cell such as a microorganism (e.g., a fungus) are able to survive where temperatures permit. Susceptible surfaces may include a porous material such as a stone, a brick, a wall board (e.g., a sheetrock) and/or a ceiling tile; a semi-porous material, including a concrete, an unglazed tile, a stucco, a grout, a painted surface, a roofing tile, a shingle, a painted and/or a treated wood and/or a textile; or a combination thereof. Any type of indoor object, outdoor object, structure and/or material that may be capable of providing anchorage, food and moisture to fungal cells is potentially vulnerable to infestation with mold, mildew or other fungus. Moisture generally appears due to condensation on surfaces that are at or below the dew point for a given relative humidity.

To inhibit or prevent fungus infestation and growth, one or more antifungal peptidic agents described herein (e.g., approximately 250-1000 mg/L of the hexapeptide of SEQ ID No. 41), may be dissolved or suspended in water and applied by simply brushing and/or spraying the solution onto a pre-painted surface such as an exterior wall that may be susceptible to mold infestation. Conventional techniques for applying or transferring a coating material to a surface in the art are suitable for applying the antifungal peptide composition. The selected peptide(s) have activity for inhibiting or preventing the growth of one or more target fungi. The applied peptide solution is then dried on the painted surface, preferably by allowing it to dry under ambient conditions. If desired, drying can be facilitated with a stream of warm, dry air. Optionally, the application procedure may be repeated one or more times to increase the amount of antifungal peptide that is deposited per unit area of the surface. As a result of the treatment, when the treated surface is subsequently subjected to the target mold organisms or spores and growth promoting conditions comprising humidity above about typical indoor ambient humidity, presence of nutrients, and temperature above about typical indoor ambient temperature and not exceeding about 38° C., the ability of the surface to resistance fungal infestation and growth is enhanced compared to its pre-painted condition before application of the antifungal peptide.

A simple spray-coated surface may provide sufficient durability for certain applications such as surfaces that are exposed to weathering, though longer-term protection may be provided against adhesion and growth of mold by mixing one or more of the antifungal peptides with a base paint or other coating composition, which may be any suitable, commercially available product in the art. The base composition may be free of chemicals and other additives that are toxic to humans or animals, and/or that fail to comply with applicable environmental safety rules or guidelines. The typical components, additives and properties of conventional paints and coating materials, and film-forming techniques, of the art, described herein, and/or described in U.S. patent application Ser. No. 10/655,345 filed Sep. 4, 2003, U.S. patent application Ser. No. 10/792,516 filed Mar. 3, 2004, and U.S. patent application Ser. No. 10/884,355 filed Jul. 2, 2004, may be used.

If additional, long-term protection against growth and adhesion of a mold, a mildew and/or a fungus is desired, the paint or other coating composition may include a barrier material that resists moisture penetration and also prevents or deters penetration and adhesion of the microorganisms and the airborne contaminants which serve as food for the growing organisms. Some typical water repellent components are an acrylic, a siliconate, a metal-stearate, a silane, a siloxane and/or a paraffinic wax. The user will preferably take additional steps to deter mold infestation include avoiding moisture from water damage, excessive humidity, water leaks, condensation, water infiltration and flooding, and taking reasonable steps to avoid buildup of organic matter on the treated surface.

Example 27: This Example describes a method of treating a fungus-infested surface.

In situations where existing fungal growth is present, the mold colonies and/or spores may be removed and/or substantially eliminated before application of one of an antifungal coating, it is expected that in some situations an antifungal compositions may be applied to existing mold infected surfaces. In this case, the composition, comprising one or more antifungal peptides, may inhibit, arrest the growth of, or substantially eradicate the mold. Early detection and treatment is highly preferred in order to minimize the associated discoloration or other deterioration of the underlying surface due to mold growth. The treatment procedure may comprise applying one or more coats of an antifungal peptide solution and/or a coating composition (e.g., a paint) as described herein.

Example 28: This Example describes an impregnating a porous substrate to inhibit cell (e.g., fungus) growth.

A porous and/or a semi-porous object and/or a material, such as a paper, wood, a fabric, a carpet, some types of stone, and many other items that are employed indoors and/or outdoors, have internal surface areas that can be susceptible to infestation e.g., mold infestation) and are very difficult to treat effectively by conventional methods. A surface treatment (e.g., a coating material, a non-coating surface treatment, a liquid component comprising an antibiological agent) comprising one or more antibiological agents (e.g., an antifungal peptide, an enzyme) may be used to impregnate such an object, as described herein. The liquidity of the composition may be such that it is capable of penetrating into the pores of the object. In this way, an effective amount of the antibiological agent (e.g., an antifungal peptide) becomes deposited on the internal surfaces as well as the exterior ones. Circumstances requiring treatment of a porous surface may benefit from using a relatively thin material (e.g., a thin surface treatment, a thin coating material, a liquid component comprising an antibiological agent) rather than a thick, pigmented paint, in order to facilitate penetration of the pores.

Example 29: This Example describes a coating a fruit or grain storage vessel to inhibit mold.

The interior wall(s) of a grain silo, a fruit storage, a grain storage, and/or a transportation tank may be coated with a peptidic antifungal material described herein (e.g., a peptidic antifungal composition, a coating comprising an antifungal peptide) to deter the attachment and growth of mold organisms inside the container. By selecting antifungal peptides that target specific organisms, and that may be non-toxic to a human and/or an animal, mold contamination of a wide variety of agricultural products may be deterred.

Example 30: This Example is directed to the assay for active phosphoric triester hydrolase expression in cells. Routine analysis of parathion hydrolysis in whole cells is accomplished by suspending cultures in 10 milli-Molar ("mM") Tris hydrochloride at pH 8.0 comprising 1.0 mM sodium EDTA ("TE buffer"). Cell-free extracts are assayed using sonicated extracts in 0.5 milliLiters ("ml") of TE buffer. The suspended cells or cell extracts are incubated with 10 microLiters ("µl") of substrate, specifically 100 µg of parathion in 10% methanol, and p-nitrophenol production is monitored at a wavelength of 400 nm. To induce the opd gene under lac control, 1.0 µmol of isopropyl-β-D-thiogalactopyranoside (Sigma) per ml is added to the culture media.

Example 31: This Example is directed to the preparation of an enzyme powder. In a typical preparation, a single colony of bacteria that expresses the opd gene is selected and cultured in a rich media. After growth to saturation, the cells are concentrated by centrifugation at 7000 rotations per minute ("rpm") for 10 minutes for example. The cell pellet is then resuspended in a volatile organic solvent such as acetone one or two times to desiccate the cells and to remove a substantial portion of the water contained in the cell pellet. The pellet may then be ground or milled to a powder form. The powder may be frozen or stored at ambient conditions for future use, or may be added immediately to a surface coating formulation. Additionally, the powder may be freeze dried, combined with a cryoprotectant (e.g., cryopreservative), or a combination thereof.

Example 32: This Example is directed to the formation of an OPH powder and latex coating. In an example of use of the powder prepared as described in Example 10, 3 mg of the milled powder was added to 3 ml of 50% glycerol. The suspension was then added to 100 ml of Olympic® premium interior flat latex paint (Olympic®, One PPG Place, Pittsburgh, PA 15272 USA). This paint with biomolecule composition was then used to demonstrate the activity of the paint biomolecule composition in hydrolysis of a pesticide or a nerve agent analog.

Example 33: This Example demonstrates, in a first set of assays, a paint product as prepared in Example 32 was applied to a hard, metal surface. The surface used in the present Example was a non-galvanized steel surface that was cleaned through being degreased, and pretreated with a primer coat. A control surface was painted with the identical paint with no biomolecule composition. Paraoxon, an organophosphorus nerve gas analog was used as an indicator of enzyme activity. Paraoxon, which is colorless, is degraded to form p-nitrophenol, which is yellow in color, plus diethyl phosphate, thus giving a visual indication of enzyme activity. In multiple assays, the surface with control paint remained white, indicating no production of p-nitrophenol, and the surface painted with the paint and biomolecule composition turned yellow within minutes, indicating an active OPH enzyme in the paint. This demonstration has shown that the surface remains active for more than 65 days, which was the maximum duration of the protocol.

In a further demonstration, the surfaces were treated as described above and each surface was then treated with paraoxon, an OP insecticide. Approximately 100 flies were then placed on each surface under a plastic cover. In each procedure, within three hours, virtually all the flies on the control surface with no paint biomolecule composition were killed by the paraoxon. In contrast, approximately 5% of the flies on the enzyme comprising surface had died.

In a demonstration of enzyme stability in the paint, a series of wood dowels were dipped into the paint comprising OPH enzyme composition. The dowels were then placed in tubes containing paraoxon to indicate enzyme activity as described above. In each case, a positive yellow color was seen except in those dowels painted with no biomolecule composition as controls. The control solution remained clear in every case.

To demonstrate the shelf life of both the dry biomolecule composition and the paint with biomolecule composition, the biomolecule composition was aged from 0 to 20 days prior to mixing in the paint. The mixed paint and biomolecule composition was then also aged from 0 to 20 prior to painting individual dowels. The enzyme composition retained strong activity after 20 days aging prior to being mixed in the paint, and for 20 days after mixing the maximum time used in the assay.

Example 34: This Example relates to a NATO demonstration of Soman detoxification using an OPH coated surface. At the Sep. 22, 2002, meeting of the NATO Army Armaments Group in Cazaux, France, painted metal surfaces were assayed with soman using standard NATO procedures and protocols. For the assays, 10 cm×10 cm metal plates primed with standard NATO specification paints were coated with paint containing OPH. Control plates plus two different versions of the OPH enzyme composition differing in soman detoxification specificity were used. These surfaces were allowed to dry for several hours at room temperature and then assayed according to standard NATO assay protocol (described below), modified to account for the character of the surfaces treated with a paint comprising OPH.

The form of OPH in the biomolecule composition contains both the changes of the previously described H254R mutant and the H257L mutant, and is corresponding designated the "H254R, H257L mutant." The H254R, H257L mutant demonstrates a several-fold enhanced rates of R VX catalysis relative to either the H254R mutant or the H257L mutant, and a 20-fold enhancement of activity relative to wild-type OPH. This version of the OPH biomolecule composition has been assayed in paints treated with soman or R—VX, and are described below.

Following standard protocols, OPD painted surfaces were uniformly contaminated with an isopropanol solution containing the chemical warfare agent soman. The concentration of soman on each contaminated surface was 1.0 mg/cm2. The contaminated plates were maintained at or slightly above room temperature (>20° C.) without any forced air-flow for various periods of time. A zero-time, 15 minutes, 30 minutes, and 45 minutes sample was taken for each control and biomolecule composition-containing plate series. To terminate the reaction and isolate residual soman on the plate surface, each plate was submerged in a container of isopropanol at the end-point and placed on a shaker to thoroughly extract any residual nerve agent. The solubilized portions were then quantified for soman. These assays showed that both the forms of OPH biomolecule composition were effective in detoxifying soman on metal surfaces. The two different OPH biomolecule compositions assayed detoxified the soman at levels over 65% and 77% after 45 minutes (Nato Army Armaments Group Project Group 31 on Non-Corrosive, Biotechnology-Based Decontaminants for CBW Agents, 2002). Additional assays with a CWA simulant indicated that had the NATO assay run for one to two hours, substantially all of the soman would have been detoxified.

Example 35: This Example relates to a demonstration of an OPH biomolecule composition at Aberdeen Proving Ground (SBCCOM) in Aberdeen, MD. In these assays, a primed wooden stick was coated with paint containing OPH biomolecule composition. The painted sticks used were 2 millimeter ("mm") in diameter×15 mm in length. By estimating that the paint layer was 0.25 mm thick, the resulting surface area was approximately 125 mm2. After coating the stick with paint containing OPH biomolecule composition and allowing the paint to dry, the coated stick was inserted into a microfuge tube containing 100 ml of 3.24 mM Russian VX agent in saline and 900 ml phosphate buffer at pH 8.3. The tubes containing R—VX and the painted sticks were allowed to sit overnight in a hood at room temperature. Appropriate controls were run simultaneously.

The following morning, the contents of the microfuge tubes were assayed for free thiols by the Ellman method. 10 mM DTNB [molecular weight ("MW") 396.3] was prepared in 10 mM phosphate buffer at pH 8.0 for use as the indicator of enzyme activity. OPH paint's cleavage of R VX releases a free thiol that reacts with DNTP to produce a colored product detectable spectrophotometrically at 405 nm. Ten ml of the microfuge tube contents, 100 ml DTNB solution and 890 ml phosphate buffer at pH 8.3 were read for thiol release at 405 nm using a Varian Carey 300 Spectrophotometer. The spectrophotometer was blanked with an unpainted stick control reaction. The molar equivalent of the R—VX hydrolyzed was determined using an extinction coefficient of 14,150 and the Beer-Lambert equation to calculate the product concentration. Results indicated that overnight exposure to OPH paint coated sticks resulted in decontamination of Russian VX from 32.4 mM in the original tube to less than 1 mM.

Example 36: This Example demonstrates the use of a coating comprising a lipase, and the enzymatic activity conferred to the coating comprising the lipase by detection of triglyceride breakdown through monitoring pH.

The equipment/reagents were as follows: pH meter; shaker; Lightin Lab Master paint mixer; phenol red (Sigma-Aldrich; Catalog #—P3532), 1.128 mM in distilled water, pH=7.0; lipase (Sigma-Aldrich; Catalog #—L3126), Sherwin Williams acrylic latex paint; sodium hydroxide; hydrochloric acid; isopropyl alcohol; and vegetable oil. The solutions used in measuring pH changes included a phenol red stock solution, 1.128 mM in distilled water, pH=7.0.

The procedure for preparation of the surfaces coated with paint either comprising lipase or not (control paint) was as follows: first, 100 mg/ml, 50 mg/ml, and 0 mg/ml lipase solutions in paint were made; second, solutions were mixed for 3 minutes; third, paints were spread to 8 mils thickness and allowed to dry for 96 hours, and fourth, 1 cm×4 cm coupons were cut from the paint film.

The pre-experimental set-up included the following steps: first, a 1 cm×4 cm piece of film of each lipase concentration was placed in a 15 ml eppendorf tube in triplicate; second, 10 ml ddH$_2$O was added inside the eppendorf tube; third, tubes on shaker were set for 24 hours, and fourth, after 24 hours, the water from the tube was removed and the film placed in a new 15 ml eppendorf tube. For measuring the control paint (no lipase) samples, the following steps were conducted: first, 5 ml of phenol red stock solution was added into a 15 ml eppendorf tube; second, 5 ml of phenol red stock solution with 100 µl vegetable oil was added into a 15 ml eppendorf tube; third, a 1 cm×4 cm piece of paint film (no lipase) from both the washed and non-washed films was added into a 15 ml eppendorf tube in triplicate; fourth, 5 ml of the phenol red stock solution was added into the 15 ml eppendorf tubes along with 100 µl vegetable oil; and fifth, the tubes were set on a shaker for 24 hours. To measure the paint samples comprising lipase: first, a 1 cm×4 cm piece of the 50 mg/ml paint film, both washed and unwashed, was added into a 15 ml eppendorf tube; second, a 1 cm×4 cm piece of the 100 mg/ml paint film, both washed and unwashed, was added into a 15 ml eppendorf tube; third, 5 ml of the Phenol Red stock solution was added into each tube along with 100 µl vegetable oil; and fourth, the tubes were set on shaker for 24 hours. For both the control paint and lipase paint samples, the pH of each sample was recorded at 24 hours.

Phenol Red comprises a pH indicator that is yellow in color below pH 6.8 and red in color above pH 8.2. Setting the pH at 7.0 right before the 6.8 end point would demonstrate a color change if the solution becomes slightly more acidic. If in fact the triglycerides are being broken down into free fatty acids by lipase, the pH of the solution should go down, thus exhibiting a color change. In the presence of a paint film with no lipase, the pH of the phenol red solution rose from 7 to almost 9. The pH of the tubes with lipase in them were both substantially lower than the control tubes, demonstrating that the triglycerides were broken down into fatty acids, decreasing the pH of the solutions. All lipase impregnated coatings demonstrated catalytic activity. Washing the coating films with water decreased their effectiveness but the films were still active. Further, vegetable oil was spread over panels that were either control (no lipase) or lipase impregnated. After a day, the lipase impregnated panels were dry while the control panels were still visibly full of oil. It is also contemplated that greater loads of lipase, such as, for example, 200 mg/ml, 100 mg/ml, and 50 mg/ml lipase, may be used.

TABLE 61

| Sample | No washing cycle pH at 24 hr | 24 hr washing cycle pH at 24 hr |
|---|---|---|
| Control | 8.87 + 0.01 | 8.78 + 0.04 |
| 50 mg/ml Lipase | 6.80 + 0.05 | 7.25 + 0.21 |
| 100 mg/ml Lipase | 6.70 + 0.05 | 6.63 + 0.07 |

TABLE 62 pH Buffer

| Sample | pH |
|---|---|
| Phenol Red | 7.07 |
| Phenol Red w/oil | 7.08 |

Example 37: This Example demonstrates the use of a coating comprising a lipase, and the enzymatic activity conferred to the coating comprising the lipase by detection of the hydrolysis of 4-nitrophenyl palmitate through monitoring pH.

The equipment/reagents were as follows: 40 mM CHES Buffer; bring to pH=9.0 with NaOH; 4-nitrophenyl palmitate (Sigma Product #N2752), 14.5 mM solution in isopropyl alcohol; 4-nitrophenyl acetate; lipase from porcine pancreas (Sigma Product #L3126); Sherwin-Williams acrylic latex paint; 2 mL microtubes; paint spreader (1-8 mils); polypropylene blocks; Lightnin Labmaster Mixer; rotator shaker; pipettes and pipetteman; and centrifuge.

The following paint formulations were evaluated: Sherwin-Williams Acrylic Latex Control (no additive), and Sherwin-Williams Acrylic Latex with 100 mg/mL lipase. The paints were mixed in a plastic 50 ml eppendorf tube with a glass stirring rod for three minutes followed by a paint mixer for three minutes. The paints were spread with a mils spreader to 8 mils thickness onto polypropylene surfaces and were allowed to dry a minimum of 72 hours prior to assay. Coupons were generated as free films from the polypropylene surfaces.

The procedure for the preparation of the blank (control) samples was: adding 500ul 40 mM CHES, 400ul ddH$_2$O, and 100ul 14.5 mM p-nitrophenyl palmitate to a 2 ml microtube. The procedure for preparation of the experimental (comprising lipase) samples was: cutting the following free film sizes for the 100 mg/ml lipase films—1 cm×3 cm, 1 cm×2 cm, and 1 cm×1 cm, and for the control film (no lipase)—1 cm×3 cm; placing the free films into labeled 2 mL microtubes, where each of the coupon sizes were tested in triplicate; adding 500ul 40 mM CHES to each microtube; adding 400ul ddH$_2$O to each microtube; adding 100ul 14.5 mM p-nitrophenyl palmitate to each microtube; and setting microtubes on a shaker. At each time point, tubes were placed in a centrifuge for 5 minutes at 13,000 RPM. A 100ul was removed from each tube and the absorbance of the reaction product p-nitrophenol read at 405 nm in a 96-well plate.

The tables below shows the activity of each sample. The measured rates of reaction for the free films without any lipase were essentially baseline, exhibiting no destruction of the 4-nitrophenol palmitate. All lipase impregnated coatings demonstrated catalytic activity. The specific activity per centimeter basis was consistent within the different sample sizes.

TABLE 63A

Lipase Activity in Sherwin-Williams Latex pNP Absorbance at 405 nm

| Time (min) | 1 cm × 3 cm Lipase | | | 1 cm × 2 cm Lipase | | | 1 cm × 1 cm Lipase | | |
|---|---|---|---|---|---|---|---|---|---|
| 1 | 0.2314 | 0.3159 | 0.2781 | 0.3146 | 0.4118 | 0.3865 | 0.4265 | 0.3141 | 0.2917 |
| 30 | 0.2511 | 0.3337 | 0.2615 | 0.2850 | 0.3465 | 0.3523 | 0.3849 | 0.2723 | 0.3136 |
| 60 | 0.2625 | 0.3365 | 0.2794 | 0.2984 | 0.3451 | 0.3494 | 0.3833 | 0.2826 | 0.2873 |
| 120 | 0.2674 | 0.3351 | 0.3180 | 0.2960 | 0.3342 | 0.3361 | 0.3680 | 0.2867 | 0.2657 |
| 210 | 0.2949 | 0.3502 | 0.3057 | 0.2946 | 0.3306 | 0.3304 | 0.3527 | 0.2792 | 0.2329 |
| 1200 | 0.4051 | 0.5281 | 0.4568 | 0.3361 | 0.3308 | 0.3374 | 0.3016 | 0.3066 | 0.2159 |

TABLE 63B

Lipase Activity in Sherwin-Williams Latex pNP Absorbance at 405 nm

| Time (min) | 1 cm × 3 cm Control | | | Blank | | |
|---|---|---|---|---|---|---|
| 1 | 0.3718 | 0.4458 | 0.2327 | 0.3154 | 0.4142 | 0.3773 |
| 30 | 0.3119 | 0.3631 | 0.2172 | 0.2757 | 0.3442 | 0.3069 |
| 60 | 0.2852 | 0.3380 | 0.2025 | 0.2674 | 0.3307 | 0.2767 |
| 120 | 0.2473 | 0.2572 | 0.1707 | 0.2748 | 0.3259 | 0.2780 |
| 210 | 0.1707 | 0.1996 | 0.1542 | 0.2621 | 0.3007 | 0.2616 |
| 1200 | 0.0541 | 0.0552 | 0.0590 | 0.2374 | 0.2640 | 0.2264 |

TABLE 64

Lipase Average Activity in Sherwin-Williams Latex pNP Absorbance at 405 nm

| Time (min) | Lipase 1 cm × 3 cm | Control 1 cm × 3 cm | Blank |
|---|---|---|---|
| 1 | 0.2751 | 0.3501 | 0.3690 |
| 30 | 0.2821 | 0.2974 | 0.3089 |
| 60 | 0.2928 | 0.2752 | 0.2916 |
| 120 | 0.3068 | 0.2251 | 0.2929 |
| 210 | 0.3169 | 0.1748 | 0.2748 |
| 1200 | 0.4633 | 0.0561 | 0.2426 |

TABLE 65A

Lipase Activity in Sherwin-Williams Latex pNP Absorbance at 405 nm

| Time (min) | 1 cm × 3 cm Lipase | | | 1 cm × 2 cm Lipase | | | 1 cm × 1 cm Lipase | | |
|---|---|---|---|---|---|---|---|---|---|
| 0 | | | | | | | | | |
| 30 | 0.1685 | 0.2200 | 0.1654 | 0.2135 | 0.1494 | 0.1457 | 0.1271 | 0.0711 | 0.1389 |
| 60 | 0.2287 | 0.1822 | 0.2027 | 0.1570 | 0.2008 | 0.1554 | 0.1500 | 0.1284 | 0.0758 |
| 120 | 0.2044 | 0.2208 | 0.2487 | 0.1694 | 0.1926 | 0.2007 | 0.1126 | 0.0771 | 0.0859 |
| 225 | 0.2521 | 0.2621 | 0.2620 | 0.2707 | 0.1920 | 0.1746 | 0.1779 | 0.1654 | 0.1611 |
| 1200 | 0.3917 | 0.3579 | 0.3735 | 0.2315 | 0.2607 | 0.2682 | 0.1335 | 0.1702 | 0.1300 |

TABLE 65B

Lipase Activity in Sherwin-Williams Latex pNP Absorbance at 405 nm

| Time (min) | 1 cm × 3 cm Control | | | Blank | | |
|---|---|---|---|---|---|---|
| 0 | | | | 0.1114 | 0.0981 | 0.1269 |
| 30 | 0.1551 | 0.1628 | 0.1173 | 0.1410 | 0.1022 | 0.1204 |
| 60 | 0.1198 | 0.0987 | 0.1029 | 0.0974 | 0.1278 | 0.1119 |
| 120 | 0.1365 | 0.1082 | 0.1192 | 0.1487 | 0.1284 | 0.0995 |
| 225 | 0.0680 | 0.0688 | 0.0602 | 0.1129 | 0.0788 | 0.1231 |
| 1200 | 0.0514 | 0.0521 | 0.0599 | 0.1008 | 0.1106 | 0.0626 |

TABLE 66

Lipase Activity in Sherwin-Williams Latex pNP Average Absorbance at 405 nm and Standard Deviations

| | Average | | | | | SD | | | | |
|---|---|---|---|---|---|---|---|---|---|---|
| | Lipase | | | Control | | Lipase | | | Control | |
| Time (min) | 1 cm × 3 cm | 1 cm × 2 cm | 1 cm × 1 cm | 1 cm × 3 cm | Blank | 1 cm × 3 cm | 1 cm × 2 cm | 1 cm × 1 cm | 1 cm × 3 cm | Blank |
| 0 | 1.1121 | 0.1121 | 0.1121 | 0.1121 | 0.1121 | 0.0144 | 0.0144 | 0.0144 | 0.0144 | 0.0144 |
| 30 | 0.1846 | 0.1695 | 0.1124 | 0.1451 | 0.1212 | 0.0307 | 0.0381 | 0.0362 | 0.0244 | 0.0194 |
| 60 | 0.2045 | 0.1711 | 0.1181 | 0.1071 | 0.1124 | 0.0233 | 0.0258 | 0.0382 | 0.0112 | 0.0152 |
| 120 | 0.2246 | 0.1876 | 0.0919 | 0.1213 | 0.1255 | 0.0224 | 0.0162 | 0.0185 | 0.0143 | 0.0247 |
| 225 | 0.2587 | 0.2124 | 0.1681 | 0.0657 | 0.1049 | 0.0057 | 0.0512 | 0.0087 | 0.0048 | 0.0232 |
| 1200 | 0.3744 | 0.2535 | 0.1446 | 0.0545 | 0.0913 | 0.0169 | 0.0194 | 0.0223 | 0.0047 | 0.0254 |

TABLE 67A

Lipase Activity in Sherwin-Williams Latex pNP Absorbance at 405 nm and Initial Slopes

| Time (min) | Lipase 1 cm × 3 cm | | |
|---|---|---|---|
| 0 | 0.1121 | 0.1121 | 0.1121 |
| 225 | 0.2521 | 0.2621 | 0.2620 |
| Slope (ΔAbs/Δmin) | 0.0006 | 0.0007 | 0.0007 |
| U(umol/min) | 0.1362 | 0.1459 | 0.1458 |
| U/cm² | 0.0454 | 0.0486 | 0.0486 |

TABLE 67B

Lipase Activity in Sherwin-Williams Latex pNP Absorbance at 405 nm and Initial Slopes

| Time (min) | Lipase | | | | | |
|---|---|---|---|---|---|---|
| | 1 cm × 2 cm | | | 1 cm × 1 cm | | |
| 0 | 0.1121 | 0.1121 | 0.1121 | 0.1121 | 0.1121 | 0.1121 |
| 225 | 0.2707 | 0.1920 | 0.1746 | 0.1779 | 0.1654 | 0.1611 |

TABLE 67B-continued

Lipase Activity in Sherwin-Williams Latex pNP Absorbance at 405 nm and Initial Slopes

| Time (min) | Lipase | | | | | |
|---|---|---|---|---|---|---|
| | 1 cm × 2 cm | | | 1 cm × 1 cm | | |
| Slope (ΔAbs/Δmin) | 0.0007 | 0.0004 | 0.0003 | 0.0003 | 0.0002 | 0.0002 |
| U(umol/min) | 0.1543 | 0.0777 | 0.0608 | 0.0640 | 0.0519 | 0.0477 |
| U/cm² | 0.0772 | 0.0389 | 0.0304 | 0.0640 | 0.0519 | 0.0477 |

TABLE 67C

Lipase Activity in Sherwin-Williams Latex pNP Absorbance at 405 nm and Initial Slopes

| Time (min) | 1 cm × 3 cm Control | | | Blank | | |
|---|---|---|---|---|---|---|
| 0 | 0.1121 | 0.1121 | 0.1121 | 0.1121 | 0.1121 | 0.1121 |
| 225 | 0.0680 | 0.0688 | 0.0602 | 0.1129 | 0.0788 | 0.1231 |
| Slope (ΔAbs/Δmin) | −0.0002 | −0.0002 | −0.0002 | 0.0000 | −0.0001 | 0.0000 |
| U(umol/min) | −0.0429 | −0.0421 | −0.0505 | 0.0008 | −0.0324 | 0.0107 |
| U/cm² | | | | | | |

TABLE 68

| Sample Activity | | |
|---|---|---|
| Sample | U (μmol/min) | U (μmol/min)/cm² |
| 1 cm × 3 cm; with lipase | 0.1427 ± 0.0056 | 0.0476 ± 0.0019 |
| 1 cm × 2 cm; with lipase | 0.0976 ± 0.0498 | 0.0488 ± 0.0249 |
| 1 cm × 1 cm; with lipase | 0.0545 ± 0.0085 | 0.0545 ± 0.0085 |
| 1 cm × 3 cm; no lipase | −0.0452 ± 0.0046 | |
| Blank | −0.0070 ± 0.0226 | |

The reaction containing the 1 cm×3 cm free-film with lipase went to 50% completion. This is due to the nature of the insolubility of 4-nitrophenyl palmitate. Particles of 4-nitrophenyl palmitate were present in all microtubes due to precipitation when it comes in contacts with water. The 1 cm×1 cm free-film was likely too small a film size, although the microtube was visually yellow, the data did not support the fact that the reaction did in fact take place. 4-nitrophenyl palmitate was originally used, but it self-hydrolyzed in water. Further, vegetable oil was spread over panels that were either control (no lipase) or lipase impregnated. After a day, the lipase impregnated panels were dry while the control panels were still visibly full of oil. It is also contemplated that greater loads of lipase, such as, for example, 200 mg/ml, 100 mg/ml, and 50 mg/ml lipase, may be used.

Example 38: This Example demonstrates a lipase assay determining the efficacy of lipase in a coating (e.g., paint). Films of Sherwin-Williams Acrylic Latex comprising lipase were assayed 7 months after they were prepared. Materials used are shown in the table below.

TABLE 69

| Materials |
| --- |
| 200 mM TRIS Buffer (Sigma Product # T1503); brought to pH = 7.1 with HCl |
| 4-nitrophenyl acetate (Sigma Product # N8130) 14.5 mM solution in isopropyl alcohol |
| Lipase from porcine pancreas (Sigma Product # L3126) |
| 2 mL microtubes |
| Pipette |
| Pipette Tips |
| Plate Reader |
| 96-well Plate |

The reaction procedure included: cutting 1 cm×3 cm free film coupon sizes; placing individual coupons into labeled 2 mL microtubes, with each of the coupon samples tested in triplicate; adding 750 μl 200 mM TRIS to each microtube; adding 600ul ddH$_2$O to each microtube; adding 150ul 14.5 mM p-nitrophenyl acetate to each microtube; preparing control samples that had 750ul 200 mM TRIS, 600ul ddH$_2$O, and 150ul 14.5 mM p-nitrophenyl acetate; taking out at each desired time point, 100ul and reading the absorbance at 405 nm in a 96-well plate; and plotting absorbance vs. time to calculate the slope. Data and calculate values are shown below, demonstrating lipase activity in a cured coating's film 7 months after preparation.

TABLE 70

Absorbance at 405 nm Data

| Time (min) | Blank | | | Control | | | Lipase | | |
| --- | --- | --- | --- | --- | --- | --- | --- | --- | --- |
| 0 | 0.0423 | 0.0423 | 0.0423 | 0.0423 | 0.0423 | 0.0423 | 0.0423 | | |
| 15 | 0.0477 | 0.0475 | 0.0487 | 0.0495 | 0.1760 | 0.1933 | 0.1719 | | |
| 30 | 0.0562 | 0.0556 | 0.0550 | 0.0572 | 0.3353 | 0.3631 | 0.3137 | | |
| 45 | 0.0587 | 0.0598 | 0.0616 | 0.0624 | 0.4642 | 0.5084 | 0.4486 | | |
| 60 | 0.0643 | 0.0673 | 0.0684 | 0.0691 | 0.6008 | 0.6069 | 0.5565 | | |
| 90 | 0.0751 | 0.0762 | 0.0785 | 0.0783 | 0.7181 | 0.7896 | 0.7591 | | |
| Slope | 0.0004 | 0.0004 | 0.0004 | 0.0005 | 0.0095 | 0.0105 | 0.0091 | | |

TABLE 71

Average pNP Absorbance at 405 nm

| Time | Blank | Control Avg | Lipase Avg | Control SD | Lipase SD |
| --- | --- | --- | --- | --- | --- |
| 0 | 0.0423 | 0.0423 | 0.0423 | 0.0000 | 0.0000 |
| 15 | 0.0477 | 0.0486 | 0.1804 | 0.0010 | 0.0114 |
| 30 | 0.0562 | 0.0559 | 0.3374 | 0.0011 | 0.0248 |
| 45 | 0.0587 | 0.0613 | 0.4737 | 0.0013 | 0.0310 |
| 60 | 0.0643 | 0.0683 | 0.5881 | 0.0009 | 0.0275 |
| 90 | 0.0751 | 0.0777 | 0.7556 | 0.0013 | 0.0359 |

TABLE 72

Activity Data

| Sample | Slope (A/min) | U (umol/min) | U Avg | U SD |
| --- | --- | --- | --- | --- |
| Blank | 0.0004 | 0.0842 | 0.08 | NA |
| Control | 0.0004 | 0.0884 | 0.09 | 0.01 |
|  | 0.0004 | 0.0937 |  |  |
|  | 0.0005 | 0.0992 |  |  |
| Lipase (100 mg/ml wet) | 0.0095 | 2.0796 | 2.12 | 0.15 |
|  | 0.0105 | 2.2884 |  |  |
|  | 0.0091 | 1.9857 |  |  |

TABLE 73

Absorbance vs. Time Slope

| Sample | U (μmol/min) |
| --- | --- |
| Blank | 0.08 + 0.00 |
| Control | 0.09 + 0.01 |
| Lipase | 2.12 + 0.15 |

Example 39: This Example demonstrates lipase activity in a Glidden alkyd/oil solvent based coating. The materials used are shown in the Table below.

TABLE 74

| Materials |
| --- |
| 200 mM TRIS Buffer (Sigma Product # T1503); brought to pH = 7.1 with HCl |
| 4-nitrophenyl acetate (Sigma Product # N8130); 14.5 mM solution in isopropyl alcohol |
| Lipase from porcine pancreas (Sigma Product # L3126) |
| 2 mL microtubes |
| Pipette |
| Pipette Tips |
| Plate Reader |
| 96-well Plate |

The assay procedure included: cutting appropriate coupon sizes; placing individual coupons into labeled 2 mL microtubes, with each of the coupon sizes are tested in triplicate; adding 750ul 200 mM TRIS to each microtube; adding 600ul ddH$_2$O to each microtube; adding 150ul 14.5 mM p-nitrophenyl acetate to each microtube; preparing control samples (no films) to have 750ul 200 mM TRIS, 600ul ddH$_2$O, and 150ul 14.5 mM p-nitrophenyl acetate; removing at each desired time point, 100ul and reading the absorbance at 405 nm in a 96-well plate; and plotting absorbance vs. time to calculate the initial rate slope.

TABLE 75A

Absorbance at 405 nm

| Time | Blank | | | 3 cm × 1 cm Control | | |
|---|---|---|---|---|---|---|
| 0 | 0.04430 | 0.04260 | 0.04420 | 0.04430 | 0.04260 | 0.04420 |
| 15 | 0.05450 | 0.04840 | 0.04940 | 0.05290 | 0.05300 | 0.04810 |
| 30 | 0.05520 | 0.05400 | 0.05520 | 0.05530 | 0.05720 | 0.05160 |
| 60 | 0.06710 | 0.06520 | 0.06730 | 0.06180 | 0.06230 | 0.05970 |
| 120 | 0.07800 | 0.07690 | 0.07810 | 0.06770 | 0.06820 | 0.07120 |
| Slope | 0.00027 | 0.00029 | 0.00029 | 0.00018 | 0.00019 | 0.00023 |

TABLE 75B

Absorbance at 405 nm

| Time | 3 cm × 1 cm Lipase 200 g/gal | | | 3 cm × 1 cm Lipase 100 g/gal | | |
|---|---|---|---|---|---|---|
| 0 | 0.04430 | 0.04260 | 0.04420 | 0.04430 | 0.04260 | 0.04420 |
| 15 | 0.07050 | 0.11020 | 0.06940 | 0.05300 | 0.05260 | 0.05300 |
| 30 | 0.07970 | 0.11690 | 0.07850 | 0.06280 | 0.06780 | 0.06270 |
| 60 | 0.10290 | 0.12410 | 0.09510 | 0.09460 | 0.08930 | 0.08780 |
| 120 | 0.13500 | 0.15060 | 0.12870 | 0.10620 | 0.12110 | 0.11940 |
| Slope | 0.00071 | 0.00069 | 0.00065 | 0.00054 | 0.00066 | 0.00064 |

TABLE 76A

Absorbance Averages

| | Absorbance Average | | | |
|---|---|---|---|---|
| Time | Blank | Control | 200 g/gal | 100 g/gal |
| 0 | 0.04370 | 0.04370 | 0.04370 | 0.04370 |
| 15 | 0.05077 | 0.05133 | 0.08337 | 0.05287 |
| 30 | 0.05480 | 0.05470 | 0.09170 | 0.06443 |
| 60 | 0.06653 | 0.06127 | 0.10737 | 0.09057 |
| 120 | 0.07767 | 0.06903 | 0.13810 | 0.11557 |

TABLE 76B

Absorbance Average'sStandard Deviations

| | Absorbance Deviation | | | |
|---|---|---|---|---|
| Time | Blank | Control | 200 g/gal | 100 g/gal |
| 0 | 0.000954 | 0.000954 | 0.000954 | 0.000954 |
| 15 | 0.003272 | 0.002801 | 0.023245 | 0.000231 |
| 30 | 0.000693 | 0.002848 | 0.021832 | 0.002916 |
| 60 | 0.001159 | 0.00138 | 0.015007 | 0.003573 |
| 120 | 0.000666 | 0.001893 | 0.011274 | 0.008156 |

TABLE 77

Absorbance vs. Time Slope

| Sample | Slope (A/min) | U (umol/min) | U Average | U Deviation |
|---|---|---|---|---|
| Blank | 0.000267 | 0.0584 | 0.06 | 0.00 |
| | 0.000285 | 0.0624 | | |
| | 0.000285 | 0.0625 | | |
| Control 3cm² | 0.000177 | 0.0388 | 0.04 | 0.01 |
| | 0.000187 | 0.0410 | | |
| | 0.000226 | 0.0494 | | |
| 200 g/gal 3cm² | 0.000707 | 0.1548 | 0.15 | 0.01 |
| | 0.000687 | 0.1503 | | |
| | 0.000648 | 0.1418 | | |
| 100 g/gal 3cm² | 0.000540 | 0.1182 | 0.13 | 0.01 |
| | 0.000657 | 0.1437 | | |
| | 0.000639 | 0.1399 | | |

Example 40: To provide a description that is both concise and clear, various examples of ranges have been identified herein. Any range cited herein includes any and all subranges and specific values within the cited range, this example provides specific numeric values for use within any cited range that may be used for an integer, intermediate range(s), subrange(s), combinations of range(s) and individual value(s) within a cited range, including in the claims. Examples of specific values (e.g., %, kDa, ° F., μm, kg/L, Ku) that can be within a cited range include 0.000001, 0.000002, 0.000003, 0.000004, 0.000005, 0.000006, 0.000007, 0.000008, 0.000009, 0.00001, 0.00002, 0.00003, 0.00004, 0.00005, 0.00006, 0.00007, 0.00008, 0.00009, 0.0001, 0.0002, 0.0003, 0.0004, 0.0005, 0.0006, 0.0007, 0.0008, 0.0009, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.00, 2.01, 2.02, 2.03, 2.04, 2.05, 2.06, 2.07, 2.08, 2.09, 2.10, 2.11, 2.12, 2.13, 2.14, 2.15, 2.16, 2.17, 2.18, 2.19, 2.20, 2.21, 2.22, 2.23, 2.24, 2.25, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.10, 99.20, 99.30, 99.40, 99.50, 99.60, 99.70, 99.80, 99.90, 99.91, 99.92, 99.93, 99.94, 99.95, 99.96, 99.97, 99.98, 99.99, 99.999, 99.9999, 99.99999, 99.999999, 99.9999999, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 260, 270, 275, 280, 290, 300, 310, 320, 325, 330, 340, 350, 360, 370, 375, 380, 390, 400, 410, 420, 425, 430, 440, 450, 460, 470, 475, 480, 490, 500, 510, 520, 525, 530, 540, 550, 560, 570, 575, 580, 590, 600, 610, 620, 625, 630, 640, 650, 660, 670, 675, 680, 690, 700, 710, 720, 725, 730, 740, 750, 760, 770, 775, 780, 790, 800, 810, 820, 825, 830, 840, 850, 860, 870, 875, 880, 890, 900, 910, 920, 925, 930, 940, 950, 960, 970, 975, 980, 990, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, 1600, 1625, 1650, 1675, 1700, 1725, 1750, 1775, 1800, 1825, 1850, 1875, 1900, 1925, 1950, 1975, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5250, 5500, 5750, 6000, 6250, 6500, 6750, 7000, 7250, 7500, 7750, 8000, 8250, 8500, 8750, 9000, 9250, 9500, 9750, 10,000, 25,000, 50,000, 75,000, 100,000, 250, 000, 500,000, 1,000,000, or more. Additional examples of the use of this definition to specify sub-ranges are given herein. For example, a cited range of 25,000 to 100,000 would include specific values of 50,000 and/or 75,000, as well as sub-ranges such as 25,000 to 50,000, 25,000 to 75,000, 50,000 to 100,000, 50,000 to 75,000, and/or 75,000 to 100,000. In another example, the range 875 to 1200 would include values such as 910, 930, etc. as well as sub-ranges such as 940 to 950, 890 to 1150, etc.

In embodiments wherein a value or range is denoted in exponent form, both the integer and the exponent values are included. For example, a range of $1.0 \times 10^{-17}$ to $2.5 \times 10^{-7}$, would include a description for a sub-range such as $1.24 \times 10^{-17}$ to $8.7 \times 10^{-11}$.

However, general sub-ranges for each type of unit (e.g., %, kDa, ° C., ° F., kg/L, Ku) are contemplated, as the values typically found within a particular type of unit are of a sub-range of the integers described above. For example, integers typically found within a cited percentage range, as applicable, include 0.000001% to 100%. Examples of values that can be within a cited molecular mass range in kilo Daltons ("kDa") as applicable for many coating components include 0.50 kDa to 110 kDa. Examples of values that can be within a cited temperature range in degrees Celsius ("° C.") as may be applicable in the arts of a polymeric material, a surface treatment (e.g., a coating), and/or a filler include –10° C. to 500° C. Examples of values that can be within a thickness range in micrometers ("µm") as may be applicable to coating and/or film thickness upon a surface include 1 µm to 2000 Examples of values that can be within a cited density range in kilograms per liter ("kg/L") as may be applicable in the arts of a material formulation include 0.50 kg/L to 20 kDa. Examples of values that can be within a cited shear rate range in Krebs Units ("Ku"), as may be applicable in the arts of a material formulation, include 20 Ku to 300 Ku.

Example 41: This Example demonstrate selection method for a biomolecule composition as an antibiological agent for in-can preservative activity.

Bio-based antibiological agents will be selected based on one or more methods, including measurement of enzymatic kinetics for enzymatic antibiological agent(s); via rapid-throughput antimicrobial assays of antibiological agent(s) (e.g., peptide abiological agents); in vitro high throughput assays for biocidal activity of one or more bio-based active(s) on various microorganisms either alone or mixed together; or a combination thereof. Further selection of a subset of antibiological agent(s) may be conducted using various microorganisms (i.e., subset of microbe species) via conducting ASTM D 2574 assay for biocidal activity of single bio-based active(s) compared to an existing preservative [e.g., biocide(s)] in a specific coating. It is contemplated that if no single bio-based antimicrobial candidate achieves biocidal activity comparable to existing in-can preservative using ASTM D 2574 procedure, then an in vitro high throughput assay(s) and/or ASTM D2574 assay(s) for synergistic antibiological activity of combination(s) ("cocktail") of biomolecule composition(s) including combinations with a non-biomolecule preservative and/or antimicrobial compound will be conducted against various microorganisms either alone or mixed together. It is further contemplated that if various candidate biomolecule compositions either disclosed herein or as would be known in the art may be selected for evaluation as an in-can antibiological agent. For example, biomolecular compositions such as a lipolytic enzyme (e.g., a lipase, a phospholipase A, a phospholipase C, a lysophospholipase, etc.), a peptidase/protease (e.g., a thermolysin, a trypsin, a chymotrypsin, a chymosin, etc.), a saccharidase (e.g., a glycosidase, a beta mannanase, an endo mannanase, an alpha amylase, a glucoamylase, etc.), a peptidic biomolecule (e.g., an AMP-7, AMP-6, AMP-LKLK, a nisin, a melittin, a duramycin, etc.) that may act on a cellular component (e.g., a membrane, a cell wall, etc.), cell membrane disrupting biomolecule (e.g., a monolaurin, etc.), a cell wall degrading biomolecule (e.g., a lysozyme, a polygalacturonase, an endo glucanase, a beta glucanase, a cellulase, a beta-mannosidase, etc.), a biomolecule that degrades a component of a microbe produced biofilm (e.g., alginate lysase, etc.), an oxygen toxin producing/oxidizing biomolecule (e.g., a lactoferrin, a peroxidase, a glycose oxidase, a laccase etc.), other biomolecules that may possess antibiological activity [e.g., a bacteriocins such as an enterocin (vulgamycin), OPDtox™ which is an organophosphorus hydrolase, etc.], or a combination thereof.

Example 42: This Example demonstrate selection method for a biomolecule composition as an antibiological agent for in-can preservative activity by detection of in vitro bioactivity.

As the bioactivity of a candidate antibiological agent must survive within a coating for that bioactivity to be detectable after curing of the coating to produce a film, it is contemplated that any assays for in-film activity may be used to identify candidate an in-can antibiological agent during in-can storage.

The sides of wells of a 96-well plate were painted with either control acrylic latex or acrylic latex with 0.5%, 1.5% or 3% total solids of human lysozyme mixed into the paint. The sides were coated evenly by brushing and the paint with plate inverted and cure at 60 C for 40 minutes inverted. M. lysodeikticus was prepared at 10 mg/mL in microcentrifuge tube using potassium phosphate ("PP") buffer and mixed to disperse well. This stock solution was diluted by adding 0.5 mL of 10 mg/ml stock to 1.5 mL PP buffer. 50 µl was transferred into 3 wells of 96-well plate and absorbance reading at 450 nm measured with an expected reading of between 0.6-0.7, and equipment adjusted if necessary. The data file was saved and use as T0. 50 µl/well M. lysodeikticus working solution was applied in triplicate to painted wells. The painted wells were placed on rocking plate. For multiple point analysis, OD450 was measured at T0 and every 10 minutes for 2 hours. For single point analysis, the plates were rocked for 2 hours and OD450 measured. The results are shown at the Table below.

TABLE 78

M. lysodeikticus turbidity upon contact with lysozyme paint

| Time (minutes) | Control | 0.5% Lysozyme | 1.5% Lysozyme | 3% Lysozyme |
|---|---|---|---|---|
| 0 | 0.7633 | 0.7672 | 0.7734 | 0.7331 |
| 10 | 0.7675 | 0.7608 | 0.7582 | 0.6474 |
| 20 | 0.7706 | 0.7469 | 0.7374 | 0.5528 |
| 30 | 0.7700 | 0.7210 | 0.7115 | 0.4691 |
| 40 | 0.7687 | 0.7002 | 0.6810 | 0.3996 |
| 50 | 0.7683 | 0.6802 | 0.6439 | 0.3451 |
| 60 | 0.7665 | 0.6601 | 0.6087 | 0.3058 |
| 70 | 0.7620 | 0.6341 | 0.5589 | 0.2686 |
| 80 | 0.7602 | 0.6128 | 0.5168 | 0.2448 |
| 90 | 0.7559 | 0.5882 | 0.4777 | 0.2258 |
| 100 | 0.7554 | 0.5724 | 0.4467 | 0.2130 |
| 110 | 0.7536 | 0.5571 | 0.4225 | 0.2020 |
| 120 | 0.7528 | 0.5442 | 0.4039 | 0.1965 |

Further, prior to incorporation into a liquid coating, a candidate antibiological substance may be evaluated for antimicrobial activity in a liquid media. An 2,3-bis-(2-methoxy-4-nitro-5-sulfophenyl)-2H-tetrazolium-5-carboxanilide ("XTT") liquid assay for reduction of metabolic activity was conducted using a mixture of comprising various biofouling microorganism strains (see for example U.S. Patent Application no. 2013/0142855 for examples of biofouling microorganisms) against combination of lysozyme, nisin, peroxidase, glucose oxidase, AMP-6, AMP-7, AMP-LKLK, monolaurin, and/or EDTA.

The microbial cell cultures were prepared in the following manner:

Day 1: Inoculated 5 ml tryptic soy broth ("TSB") broth with *Pseudomonas* sp. from tryptic soy agar ("TSA") slants (stored at 4° C.). Incubated at 30° C. with agitation overnight.

Day 2: Passed the *Pseudomonas* sp. broth cultures into new 5 ml TSB broth using a sterile inoculation loop (first pass). Incubated at 30° C. with agitation overnight.

Day 3: Passed the *Pseudomonas* spp. broth cultures into new 5 ml TSB broth using a sterile inoculation loop (second pass). Inoculated 5 ml TSB broth with *Alcaligenes faecalis*, *Pseudomonas alcahphila* culture A ("*Pseudomonas alcahphila* A"), *Pseudomonas alcahphila* culture B ("*Pseudomonas alcahphila* B"), *Pseudomonas aeruginosa* culture A ("*Pseudomonas aeruginosa* A"), *Pseudomonas aeruginosa* culture B ("*Pseudomonas aeruginosa* B"), *Stenotrophomonas maltophila*, *Microbacterium paraoxydans*, *Pseudomonas oleovorans* culture A ("*Pseudomonas oleovorans* A"), and *Pseudomonas oleovorans* culture B ("*Pseudomonas oleovorans* B") from TSA slants (stored at 4° C.). Incubated all broths at 30° C. with agitation overnight.

Day 4: Passed the *Alcaligenes faecalis*, *Pseudomonas alcahphila* A, *Pseudomonas alcahphila* B, *Pseudomonas aeruginosa* A, *Pseudomonas aeruginosa* B, *Stenotrophomonas maltophila*, *Microbacterium paraoxydans*, *Pseudomonas oleovorans* A, and *Pseudomonas oleovorans* B broth cultures into new 5 ml TSB broth using a sterile inoculation loop (first pass). Incubated all broths at 30° C. with agitation overnight.

Day 5: Passed the *Alcaligenes faecalis*, *Pseudomonas alcahphila* A, *Pseudomonas alcahphila* B, *Pseudomonas aeruginosa* A, *Pseudomonas aeruginosa* B, *Stenotrophomonas maltophila*, *Microbacterium paraoxydans*, *Pseudomonas oleovorans* A, and *Pseudomonas oleovorans* B broth cultures into new 5 ml TSB broth using a sterile inoculation loop (second pass). Incubated all broths at 30° C. with agitation overnight.

Day 6: Pooled together 2.5 mL from each broth culture into a sterile screw-cap tube and swirled to mix thoroughly immediately before adding to the microplate.

Preparation of reagents: The following solutions were prepared at a concentration of 10 mg/ml in sterile ddH$_2$O (except for monolaurin, which was dissolved in DMSO): peroxidase (Sigma, cat #77332-100MG, lot #BCBP5939V); monolaurin (supplement from Med-Chem Labs, Inc., ground up into powder); lysozyme (Biocat, lot #LYS-RA17); AMP-7 (lot #1314051-31709); AMP-6 (lot #1718041-50479); AMP-LKLK (lot #1718148-50995); and nisin (2.5%, from *Lactococcus lactis*, Sigma, cat #N5764-1G, lot #046M4010V). For the glucose oxidase, the 25 µl remaining from the 50 mg/ml stock was diluted into 100 µl ddH$_2$O to make a 10 mg/ml solution. This was further diluted into 1.125 ml ddH$_2$O to make a 1 mg/ml stock, which was used in the assay. A 20 mM solution of EDTA was made by diluting 100 µl of 200 mM into 900 µl ddH$_2$O (1:10 dilution). In addition, 32 µl of 1.7 mg/ml menadione in acetone was added to 4 ml of 1 mg/ml XTT in phosphate-buffered saline ("PBS") (stored at 4° C.). The reagents and microbial mixture were added to a 96-well microplate. The absorbance at 492 nm was measured immediately after mixing all reagents. The microplate was incubated at 30° C. for 20 hours, after which A$_{492}$ was measured again. The percent reduction in cell metabolism for each treatment was calculated using the following procedure. First, the percent increase in absorbance was calculated for each treatment type (including the cells that received no treatment, which served as the negative control). The percent increase in absorbance was calculated as follows: % increase absorbance=[(A$_{20H}$−A$_{0H}$)/A$_{0H}$]*100; where A$_{20H}$ is the absorbance after 20 hours incubation, and A$_{0H}$ is the absorbance before starting incubation. The reduction in cell metabolism compared to the untreated control (no lysozyme, no EDTA) was calculated as follows: % reduction cell metabolism=100−[(T/C)*100]; where T is the percent increase absorbance for the cells under test, and C is the percent increase absorbance for the negative control. The negative control for the samples containing monolaurin or DMSO was cells containing DMSO only. A 2D matrix of percent reduction of metabolic activity measured for each candidate antibiological substance is shown in the Tables below.

TABLE 79A

XTT metabolic activity measurements of mixed microbes upon contact with biocides

| Additive | none | | | 0.5 mg/ml lysozyme | | | 0.5 mg/ml nisin | | | 0.05 mg/ml glucose oxidase | | |
|---|---|---|---|---|---|---|---|---|---|---|---|---|
| none | | | | 16.7 | 7.7 | −3.1 | 17.8 | 15.6 | 23.8 | 20.9 | 13.2 | 17.0 |
| 0.5 mg/ml lysozyme | 16.7 | 7.7 | −3.1 | | | | | | | | | |
| 0.5 mg/ml nisin | 17.8 | 15.6 | 23.8 | 13.2 | 23.2 | 14.1 | | | | | | |

TABLE 79A-continued

XTT metabolic activity measurements of mixed microbes upon contact with biocides

| Additive | none | | | 0.5 mg/ml lysozyme | | | 0.5 mg/ml nisin | | | 0.05 mg/ml glucose oxidase | | |
|---|---|---|---|---|---|---|---|---|---|---|---|---|
| 0.05 mg/ml glucose oxidase | 20.9 | 13.2 | 17.0 | 29.7 | 30.4 | 29.1 | 28.9 | 21.4 | 23.5 | | | |
| 0.5 mg/ml peroxidase | 23.2 | 15.9 | 16.9 | 17.2 | 14.2 | 18.0 | 33.0 | 38.8 | 45.8 | 46.5 | 43.1 | 42.6 |
| 0.5 mg/ml AMP-6 | −7.5 | −8.9 | −11.2 | 16.3 | 16.0 | 15.0 | 11.7 | 28.9 | 31.1 | 42.9 | 43.9 | 41.8 |
| 0.5 mg/ml AMP-7 | 31.9 | 20.1 | 13.2 | 28.8 | 32.8 | 29.2 | 38.5 | 36.6 | 34.9 | 32.3 | 42.2 | 43.8 |
| 0.5 mg/ml AMP-LKLK | 0.8 | −2.2 | −4.7 | 8.6 | −3.7 | −1.0 | 12.6 | 9.7 | 3.6 | 40.1 | 41.1 | 30.5 |
| 1 mM EDTA | 40.8 | 46.4 | 41.5 | 49.6 | 47.2 | 50.5 | 40.9 | 45.3 | 38.8 | 75.6 | 77.3 | 79.9 |

TABLE 79B

XTT metabolic activity measurements of mixed microbes upon contact with biocides

| Additive | 0.5 mg/ml peroxidase | | | 0.5 mg/ml AMP-6 | | | 0.5 mg/ml AMP-7 | | | 0.5 mg/ml AMP-LKLK | | |
|---|---|---|---|---|---|---|---|---|---|---|---|---|
| none | 23.2 | 15.9 | 16.9 | −7.5 | −8.9 | −11.2 | 31.9 | 20.1 | 13.2 | 0.8 | −2.2 | −4.7 |
| 0.5 mg/ml lysozyme | | | | | | | | | | | | |
| 0.5 mg/ml nisin | | | | | | | | | | | | |
| 0.05 mg/ml glucose oxidase | | | | | | | | | | | | |
| 0.5 mg/ml peroxidase | | | | | | | | | | | | |
| 0.5 mg/ml AMP-6 | 18.3 | 22.0 | 16.7 | | | | | | | | | |
| 0.5 mg/ml AMP-7 | 46.4 | 46.5 | 37.8 | 55.3 | 53.5 | 54.8 | | | | | | |
| 0.5 mg/ml AMP-LKLK | 19.0 | 33.7 | 12.8 | −14.8 | −18.8 | −11.6 | 53.9 | 51.6 | 51.8 | | | |
| 1 mM EDTA | 68.2 | 54.4 | 53.9 | 62.5 | 67.9 | 58.1 | 73.4 | 66.4 | 68.9 | 66.6 | 68.9 | 66.1 |

Example 43: This Example demonstrate selection method for a biomolecule composition as an antibiological agent for in-can preservative activity by detection of in vitro bioactivity using subset of microbial organisms being evaluated herein.

The XTT assay described in the Example above was repeated with lysozyme and EDTA using *P. oleovorans* A, *M. paraoxydans* and *A. faecalis*. The ethanol and heat-killing experimental controls were also repeated.

Overnight cultures of *P. oleovorans* A, *M. paraoxydans*, and *A. faecalis* were grown at in M9 minimal media. Three different dilutions of EDTA were made from a 200 mM stock: 10 mM EDTA, 20 mM EDTA and 60 mM EDTA. A stock of human lysozyme (Sigma cat #L1667-1G, lot #SLBR7673V, >=100,000 U/mg) concentration of 10 mg/ml was made up immediately before setting up the microplate. This stock was used for the following dilutions: 1:10, 1:50, and 1:100; and were used to make 5 U/ul, 1U/ul and 0.5 U/ul when 10 ul was added to each well (final volume 200 ul). The XTT (Invitrogen) was made up immediately before use by dissolving 10 mg of XTT into 10 ml PBS that had been prewarmed to 40° C. The lysozyme, EDTA, cells, diluent (M9 minimal media or TSB) and XTT were added to the wells. Microplates were incubated at 30 C for up to 20 hours. Absorbance measurements were taken at and 20 hour time points.

Results: The was much variance in the data (in some cases, the standard deviation was higher than the average), so the results were not used. It was discovered that the variance was likely due to excessive condensation on the lid of the microplate. The data for the *A. faecalis* showed results with more acceptable standard deviation values. The effects of lysozyme or EDTA alone only had a modest effect on the accumulation of absorbance at 492 nm. The combined action of lysozyme and EDTA was more effective in reducing metabolism, with higher concentration of lysozyme and EDTA having a greater negative impact on cell metabolism.

To calculate the reduction in cell metabolism compared to the negative control (cells with no lysozyme or EDTA), the percent increase in absorbance at 492 nm from the 0 to the 20 hour time point was calculated and compared to the percent increase absorbance of the negative control, with results shown at the Table below.

TABLE 80

XTT metabolic activity measurements of mixed microbes upon contact with biocides

| Additive | avg red cell metab | std dev cell metab |
|---|---|---|
| 0.5 U/ul Lysozyme | 43.5 | 10.6 |
| 1 U/ul Lysozyme | 26.9 | 4.5 |
| 5 U/ul Lysozyme | 17.2 | 6.4 |

TABLE 80-continued

XTT metabolic activity measurements of
mixed microbes upon contact with biocides

| Additive | avg red cell metab | std dev cell metab |
|---|---|---|
| 0.5 mM EDTA | 27.8 | 2.3 |
| 1 mM EDTA | 55.6 | 7.0 |
| 3 mM EDTA | 73.5 | 7.0 |
| 0.5 U/ul Lysozyme, 0.5 mM EDTA | 46.7 | 19.1 |
| 1 U/ul Lysozyme, 0.5 mM EDTA | 53.0 | 9.1 |
| 5 U/ul Lysozyme, 0.5 mM EDTA | 63.6 | 4.9 |
| 0.5 U/ul Lysozyme, 1 mM EDTA | 81.0 | 3.7 |
| 1 U/ul Lysozyme, 1 mM EDTA | 72.7 | 7.1 |
| 5 U/ul Lysozyme, 1 mM EDTA | 83.0 | 0.6 |
| 0.5 U/ul Lysozyme, 3 mM EDTA | 82.9 | 4.2 |
| 1 U/ul Lysozyme, 3 mM EDTA | 77.0 | 12.5 |
| 5 U/ul Lysozyme, 3 mM EDTA | 85.3 | 2.6 |
| EtOH | 74.7 | 3.0 |
| 100° C., 30 min | 62.4 | 3.2 |

Ethanol-treated cells showed ~75% reduction in cell metabolism according to the absorbance at 492 nm, while heat-killing showed ~62% reduction in metabolism. Although there was no growth detected on spread plates prepared from heat-killed samples, for some reason these samples reacted almost immediately with the XTT.

Example 44: This Example demonstrate selection method for a biomolecule composition as an antibiological agent for in-can preservative activity by detection of in vitro bioactivity using another subset of organisms of a microbes being evaluated herein.

The XTT assay was repeated with lysozyme and EDTA using P. oleovorans A; also repeated was the ethanol and heat-killing experimental controls.

An overnight culture of P. oleovorans A grown overnight at 30 C in M9 minimal media. Three different dilutions of EDTA were made from a 200 mM stock: 10 mM EDTA, 20 mM EDTA and 60 mM EDTA. A stock of human lysozyme (Sigma cat #L1667-1G, lot #SLBR7673V, >=100,000 U/mg) concentration of 10 mg/ml and kept at 4 C was used. This stock was used for the following dilutions: 1:10, 1:50, and 1:100; which were used to make 5 U/ul, 1U/ul and 0.5 U/ul when 10 ul is added to each well (final volume 200 ul). Eight microliters of 1.7 mg/ml menadione in acetone was added to 992 µl of 1 mg/ml XTT (Invitrogen) (1:120 dilution), which was filtered-sterilized using a 0.2 µm nylon syringe filter. The lysozyme, EDTA, cells, diluent (M9 minimal media or TSB) and XTT were added to the wells. For killing with ethanol, 80 µl of 200 proof ethanol was added to wells with 100 µl cells and 20 µl XTT. For heat killing, a 1 ml aliquot of cells was heated to 65° C. for 30 minutes. Microplates were incubated at 30° C. for up to 20 hours. Absorbance measurements were taken at 0 and 20 hour time points, and the values calculated as in previous examples and are shown at the Table below.

TABLE 81

XTT metabolic activity measurements of
P. oleovorans A upon contact with biocides

| Additive | avg red cell metab | std dev cell metab |
|---|---|---|
| Control | 0.0 | 4.1 |
| 0.5 U/ul Lysozyme | 1.9 | 5.4 |
| 1 U/ul Lysozyme | 5.8 | 10.3 |

TABLE 81-continued

XTT metabolic activity measurements of
P. oleovorans A upon contact with biocides

| Additive | avg red cell metab | std dev cell metab |
|---|---|---|
| 5 U/ul Lysozyme | 25.0 | 24.4 |
| 0.5 mM EDTA | 13.7 | 35.9 |
| 1 mM EDTA | 44.9 | 21.6 |
| 3 mM EDTA | 71.7 | 16.3 |
| 0.5 U/ul Lysozyme, 0.5 mM EDTA | 19.6 | 30.9 |
| 1 U/ul Lysozyme, 0.5 mM EDTA | 12.6 | 33.8 |
| 5 U/ul Lysozyme, 0.5 mM EDTA | 34.5 | 58.0 |
| 0.5 U/ul Lysozyme, 1 mM EDTA | 40.0 | 14.7 |
| 1 U/ul Lysozyme, 1 mM EDTA | 61.2 | 5.7 |
| 5 U/ul Lysozyme, 1 mM EDTA | 42.7 | 13.4 |
| 0.5 U/ul Lysozyme, 3 mM EDTA | 79.9 | 15.9 |
| 1 U/ul Lysozyme, 3 mM EDTA | 71.4 | 20.1 |
| 5 U/ul Lysozyme, 3 mM EDTA | 65.3 | 29.6 |
| EtOH | 60.4 | 39.3 |
| 65° C., 30 min | 62.3 | 16.3 |

The results show similar trends to the previous experiment with P. oleovorans A. Namely, the lysozyme alone had limited effect on reducing cell metabolism. Though the EDTA had a greater effect at higher concentrations, the effect was increased when combined with lysozyme. The standard deviation was high, even though the colors of the triplicate samples looked similar, and there was one column in the 0.5 mM EDTA set of triplicates that probably didn't get EDTA, so those samples were not included in analysis. It is likely that the deviation in absorbance values was due to condensation on the microplate lid, which was left on during reading. The 65C heat-killing temperature did not have the high absorbance values as with the 100C temperature. Although it did not kill all of the cells, the cell density was reduced from 7.34E7 CFU/ml to 120 CFU/ml, which is a 99.9998365% reduction.

Example 45: This Example demonstrate selection method for a biomolecule composition as an antibiological agent for in-can preservative activity by detection of in vitro bioactivity using another subset of organisms of a microbes being evaluated herein.

The XTT assay described in the Examples above was repeated with lysozyme and EDTA using M. paraoxydans. The ethanol and heat-killing experimental controls were also repeated.

An overnight culture of M. paraoxydans grown overnight at 30 C in M9 minimal media. Three different dilutions of EDTA were used: 10 mM EDTA, 20 mM EDTA and 60 mM EDTA. A stock of human lysozyme (Sigma cat #L1667-1G, lot #SLBR7673V, >=100,000 U/mg) concentration of 10 mg/ml kept at 4 C was used. This stock was used for the following dilutions: 1:10, 1:50, and 1:100; which was used to make 5 U/ul, 1U/ul and 0.5 U/ul when 10 ul is added to each well (final volume 200 ul). The filtered XTT (Invitrogen) with menadione was used. The lysozyme, EDTA, cells, diluent (M9 minimal media or TSB) and XTT were added to the wells. For killing with ethanol, 80 µl of 200 proof ethanol was added to wells with 100 µl cells and 20 µl XTT. For heat killing, a 1 ml aliquot of cells was heated to 65 C for 30 minutes. Microplates were incubated at 30 C for up to 20 hours.

Absorbance measurements at 492 nm were taken at 0 and 20 hour time points, though the triplicate values showed a high degree of variance, even though the samples visually looked similar. As the high error values were thought due to condensation on the microplate lid, another reading at 20 hours without the lid was taken. The contribution toward absorbance at 492 nm of the microplate lid by measuring absorbance at 492 nm of empty wells with and without the lid in place, which gave an average absorbance of 0.052716667 for the lid. This value was subtracted from all of the 0 hour readings, which also had less variance since there was no condensation (as the plate had not been incubated). Using the absorbance values with the microplate lid off to calculate the reduction in metabolism, the standard deviation values were drastically smaller. The measurement results are show in the Table below.

TABLE 82

XTT metabolic activity measurements of *M. paraoxydans* upon contact with biocides

| Additive | avgredcellmetab | stddevcellmetab |
|---|---|---|
| Control | (0.0) | 3.6 |
| 0.5 U/ul Lysozyme | 6.2 | 13.6 |
| 1 U/ul Lysozyme | 51.4 | 9.3 |
| 5 U/ul Lysozyme | 86.8 | 1.8 |
| 0.5 mM EDTA | 68.8 | 0.7 |
| 1 mM EDTA | 77.3 | 1.5 |
| 3 mM EDTA | 80.6 | 0.6 |
| 0.5 U/ul Lysozyme, 0.5 mM EDTA | 64.8 | 0.9 |
| 1 U/ul Lysozyme, 0.5 mM EDTA | 64.1 | 1.4 |
| 5 U/ul Lysozyme, 0.5 mM EDTA | 77.5 | 2.4 |
| 0.5 U/ul Lysozyme, 1 mM EDTA | 74.8 | 0.6 |
| 1 U/ul Lysozyme, 1 mM EDTA | 75.0 | 0.0 |
| 5 U/ul Lysozyme, 1 mM EDTA | 74.2 | 3.1 |
| 0.5 U/ul Lysozyme, 3 mM EDTA | 79.4 | 0.8 |
| 1 U/ul Lysozyme, 3 mM EDTA | 79.5 | 0.8 |
| 5 U/ul Lysozyme, 3 mM EDTA | 80.4 | 0.9 |
| EtOH | 89.4 | 3.2 |
| 65° C., 30 min | 76.4 | 0.3 |

Example 46: This Example demonstrate selection method for a biomolecule composition as an antibiological agent for in-can preservative activity by detection of in vitro bioactivity using another subset of organisms of a microbes being evaluated herein.

The liquid XTT assay with *Pseudomonas oleovorans* A and *Alcaligenes faecalis* was conducted using with various enzyme (lipases from different preparations, organophosphorus hydrolase) and peptide (AMP-7) concentrations Overnight cultures of *P. oleovorans* A and *A. faecalis* were grown at 30° C. in M9 minimal media. The following enzymes and peptide were made up as 10 mg/ml solutions in sterile ddH$_2$O: yeast lipase 200,000 FIP/g CC (Biocat, lot #YLP200-QA20), Lipolase® (lot #LSMEC102116), OPDtox™, lipex (lot #LXMECC102116), and AMP-7 (lot #131405-3109). The 10 mg/ml solution of each enzyme/peptide was used for 1:10 and 1:100 serial dilutions. The XTT (Invitrogen) was made up immediately before use by dissolving 10 mg of XTT into 10 ml PBS that had been prewarmed to 40° C. Forty microliters of 1.7 mg/ml menadione was added to 5 ml XTT immediately before setting up the experiment. 60 mM EDTA solution was used. The reagents were added to the wells. Microplates were incubated at 30 C for up to 20 hours. Absorbance measurements were taken at 0 and 20 hour time points.

The lipase preparation A, lipase preparation B, lipase preparation C and OPDtox™ were only marginally effective against both *P. oleovorans* A and *A. faecalis* (<20% reduction in cell metabolism), with the exception of undiluted lipase B in *A. faecalis* and undiluted lipase C in *P. oleovorans* A, which reduced cell metabolism by 27.84±11.01 and 37.22±17.00 percent, respectively. All of these enzymes had around the same reduction in metabolism when combined with EDTA (~35% for *A. faecalis* and ~58% for *P. oleovorans* A, and showed similar levels as the samples with EDTA alone. The only compound in this test that showed significant antimicrobial activity at the concentrations tested was AMP-7, which reduced cell growth in *A. faecalis* by 63.15±1.5 percent and in *P. oleovorans* A by 84.19±0.96 percent. The action of AMP-7 was improved by the addition of EDTA, which reduced cell metabolism by an extra ~5% in *P. oleovorans* A and ~15% in *A. faecalis*. It should be noted that a microplate was also set up for *Microbacterium paraoxydans*, but the results seem to indicate that the cell culture wasn't mixed very well, upper rows of samples (which were plated first) showed little to no growth, while the bottom rows of cells showed large amounts of growth.

Another liquid XTT assay with *Pseudomonas oleovorans* A and *Alcaligenes faecalis* treated with various enzyme (e.g., cellulase, a-chymotrypsin, nisin, thermolysin, protease) concentrations was conducted. Overnight cultures of *P. oleovorans* A and *A. faecalis* were grown overnight at 30° C. in M9 minimal media. The following enzymes were made up as 10 mg/ml solutions in sterile ddH$_2$O: cellulase (RPI cat. #C32200-1.0 lot #25680), a-chymotrypsin (MP Biomedicals cat. #152272 lot #Q3157), nisin (Sigma cat. #N6764-1G lot #046M-4010V), thermolysin (Promega #V400A lot #0000229522), and protease (Sigma cat. #P6141-1G lot #056K1351). The 10 mg/ml solution of each enzyme/peptide was used for 1:10 and 1:100 serial dilutions. XTT solution previously prepared was used. Forty microliters of 1.7 mg/ml menadione was added to 5 ml XTT immediately before setting up the experiment. The 60 mM EDTA solution previously prepared. The reagents were added to the wells and the microplates were incubated at 30 C for up to 20 hours. Absorbance measurements were taken at 0 and 20 hour time points.

Most of the compounds tested had little effect on the growth/metabolism of *A. faecalis*, with the exception of thermolysin. Addition of EDTA improved the effectiveness of all of the compounds, though the level of growth reduction was about the same as that seen in samples with EDTA only, indicating that the level of growth inhibition is due to EDTA alone. The thermolysin sample with EDTA showed less growth inhibition that the thermolysin alone. This may be an artifact, since the undiluted 10 mg/ml thermolysin solution was observed to be cloudy (probably due to an additive that is not soluble in plain water), but not so in wells with EDTA added. The experiment may be repeated using a 10 mg/ml thermolysin stock that has been clarified by centrifugation. The *Pseudomonas oleovorans* A culture showed sensitivity to more compounds, such as chymotrypsin (~25% reduction in undiluted enzyme sample), nisin (~40% reduction in undiluted enzyme sample), thermolysin (~80% reduction in undiluted enzyme sample, though this may be an artifact), and protease (~30% reduction in undiluted enzyme sample). The effectiveness of all of these samples was increased by the addition of EDTA, though the level of inhibition was about the same as EDTA alone in the cellulase, thermolysin, and protease combinations. The effect of adding EDTA was substantial when combined with levels of growth inhibition almost reaching 90%. Adding EDTA also increased the effectiveness of chymotrypsin, with a level of growth inhibition at ~75%, which is much higher than inhibition rates seen with EDTA or chymotrypsin alone. The results are also shown at the Tables below.

TABLE 83A

XTT metabolic activity measurements of P. oleovorans A upon contact with biocides

| Additive | avg red cell metab | std dev cell metab |
|---|---|---|
| Control | (0.0) | 3.3 |
| 3 mM EDTA | 62.2 | 0.5 |
| Lipase A (Yeast lipase) 1:100 | 7.3 | 2.4 |
| Lipase A (Yeast lipase) 1:10 | 12.3 | 7.7 |
| Lipase A (Yeast lipase) 1:1 | 11.6 | 2.0 |
| Lipase A (Yeast lipase) = 1:1 + 3 mM EDTA | 58.7 | 1.0 |
| Lipase B 1:100 | (3.0) | 1.9 |
| Lipase B 1:10 | (1.4) | 2.4 |
| Lipase B 1:1 | 8.1 | 4.1 |
| Lipase B 1:1 + 3 mM EDTA | 56.4 | 1.1 |
| Lipase C 1:100 | 3.6 | 2.9 |
| Lipase C 1:10 | 1.0 | 0.8 |
| Lipase C 1:1 | 37.2 | 17.0 |
| Lipase C 1:1 + 3 mM EDTA | 50.7 | 2.2 |
| AMP-7 1:100 | (10.6) | 6.9 |
| AMP-7 1:10 | 18.2 | 1.1 |
| AMP-7 1:1 | 84.2 | 1.0 |
| AMP-7 1:1 + 3 mM EDTA | 89.4 | 2.2 |
| OPDtox ™ 1:100 | (3.3) | 15.1 |
| OPDtox ™ 1:10 | (3.9) | 28.9 |
| OPDtox ™ 1:1 | 14.9 | 41.8 |
| OPDtox ™ 1:1 + 3 mM EDTA | 46.8 | 17.3 |

TABLE 83B

XTT metabolic activity measurements of A. faecalis upon contact with biocides

| Additive | avg red cell metab | std dev cell metab |
|---|---|---|
| Control | (0.0) | 3.7 |
| 3 mM EDTA | 31.8 | 4.2 |
| Lipase A (Yeast lipase) 1:100 | 11.5 | 3.0 |
| Lipase A (Yeast lipase) 1:10 | 5.7 | 1.1 |
| Lipase A (Yeast lipase) 1:1 | 10.5 | 1.0 |
| Lipase A (Yeast lipase) 1:1 + 3 mM EDTA | 37.1 | 1.6 |
| Lipase B 1:100 | 15.1 | 4.6 |
| Lipase B 1:10 | 14.0 | 1.0 |
| Lipase B 1:1 | 48.5 | 36.6 |
| Lipase B 1:1 + 3 mM EDTA | 40.4 | 2.6 |
| Lipase C 1:100 | 17.1 | 4.0 |
| Lipase C 1:10 | 7.4 | 3.4 |
| Lipase C 1:1 | 11.8 | 1.2 |
| Lipase C 1:1 + 3 mM EDTA | 29.5 | 0.6 |
| AMP-7 1:100 | 17.9 | 2.4 |
| AMP-7 1:10 | 20.3 | 5.1 |
| AMP-7 1:1 | 63.2 | 1.5 |
| AMP-7 1:1 + 3 mM EDTA | 78.8 | 0.8 |
| OPDtox ™ 1:100 | 14.9 | 1.3 |
| OPDtox ™ 1:10 | 7.7 | 3.8 |
| OPDtox ™ 1:1 | 11.8 | 4.9 |
| OPDtox ™ 1:1 + 3 mM EDTA | 34.2 | 5.7 |

Example 47: This Example demonstrate selection method for a biomolecule composition as an antibiological agent by detection of antimicrobial bioactivity in a high-throughput metabolic assay.

An XTT liquid high throughput assay was conducted in liquid media for 20 hours using a various microbes being challenged by a biocide and compared to microbe only control metabolism, with the relative reduction in metabolism after triplicate runs calculated, as shown in the Table below.

TABLE 84

XTT metabolic activity measurements of microorganisms upon contact with biocides

| Additive and Concentration | Microbe | Reduction in Metabolism |
|---|---|---|
| Lysozyme 0.5 mg/ml | Microbacterium paraoxydans | 60.4 ± 1.2% |
| | Alcaligenes faecalis | 20.9 ± 2.3% |
| | Pseudomonas oleovorans A | 25.6 ± 0.7% |
| | Pseudomonas oleovorans B (TSB) | 12.3 ± 2.0% |
| | Pseudomonas oleovorans B (M9) | 55.4 ± 14.8% |
| | Pseudomonas alcaliphila B | 34.4 ± 4.5% |
| | Pseudomonas sp. | 29.0 ± 4.3% |
| | Strenotrophomonas maltophila | 19.2 ± 3.6% |
| Nisin mixture (2.5% active) 0.5 mg/ml (0.0125 mg/ml Nisin) | Microbacterium paraoxydans | 85.1 ± 0.4% |
| | Pseudomonas oleovorans A | 32.1 ± 3.0% |
| | Pseudomonas oleovorans B (M9) | 59.3 ± 0.5% |
| | Pseudomonas alcaliphila B | 13.2 ± 5.1% |
| | Strenotrophomonas maltophila | 14.5 ± 2.0% |
| AMP-7 0.5 mg/ml | Microbacterium paraoxydans (M9) | 95.1 ± 0.1% |
| | Alcaligenes faecalis | 61.0 ± 1.3% |
| | Pseudomonas oleovorans A | 81.9 ± 0.9% |
| | Pseudomonas alcaliphila A | 38.9 ± 0.8% |
| | Pseudomonas alcaliphila B | 80.4 ± 2.1% |
| | Strenotrophomonas maltophila | 11.0 ± 2.8% |
| | Pseudomonas sp. | 73.4 ± 1.3% |
| Horseradish Peroxidase 0.05 mg/ml | Microbacterium paraoxydans (M9) | 13.5 ± 3.7% |
| | Alcaligenes faecalis | 69.4 ± 0.8% |
| | Pseudomonas oleovorans A | 56.2 ± 1.0% |
| | Pseudomonas alcaliphila B *0.5 mg/ml | 20.1 ± 5.4% |
| | Pseudomonas sp. | 82.1 ± 1.0% |

TABLE 84-continued

XTT metabolic activity measurements of microorganisms upon contact with biocides

| Additive and Concentration | Microbe | Reduction in Metabolism |
|---|---|---|
| Glucose oxidase | *Microbacterium paraoxydans* | 93.7 ± 1.4% |
| 0.005 mg/ml | *Pseudomonas oleovorans* A | 12.7 ± 1.2% |
| | *Pseudomonas oleovorans* B (TSB) | 13.5 ± 1.4% |
| | *Pseudomonas oleovorans* B (M9) | 64.0 ± 13.3% |
| | *Pseudomonas alcaliphila* A | 33.1 ± 1.8% |
| | *Pseudomonas alcaliphila* B | 89.1 ± 0.2% |
| | *Strenotrophomonas maltophila* | 12.7 ± 3.5% |
| Melittin | *Microbacterium paraoxydans* | 54.5 ± 2.0% |
| 0.05 mg/ml | *Pseudomonas oleovorans* A | 18.3 ± 3.4% |
| | *Pseudomonas alcaliphila* B | 41.4 ± 1.0% |
| | *Pseudomonas alcaliphila* A | 14.9 ± 2.4% |
| | *Pseudomonas* sp. | 35.2 ± 3.1% |
| | *Strenotrophomonas maltophila* | 25.7 ± 3.4% |

Reduction of metabolic activity of about 60% or more was indicative of biocidal (e.g., killing) antibiological activity.

Example 48: This Example demonstrate selection method for a biomolecule composition as an antibiological agent by detection of bioactivity in films produced by a cured coating. Acrylic latex were admixed with various biomolecule compositions and cured into films for 40 minutes at 60° C. that underwent bioactivity assays specific for each active biomolecule. Activity values were calculated using plate reader values as the average of triplicate runs, shown in the Table below.

TABLE 85

Bioactivity of various enzymes in acrylic latex

| Additive and Substrate | Additive Concentration | Activity |
|---|---|---|
| Lipase-Source A | 0-blank/control | 0.0 |
| 4-nitrophenyl acetate | 0.5 wt % on solids | 5.2 |
| | 1.5 wt % on solids | 7.0 |
| | 3.0 wt % on solids | 10.6 |
| Lipase-Source B | 0-blank/control | 0.0 |
| 4-nitrophenyl acetate | 0.5 wt % on solids | 5.2 |
| | 1.5 wt % on solids | 6.3 |
| | 3.0 wt % on solids | 7.8 |
| Lipase-Source C | 0-blank/control | 0.0 |
| 4-nitrophenyl acetate | 0.5 wt % on solids | 0.4 |
| | 1.5 wt % on solids | 4.1 |
| | 3.0 wt % on solids | 6.4 |
| OPDtox ™ | 0-blank/control | 0.0 |
| 4- | 0.5 wt % on solids | 1.7 |
| | 1.5 wt % on solids | 1.9 |
| | 3.0 wt % on solids | 1.7 |
| Glucose Oxidase | 0-blank/control | 0.0 |
| 4-nitrophenyl acetate/glucose | Paint A acrylic latex-no | −0.1 |
| | 3.0 wt % on solids | 5.0 |
| Horseradish Peroxidase | 0-blank/control | 0.0 |
| 4-nitrophenyl acetate/glucose | Paint A acylic latex-no | −0.1 |
| | 3.0 wt % on solids | 3.4 |

Increasing the percentage of biomolecule compositions relative to coating solids all produced films with bioactivity relative no bioadditive controls or those with lower loading levels.

Example 49: This Example demonstrate selection method for a biomolecule composition as an antibiological agent by detection of bioactivity in films produced by a cured coating using a high-throughput metabolic assay.

Acrylic latex were admixed with various biomolecule compositions to produce cured films at 3% weight solids of bioadditive, and contacted with *Microbacterium paraoxydans* for approximately 18 hours prior to XTT assay evaluation. The reduction in metabolic activity was measured by absorbance readings per the assay instructions, and the average of triplicate runs shown at the Table below.

TABLE 86

XTT measurments of *Microbacterium paraoxydans* upone contact with various biocides.

| Additive | Reduction in Absorbance |
|---|---|
| Cells Alone (control)-no paint | 0.0% |
| Sample A-Acrylic latex (no added | 28.3% |
| Sample B-Acrylic latex (w/biocide) | 71.8% |
| Horseradish Peroxidase | 9.9% |
| Glucose Oxidase | 22.0% |
| Monolaurin | 75.8% |
| Nisin | 76.0% |
| AMP-7 | 80.6% |
| AMP-6 | 82.1% |

Reduction of absorbance reduction of about 60% or more was indicative of biocidal (e.g., killing) antibiological activity.

Example 50: This Example demonstrate selection method for a biomolecule composition as an antibiological agent by detection of bioactivity in films produced by a cured coating after in-can storage of the coating comprising the biomolecule composition.

Acrylic latex were admixed with different lipase compositions and stored in-can up to 2 months prior to curing into films for 24 hours after draw down of the coating. Each film underwent enzymatic activity assay and the average of triplicate runs show in the Table below.

TABLE 87A

Enzymatic activity of lipae after in-can storage

| Additive and Substrate | Additive Concentration | Activity | 1 Week in can | 2 Weeks in can | 3 Weeks in can |
|---|---|---|---|---|---|
| Lipase - Source A | 0 - blank/control | 0.0 | 0.0 | 0.0 | 0.0 |
| 4-nitrophenyl acetate | 0.5 wt % on | 5.2 | 6.2 | 6.2 | 7.6 |
|  | 1.5 wt % on | 7.0 | 7.3 | 6.5 | 9.7 |
|  | 3.0 wt % on | 10.6 | 7.9 | 8.4 | 9.9 |
| Lipase - Source B | 0 - blank/control | 0.0 | 0.0 | 0.0 | 0.0 |
| 4-nitrophenyl acetate | 0.5 wt % on | 5.2 | 4.9 | 5.5 | 8.6 |
|  | 1.5 wt % on | 6.3 | 6.4 | 8.2 | 9.0 |
|  | 3.0 wt % on | 7.8 | 8.7 | 6.4 | 8.2 |

TABLE 87B

Enzymatic activity of lipae after in-can storage

| Additive and Substrate | Additive Concentration | Activity | 1 Month in can | 2 Months in can |
|---|---|---|---|---|
| Lipase-Source A | 0-blank/control | 0.0 | 0.0 | 0.0 |
| 4-nitrophenyl acetate | 0.5 wt % on solids | 5.2 | 6.7 | 4.6 |
|  | 1.5 wt % on solids | 7.0 | 5.8 | 5.9 |
|  | 3.0 wt % on solids | 10.6 | 6.3 | 8.2 |
| Lipase-Source B | 0-blank/control | 0.0 | 0.0 | 0.0 |
| 4-nitrophenyl acetate | 0.5 wt % on solids | 5.2 | 3.2 | 5.0 |
|  | 1.5 wt % on solids | 6.3 | 4.5 | 5.5 |
|  | 3.0 wt % on solids | 7.8 | 5.0 | 7.3 |

The in-film bioactivity of the lipase additives is indicative of lipase activity retention during in-can storage, as well as any antibiological activity retention the lipase may possess during in-can storage.

Example 51: This Example demonstrate selection method for a biomolecule composition as an antibiological agent by detection of antibiological activity in vitro using a high-throughput metabolic assay.

An XTT assay was conducted in liquid media (not paint) with microbe challenge by various bacteria. Assays were run for 20 hours and compared to microbe-only control metabolism. The microbe-only controls should have shown the full metabolism of the microbes. A reduction in metabolism of about 60-80% was seen for heat treated and ethanol treated samples and was considered full kill of the organism. Greater reduction of metabolism was indicative of greater antibiological activity. Thirty candidate antibiological agents were screened through this assay. The data in the below only shows the selected additives with 50% or greater reduction value by an average of triplicate wells against at least one of the microbe strains relative to the control sample.

TABLE 88

XTT metabolic activity of various microbes after contact with biocides.

| Additive and Concentration | Microbe | Reduction in Metabolism |
|---|---|---|
| Lysozyme | *Microbacterium paraoxydans* | 60.4 ± 1.2% |
| 0.5 mg/ml | *Alcaligenes faecalis* | 20.9 ± 2.3% |
|  | *Pseudomonas oleovorans* A | 25.6 ± 0.7% |
|  | *Pseudomonas oleovorans* B (TSB) | 12.3 ± 2.0% |
|  | *Pseudomonas oleovorans* B (M9) | 55.4 ± 4.8% |
|  | *Pseudomonas alcaliphila* B | 34.4 ± 4.5% |
|  | *Pseudomonas* sp. | 29.0 ± 4.3% |
|  | *Strenotrophomonas maltophila* | 19.2 ± 3.6% |
| Nisin mixture | *Microbacterium paraoxydans* | 85.1 ± 0.4% |
| (2.5% active) | *Pseudomonas oleovorans* A | 32.1 ± 3.0% |
| 0.5 mg/ml | *Pseudomonas oleovorans* B (M9) | 59.3 ± 0.5% |
| (0.0125 mg/ml Nisin) | *Pseudomonas alcaliphila* B | 13.2 ± 5.1% |
|  | *Strenotrophomonas maltophila* | 14.5 ± 2.0% |
| AMP-7 | *Microbacterium paraoxydans* (M9) | 95.1 ± 0.1% |
| 0.5 mg/ml | *Alcaligenes faecalis* | 61.0 ± 1.3% |
|  | *Pseudomonas oleovorans* A | 81.9 ± 0.9% |
|  | *Pseudomonas alcaliphila* A | 38.9 ± 0.8% |
|  | *Pseudomonas alcaliphila* B | 80.4 ± 2.1% |
|  | *Strenotrophomonas maltophila* | 11.0 ± 2.8% |
|  | *Pseudomonas* sp. | 73.4 ± 1.3% |
| Horseradish | *Microbacterium paraoxydans* (M9) | 13.5 ± 3.7% |
| Peroxidase | *Alcaligenes faecalis* | 69.4 ± 0.8% |
| 0.05 mg/ml | *Pseudomonas oleovorans* A | 56.2 ± 1.0% |
|  | *Pseudomonas alcaliphila* B *0.5 mg/ml | 20.1 ± 5.4% |
|  | *Pseudomonas* sp. | 82.1 ± 1.0% |
| Glucose oxidase | *Microbacterium paraoxydans* | 93.7 ± 1.4% |
|  | *Pseudomonas oleovorans* A | 12.7 ± 1.2% |
|  | *Pseudomonas oleovorans* B (TSB) | 13.5 ± 1.4% |
|  | *Pseudomonas oleovorans* B (M9) | 64.0 ± 3.3% |
|  | *Pseudomonas alcaliphila* A | 33.1 ± 1.8% |
|  | *Pseudomonas alcaliphila* B | 89.1 ± 0.2% |
|  | *Strenotrophomonas maltophila* | 12.7 ± 3.5% |

Example 52: This Example demonstrate selection method for a biomolecule composition as an antibiological agent by detection of bioactivity in films produced by a cured coating comprising the biomolecule composition.

All films were cured at 60° C. for 40 minutes. Activity values were calculated using plate reader absorbance values and were the average of three individual spots for the assay. These values were a relative activity, and the focus was to prove that activity exists—i.e., that the biomolecule composition can survive paint conditions to provide activity results over the blank (no additive) sample. In this Table, values above 0.0 prove the additive was active in the paint.

TABLE 89

Enzymatic activity in cured films

| Additive and Substrate | Additive Concentration | Activity (relative conversion rate of substrate) | Activity Confirmed in Paint |
|---|---|---|---|
| Lipase-Source A | 0-blank/control | 0.0 | Yes |
| 4-nitrophenyl acetate | 0.5 wt % on solids | 5.2 | |
| | 1.5 wt % on solids | 7.0 | |
| | 3.0 wt % on solids | 10.6 | |
| Lipase-Source B | 0-blank/control | 0.0 | Yes |
| 4-nitrophenyl acetate | 0.5 wt % on solids | 5.2 | |
| | 1.5 wt % on solids | 6.3 | |
| | 3.0 wt % on solids | 7.8 | |
| Lipase-Source C | 0-blank/control | 0.0 | Yes |
| 4-nitrophenyl acetate | 0.5 wt % on solids | 0.4 | |
| | 1.5 wt % on solids | 4.1 | |
| | 3.0 wt % on solids | 6.4 | |
| OPDtox ™ | 0-blank/control | 0.0 | Yes |
| 4-nitrophenylphosphorylcholine | 0.5 wt % on solids | 1.7 | |
| | 1.5 wt % on solids | 1.9 | |
| | 3.0 wt % on solids | 1.7 | |
| Glucose Oxidase | 0-blank/control | 0.0 | Yes |
| 4-nitrophenyl acetate/glucose | Paint A Acrylic latex no additive | −0.1 | |
| | 3.0 wt % on solids | 5.0 | |
| Horseradish Peroxidase | 0-blank/control | 0.0 | Yes |
| 4-nitrophenyl acetate/glucose | Paint A Acrylic latex -no additive | −0.1 | |
| | 3.0 wt % on solids | 3.4 | |

Example 53: This Example demonstrates a selection method for a biomolecule composition as an antibiological agent by detection of bioactivity in films produced by a cured coating using a high-throughput metabolic assay.

This analysis determines if the biomolecular composition additives that have antimicrobial effects are still active after admixing in the paint. The paints were all made at 3 wt % on solids of the additive, were cured (dried), and then were exposed to *Microbacterium paraoxydans* broth culture for approximately 18 hours before XTT exposure and absorbance readings. Values greater than the Sample A control (the paint used in the test) proved antimicrobial activity in the dried paint film. The horseradish peroxidase and glucose oxidase did not show anti-microbial activity in this dry film assay in excess of the Sample A paint used to make the films, as the Sample A paint has some residual biocide and may have mask activity from certain additives. The values in this Table are reported differently than the liquid XTT assay, because these samples could not be evaluated with time because they were exposed to dried paint film (not in a clear liquid assay). This data shows the difference in XTT analysis after exposure to the paint films, with cells not exposed to any paint film used as a zero point in the Table. The values given are % reduction in absorbance compared to cells alone (control) using the average of triplicate wells.

TABLE 90

XTT assay of *Microbacterium paraoxydans* upon contact with

| Additive | Reduction in Absorbance | Confirmed activity in paint |
|---|---|---|
| Cells Alone Alone (control)-no paint | 0.0% | n/a |
| Sample A-Acrylic latex (no added | 28.3% | Yes, raw material biocide |
| Sample B-Acrylic latex (w/biocide) | 71.8% | Yes, added biocide |
| Horseradish Peroxidase | 9.9% | No, less than Sample A |
| Glucose Oxidase | 22.0% | No, less than Sample A |
| Monolaurin | 75.8% | Yes, greater than Sample |
| Nisin | 76.0% | Yes, greater than Sample |
| AMP-7 | 80.6% | Yes, greater than Sample |
| AMP-6 | 82.1% | Yes, greater than Sample |

Example 54: This Example demonstrate selection method for measuring lipase activity as an antibiological agent by detection of bioactivity in films produced by a cured coating after in-can storage of the coating comprising the lipase compositions.

The samples were made with Acrylic latex Sample A paint (no added biocide) and have been left a room temperature (RT) since they were first made. At each time point, the samples are stirred by hand, a draw down made on a Leneta chart, and the paint is left at RT to dry for 24 hrs. The enzyme assay is done on the paint after the 24-hr dry time. These are relative conversion rates of the substrate used for the assay and are reported as the average of 3 spots on the dried films. The same controls are shown on both Table below. Values greater than the blank/control of 0 showed that the lipase in the paint is still active.

TABLE 91A

Enzymatic activity in films

| Additive and | Additive | Activity | 1 Week in | 2 Weeks | 3 Weeks |
|---|---|---|---|---|---|
| Lipase-Source A | 0-blank/control | 0.0 | 0.0 | 0.0 | 0.0 |
| 4-nitrophenyl | 0.5 wt % on solids | 5.2 | 6.2 | 6.2 | 7.6 |
| acetate | 1.5 wt % on solids | 7.0 | 7.3 | 6.5 | 9.7 |
|  | 3.0 wt % on solids | 10.6 | 7.9 | 8.4 | 9.9 |
| Lipase-Source B | 0-blank/control | 0.0 | 0.0 | 0.0 | 0.0 |
| 4-nitrophenyl | 0.5 wt % on solids | 5.2 | 4.9 | 5.5 | 8.6 |
| acetate | 1.5 wt % on solids | 6.3 | 6.4 | 8.2 | 9.0 |
|  | 3.0 wt % on solids | 7.8 | 8.7 | 6.4 | 8.2 |

TABLE 91B

Enzymatic activity in films

| Additive and | Additive | Activity | 1 Month | 2 Months | 3 Months |
|---|---|---|---|---|---|
| Lipase-Source A | 0-blank/control | 0.0 | 0.0 | 0.0 | 0.0 |
| 4-nitrophenyl | 0.5 wt % on solids | 5.2 | 6.7 | 4.6 | 6.4 |
| acetate | 1.5 wt % on solids | 7.0 | 5.8 | 5.9 | 6.6 |
|  | 3.0 wt % on solids | 10.6 | 6.3 | 8.2 | 7.0 |
| Lipase-Source B | 0-blank/control | 0.0 | 0.0 | 0.0 | 0.0 |
| 4-nitrophenyl | 0.5 wt % on solids | 5.2 | 3.2 | 5.0 | 4.7 |
| acetate | 1.5 wt % on solids | 6.3 | 4.5 | 5.5 | 4.6 |
|  | 3.0 wt % on solids | 7.8 | 5.0 | 7.3 | 5.3 |

While there is some variability in this assay, it is clear that the samples were active after 3 months in liquid paint at room temperature ("RT"). It is contemplated that materials that are of interest for their activity may be assayed for enzyme activity obtain results as micromolar conversion of substrate per minute per unit area.

Example 55: This Example demonstrate determination of the amount (volume) of microbial inoculant needed to achieve visible contamination of Acrylic latex paint having an antibiological agent added verse a control Acrylic latex Sample paint having no added antibiological substance (i.e., containing biocide preservative) and another control Acrylic latex paint having regular commercial amounts of antibiological biocide preservative(s).

Per ASTM D2574 protocol (ASTM Standard D2574-16, Standard Test Method for Resistance of Emulsion Coatings in the Container to Attack by Microorganisms, ASTM International, West Conshohocken, P A, 2016), each of the strains of microbes were grown in tryptic soy broth liquid media individually, and they were passed twice before use to inoculate the test paints. The *Pseudomonas* spp. needed 72 hours while the other strains needed only 24 hours of growth time before inoculation. At the time of testing, the microbes were mixed and each test paint sample was inoculated with the mixture of microbes. The test paints were made by mixing each of the bio-based additives with Acrylic latex Sample A (no added biocide) paint by hand. Each of the inoculated paints was stored in a sterilized, sealed, glass container at 30° C. for seven days. Microorganisms were recovered from each test paint on days 1, 3, 5, and 7 of the ASTM D2574 test by dipping sterile swabs into each paint sample and spreading over tryptic soy agar plates. The plates were made in duplicate and were kept at 30° C. for 7 days. After incubating the plates for 7 days, the plates were evaluated for microbial growth and scored based on the number of colonies present (the Table below shows scoring system). Acrylic latex Sample A (no added biocide) and Acrylic latex Sample B (off-the-shelf formulation) were used in each test round as positive and negative controls, respectively.

TABLE 92

Log scale rating system for streaked plate microbial growth. Reproduced from ASTM D2574.

0 = No bacterial recovery.
1 = Trace of contamination (1 to 9 colonies).
2 = Light contamination (10 to 99 colonies).
3 = Moderate contamination (>100 distinct colonies).
4 = Heavy contamination (continuous smear of growth, colonies have grown together and are indistinguishable).

The following variations from the ASTM D2574 testing protocol were made: two volumes that deviate from the ASTM suggested 100 g of paint were evaluated—50 mL paint samples and 25 mL paint samples. Because of the volume change in paint, the microbe culture volume was also reduced to 5 mL of each strain versus the ASTM listed 10 mL volume. The paint volumes used and the selected biomolecule compositions for testing are shown in the Table below.

TABLE 93

Bio-based additives identified for evaluation from Phase 1 testing.

| 50 mL paint to be used for ASTM D2574 | 25 mL paint to be used for ASTM D2574 |
|---|---|
| Lysozyme | AMP-7 |
| Nisin | AMP-6 |
| Monolaurin | AMP-LKLK |
| Horseradish Peroxidase | Melittin |
| Glucose Oxidase |  |

Series 1 ASTM D2574: The test paints and antibiological agents included Acrylic latex Sample A (no added biocide, original sample), Acrylic latex Sample B (with biocide, original sample), lysozyme 0.5 mg/mL (final concentration after admixing with the paint), lysozyme 5.0 mg/mL, AMP-7 0.5 mg/mL, and AMP-7 5.0 mg/mL. This series of tests also examined two microbe contamination levels (1 μL inoculum/mL paint and 10 μL inoculum/mL paint) to determine if the ASTM recommended level of contamination would be suitable for further testing. The results in the Table below are averaged from duplicate plates at 7 days of growth, and showed that the ASTM recommended contamination level was appropriate and showed contamination of the control sample after 7 days; therefore, 1 μL inoculum/mL was used for testing in Series 2.

TABLE 94

Series 1 ASTM D2574 results with two levels of microbial contamination.
Score 0 = no growth, 4 = continuous growth.

| Sample | ASTM Score (0-4) | | | | Notes |
| --- | --- | --- | --- | --- | --- |
| | Day 1 | Day 3 | Day 5 | Day 7 | |
| Contamination level = 1 µL inoculum/mL paint (ASTM recommended level) | | | | | |
| Acrylic latex B (biocide) | 0 | 0 | 0 | 0 | No odor from paint (7 day) |
| Acrylic latex A (no added biocide) | 4 | 4 | 4 | 4 | Slight odor from paint (7 day) |
| Lysozyme 0.5 mg/mL | 4 | 4 | 4 | 4 | No odor from paint (7 day) |
| Lysozyme 5.0 mg/mL | 4 | 4 | 4 | 4 | Slight odor from paint (7 day) |
| AMP-7 0.5 mg/mL | 4 | 4 | 4 | 4 | Slight odor from paint (7 day) |
| AMP-7 5.0 mg/mL | 4 | 4 | 4 | 4 | Strong odor from paint (7 day) |
| Contamination level = 10 µL inoculum/mL paint | | | | | |
| Acrylic latex B (biocide) | 3 | 0 | 0 | 0 | No odor from paint (7 day) |
| Acrylic latex A (no added biocide) | 4 | 4 | 4 | 4 | Strong odor from paint (7 day) |
| Lysozyme 0.5 mg/mL | 4 | 4 | 4 | 4 | Strong odor from paint (7 day) |
| Lysozyme 5.0 mg/mL | 4 | 4 | 4 | 4 | Strong odor from paint (7 day) |
| AMP-7 0.5 mg/mL | 4 | 4 | 4 | 4 | Strong odor from paint (7 day) |
| AMP-7 5.0 mg/mL | 4 | 4 | 4 | 4 | Strong odor from paint (7 day) |

The lysozyme and AMP-7 samples all showed continuous growth and scored "4" like the Acrylic latex A sample; the lysozyme and AMP-7 samples did show a difference with some individual colonies present in those plates and not in the Acrylic latex A (no added biocide) plates. Specifically the streaked plates for Series 1, day 7 of the Acrylic latex Sample A (no added biocide) showed yellowing of the paint and a textured surface of continuous microbial growth (score=4). Series 1, day 7 of the Acrylic latex B (biocide) paint showed no growth (score=0), as the paint streaks remained white and no additional texture (no growth) seen. The streaked plate for Series 1, day 7 of the AMP-7 0.5 mg/mL paint showed continuous growth (score=4) and some individual colonies are present not seen in the Acrylic latex A sample. The streaked plates for Series 1, day 7 of the lysozyme 0.5 mg/mL paint showed continuous growth (score=4) and some small individual colonies are present not seen in the Acrylic latex A sample. The individual colonies could indicate that the AMP-7 and lysozyme additives are having a biocidal effect on certain microbial strains, which formed individual colonies and did not exhibit continuous growth due to their reduced number.

Series 2 ASTM D2574: This series was used to test the bio-based additives listed in the Table above, Acrylic latex Sample A (no added biocide, new sample), and Acrylic latex Sample B (with biocide, original sample). Each bio-based antibiological agent was tested at the level that showed anti-microbial activity in XTT in vitro analysis and at a level 10× higher. The seven-day testing period has been completed, but the seven-day growth period of the streaked plates has only been completed up to day 5, though the growth on day 7 plates appear to follow the same trend as day 5 plates. The results are averaged from duplicate plates at 7 days of growth for these samples, and are provided in the Table below.

TABLE 95

Series 2 ASTM D2574 results. Score 0 = no growth, 4 = continuous growth.
Contamination level = 1 µL inoculum/mL paint (ASTM recommended level)

| Sample | ASTM Score (0-4) | | | | Notes |
| --- | --- | --- | --- | --- | --- |
| | Day 1 | Day 3 | Day 5 | Day 7 | |
| Acrylic latex B (biocide) | 1 | 0 | 0 | TBD | No odor from paint (7 day) |
| Acrylic latex A (no added biocide) | 4 | 1 | 0 | TBD | No odor from paint (7 day) |
| Lysozyme 0.5 mg/mL | 4 | 0 | 0 | TBD | No odor from paint (7 day) |
| Lysozyme 5.0 mg/mL | 4 | 0 | 0 | TBD | No odor from paint (7 day) |
| AMP-7 0.5 mg/mL | 4 | 0 | 0 | TBD | No odor from paint (7 day) |
| AMP-7 5.0 mg/mL | 4 | 0 | 0.5 | TBD | No odor from paint (7 day) |
| Nisin 0.5 mg/mL | 4 | 2 | 0 | TBD | No odor from paint (7 day) |
| Nisin 5.0 mg/mL | 4 | 1 | 0 | TBD | No odor from paint (7 day) |
| Monolaurin 0.5 mg/mL | 4 | 0 | 0 | TBD | No odor from paint (7 day) |
| Monolaurin 5.0 mg/mL | 4 | 0.5 | 0 | TBD | No odor from paint (7 day) |
| Horseradish peroxidase 0.05 mg/mL | 4 | 0 | 0 | TBD | No odor from paint (7 day) |
| Horseradish peroxidase 0.5 mg/mL | 4 | 1 | 0 | TBD | No odor from paint (7 day) |
| AMP-6 0.5 mg/mL | 4 | 0 | 0 | TBD | No odor from paint (7 day) |
| AMP-6 5.0 mg/mL | 4 | 0.5 | 0.5 | TBD | No odor from paint (7 day) |
| AMP-LKLK 0.5 mg/mL | 4 | 0 | 0 | TBD | No odor from paint (7 day) |

TABLE 95-continued

Series 2 ASTM D2574 results. Score 0 = no growth, 4 = continuous growth.
Contamination level = 1 µL inoculum/mL paint (ASTM recommended level)

| Sample | ASTM Score (0-4) | | | | Notes |
| --- | --- | --- | --- | --- | --- |
| | Day 1 | Day 3 | Day 5 | Day 7 | |
| AMP-LKLK 5.0 mg/mL | 4 | 1 | 0 | TBD | No odor from paint (7 day) |
| Glucose oxidase 0.005 mg/mL | 4 | 0 | 0 | TBD | No odor from paint (7 day) |
| Glucose oxidase 0.05 mg/mL | 3 | 0 | 0 | TBD | No odor from paint (7 day) |
| Melittin 0.005 mg/mL | 4 | 1 | 0 | TBD | No odor from paint (7 day) |
| Melittin 0.05 mg/mL | 4 | 0 | 0 | TBD | No odor from paint (7 day) |

It appears from the differences in Series 1 and Series 2 growth results that the age of the Acrylic latex A paint (no added biocide) effects microbial growth at the same inoculation level, with the older paint showing significantly more microbial growth. Prior to beginning Series 1 and 2, the Acrylic latex A paint (original sample) was streaked onto an agar plate and zero microbial growth was confirmed (to ensure the paint sample itself was not contaminated). It is unclear at this point what difference exists between the two samples to result in the great difference in growth with the same inoculant concentration. Because of this difference in microbial growth between the two Acrylic latex A samples, the inoculation level used in Series 1 does not appear to be high enough for the newer Acrylic latex A sample.

The day 1 results from Series 2 testing showed all the samples had continuous growth other than Acrylic latex B (with biocide) and glucose oxidase 0.05 mg/mL. The streaked plates for Series 2, day 1 of the glucose oxidase 0.05 mg/mL paint showed reduced colonies of microbial growth (score=3) compared to Acrylic latex Sample A (score=4). The Acrylic latex Sample A still shows some microbial growth for day 3 (score=1) while several of the bio-based additives appear to enhance antimicrobial effects for the paint and show results similar to the Acrylic latex Sample B with zero discernable growth. From day 3 of this analysis, lysozyme, monolaurin, horseradish peroxidase, AMP-7, AMP-6, AMP-LKLK, glucose oxidase, and melittin all show no microbial growth (score=0).

Day 5 results showed no growth (score=0) for the Acrylic latex A sample (Sherwin-Williams). At day 7 the Sample A control (no added biocide) did not show contamination, therefor due to the results of this control Series 2 data is inconclusive.

The ASTM procedure states that another inoculation should be made at a higher level (10 µl inoculant/mL of paint) and the test continued repeating the seven day sampling period with new scores. After seeing day 5 results for Acrylic latex A of no growth, swabs of each of the original paint samples were taken and added to liquid TSB media to promote growth of any microbes present. This was done as an enhancement of the ASTM data to determine if enough bacterial cells remain to establish growth in the liquid media as opposed to the streak plates (random sampling for streak plates may miss cells when the number is very low). After 24 hours of growth in the liquid TSB media, swabs were streaked onto TSA plates for growth evaluation. The plates will be incubated for 7 days and examined for growth. These plates do not get scored like the original ASTM D2574 plates, but they can help differentiate between complete kill and significant reduction in microbial content in the test paints.

Example 56: This Example demonstrate determination of the amount (volume) of microbial inoculant needed to achieve visible contamination of Acrylic latex paint having an antibiological agent added verse a control Acrylic latex Sample paint having no added antibiological substance (i.e., containing biocide preservative) and another control Acrylic latex paint having regular commercial amounts of antibiological biocide preservative(s) by modifying the amount of inoculant after initial inconclusive results of an antibiological substance free control.

The Series 2 testing in above was inconclusive due to the results from the Acrylic latex A negative control sample prepared to lack added paint preservative. The undesired presence of an antimicrobial substance in one or more coating components before admixing to produce the Acrylic latex A may have accounted for the lack of microbial growth in the Acrylic latex A sample. Series 2 round of testing was repeated both by re-inoculation of the existing Series 2 paints at a higher inoculum level (10 µL inoculum/mL paint) and by making new paint samples and inoculating at the higher level (10 µL inoculum/mL paint).

Per ASTM D2574, each of the strains of microbes were grown in tryptic soy broth liquid media individually, and they were passed twice before use to inoculate the test paints. The *Pseudomonas* spp. needed 72 hours while the other strains needed only 24 hours of growth time before inoculation. At the time of testing, the strains of microbes were mixed and each test paint sample was inoculated with the mixture of microbes. The test paints were made by mixing each of the bio-based additives with Acrylic latex Sample A (no added biocide) paint by hand. Each of the inoculated paints was stored in a sterilized, sealed, glass container at 30° C. for seven days. Microorganisms were recovered from each test paint on days 1, 3, 5, and 7 of the ASTM D2574 test by dipping sterile swabs into each paint sample and spreading over tryptic soy agar plates. The plates were made in duplicate and were kept at 30° C. for 7 days. After incubating the plates for 7 days, the plates were evaluated for microbial growth and scored based on the number of colonies present as per ASTM D2574 described in the Examples above. All scores are averaged from duplicate plates at 7 days of growth. Acrylic latex Sample A (no added biocide) and Acrylic latex Sample B (off-the-shelf formulation) were used in each test round as negative and positive controls, respectively.

The ASTM D2574 protocol was modified by testing at two volumes that deviate from the ASTM suggested 100 g of paint: 50 mL paint samples and 25 mL paint samples. The antibiological agents test and paint samples volumes were the same as the Examples above with the addition of measuring glucose oxidase, duramycin and beta-mannosidase in 25 mL paint. Because of the volume change in paint, the microbe culture volume was also reduced to 5 mL of each strain versus the ASTM listed 10 mL volume.

Re-inoculated Series 2 and Series 3 samples per ASTM D2574: Test paints for this series of tests included all the Series 2 paints that were reinoculated at a higher level and freshly made paints as shown in Table below.

TABLE 96A

Series 2 ASTM D2574 results for reinoculated plates. L = large; sm = small; col = colonies.
Re-inoculated Series 2 paints; 10 μL inoculum/mL paint

| Sample | ASTM Score (0-4) | | | | Notes |
|---|---|---|---|---|---|
| | Day 1 | Day 3 | Day 5 | Day 7 | |
| Acrylic latex B (biocide) | 4 | 2 | 4 | 1 | 1 plate with 80 col; 1 plate with 0 |
| Acrylic latex A (no added biocide, 6/22/17) | 4 | 4 | 4 | 3.5 | |
| Lysozyme 0.5 mg/mL | 4 | 4 | 3 | 3 | |
| Lysozyme 5.0 mg/mL | 4 | 4 | 3.5 | 2.5 | |
| AMP-7 0.5 mg/mL | 4 | 4 | 4 | 4 | Lawn of sm clear col |
| AMP-7 5.0 mg/mL | 4 | 4 | 4 | 4 | |
| Nisin 0.5 mg/mL | 4 | 4 | 4 | 3.5 | |
| Nisin 5.0 mg/mL | 4 | 4 | 4 | 4 | L brown col on lawn of sm clear |
| Monolaurin 0.5 mg/mL | 4 | 4 | 4 | 3.5 | |
| Monolaurin 5.0 mg/mL | 4 | 4 | 4 | 4 | Lawn of sm clear col |
| Horseradish peroxidase 0.05 mg/mL | 4 | 4 | 4 | 3 | |
| Horseradish peroxidase 0.5 mg/mL | 4 | 3 | 4 | 4 | Lawn of sm clear col |
| AMP-6 0.5 mg/mL | 4 | 4 | 3 | 3 | |
| AMP-6 5.0 mg/mL | 4 | 4 | 4 | 4 | Lawn of sm clear col |
| AMP-LKLK 0.5 mg/mL | 4 | 4 | 4 | 3.5 | |
| AMP-LKLK 5.0 mg/mL | 4 | 4 | 4 | 4 | |
| Glucose oxidase 0.005 mg/mL | 4 | 4 | 4 | 4 | |
| Glucose oxidase 0.05 mg/mL | 4 | 4 | 3.5 | 4 | Lawn of sm clear col |
| Melittin 0.005 mg/mL | 4 | 4 | 4 | 3 | |
| Melittin 0.05 mg/mL | 4 | 3.5 | 2.5 | 4 | |

TABLE 96B

Series 3 ASTM D2574 results. Freshly made paint samples; 10 μL inoculum/mL paint (unless otherwise indicated). L = large; sm = small; col = colonies. Additive samples were made using Acrylic latex A from 6/22/17 unless otherwise indicated.

| Sample | ASTM Score (0-4) | | | | Notes |
|---|---|---|---|---|---|
| | Day 1 | Day 3 | Day 5 | Day 7 | |
| Acrylic latex A (no added biocide, 3/6/17) 1 μL inoc/mL paint | 3 | 4 | 4 | 4 | |
| Acrylic latex A (no added biocide, 3/6/17) 10 μL inoc/mL paint | 4 | 4 | 4 | 4 | |
| Acrylic latex A (no added biocide, 6/22/17) 1 μL inoc/mL paint | 3.5 | 0.5 | 0 | 0 | |
| Acrylic latex A (no added biocide, 6/22/17) 10 μL inoc/mL paint | 4 | 4 | 4 | 4 | |
| Lysozyme 0.5 mg/mL | 4 | 4 | 4 | 4 | L brown col on lawn of sm clear |
| Lysozyme 5.0 mg/mL | 4 | 4 | 3 | 4 | Lawn of sm clear col |
| Monolaurin 0.5 mg/mL | 4 | 4 | 4 | 4 | |
| Monolaurin 5.0 mg/mL | 4 | 4 | 4 | 4 | |
| AMP-7 0.5 mg/mL | 4 | 4 | 4 | 4 | |
| AMP-7 5.0 mg/mL | 4 | 4 | 3.5 | 4 | Lawn of sm clear col |
| AMP-6 0.5 mg/mL | 4 | 3.5 | 2 | 0 | Day 5-brown col remain |
| AMP-6 5.0 mg/mL | 4 | 4 | 4 | 4 | |
| AMP-LKLK 0.5 mg/mL | 4 | 4 | 4 | 4 | Lawn of sm clear col |
| AMP-LKLK 5.0 mg/mL | 4 | 4 | 4 | 4 | |

The two samples of Acrylic latex A paint (no added biocide) were compared at low (1 µL inoculum/mL paint) and high (10 µL inoculum/mL paint) inoculation concentrations. Streaked plates for Series 3, day 7 of the old Sample A at low inoculation and old Sample A at high inoculation showed continuous growth (score=4). Plates for new Sample A at low inoculation showed no growth (score=0) while those at high inoculation showed significant growth (score=4).

The streaked plates for samples that were tested in the reinoculation of Series 2 and the freshly made samples of Series 3 (these samples were tested during the same time period using the same microbial cultures). The test can be considered valid because the control sample (Acrylic latex A, no added biocide) showed microbial growth on day 7. The streaked plates for the re-inoculated Series 2, day 7 of the Acrylic latex Sample A (high inoculation, no added biocide) showed yellowing of the paint and a textured surface of continuous microbial growth (score=4), while the reinoculated Series 2, day 7 of the Acrylic latex B (biocide) paint showed one plate with 80 colonies and one with no showed continuous growth and scored "4" like the Acrylic latex A sample; the lysozyme and AMP-7 samples did show a difference with some individual colonies present in those plates and not in the Acrylic latex A (no added biocide) plates. The individual colonies could indicate that the AMP-7 and lysozyme additives are having a biocidal effect on certain microbial strains, which formed individual colonies and did not exhibit continuous growth due to their reduced number. The AMP-6 sample at lower concentration (0.5 mg/mL) showed no growth (score=0) for day 7.

Series 4 ASTM D2574: This series was used to test the remaining bio-based antibiological agents that were not included in Series 3, Acrylic latex Sample A (no added biocide, new sample), Acrylic latex Sample B (with biocide, original sample) and AMP-6 to confirm results from Series 3 testing. All scores are averaged from duplicate plates at 7 days of growth. The results for these samples are provided in the Table below and show that the Acrylic latex A samples, and several of the candidate additive systems. All scores are averaged from duplicate plates at 7 days of growth.

TABLE 97

Series 4 reinoculated ASTM D2574 results. Notes provided give level of growth on plate (heavy, moderate, light, zero) and the estimated number of colony types based on pigment and morphology.

| Sample | ASTM Score (0-4) Day 1 | Day 3 | Day 5 | Day 7 | Notes Growth level/ # of strains |
|---|---|---|---|---|---|
| Acrylic latex B (biocide) | 3 | 0 | 0 | 0 | Zero growth/zero strains |
| Acrylic latex A (no added biocide, Jun. 22, 2017) | 4 | 4 | 4 | 4 | Heavy/mixed strains |
| Nisin 0.5 mg/mL | 4 | 4 | 4 | 4 | Moderate - Heavy/2 strains; Brown colon lawn of clear col |
| Nisin 5.0 mg/mL | 4 | 4 | 4 | 4 | Moderate/2 strains; L brown col and sm brown col |
| Horseradish peroxidase 0.05 mg/mL | 4 | 3 | 3 | 4 | Moderate - Heavy/1 strain |
| Horseradish peroxidase 0.5 mg/mL | 4 | 4 | 4 | 4 | Moderate/2 strains (1 < 10 colonies) |
| AMP-6 0.5 mg/mL | 4 | 4 | 3.5 | 4 | Moderate - Heavy/2 strains (1 < 10 colonies); brown col on lawn of clear col |
| AMP-6 5.0 mg/mL | 4 | 4 | 4 | 4 | Heavy/mixed strains; lawn of clear col |
| Glucose oxidase 0.005 mg/mL | 4 | 4 | 4 | 4 | Moderate/1 strain |
| Glucose oxidase 0.05 mg/mL | 4 | 4 | 4 | 4 | Moderate/1 strain |
| Melittin 0.005 mg/mL | 4 | 4 | 4 | 4 | Heavy/mixed strains |
| Melittin 0.05 mg/mL | 4 | 4 | 4 | 4 | Moderate - Heavy/2-3 strains; Sm clear col |
| Duramycin 0.02 mg/mL | 4 | 4 | 4 | 4 | Moderate/2 strains (1 < 10 colonies) |
| Duramycin 0.2 mg/mL | 4 | 4 | 4 | 4 | Moderate/1 strain |
| β-mannosidase 0.075 U/mL | 4 | 3 | 3 | 4 | Moderate - Heavy/2-3 strains; Sm tan, 1 L tan, 1 L yellow |

Several biomolecule compositions provided significant reduction in colony counts and number of colony types compared with the Acrylic latex A control, and exhibited biocidal activity comparable to traditional biocides for certain strains in Acrylic latex coating when tested against the various bacteria being evaluated herein. This is apparent from the standardized test scoring to a certain degree, but is markedly so from actual colony counts of individual strains, growth (score=1). The lysozyme and AMP-7 samples all as several biomolecule compositions showed complete kill of 8 strains, though one or more stains remained.

Example 57: This Example demonstrate selection method for a combination of biomolecule compositions as an antibiological agent combination by detection of antibiological activity in vitro using a high-throughput metabolic assay.

XTT assays were conducted using the mixture of the microbial strains with paired combinations of the antibiological agents. The ranked results are given in the Table below for the XTT assay conducted in a buffered solution and show that several combinations had a significant effect on the metabolism of the microbe mixture. A few of the biomolecular compositions showed large standard deviations. This has been attributed to the use of the mixture of microbial strains because several of the strains are pigmented and could influence the absorbance readings differently based on which strains remained after exposure to the additive. DMSO was included to provide monolaurin solubility and was included with the other additives to determine inherent effects.

TABLE 98

XTT assay results showing percent reduction in metabolism for the bio-additive or a combination of additives.
Higher percentage = less cell growth.

| Additive or Combination of Additives | % Reduction in Metabolism Averages | Std Dev |
|---|---|---|
| 0.5 mg/ml AMP-7 + 0.5 mg/ml monolaurin | 71.6 | 11.3 |
| 0.5 mg/ml AMP-6 + 0.5 mg/ml monolaurin | 69.7 | 6.3 |
| 0.5 mg/ml lysozyme + 0.5 mg/ml monolaurin | 69.7 | 1.8 |
| 0.5 mg/ml AMP-LKLK + 0.5 mg/ml monolaurin | 68.8 | 5.0 |
| 0.5 mg/ml peroxidase + 0.5 mg/ml monolaurin | 65.7 | 18.2 |
| 0.5 mg/ml nisin + 0.5 mg/ml monolaurin | 65.6 | 16.1 |
| 0.5 mg/ml AMP-6 + 0.5 mg/ml AMP-7 | 54.5 | 1.0 |
| 0.5 mg/ml AMP-7 + 0.5 mg/ml AMP-LKLK | 52.4 | 1.3 |
| 0.5 mg/ml monolaurin | 48.2 | 1.2 |
| 0.05 mg/ml glucose oxidase + 0.5 mg/ml monolaurin | 46.9 | 51.8 |
| 0.05 mg/ml glucose oxidase + 0.5 mg/ml peroxidase | 44.1 | 2.1 |
| 0.5 mg/ml peroxidase + 0.5 mg/ml AMP-7 | 43.5 | 5.0 |
| 0.05 mg/ml glucose oxidase + 0.5 mg/ml AMP-6 | 42.9 | 1.1 |
| 0.05 mg/ml glucose oxidase + 0.5 mg/ml AMP-7 | 39.4 | 6.2 |
| 0.5 mg/ml nisin + 0.5 mg/ml peroxidase | 39.2 | 6.4 |
| 0.05 mg/ml glucose oxidase + 0.5 mg/ml AMP-LKLK | 37.2 | 5.8 |
| 0.5 mg/ml nisin + 0.5 mg/ml AMP-7 | 36.7 | 1.8 |
| 0.5 mg/ml AMP-7 + DMSO | 33.8 | 4.6 |
| 0.05 mg/ml glucose oxidase + DMSO | 33.0 | 4.4 |
| 0.5 mg/ml lysozyme + 0.5 mg/ml AMP-7 | 30.3 | 2.2 |
| 0.5 mg/ml lysozyme + 0.5 mg/ml glucose oxidase | 29.7 | 0.7 |
| 0.5 mg/ml AMP-6 + DMSO | 29.6 | 7.4 |
| 0.5 mg/ml nisin + 0.05 mg/ml glucose oxidase | 24.6 | 3.9 |
| 0.5 mg/ml lysozyme + DMSO | 24.4 | 1.4 |
| 0.5 mg/ml nisin + 0.5 mg/ml AMP-6 | 23.9 | 10.6 |

TABLE 98-continued

XTT assay results showing percent reduction in metabolism for the bio-additive or a combination of additives.
Higher percentage = less cell growth.

| Additive or Combination of Additives | % Reduction in Metabolism Averages | Std Dev |
|---|---|---|
| 0.5 mg/ml peroxidase + 0.5 mg/ml AMP-LKLK | 21.8 | 10.7 |
| 0.5 mg/ml AMP-7 | 21.7 | 9.4 |
| 0.5 mg/ml nisin | 19.1 | 4.2 |
| 0.5 mg/ml peroxidase + 0.5 mg/ml AMP-6 | 19.0 | 2.7 |
| 0.5 mg/ml peroxidase | 18.6 | 4.0 |
| 0.5 mg/ml peroxidase + DMSO | 18.4 | 21.6 |
| 0.05 mg/ml glucose oxidase | 17.0 | 3.8 |
| 0.5 mg/ml lysozyme + 0.5 mg/ml nisin | 16.8 | 5.5 |
| 0.5 mg/ml lysozyme + 0.5 mg/ml peroxidase | 16.5 | 2.0 |
| 0.5 mg/ml lysozyme + 0.5 mg/ml AMP-6 | 15.8 | 0.7 |
| 0.5 mg/ml nisin + DMSO | 15.2 | 5.1 |
| 0.5 mg/ml AMP-LKLK + DMSO | 12.4 | 4.5 |
| 0.5 mg/ml nisin + 0.5 mg/ml AMP-LKLK | 8.6 | 4.6 |
| 0.5 mg/ml lysozyme | 7.1 | 9.9 |
| 0.5 mg/ml lysozyme + 0.5 mg/ml AMP-LKLK | 1.3 | 6.5 |
| 0.5 mg/ml AMP-LKLK | −2.0 | 2.7 |
| 0.5 mg/ml AMP-6 | −9.2 | 1.9 |
| 0.5 mg/ml AMP-6 + 0.5 mg/ml AMP-LKLK | −15.1 | 3.6 |

Example 58: This Example demonstrate evaluation of combinations of antibiological agents in inhibiting contamination of Acrylic latex paint verse a control Acrylic latex Sample paint having no added antibiological substance (i.e., containing biocide preservative) and another control Acrylic latex paint having regular commercial amounts of antibiological biocide preservative(s).

Series 5 ASTM D2574: This series was used to reinoculate the Series 3 AMP-6 (0.5 mg/mL) sample, introduce some combinations of materials based on the last few ASTM test results and the XTT data collected, and test AMP-6 at lower concentrations. It was also noticed that the monolaurin had limited solubility in the paint for previous ASTM testing, and this round of testing used an improved method for monolaurin incorporation by warming the paint and monolaurin followed by vigorous mixing which resulted in a more stable mixture of the two. All scores are averaged from duplicate plates at 7 days of growth, and are shown at the Table below.

TABLE 99

Series 5 ASTM D2574 results. Notes provided give level of growth on plate (heavy, moderate, light, zero) and the estimated number of colony types based on pigment and morphology.

| Sample | ASTM Score (0-4) | | | | Notes |
| | Day 1 | Day 3 | Day 5 | Day 7 | Growth level/# of strains |
|---|---|---|---|---|---|
| Acrylic latex B (biocide) | 2.5 | 0 | 0 | 0 | Zero growth/zero strains |
| Acrylic latex A (no added biocide, 6/22/17) | 4 | 4 | 4 | 3 | Moderate/2-3 strains (1 < 20 colonies) |
| Series 3 AMP-6 0.5 mg/mL, reinoculation | 4 | 4 | 4 | 4 | Moderate/1 strain |
| AMP-6 0.05 mg/mL | 4 | 4 | 3 | 3 | Light-Moderate/2 strains (1 < 10 colonies) |
| AMP-6 0.25 mg/mL | 4 | 4 | 3.5 | 3 | Moderate/2 strains (1 < 10 colonies) |
| AMP-6 0.5 mg/mL | 4 | 4 | 4 | 3 | Heavy/3 strains (1 < 10 colonies) |
| Monolaurin (improved soln. process) 0.5 mg/mL | 4 | 4 | 4 | 3 | Moderate/2 strains (1 < 10 colonies) |
| AMP-6 0.5 mg/mL + monolaurin 0.5 mg/mL | 4 | 4 | 4 | 4 | Moderate/2-3 strains |
| AMP-6 0.5 mg/mL + lysozyme 0.5 mg/mL | 4 | 4 | 3.5 | 3 | Light-Moderate/2 strains |

TABLE 99-continued

Series 5 ASTM D2574 results. Notes provided give level of growth on plate (heavy, moderate, light, zero) and the estimated number of colony types based on pigment and morphology.

| Sample | ASTM Score (0-4) | | | | Notes |
|---|---|---|---|---|---|
| | Day 1 | Day 3 | Day 5 | Day 7 | Growth level/# of strains |
| AMP-6 0.5 mg/mL + glucose oxidase 0.05 mg/mL | 4 | 4 | 4 | 3 | Moderate/2 strains (1 < 20 colonies) |
| AMP-6 0.25 mg/mL + AMP-7 0.25 mg/mL | 4 | 4 | 3.5 | 3 | Moderate/2 strains (1 < 20 colonies) |
| Lysozyme 0.5 mg/mL + monolaurin 0.5 mg/mL | 4 | 4 | 3.5 | 3 | Heavy/2-3 strains |

Basing selection on results from individual additive studies, pairwise combinations of bio-based additives are exhibiting synergistic biocidal characteristics (greater reduction in colony counts). These results indicate that by understanding the weakly surviving individual strains and adjusting the biomolecule composition combinations to specifically address these surviving strains, the biomolecule composition cocktail will result in complete in-can preservation comparable to the traditional biocides presently used.

Example 59: This Example demonstrates combinations of antibiological agents with or without non-biobased antibiologic substances that inhibit contamination of Acrylic latex paint.

Various combinations of antibiogical agents with or without non-biobased antibiological substances were admixed with Acrylic latex A paint (no biocide) and challenged in-can with the cocktail of microorganisms per ASTM D2574 protocol as previously described. The combinations shown in the Table below demonstrated complete inhibition (score=0) of microbial growth.

TABLE 100

Composition of Antibiological Substances Cocktails

| | Additive | Concentration | Mode of Action |
|---|---|---|---|
| Cocktail A | AMP-7 | 0.5 mg/mL | Cell membrane disruption |
| | Lysozyme | 0.5 mg/mL | Cell wall disruption |
| | Glucose oxidase | 0.05 mg/mL | Peroxide generation |
| | Alginate lyase | 0.5 mg/mL | Biofilm disrupter |
| Cocktail B | Nisin | 0.5 mg/mL | Cell wall disruption |
| | Lysozyme | 0.5 mg/mL | Cell wall disruption |
| | Horseradish peroxidase | 0.5 mg/mL | Free radical generation |
| | EDTA | 0.5 mg/mL | Chelator, metallo-enzyme inhibitor |
| | ABHCl from Sigma (cat # 857661-1G, lot # SLBT-4775). | 0.5 mg/mL | Serine protease inhibitor |

As Acrylic latex B possesses chemical preservatives that inhibit in-can microbial contamination and Acrylic latex B paint is prepared without those biocides, the amount of those biocides can be reduced by mixing various amounts of Acrylic latex A and Acrylic latex B, and then biobased antibiological agent(s) added to demonstrate that a cocktail of standard preservative(s) at a reduced amount and one or more antibiological agent(s) can achieve comparable in-can preservative activity as Acrylic latex A with standard chemical biocides. The Acrylic latex A+B mixtures with or without an antimicrobial agent were challenged in-can with the cocktail of microorganisms per ASTM D2574 protocol as previously described, with results shown on the Table below.

TABLE 101

Ability to Reduce Traditional Biocide Loading with Antibiological Agents

| Paint and Additive | Day 1 | Day3 | Day 5 | Day7 |
|---|---|---|---|---|
| 1:1 Acrylic latex A + Acrylic latex B | 3 | 3 | 1 | 1 |
| 2:1 Acrylic latex A + Acrylic latex B | 3 | 4 | 4 | 3* |
| 9:1 Acrylic latex A + Acrylic latex B | 4 | 4 | 3 | 4 |
| 1:1 Acrylic latex A + Acrylic latex B + Lysozyme | 3.5 | 4 | 3 | 3.5 |
| 2:1 Acrylic latex A + Acrylic latex B + Lysozyme | 3 | 4 | 3 | 2* |
| 9:1 Acrylic latex A + Acrylic latex B + Lysozyme | 4 | 4 | 3 | 3 |
| 1:1 Acrylic latex A + Acrylic latex B + AMP-7 | 3.5 | 4 | 3 | 4 |
| 2:1 Acrylic latex A + Acrylic latex B + AMP-7 | 4 | 4 | 3 | 3 |
| 9:1 Acrylic latex A + Acrylic latex B + AMP-7 | 4 | 4 | 3 | 3 |

*A score of 3 is >100 colonies, the score of 2 had 50 and 28 colonies on the duplicates.

Example 60: This Example demonstrates identification of resistant microorganisms to in-can antibiological substances by visual appearance relative to the strains used herein.

Often only a subset of the microorganisms being evaluated is resistant to the in-can antimicrobial substance being evaluated. If one organism survives to grow, then that will be indicative of an antibiological substance that may be less desirable for in-can use. Resistant subset organism(s) to one antibiological substance may be susceptible to another antibiological substance, so that combination of antibiogical substances may produce a cocktail with desirable antibiological properties. Visual comparison of remaining colonies after conducting ASTM D2574 protocol in the previous Examples to the species of challenge organisms was done to identify specific antibiological substance resistances and succesptablilites, and the results shown in the Table below.

TABLE 102

Visual Identification of Species of Microbes Resistant to Specific Antibiological Agent(s)

| Antibiological Agent(s) | Resistant Organism(s) Appearance | Corresponding Microbe |
|---|---|---|
| 0.05 mg/ml Melittin: | Yellow | *Microbacterium paraoxydans* |
| 0.05 mg/ml Melittin: | Brown | *Pseudomonas oleovorans* B |
| 5.0 mg/ml Lysozyme: | Yellow | *Microbacterium paraoxydans* |

TABLE 102-continued

Visual Identification of Species of Microbes Resistant to Specific Antibiological Agent(s)

| Antibiological Agent(s) | Resistant Organism(s) Appearance | Corresponding Microbe |
|---|---|---|
| 5.0 mg/ml Lysozyme: | Brown | Pseudomonas oleovorans B |
| 0.5 mg/ml Monolaurin: | Brown | Pseudomonas aeruginosa B |
| 0.5 mg/ml Monolaurin: | Lawn #1 | Pseudomonas oleovorans B |
| 0.5 mg/ml Monolaurin: | Lawn #2 | Pseudomonas sp. |
| 0.5 mg/mL AMP-7/ 0.5 mg/ml Monolaurin: | Brown | Pseudomonas oleovorans A |
| 0.5 mg/ml AMP-7/ 0.5 mg/ml Monolaurin: | Lawn 1 | Pseudomonas sp. |
| 0.5 mg/ml AMP-7/ 0.5 mg/ml Monolaurin: | Lawn 2 | Pseudomonas alcaliphila B |
| 0.5 mg/ml AMP-6: | Brown | Pseudomonas aeruginosa A |
| 0.005 mg/ml Glucose Oxidase: | Brown | Pseudomonas oleovorans B |
| 0.05 mg/ml Peroxidase: | Brown | Microbacterium paraoxydans |
| 0.5 mg/ml AMP-6/ 0.5 mg/ml Lysozyme | Yellow | Pseudomonas oleovorans B |
| 0.5 mg/ml AMP-6/ 0.5 mg/ml Lysozyme | Brown | Pseudomonas sp. |
| 0.5 mg/ml AMP-6/ 0.5 mg/ml Lysozyme | Lawn | Pseudomonas aeruginosa B |
| 0.5 mg/ml AMP-6/ 0.5 mg/ml Lysozyme + EDTA Acrylic latex B Series 1 | | Pseudomonas oleovoran B |

Example 61: This Example demonstrates identification of resistant microorganisms to in-can antibiological substances by DNA sequence and comparison to sequences of species in DNA databases.

To identify one or more species of organisms resistant to various antibiological substance(s) after conducting ASTM D2574 protocol in the previous Examples, the DNA sequences of resistant organisms were compared to the DNA sequences found in the GenBank database.

The resistant colony or lawn of bacteria growth was plate streaked to isolate colony(s) for DNA analysis. DNA was extracted and used in PCR amplification and DNA sequences. The sequences were aligned and compared to those found in the GenBank data base. Various resistant organisms were identified that matched the visual identification in the Example above. The yellow colonies resistant to melittin were verified by DNA sequence to be Microbacterium paraoxydans. As a positive control, the sequences of the organisms being evaluated herein were compared to those in the GenBank database, and organisms such as Pseudomonas aeruginosa B identified as having 99% identify with other species of Pseudomonas or Pseudomonas aeruginosa.

Thus, PCR amplification and sequence analysis was useful for rapid identification of isolates following standard ASTM paint challenge. It confirmed identification of suspected strains based on colony morphology (yellow Microbacterium colonies), but was most beneficial for rapid identification of more obscure clear or brown colonies and lawn growth. Several commonly seen resistant colony types by visual identification were identified by DNA sequencing as remaining members from a number of antibiological agent challenges, such as Pseudomonas oleovorans B. DNA analysis was used to confirm the identity of single remaining isolates in several cases, glucose oxidase, peroxidase, and AMP-7/Lysozyme/EDTA; and was able to determine that Pseudomonas oleovorans B was able to survive challenge in Acrylic latex B.

Example 62: This Example demonstrates selection of an antibiological agent from one or more similar antibiological agents for use against a particular microorganism.

As peptide libraries can possess millions of different peptide sequences, many having various antibiological properties that include some being more effective against a certain microorganism over another. The effectiveness of an antibiological substance can be modified ("tuned") by selection of one or more peptides having enhanced antibiological activity against a target microorganism. The selection of the specific antibiological peptide between AMP-6, having the sequence FRLKFH, and AMP-7, having the sequence FRLKFHF, was conducted by growth curve comparison of Pseudomonas sp. grown in media containing differing concentrations of either AMP-6 or AMP-7, with no added antimicrobial agent media as a negative control and media containing the antibiological substance ethanol as a positive control of growth inhibition, as shown in the table below.

TABLE 103

Selection of a Specific Antibiological Agent from Several Simlar Ones Using Microbial Growth Rates

| Additive | Generation Time (Hours) | % Increase Generation |
|---|---|---|
| Control | 5.65 | 0 |
| Ethanol | 34.83 | 516 |
| 0.5 mg/ml AMP-6 | 144.30 | 2452 |
| 0.05 mg/ml AMP-6 | 4.67 | −17 |
| 0.5 mg/ml AMP-7 | 505.05 | 8833.33 |
| 0.05 mg/ml AMP-7 | 3030.30 | 53500 |

Based on the enhanced antibiological activity of AMP-7 relative to AMP-6 against for Pseudomonas sp., the former peptide is contemplated for use in antimicrobial substances that protect against Pseudomonas sp. Further evaluations of AMP-6, AMP-7 and AMP-LKLK were made using the XTT assay per the previous Examples against various organisms of the microbes being evaluated herein, with the results shown in the Table below.

TABLE 104

Selection of a Specific Antibiological Agent from Several Simlar Ones Using the XTT Metabolic Assay

| Biomolecule Composition | Concentration | Microbe | % Reduction in Metabolism | Standard Deviatio |
|---|---|---|---|---|
| AMP-7 | 0.5 mg/mL | Microbacterium paraoxydans | 95.1 | 0.1 |
| AMP-7 | 0.5 mg/mL | Pseudomonas oleovorans A | 84.2 | 1.0 |
| AMP-7 | 0.5 mg/mL | Pseudomonas alcaliphila B | 80.4 | 2.1 |
| AMP-7 | 0.5 mg/mL | Pseudomonas alcaliphila A | 77.5 | 0.9 |
| AMP-6 | 0.5 mg/mL | Pseudomonas sp. | 76.3 | 0.5 |
| AMP-7 | 0.5 mg/mL | Pseudomonas sp. | 73.4 | 1.3 |
| AMP-7 | 0.5 mg/mL | Pseudomonas aeruginosa B | 65.4 | 1.0 |
| AMP-7 | 0.5 mg/mL | Pseudomonas oleovorans B | 64.4 | 0.6 |

TABLE 104-continued

Selection of a Specific Antibiological Agent from Several Simlar Ones Using the XTT Metabolic Assay

| Biomolecule Composition | Concentration | Microbe | % Reduction in Metabolism | Standard Deviatio |
|---|---|---|---|---|
| AMP-7 | 0.5 mg/mL | Alcaligenes faecalis | 63.2 | 1.5 |
| AMP-LKLK | 0.5 mg/mL | Pseudomonas sp. | 61.0 | 3.9 |
| AMP-6 | 0.5 mg/mL | Alcaligenes faecalis | 53.7 | 1.6 |
| AMP-7 | 0.005 mg/mL | Pseudomonas oleovorans B | 45.8 | 3.6 |
| AMP-7 | 0.005 mg/mL | Microbacterium paraoxydans | 32.2 | 1.9 |
| AMP-6 | 0.005 mg/mL | Pseudomonas sp. | 21.2 | 5.4 |
| AMP-7 | 0.005 mg/mL | Alcaligenes faecalis | 17.9 | 2.4 |
| AMP-7 | 0.05 mg/mL | Pseudomonas oleovorans B | 68.9 | 1.7 |
| AMP-7 | 0.05 mg/mL | Pseudomonas oleovorans A | 61.4 | 4.9 |
| AMP-7 | 0.05 mg/mL | Microbacterium paraoxydans | 38.1 | 4.6 |
| AMP-7 | 0.05 mg/mL | Pseudomonas alcaliphila B | 35.8 | 0.8 |
| AMP-7 | 0.05 mg/mL | Alcaligenes faecalis | 20.3 | 5.1 |
| AMP-6 | 0.05 mg/mL | Pseudomonas sp. | 12.9 | 2.5 |

Example 63: This Example describes identification of specific organisms that contaminate a coating in-can and the changes in the amount of each organism over time.

Difference microbial organisms can contribute to community formation at different times during infestation of a coating during in-can storage. It is contemplated that identification of each organism through time may allow selection of one or more antimicrobial sub stance(s) for in-can preservation, such as inhibiting the growth of one or more organisms that are more important (e.g., early growers) in multispecies community formation.

It is contemplated that molecular biological techniques such as reverse transcription of RNA being expressed by actively growing microorganisms can identify which organisms are growing at a particular time. For example, total RNA may be extracted from microorganism challenged paint sample during an ASTM D2574 protocol. Reverse transcription quantitative real-time PCR may be used to allow synthesis of DNA from RNA template and real-time fluorescence monitoring of DNA amplification. The primers (probes) for DNA amplification may be designed to be specific for each strain by targeting variable regions of the sequences. Therefore primer will only bind and amplify an individual strain's nucleic acids. This will enable rapid quantitation of levels of strain members in the sample over time without the necessity to identify isolated strains by biochemical or sequence methods. This procedure will allow the monitoring of growth of each individual strain over length of spoilage challenge test.

It is contemplated that such rapid organism identification and organism growth analysis may be applied at any point in preparation of a material formulation, including manufacture of the material formulation's components, to select an antimicrobial substance for admixing or incorporation to achieve maximal antibiological effects throughout the manufacturing, distribution, and use of the material formulation. For example, during coating preparation rapid analysis of production point contamination may be conducted using general nucleic acid probe to detect any contamination and/or specific probes for detailed identification of organism genus or species, or an phyla classification level. Such analysis may also be done, for example, for coating raw materials (e.g., tints, resins, oils, solvents, etc.) during storage (e.g., tank farm storage), during mixing with other component(s) (e.g., pigments, etc.), during storage in pre-mix tanks, during dispersion milling, during the let-down (dilution) phase, in the filling machines for containers (e.g., cans, etc.), while the cans are being labeled, during packaging in cartons, during shipping, at the retail store outlet, in the hands of the customer during use, and so forth. Selected antibiological substance(s) may be added upon this analysis at the point where the effectiveness in reducing the growth of detected microorganisms would be enhanced relative to latter or earlier points in time.

Further, by identifying colonies that remain for the ASTM tested samples that show greatly reduced colony counts and limited number of remaining colony types, this will enhance the ability to select an optimum bio-based active combination. Such techniques can also be applied to evaluate select bio-based antibiological agents with each component of the paint to determine if a specific paint component is causing reduced in-can activity.

Example 64: This Example describes the use of biobased additives as in-can preservatives for coatings.

A metabolic assay (XTT) for screening of biobased additives, and coatings containing them, was used to measure each additive(s) effectiveness against common spoilage and coating-associated microbes. A tetrazolium salt was reduced to a water-soluble, orange derivative by metabolically active cells and measured spectrophotometrically in a high-throughput manner. Microbial spoilage agents including Pseudomonads as well as other Gram-negative and Gram-positive bacteria was used for initial screening. Over 30 enzyme and peptide-based biological molecules were selected for either their known antimicrobial activity or whose mechanism of action allows for synergistic effects with other biobased additives.

Following initial antimicrobial screening in the XTT assay, candidate biobased additives were evaluated using ASTM D2574 for in-can coating spoilage challenges. Impacts of biobased additive incorporation on physical properties of latex coatings were also evaluated. Numerous biobased additives and combinations were found to decrease cellular metabolism of microorganisms being evaluated herein by 50% or greater in the XTT assay. Biobased additives were identified that could selectively eliminate individual strain members as well as combinations that completely eliminated recoverable bacterial growth. In certain cases, carry-over antimicrobial properties were observed from efficacy as in-can liquid preservatives to efficacy as in-film biocides. This demonstrated the ability of using biobased additives for prevention of coating spoilage and their ability to decrease or eliminate traditional toxic and environmentally-damaging biocide levels. It is contemplated that bioadditive combinations that are broadly applicable across the widest material classes and formulations can be produced.

Both liquid-phase and dry film products of waterborne coatings may undergo microbial contamination. Different microbial groups are responsible for negative effects on coating properties. For this reason, the biocides used routinely differ depending on liquid in-can versus dry-film products. Bacteria are of greater concern for in-can preservation. Fungal contamination is observed less frequently inside cans, but is seen particularly where raw materials are contaminated or the production areas prone to fungal contamination are not controlled. Fungi and algae generally are the organisms that damage dry coating, and both microbes and macrofauna are targets for antifouling systems.

Common microorganisms isolated from wet coating include Gram-negative bacteria such as *Pseudomonas, Enterobacter, Escherichia*, and *Proteus* and Gram-positive endospore formers such as *Bacillus*. Pseudomonads are often the most frequently reported contaminants of in-can waterborne coatings owing to their high metabolic diversity and ability to form extensive biofilms. Sources of contamination include raw materials, production equipment, water, and recycled wash water. Wash water can be a major source of contamination in production facilities without adequate preservation; in some cases, leading to levels of $1 \times 10^{8-9}$ CFU/mL of contamination of the in-can coating product. In wet-state systems, microbial growth can impact the coating quality by hydrolysis of coating components, decrease in pH, production of gases, creation of foul odors, discoloration of the in-film product, and decreased viscosity.

Traditional biocides approved for in-can preservation fall into one of several common classes. These include formaldehyde releasers, isothiazolinone derivatives, as well as brominated and other halogenated compounds. These can be used alone or in combination with classes such as carbamates, quaternary amines, phenyl urea derivatives, and heavy metals for dry-film preservation and antifouling properties. Mechanisms of action vary and final cell death can often be contributed to multiple cellular impacts, several characteristic mechanisms have been determined. These include effects due to alkylating agents, crosslinkers, electrophilic substances, membrane disruptors, as well as releasers of free radicals and reactive oxygen species. Some of these have more direct impact on humans (e.g., alkylating agents and crosslinkers). Others, such as the isothiazolinones, have been reported to have lower direct toxicity to humans, but may cause sensitization following continued exposure. These and other health risks, as well as potential environmental impacts, have prompted many countries to restrict the levels of use and/or require special labeling.

Natural, biologically-based molecules described herein may be less toxic and require less stringent regulations. Enzymes, peptides, and natural product small molecules may also be used food and materials preservation. Biobased antimicrobials have been used food and personal health industries, in some cases carrying a Generally Regarded as Safe (GRAS) designation for the intended uses. Small antimicrobial peptides (AMPs) may be used for in-can coating preservation.

Biobased molecules that target different components of the microbial cell may broadly act as biologically-based biocides to include in-process and in-can preservatives. For example, enzymes that target the cell wall (lysozyme), glycocalyx or biofilm (alginate lyase), or that generate reactive oxygen (glucose oxidase) in combination with peptides to disrupt the cell membrane (AMPS) synergistically. This multifaceted approach has been used in the pharmaceutical industry to treat multidrug resistant infections and decrease the likelihood of resistance of a given strain occurring due to targeting of various molecular moieties within cells, and may be applied to paints, coatings, and other materials described herein.

The microbial species used for evaluating antimicrobial efficacy of such combinations for in-can water based coatings is preferred when they are selected to be those that are frequently isolated from coating. The microorganisms in the present Example belong to genera either recommended in ASTM Standard D2574 "Standard Test Method for Resistance of Emulsion Coatings in the Container to Attack by Microorganisms" or identified from other publicly available sources as coating contaminants.

Prevention of spoilage using a coating challenge method is one method used to evaluate a preservative, but is more time intensive for screening of biobased or other agents for coating preservation and may not be data-intensive enough to detect useful trends in biocidal affects. The present Example used rapid screening methods for initial selection of candidate agents for analysis in the coating challenge method. This screening method can be coupled with standard coating microbiological techniques to correlate ultimate efficacy of biobased biocides.

It is contemplated that a "bookend" approach can then be used that evaluates the ultimate in-film efficacy of such antimicrobial formulations, providing the formulation chemist and microbiologist with the largest and most complete database from which to control microbes from raw materials introduction, through production, into the marketed container, and ultimately into dry films. Assays to evaluate antimicrobial efficacy of candidate biocides should be used to quickly down-select the most promising formulations and a quantitative metabolic assay using the XTT substrate was used. This rapid cell viability assay utilizes the ability of living cells to reduce the tetrazolium dye XTT (2,3-bis-(2-methoxy-4-nitro-5-sulfophenyl)-2H-tetrazolium-5-carboxanilide) to a colored product that can be measured spectrophotometrically at a wavelength of 492 nm. Cells are cultured in liquid media and then transferred into 96-well (or 384-well) plates where they are exposed to XTT and treatment compounds (or controls). Following exposure, the reduction in cellular metabolism can be calculated and used as an indicator of cell viability following treatment. Small biobased molecules were used at high concentrations to validate that a high reduction in cellular metabolism in mixed culture XTT assays would translate to a zero score in the ASTM D2574 challenge method. Enzyme and peptide-based biomolecules were evaluated for antibacterial activity in the XTT (alone and in combination) and subsequently tested using ASTM D2574. Impacts on basic coating properties following formulation with biobased additives were also evaluated.

Cinnamaldehyde, citral, glucose oxidase, alginate lyase, nisin (2.5%), α-amylase, β-glucosidase, β-mannosidase, β-glucanase, amyloglucosidase, cellulose, trypsin, pectinase, and protease were obtained from Sigma-Aldrich (St. Louis, MO). Lysozyme was obtained from Bio-Cat (Troy, VA). Peroxidase was obtained from TCI America (Portland, OR). Chymotrypsin was obtained from 1VIP Biomedicals (Santa Anna, CA). OPDtox™ and the peptides AMP-6, AMP-7, and AMP-LKLK were obtained from Reactive Surfaces, Ltd. (Austin, TX). Monolaurin was obtained by grinding Lauricidin® pellets from Med-Chem Labs, Inc. (Goodyear, AZ) into a fine powder. XTT (2,3-b is-(2-methoxy-4-nitro-5-sulfophenyl)-2H-tetrazolium-5-carboxanilide)) was obtained from Biotium (Fremont, CA). Bacterial broth cultures used either SelenoMet™ (SM) minimal media from Molecular Dimensions (Altamonte Springs, FL) or Bacto Tryptic Soy Broth from Becton, Dickinson, and Co. (Sparks, MD). All growth media used Difco Tryptic Soy Agar from Becton, Dickinson, and Co. (Sparks, MD). *Pseudomonas aeruginosa* (#155250A), *Pseudomonas putida* (#155265), *Pseudomonas fluorescens* (#155255), *Alcaligenes faecalis* (#154835A), *Bacillus cereus* (#154870) and *Enterobacter aerogenes* (#155030) cultures were obtained from Carolina Biological Supply (Burlington, NC).

For the cell viability XTT assay, *Pseudomonas aeruginosa*, *Pseudomonas putida*, *Pseudomonas fluorescens*, *Alcaligenes faecalis*, *Bacillus cereus*, and *Enterobacter aerogenes* cultures were grown in 5 mL SM or TSB broth overnight at 30° C. with agitation, then diluted 1:10 in SM or TSB for assays measuring the effect of single additives of the growth of individual strains. In experiments looking at the effects of additives on mixed cultures, 1 mL from each overnight culture was first combined in a sterile tube, and the microbial mixture was diluted 1:10 with SM media. A stock of menadione was prepared at a concentration of 1.7 mg/mL in acetone, and was diluted 1:120 into a solution of 1 mg/mL XTT in PBS (filter-sterilized with 0.45 µm nylon filter (Fisher Scientific)) immediately before setting up the assay. Stock solutions were prepared in DMSO for monolaurin, cinnamaldehyde, and citral, or sterile water for all other additives so that the stock concentration was 20× the final test concentration. Each well in a 96-well microplate received, in triplicate, 10 µL of the additive to be tested, 20 µL of the XTT/menadione solution, and 100 µL of diluted cells, with the remainder consisting of growth media so that the final volume for each well was 200 µL. Wells containing diluted cells without additives (or with 10 µL DMSO for additives requiring DMSO for solubility) were included as negative controls. The absorbance at 492 nm was measured before and after incubation at 30° C. for 20 hours. The percent increase in absorbance and percent reduction in metabolism was calculated for each treatment as described. Testing was performed in triplicate using three different concentrations of the biobased additives.

Coating challenges were conducted as described in the ASTM International Standard procedure D2574-16. *Pseudomonas aeruginosa*, *Pseudomonas putida*, *Pseudomonas fluorescens*, *Alcaligenes faecalis*, *Bacillus cereus* and *Enterobacter aerogenes* cultures were grown in 5 mL TSB broth for 24 hours at 30° C. with agitation. Sterile inoculation loops were used to pass a loop-full of each culture into new 5 mL TSB broths, which were incubated for 24 hours at 30° C. with agitation. The cultures were passed and incubated again for 24 hours. Coating samples were prepared by hand mixing additives into 25 mL of acrylic latex coating using sterile glass rods. Sterile swabs were used to sample each coating and streak TSA plates to ensure that the coatings were sterile prior to inoculation. One mL from each broth culture was combined into a sterile tube and mixed well immediately prior to inoculation of the coating. The coating samples were inoculated with either 25 µL or 250 µL of the microbial mixture, and the coatings were incubated at 30° C. for the duration of the test. Sterile swabs were used to sample each coating and streak duplicate TSA plates on days 1, 3, 5, and 7 following inoculation. The TSA plates were incubated at 30° C. for one week, after which the amount of bacterial recovery from the coating was scored as described in the ASTM standard procedure: 0—no bacterial recovery; 1—trace contamination (1 to 9 colonies); 2—light contamination (10 to 99 colonies); 3 moderate contamination (>100 distinct colonies); 4—heavy contamination (continuous smear of growth, colonies have grown together and are indistinguishable).

Biocide-free acrylic latex was formulated with biobased additives in 10 mL coating by adding desired amounts of additives and hand mixing with a clean glass rod. Drawdowns were done at 6 mils wet film thickness on 0.6×76× 152 mm Q-panels (3003 H14 aluminum, mill finish and aluminum chromate pretreated) and 10 mils wet film thickness on 194×289 mm opacity charts (BYK byko-charts #2811). Final dry film thickness ranged from 25-33 µm on the Q-panels and 48-54 µm on the opacity charts. ICI viscosity was determined at 900 rpm using spindle 1, which equates to 11,997 sec$^{-1}$ (or 13.33*N, N in rpm). Pencil hardness, crosshatch adhesion, and color were tested after curing the panels for seven days at ambient temperature in a dust-free environment. The color change was reported as a deltaE comparison to the control (Equation 1)

$$\Delta E_{ab}^* = \sqrt{(L_2^* - L_1^*)^2 + (a_2^* - a_1^*)^2 + (b_2^* - b_1^*)^2} \qquad \text{Equation 1}$$

where L*, a*, and b* represent values along the lightness, red-green, and blue-yellow axes of the color sphere, respectively.

From an original panel of over 30 enzymes, peptides, and small molecule natural products, the 23 biobased additives listed in Table 105 were selected for evaluation here. These were screened against individual members of microbial contamination listed in Table 106 using the XTT assay (see Table 107 below). Nine of the 23 biobased additives were found to reduce cellular metabolism in the XTT assay by ≥50% (bold in Table 105).

TABLE 105

Biobased Additives Tested in the XTT Assay

| Enzymes | Enzymes | Peptides | Small Molecule Natural Products |
|---|---|---|---|
| Lysozyme | Lipase | AMP-7 | Cinnamaldehyde |
| β-Glucosidase | β-Gluconase | AMP-6 | Citral |
| Pectinase | Amyloglucosidase | AMP-LKLK | Monolaurin |
| β-Mannosidase | Trypsin | Nisin | |
| Endo glucanase | Cellulase | | |
| Chymotrypsin | Glucose oxidase | | |
| Amylase | Protease | | |
| Peroxidase | Alginate lyase | | |
| Organophosphate hydrolase (OPDtox ™'s active) | | | |

*Bold indicates additives that had ≥50% reduction in metabolism against at least one strain at the concentrations evaluated.

TABLE 106

Bacteria used for XTT and In-can Coating Challenges

| Bacterial Genus/ Species | Characteristics |
|---|---|
| *Alcaligenes faecalis* | Gram-negative bacillus |
| *Bacillus cereus* | Gram-positive bacillus, spore former |
| *Enterobacter aerogenes* | Gram-negative enteric |
| *Pseudomonas aeruginosa* | Gram-negative pseudomonad, biofilm former |
| *Pseudomonas fluorescens* | Gram-negative pseudomonad, biofilm former |
| *Pseudomonas putida* | Gram-negative pseudomonad, biofilm former |

TABLE 107

XTT Assay Results of Biobased Additives

| Additive | Concentration | Average % Reduction | Standard Deviation | Organism |
|---|---|---|---|---|
| Lysozyme | 0.5 mg/mL | −4.82 | 2.03 | *Pseudomonas aeruginosa* |
| Lysozyme | 0.05 mg/mL | −3.60 | 3.07 | *Pseudomonas aeruginosa* |
| Lysozyme | 0.005 mg/mL | −3.18 | 1.24 | *Pseudomonas aeruginosa* |
| Glucose oxidase | 0.5 mg/mL | 11.62 | 2.22 | *Pseudomonas aeruginosa* |
| Glucose oxidase | 0.05 mg/mL | 7.35 | 0.72 | *Pseudomonas aeruginosa* |
| Glucose oxidase | 0.005 mg/mL | 14.51 | 3.18 | *Pseudomonas aeruginosa* |
| AMP-6 | 0.5 mg/mL | 28.30 | 4.51 | *Pseudomonas aeruginosa* |
| AMP-6 | 0.05 mg/mL | −6.10 | 5.10 | *Pseudomonas aeruginosa* |
| AMP-6 | 0.005 mg/mL | −3.46 | 4.06 | *Pseudomonas aeruginosa* |
| AMP-7 | 0.5 mg/mL | 61.19 | 2.46 | *Pseudomonas aeruginosa* |
| AMP-7 | 0.05 mg/mL | −0.83 | 4.49 | *Pseudomonas aeruginosa* |
| AMP-7 | 0.005 mg/mL | 2.29 | 5.69 | *Pseudomonas aeruginosa* |
| Nisin | 0.5 mg/mL | −7.68 | 4.18 | *Pseudomonas aeruginosa* |
| Nisin | 0.05 mg/mL | −1.22 | 3.11 | *Pseudomonas aeruginosa* |
| Nisin | 0.005 mg/mL | 10.45 | 4.16 | *Pseudomonas aeruginosa* |
| Peroxidase | 0.5 mg/mL | 19.65 | 0.51 | *Pseudomonas aeruginosa* |
| Peroxidase | 0.05 mg/mL | −0.05 | 3.18 | *Pseudomonas aeruginosa* |
| Peroxidase | 0.005 mg/mL | −0.43 | 2.96 | *Pseudomonas aeruginosa* |
| Alginate lyase | 0.5 mg/mL | −12.52 | 4.15 | *Pseudomonas aeruginosa* |
| Alginate lyase | 0.05 mg/mL | −10.68 | 2.70 | *Pseudomonas aeruginosa* |
| Alginate lyase | 0.005 mg/mL | −5.01 | 2.15 | *Pseudomonas aeruginosa* |
| Cinnamaldehyde | 1% | 95.28 | 1.09 | *Pseudomonas aeruginosa* |
| Cinnamaldehyde | 0.10% | 77.20 | 9.82 | *Pseudomonas aeruginosa* |
| Cinnamaldehyde | 0.01% | −3.09 | 0.67 | *Pseudomonas aeruginosa* |
| Citral | 1% | 25.46 | 2.19 | *Pseudomonas aeruginosa* |
| Citral | 0.10% | 33.70 | 5.59 | *Pseudomonas aeruginosa* |
| Citral | 0.01% | −1.03 | 8.29 | *Pseudomonas aeruginosa* |
| Monolaurin | 0.5 mg/mL | 56.55 | 5.22 | *Pseudomonas aeruginosa* |
| Monolaurin | 0.05 mg/mL | −3.09 | 3.13 | *Pseudomonas aeruginosa* |
| Monolaurin | 0.005 mg/mL | −8.59 | 0.87 | *Pseudomonas aeruginosa* |
| Lysozyme | 0.5 mg/mL | 17.44 | 6.79 | *Pseudomonas putida* |
| Lysozyme | 0.05 mg/mL | −21.00 | 5.31 | *Pseudomonas putida* |
| Lysozyme | 0.005 mg/mL | 34.51 | 22.75 | *Pseudomonas putida* |
| Glucose oxidase | 0.5 mg/mL | 59.68 | 1.42 | *Pseudomonas putida* |
| Glucose oxidase | 0.05 mg/mL | 74.16 | 0.07 | *Pseudomonas putida* |
| Glucose oxidase | 0.005 mg/mL | 76.30 | 3.41 | *Pseudomonas putida* |
| AMP-6 | 0.5 mg/mL | 63.66 | 2.42 | *Pseudomonas putida* |
| AMP-6 | 0.05 mg/mL | 14.46 | 3.21 | *Pseudomonas putida* |
| AMP-6 | 0.005 mg/mL | 21.89 | 19.64 | *Pseudomonas putida* |
| AMP-7 | 0.5 mg/mL | 89.91 | 1.00 | *Pseudomonas putida* |
| AMP-7 | 0.05 mg/mL | 51.99 | 5.14 | *Pseudomonas putida* |
| AMP-7 | 0.005 mg/mL | 2.87 | 20.84 | *Pseudomonas putida* |
| Nisin | 0.5 mg/mL | 12.70 | 4.46 | *Pseudomonas putida* |
| Nisin | 0.05 mg/mL | 11.73 | 3.11 | *Pseudomonas putida* |
| Nisin | 0.005 mg/mL | 4.55 | 7.35 | *Pseudomonas putida* |
| Peroxidase | 0.5 mg/mL | 33.79 | 2.40 | *Pseudomonas putida* |
| Peroxidase | 0.05 mg/mL | 2.85 | 4.53 | *Pseudomonas putida* |
| Peroxidase | 0.005 mg/mL | −5.69 | 0.61 | *Pseudomonas putida* |
| Alginate lyase | 0.5 mg/mL | 45.94 | 3.93 | *Pseudomonas putida* |
| Alginate lyase | 0.05 mg/mL | 4.63 | 8.04 | *Pseudomonas putida* |
| Alginate lyase | 0.005 mg/mL | −3.84 | 5.63 | *Pseudomonas putida* |
| Cinnamaldehyde | 1% | 92.50 | 2.90 | *Pseudomonas putida* |
| Cinnamaldehyde | 0.10% | 86.04 | 0.55 | *Pseudomonas putida* |
| Cinnamaldehyde | 0.01% | 68.15 | 1.31 | *Pseudomonas putida* |
| Citral | 1% | 84.60 | 0.80 | *Pseudomonas putida* |
| Citral | 0.10% | 92.50 | 1.17 | *Pseudomonas putida* |
| Citral | 0.01% | 84.14 | 2.50 | *Pseudomonas putida* |
| Monolaurin | 0.5 mg/mL | 92.56 | 4.06 | *Pseudomonas putida* |
| Monolaurin | 0.05 mg/mL | 89.48 | 1.26 | *Pseudomonas putida* |
| Monolaurin | 0.005 mg/mL | 20.37 | 13.39 | *Pseudomonas putida* |
| Lysozyme | 0.5 mg/mL | 13.86 | 4.35 | *Pseudomonas fluorescens* |
| Lysozyme | 0.05 mg/mL | 1.33 | 0.57 | *Pseudomonas fluorescens* |
| Lysozyme | 0.005 mg/mL | 8.75 | 7.18 | *Pseudomonas fluorescens* |
| Glucose oxidase | 0.5 mg/mL | 45.86 | 12.28 | *Pseudomonas fluorescens* |
| Glucose oxidase | 0.05 mg/mL | 28.49 | 1.31 | *Pseudomonas fluorescens* |
| Glucose oxidase | 0.005 mg/mL | 34.28 | 2.72 | *Pseudomonas fluorescens* |
| AMP-6 | 0.5 mg/mL | 62.80 | 2.85 | *Pseudomonas fluorescens* |
| AMP-6 | 0.05 mg/mL | 16.05 | 4.98 | *Pseudomonas fluorescens* |
| AMP-6 | 0.005 mg/mL | 20.30 | 1.63 | *Pseudomonas fluorescens* |
| AMP-7 | 0.5 mg/mL | 72.73 | 0.33 | *Pseudomonas fluorescens* |
| AMP-7 | 0.05 mg/mL | 26.04 | 2.09 | *Pseudomonas fluorescens* |
| AMP-7 | 0.005 mg/mL | 21.59 | 6.29 | *Pseudomonas fluorescens* |
| Nisin | 0.5 mg/mL | 28.78 | 4.89 | *Pseudomonas fluorescens* |
| Nisin | 0.05 mg/mL | 17.62 | 2.83 | *Pseudomonas fluorescens* |
| Nisin | 0.005 mg/mL | 13.98 | 8.92 | *Pseudomonas fluorescens* |

TABLE 107-continued

XTT Assay Results of Biobased Additives

| Additive | Concentration | Average % Reduction | Standard Deviation | Organism |
|---|---|---|---|---|
| Peroxidase | 0.5 mg/mL | 32.36 | 2.76 | *Pseudomonas fluorescens* |
| Peroxidase | 0.05 mg/mL | 2.54 | 5.58 | *Pseudomonas fluorescens* |
| Peroxidase | 0.005 mg/mL | −0.43 | 4.88 | *Pseudomonas fluorescens* |
| Alginate lyase | 0.5 mg/mL | 34.79 | 2.00 | *Pseudomonas fluorescens* |
| Alginate lyase | 0.05 mg/mL | 22.00 | 3.11 | *Pseudomonas fluorescens* |
| Alginate lyase | 0.005 mg/mL | 11.64 | 4.40 | *Pseudomonas fluorescens* |
| Cinnamaldehyde | 1% | 82.40 | 1.45 | *Pseudomonas fluorescens* |
| Cinnamaldehyde | 0.10% | 72.16 | 2.08 | *Pseudomonas fluorescens* |
| Cinnamaldehyde | 0.01% | 27.17 | 11.67 | *Pseudomonas fluorescens* |
| Citral | 1% | 79.16 | 1.11 | *Pseudomonas fluorescens* |
| Citral | 0.10% | 86.56 | 2.66 | *Pseudomonas fluorescens* |
| Citral | 0.01% | 2.16 | 3.31 | *Pseudomonas fluorescens* |
| Monolaurin | 0.5 mg/mL | 61.87 | 2.92 | *Pseudomonas fluorescens* |
| Monolaurin | 0.05 mg/mL | −5.93 | 1.81 | *Pseudomonas fluorescens* |
| Monolaurin | 0.005 mg/mL | −4.19 | 2.18 | *Pseudomonas fluorescens* |
| Lysozyme | 0.5 mg/mL | −9.07 | 2.72 | *Bacillus cereus* |
| Lysozyme | 0.05 mg/mL | 1.39 | 4.64 | *Bacillus cereus* |
| Lysozyme | 0.005 mg/mL | 17.97 | 8.70 | *Bacillus cereus* |
| Glucose oxidase | 0.5 mg/mL | 12.68 | 1.72 | *Bacillus cereus* |
| Glucose oxidase | 0.05 mg/mL | 19.27 | 1.26 | *Bacillus cereus* |
| Glucose oxidase | 0.005 mg/mL | 16.79 | 7.88 | *Bacillus cereus* |
| AMP-6 | 0.5 mg/mL | 17.48 | 3.43 | *Bacillus cereus* |
| AMP-6 | 0.05 mg/mL | 13.07 | 1.44 | *Bacillus cereus* |
| AMP-6 | 0.005 mg/mL | 28.80 | 5.23 | *Bacillus cereus* |
| AMP-7 | 0.5 mg/mL | 29.93 | 1.63 | *Bacillus cereus* |
| AMP-7 | 0.05 mg/mL | 9.75 | 2.80 | *Bacillus cereus* |
| AMP-7 | 0.005 mg/mL | 17.04 | 5.25 | *Bacillus cereus* |
| Nisin | 0.5 mg/mL | 39.63 | 3.99 | *Bacillus cereus* |
| Nisin | 0.05 mg/mL | 7.41 | 1.17 | *Bacillus cereus* |
| Nisin | 0.005 mg/mL | 13.86 | 2.66 | *Bacillus cereus* |
| Peroxidase | 0.5 mg/mL | 15.91 | 0.30 | *Bacillus cereus* |
| Peroxidase | 0.05 mg/mL | 22.34 | 1.65 | *Bacillus cereus* |
| Peroxidase | 0.005 mg/mL | 14.97 | 3.74 | *Bacillus cereus* |
| Alginate lyase | 0.5 mg/mL | 7.03 | 3.86 | *Bacillus cereus* |
| Alginate lyase | 0.05 mg/mL | −2.37 | 4.53 | *Bacillus cereus* |
| Alginate lyase | 0.005 mg/mL | −0.51 | 4.75 | *Bacillus cereus* |
| Cinnamaldehyde | 1% | 83.02 | 3.80 | *Bacillus cereus* |
| Cinnamaldehyde | 0.10% | 43.03 | 4.84 | *Bacillus cereus* |
| Cinnamaldehyde | 0.01% | 3.28 | 5.35 | *Bacillus cereus* |
| Citral | 1% | 38.62 | 3.30 | *Bacillus cereus* |
| Citral | 0.10% | 48.69 | 1.46 | *Bacillus cereus* |
| Citral | 0.01% | 21.31 | 4.54 | *Bacillus cereus* |
| Monolaurin | 0.5 mg/mL | 73.86 | 4.06 | *Bacillus cereus* |
| Monolaurin | 0.05 mg/mL | 55.39 | 3.84 | *Bacillus cereus* |
| Monolaurin | 0.005 mg/mL | 12.15 | 4.07 | *Bacillus cereus* |
| Lysozyme | 0.5 mg/mL | 32.58 | 0.85 | *Alcaligenes faecalis* |
| Lysozyme | 0.05 mg/mL | −35.02 | 8.73 | *Alcaligenes faecalis* |
| Lysozyme | 0.005 mg/mL | 1.48 | 16.51 | *Alcaligenes faecalis* |
| Glucose oxidase | 0.5 mg/mL | 64.05 | 0.74 | *Alcaligenes faecalis* |
| Glucose oxidase | 0.05 mg/mL | 76.69 | 0.18 | *Alcaligenes faecalis* |
| Glucose oxidase | 0.005 mg/mL | 79.88 | 1.62 | *Alcaligenes faecalis* |
| AMP-6 | 0.5 mg/mL | 66.88 | 4.11 | *Alcaligenes faecalis* |
| AMP-6 | 0.05 mg/mL | 5.50 | 9.22 | *Alcaligenes faecalis* |
| AMP-6 | 0.005 mg/mL | −10.55 | 10.66 | *Alcaligenes faecalis* |
| AMP-7 | 0.5 mg/mL | 68.38 | 0.55 | *Alcaligenes faecalis* |
| AMP-7 | 0.05 mg/mL | 2.36 | 2.82 | *Alcaligenes faecalis* |
| AMP-7 | 0.005 mg/mL | −10.23 | 5.93 | *Alcaligenes faecalis* |
| Nisin | 0.5 mg/mL | −21.14 | 11.67 | *Alcaligenes faecalis* |
| Nisin | 0.05 mg/mL | −13.24 | 4.81 | *Alcaligenes faecalis* |
| Nisin | 0.005 mg/mL | 0.44 | 2.08 | *Alcaligenes faecalis* |
| Peroxidase | 0.5 mg/mL | 66.65 | 3.65 | *Alcaligenes faecalis* |
| Peroxidase | 0.05 mg/mL | 11.49 | 5.43 | *Alcaligenes faecalis* |
| Peroxidase | 0.005 mg/mL | 5.36 | 6.03 | *Alcaligenes faecalis* |
| Alginate lyase | 0.5 mg/mL | 74.74 | 6.60 | *Alcaligenes faecalis* |
| Alginate lyase | 0.05 mg/mL | 31.57 | 2.83 | *Alcaligenes faecalis* |
| Alginate lyase | 0.005 mg/mL | 18.08 | 17.48 | *Alcaligenes faecalis* |
| Cinnamaldehyde | 1% | 86.77 | 0.35 | *Alcaligenes faecalis* |
| Cinnamaldehyde | 0.10% | 67.90 | 0.63 | *Alcaligenes faecalis* |
| Cinnamaldehyde | 0.01% | 57.22 | 2.83 | *Alcaligenes faecalis* |
| Citral | 1% | 74.93 | 1.68 | *Alcaligenes faecalis* |
| Citral | 0.10% | 79.50 | 2.69 | *Alcaligenes faecalis* |
| Citral | 0.01% | 52.54 | 5.64 | *Alcaligenes faecalis* |
| Monolaurin | 0.5 mg/mL | 66.71 | 4.09 | *Alcaligenes faecalis* |
| Monolaurin | 0.05 mg/mL | 14.96 | 4.88 | *Alcaligenes faecalis* |
| Monolaurin | 0.005 mg/mL | 0.29 | 8.44 | *Alcaligenes faecalis* |

TABLE 107-continued

XTT Assay Results of Biobased Additives

| Additive | Concentration | Average % Reduction | Standard Deviation | Organism |
| --- | --- | --- | --- | --- |
| Lysozyme | 0.5 mg/mL | 26.02 | 5.08 | Enterobacter aerogenes |
| Lysozyme | 0.05 mg/mL | 6.45 | 3.86 | Enterobacter aerogenes |
| Lysozyme | 0.005 mg/mL | 14.59 | 10.51 | Enterobacter aerogenes |
| Glucose oxidase | 0.5 mg/mL | 24.76 | 1.93 | Enterobacter aerogenes |
| Glucose oxidase | 0.05 mg/mL | 21.47 | 3.80 | Enterobacter aerogenes |
| Glucose oxidase | 0.005 mg/mL | 51.89 | 3.27 | Enterobacter aerogenes |
| AMP-6 | 0.5 mg/mL | 54.24 | 4.41 | Enterobacter aerogenes |
| AMP-6 | 0.05 mg/mL | 39.24 | 0.97 | Enterobacter aerogenes |
| AMP-6 | 0.005 mg/mL | 25.34 | 5.76 | Enterobacter aerogenes |
| AMP-7 | 0.5 mg/mL | 61.52 | 12.70 | Enterobacter aerogenes |
| AMP-7 | 0.05 mg/mL | 43.83 | 1.51 | Enterobacter aerogenes |
| AMP-7 | 0.005 mg/mL | 28.70 | 5.85 | Enterobacter aerogenes |
| Nisin | 0.5 mg/mL | 14.79 | 1.80 | Enterobacter aerogenes |
| Nisin | 0.05 mg/mL | 6.44 | 3.16 | Enterobacter aerogenes |
| Nisin | 0.005 mg/mL | 16.95 | 4.11 | Enterobacter aerogenes |
| Peroxidase | 0.5 mg/mL | 21.12 | 2.05 | Enterobacter aerogenes |
| Peroxidase | 0.05 mg/mL | 1.88 | 2.06 | Enterobacter aerogenes |
| Peroxidase | 0.005 mg/mL | 9.93 | 3.64 | Enterobacter aerogenes |
| Alginate lyase | 0.5 mg/mL | 9.42 | 5.25 | Enterobacter aerogenes |
| Alginate lyase | 0.05 mg/mL | 3.48 | 0.49 | Enterobacter aerogenes |
| Alginate lyase | 0.005 mg/mL | 10.19 | 5.33 | Enterobacter aerogenes |
| Cinnamaldehyde | 1% | 95.20 | 1.39 | Enterobacter aerogenes |
| Cinnamaldehyde | 0.10% | 46.62 | 2.09 | Enterobacter aerogenes |
| Cinnamaldehyde | 0.01% | −13.98 | 3.32 | Enterobacter aerogenes |
| Citral | 1% | 78.36 | 3.06 | Enterobacter aerogenes |
| Citral | 0.10% | 46.50 | 3.92 | Enterobacter aerogenes |
| Citral | 0.01% | 14.80 | 10.29 | Enterobacter aerogenes |
| Monolaurin | 0.5 mg/mL | 46.04 | 4.23 | Enterobacter aerogenes |
| Monolaurin | 0.05 mg/mL | 0.86 | 9.73 | Enterobacter aerogenes |
| Monolaurin | 0.005 mg/mL | 0.20 | 1.56 | Enterobacter aerogenes |
| Endoglucanase | — | −25.54 | 4.86 | Pseudomonas aeruginosa |
| Endoglucanase | 1:10 | −7.62 | 2.35 | Pseudomonas aeruginosa |
| Endoglucanase | 1:100 | 2.09 | 4.97 | Pseudomonas aeruginosa |
| β-Mannosidase | 0.7 U/mL | −22.79 | 3.68 | Pseudomonas aeruginosa |
| β-Mannosidase | 0.075 U/mL | −0.41 | 2.19 | Pseudomonas aeruginosa |
| β-Mannosidase | 0.0075 U/mL | 2.50 | 3.92 | Pseudomonas aeruginosa |
| Protease | 0.5 mg/mL | 4.50 | 4.52 | Pseudomonas aeruginosa |
| Protease | 0.05 mg/mL | −1.87 | 1.59 | Pseudomonas aeruginosa |
| Protease | 0.005 mg/mL | 5.86 | 0.89 | Pseudomonas aeruginosa |
| Chymotrypsin | 0.5 mg/mL | 3.65 | 2.93 | Pseudomonas aeruginosa |
| Chymotrypsin | 0.05 mg/mL | 3.52 | 1.05 | Pseudomonas aeruginosa |
| Chymotrypsin | 0.005 mg/mL | 10.28 | 1.51 | Pseudomonas aeruginosa |
| Amylase | 0.5 mg/mL | 1.02 | 1.98 | Pseudomonas aeruginosa |
| Amylase | 0.05 mg/mL | −4.03 | 3.66 | Pseudomonas aeruginosa |
| Amylase | 0.005 mg/mL | 9.40 | 3.98 | Pseudomonas aeruginosa |
| Pectinase | 0.5 mg/mL | 7.35 | 3.90 | Pseudomonas aeruginosa |
| Pectinase | 0.05 mg/mL | −6.13 | 2.08 | Pseudomonas aeruginosa |
| Pectinase | 0.005 mg/mL | 0.56 | 1.66 | Pseudomonas aeruginosa |
| Endoglucanase | — | 27.35 | 2.04 | Pseudomonas putida |
| Endoglucanase | 1:10 | 32.00 | 0.14 | Pseudomonas putida |
| Endoglucanase | 1:100 | 27.09 | 5.40 | Pseudomonas putida |
| β-Mannosidase | 0.75 U/mL | 16.62 | 8.00 | Pseudomonas putida |
| β-Mannosidase | 0.075 U/mL | 33.68 | 3.44 | Pseudomonas putida |
| β-Mannosidase | 0.0075 U/mL | 14.91 | 5.77 | Pseudomonas putida |
| Protease | 0.5 mg/mL | 32.52 | 7.18 | Pseudomonas putida |
| Protease | 0.05 mg/mL | 20.80 | 4.76 | Pseudomonas putida |
| Protease | 0.005 mg/mL | 7.18 | 8.85 | Pseudomonas putida |
| Chymotrypsin | 0.5 mg/mL | 35.06 | 7.81 | Pseudomonas putida |
| Chymotrypsin | 0.05 mg/mL | 32.35 | 0.76 | Pseudomonas putida |
| Chymotrypsin | 0.005 mg/mL | 24.50 | 8.16 | Pseudomonas putida |
| Amylase | 0.5 mg/mL | 34.26 | 9.02 | Pseudomonas putida |
| Amylase | 0.05 mg/mL | 11.57 | 4.73 | Pseudomonas putida |
| Amylase | 0.005 mg/mL | 8.97 | 9.24 | Pseudomonas putida |
| Pectinase | 0.5 mg/mL | 36.42 | 1.04 | Pseudomonas putida |
| Pectinase | 0.05 mg/mL | 18.10 | 2.14 | Pseudomonas putida |
| Pectinase | 0.005 mg/mL | 1.15 | 6.71 | Pseudomonas putida |
| Endoglucanase | — | 15.02 | 2.27 | Pseudomonas fluorescens |
| Endoglucanase | 1:10 | −14.31 | 8.45 | Pseudomonas fluorescens |
| Endoglucanase | 1:100 | −14.49 | 4.56 | Pseudomonas fluorescens |
| β-Mannosidase | 0.75 U/mL | 17.59 | 8.49 | Pseudomonas fluorescens |
| β-Mannosidase | 0.075 U/mL | −12.21 | 9.54 | Pseudomonas fluorescens |
| β-Mannosidase | 0.0075 U/mL | −17.15 | 11.79 | Pseudomonas fluorescens |
| Protease | 0.5 mg/mL | 0.98 | 2.46 | Pseudomonas fluorescens |
| Protease | 0.05 mg/mL | 4.60 | 1.91 | Pseudomonas fluorescens |
| Protease | 0.005 mg/mL | 3.03 | 10.88 | Pseudomonas fluorescens |

TABLE 107-continued

XTT Assay Results of Biobased Additives

| Additive | Concentration | Average % Reduction | Standard Deviation | Organism |
|---|---|---|---|---|
| Chymotrypsin | 0.5 mg/mL | 13.32 | 2.34 | *Pseudomonas fluorescens* |
| Chymotrypsin | 0.05 mg/mL | 11.62 | 3.11 | *Pseudomonas fluorescens* |
| Chymotrypsin | 0.005 mg/mL | 13.48 | 2.87 | *Pseudomonas fluorescens* |
| Amylase | 0.5 mg/mL | −20.87 | 2.42 | *Pseudomonas fluorescens* |
| Amylase | 0.05 mg/mL | −12.06 | 4.45 | *Pseudomonas fluorescens* |
| Amylase | 0.005 mg/mL | −0.85 | 2.06 | *Pseudomonas fluorescens* |
| Pectinase | 0.5 mg/mL | −18.06 | 1.82 | *Pseudomonas fluorescens* |
| Pectinase | 0.05 mg/mL | −16.50 | 3.64 | *Pseudomonas fluorescens* |
| Pectinase | 0.005 mg/mL | −15.79 | 7.88 | *Pseudomonas fluorescens* |
| Endoglucanase | — | 33.81 | 3.82 | *Bacillus cereus* |
| Endoglucanase | 1:10 | 44.98 | 2.02 | *Bacillus cereus* |
| Endoglucanase | 1:100 | 37.28 | 7.16 | *Bacillus cereus* |
| β-Mannosidase | 0.075 U/mL | 34.35 | 2.91 | *Bacillus cereus* |
| β-Mannosidase | 0.0075 U/mL | 34.46 | 6.02 | *Bacillus cereus* |
| Protease | 0.5 mg/mL | 39.58 | 1.22 | *Bacillus cereus* |
| Protease | 0.05 mg/mL | 38.00 | 1.80 | *Bacillus cereus* |
| Protease | 0.005 mg/mL | 34.86 | 1.20 | *Bacillus cereus* |
| Chymotrypsin | 0.5 mg/mL | 15.91 | 0.79 | *Bacillus cereus* |
| Chymotrypsin | 0.05 mg/mL | 25.24 | 10.61 | *Bacillus cereus* |
| Chymotrypsin | 0.005 mg/mL | 33.02 | 4.76 | *Bacillus cereus* |
| Amylase | 0.5 mg/mL | 29.77 | 4.85 | *Bacillus cereus* |
| Amylase | 0.05 mg/mL | 34.33 | 3.49 | *Bacillus cereus* |
| Amylase | 0.005 mg/mL | 35.97 | 3.08 | *Bacillus cereus* |
| Pectinase | 0.5 mg/mL | 24.78 | 3.25 | *Bacillus cereus* |
| Pectinase | 0.05 mg/mL | 21.50 | 6.58 | *Bacillus cereus* |
| Pectinase | 0.005 mg/mL | 16.15 | 4.09 | *Bacillus cereus* |
| Endoglucanase | — | 8.58 | 5.22 | *Enterobacter aerogenes* |
| Endoglucanase | 1:10 | 13.32 | 0.18 | *Enterobacter aerogenes* |
| Endoglucanase | 1:100 | 9.08 | 4.50 | *Enterobacter aerogenes* |
| β-Mannosidase | 0.75 U/mL | 10.08 | 4.22 | *Enterobacter aerogenes* |
| β-Mannosidase | 0.075 U/mL | 18.35 | 2.05 | *Enterobacter aerogenes* |
| β-Mannosidase | 0.0075 U/mL | 14.31 | 6.43 | *Enterobacter aerogenes* |
| Protease | 0.5 mg/mL | 12.37 | 2.69 | *Enterobacter aerogenes* |
| Protease | 0.05 mg/mL | 12.15 | 0.23 | *Enterobacter aerogenes* |
| Protease | 0.005 mg/mL | 9.98 | 4.22 | *Enterobacter aerogenes* |
| Chymotrypsin | 0.5 mg/mL | 15.67 | 2.02 | *Enterobacter aerogenes* |
| Chymotrypsin | 0.05 mg/mL | 14.40 | 1.76 | *Enterobacter aerogenes* |
| Chymotrypsin | 0.005 mg/mL | 14.27 | 4.53 | *Enterobacter aerogenes* |
| Amylase | 0.5 mg/mL | 9.52 | 1.67 | *Enterobacter aerogenes* |
| Amylase | 0.05 mg/mL | 9.49 | 0.69 | *Enterobacter aerogenes* |
| Amylase | 0.005 mg/mL | 10.52 | 3.76 | *Enterobacter aerogenes* |
| Pectinase | 0.5 mg/mL | 1.73 | 1.35 | *Enterobacter aerogenes* |
| Pectinase | 0.05 mg/mL | 4.60 | 2.10 | *Enterobacter aerogenes* |
| Pectinase | 0.005 mg/mL | 5.95 | 5.42 | *Enterobacter aerogenes* |
| Endoglucanase | — | −0.65 | 2.61 | *Alcaligenes faecalis* |
| Endoglucanase | 1:10 | 3.93 | 3.06 | *Alcaligenes faecalis* |
| Endoglucanase | 1:100 | 5.32 | 1.43 | *Alcaligenes faecalis* |
| β-Mannosidase | 0.075 U/mL | 3.41 | 1.42 | *Alcaligenes faecalis* |
| β-Mannosidase | 0.0075 U/mL | 3.21 | 6.86 | *Alcaligenes faecalis* |
| Protease | 0.5 mg/mL | 16.53 | 2.56 | *Alcaligenes faecalis* |
| Protease | 0.05 mg/mL | 8.42 | 2.91 | *Alcaligenes faecalis* |
| Protease | 0.005 mg/mL | 8.72 | 5.60 | *Alcaligenes faecalis* |
| Chymotrypsin | 0.5 mg/mL | 10.89 | 3.06 | *Alcaligenes faecalis* |
| Chymotrypsin | 0.05 mg/mL | 13.52 | 2.90 | *Alcaligenes faecalis* |
| Chymotrypsin | 0.005 mg/mL | 16.15 | 4.47 | *Alcaligenes faecalis* |
| Amylase | 0.5 mg/mL | 9.58 | 2.45 | *Alcaligenes faecalis* |
| Amylase | 0.05 mg/mL | 9.83 | 2.02 | *Alcaligenes faecalis* |
| Amylase | 0.005 mg/mL | 11.03 | 1.31 | *Alcaligenes faecalis* |
| Pectinase | 0.5 mg/mL | 7.33 | 1.82 | *Alcaligenes faecalis* |
| Pectinase | 0.05 mg/mL | 5.39 | 3.62 | *Alcaligenes faecalis* |
| Pectinase | 0.005 mg/mL | 0.60 | 2.13 | *Alcaligenes faecalis* |
| Lipase | 0.5 mg/mL | 5.71 | 4.16 | *Pseudomonas aeruginosa* |
| Lipase | 0.05 mg/mL | −3.39 | 4.21 | *Pseudomonas aeruginosa* |
| Lipase | 0.005 mg/mL | −4.75 | 2.73 | *Pseudomonas aeruginosa* |
| OPDtox ™ | 0.5 mg/mL | 6.60 | 1.30 | *Pseudomonas aeruginosa* |
| OPDtox ™ | 0.05 mg/mL | 4.34 | 1.67 | *Pseudomonas aeruginosa* |
| OPDtox ™ | 0.005 mg/mL | 5.77 | 4.75 | *Pseudomonas aeruginosa* |
| Cellulase | 0.5 mg/mL | 8.76 | 2.78 | *Pseudomonas aeruginosa* |
| Cellulase | 0.05 mg/mL | 0.00 | 3.29 | *Pseudomonas aeruginosa* |
| Cellulase | 0.005 mg/mL | −2.15 | 2.54 | *Pseudomonas aeruginosa* |
| Trypsin | 0.5 mg/mL | 10.69 | 4.04 | *Pseudomonas aeruginosa* |
| Trypsin | 0.05 mg/mL | 3.77 | 1.99 | *Pseudomonas aeruginosa* |
| Trypsin | 0.005 mg/mL | 4.59 | 1.75 | *Pseudomonas aeruginosa* |
| β-Glucosidase | 0.5 mg/mL | 8.34 | 1.38 | *Pseudomonas aeruginosa* |
| β-Glucosidase | 0.05 mg/mL | 2.91 | 3.82 | *Pseudomonas aeruginosa* |

TABLE 107-continued

XTT Assay Results of Biobased Additives

| Additive | Concentration | Average % Reduction | Standard Deviation | Organism |
|---|---|---|---|---|
| β-Glucosidase | 0.005 mg/mL | 7.09 | 3.20 | *Pseudomonas aeruginosa* |
| Amyloglucosidase | 0.5 mg/mL | 8.46 | 1.55 | *Pseudomonas aeruginosa* |
| Amyloglucosidase | 0.05 mg/mL | 6.43 | 0.72 | *Pseudomonas aeruginosa* |
| Amyloglucosidase | 0.005 mg/mL | 4.56 | 4.19 | *Pseudomonas aeruginosa* |
| β-Gluconase | 0.5 mg/mL | 3.64 | 2.85 | *Pseudomonas aeruginosa* |
| β-Gluconase | 0.05 mg/mL | 0.87 | 0.38 | *Pseudomonas aeruginosa* |
| β-Gluconase | 0.005 mg/mL | 3.89 | 2.33 | *Pseudomonas aeruginosa* |
| AMP-LKLK | 0.5 mg/mL | 14.12 | 4.78 | *Pseudomonas aeruginosa* |
| AMP-LKLK | 0.05 mg/mL | −11.65 | 1.43 | *Pseudomonas aeruginosa* |
| AMP-LKLK | 0.005 mg/mL | −2.77 | 1.56 | *Pseudomonas aeruginosa* |
| Lipase | 0.5 mg/mL | 1.27 | 5.49 | *Pseudomonas fluorescens* |
| Lipase | 0.05 mg/mL | −5.28 | 4.48 | *Pseudomonas fluorescens* |
| Lipase | 0.005 mg/mL | 5.43 | 20.90 | *Pseudomonas fluorescens* |
| OPDtox ™ | 0.5 mg/mL | 1.51 | 2.95 | *Pseudomonas fluorescens* |
| OPDtox ™ | 0.05 mg/mL | 1.38 | 6.18 | *Pseudomonas fluorescens* |
| OPDtox ™ | 0.005 mg/mL | 8.51 | 1.02 | *Pseudomonas fluorescens* |
| Cellulase | 0.5 mg/mL | −0.71 | 8.23 | *Pseudomonas fluorescens* |
| Cellulase | 0.05 mg/mL | −5.94 | 3.48 | *Pseudomonas fluorescens* |
| Cellulase | 0.005 mg/mL | −4.65 | 8.19 | *Pseudomonas fluorescens* |
| Trypsin | 0.5 mg/mL | 3.68 | 5.61 | *Pseudomonas fluorescens* |
| Trypsin | 0.05 mg/mL | 2.09 | 2.91 | *Pseudomonas fluorescens* |
| Trypsin | 0.005 mg/mL | 6.83 | 6.48 | *Pseudomonas fluorescens* |
| β-Glucosidase | 0.5 mg/mL | −3.70 | 6.60 | *Pseudomonas fluorescens* |
| β-Glucosidase | 0.05 mg/mL | −6.42 | 1.73 | *Pseudomonas fluorescens* |
| β-Glucosidase | 0.005 mg/mL | 1.87 | 3.22 | *Pseudomonas fluorescens* |
| Amyloglucosidase | 0.5 mg/mL | −5.40 | 0.61 | *Pseudomonas fluorescens* |
| Amyloglucosidase | 0.05 mg/mL | −1.34 | 0.65 | *Pseudomonas fluorescens* |
| Amyloglucosidase | 0.005 mg/mL | −8.80 | 5.75 | *Pseudomonas fluorescens* |
| β-Gluconase | 0.5 mg/mL | −1.24 | 3.89 | *Pseudomonas fluorescens* |
| β-Gluconase | 0.05 mg/mL | −7.69 | 2.44 | *Pseudomonas fluorescens* |
| β-Gluconase | 0.005 mg/mL | −0.08 | 4.24 | *Pseudomonas fluorescens* |
| AMP-LKLK | 0.5 mg/mL | 41.24 | 1.57 | *Pseudomonas fluorescens* |
| AMP-LKLK | 0.05 mg/mL | 15.20 | 2.99 | *Pseudomonas fluorescens* |
| AMP-LKLK | 0.005 mg/mL | 22.15 | 1.38 | *Pseudomonas fluorescens* |
| Lipase | 0.5 mg/mL | 5.46 | 1.49 | *Pseudomonas putida* |
| Lipase | 0.05 mg/mL | 4.37 | 5.56 | *Pseudomonas putida* |
| Lipase | 0.005 mg/mL | 16.69 | 2.47 | *Pseudomonas putida* |
| OPDtox ™ | 0.5 mg/mL | −5.47 | 2.03 | *Pseudomonas putida* |
| OPDtox ™ | 0.05 mg/mL | 3.86 | 6.97 | *Pseudomonas putida* |
| OPDtox ™ | 0.005 mg/mL | 15.85 | 1.15 | *Pseudomonas putida* |
| Cellulase | 0.5 mg/mL | 19.74 | 4.93 | *Pseudomonas putida* |
| Cellulase | 0.05 mg/mL | 21.68 | 3.98 | *Pseudomonas putida* |
| Cellulase | 0.005 mg/mL | 21.83 | 1.16 | *Pseudomonas putida* |
| Trypsin | 0.5 mg/mL | 15.02 | 5.74 | *Pseudomonas putida* |
| Trypsin | 0.05 mg/mL | 10.20 | 4.22 | *Pseudomonas putida* |
| Trypsin | 0.005 mg/mL | 17.47 | 7.25 | *Pseudomonas putida* |
| β-Glucosidase | 0.5 mg/mL | 10.90 | 7.50 | *Pseudomonas putida* |
| β-Glucosidase | 0.05 mg/mL | 17.63 | 1.13 | *Pseudomonas putida* |
| β-Glucosidase | 0.005 mg/mL | 19.43 | 2.13 | *Pseudomonas putida* |
| Amyloglucosidase | 0.5 mg/mL | 8.56 | 3.55 | *Pseudomonas putida* |
| Amyloglucosidase | 0.05 mg/mL | 7.66 | 9.04 | *Pseudomonas putida* |
| Amyloglucosidase | 0.005 mg/mL | 14.02 | 5.07 | *Pseudomonas putida* |
| β-Gluconase | 0.5 mg/mL | 14.48 | 8.11 | *Pseudomonas putida* |
| β-Gluconase | 0.05 mg/mL | 22.68 | 2.18 | *Pseudomonas putida* |
| β-Gluconase | 0.005 mg/mL | 24.02 | 3.78 | *Pseudomonas putida* |
| AMP-LKLK | 0.5 mg/mL | 49.50 | 1.52 | *Pseudomonas putida* |
| AMP-LKLK | 0.05 mg/mL | −6.87 | 6.19 | *Pseudomonas putida* |
| AMP-LKLK | 0.005 mg/mL | 5.05 | 9.20 | *Pseudomonas putida* |
| Lipase | 0.5 mg/mL | 2.63 | 3.76 | *Alcaligenes faecalis* |
| Lipase | 0.05 mg/mL | −4.75 | 3.50 | *Alcaligenes faecalis* |
| Lipase | 0.005 mg/mL | −1.01 | 2.83 | *Alcaligenes faecalis* |
| OPDtox ™ | 0.5 mg/mL | −8.89 | 3.84 | *Alcaligenes faecalis* |
| OPDtox ™ | 0.05 mg/mL | −11.66 | 5.03 | *Alcaligenes faecalis* |
| OPDtox ™ | 0.005 mg/mL | −3.99 | 5.39 | *Alcaligenes faecalis* |
| Cellulase | 0.5 mg/mL | 1.32 | 7.18 | *Alcaligenes faecalis* |
| Cellulase | 0.05 mg/mL | −11.61 | 5.41 | *Alcaligenes faecalis* |
| Cellulase | 0.005 mg/mL | 2.47 | 2.85 | *Alcaligenes faecalis* |
| Trypsin | 0.5 mg/mL | 7.23 | 4.20 | *Alcaligenes faecalis* |
| Trypsin | 0.05 mg/mL | −1.40 | 5.21 | *Alcaligenes faecalis* |
| Trypsin | 0.005 mg/mL | 4.09 | 2.75 | *Alcaligenes faecalis* |
| β-Glucosidase | 0.5 mg/mL | 3.20 | 4.80 | *Alcaligenes faecalis* |
| β-Glucosidase | 0.05 mg/mL | −0.23 | 9.47 | *Alcaligenes faecalis* |
| β-Glucosidase | 0.005 mg/mL | 4.98 | 2.90 | *Alcaligenes faecalis* |
| Amyloglucosidase | 0.5 mg/mL | −1.49 | 2.01 | *Alcaligenes faecalis* |
| Amyloglucosidase | 0.05 mg/mL | 1.36 | 1.26 | *Alcaligenes faecalis* |

TABLE 107-continued

XTT Assay Results of Biobased Additives

| Additive | Concentration | Average % Reduction | Standard Deviation | Organism |
|---|---|---|---|---|
| Amyloglucosidase | 0.005 mg/mL | 9.06 | 3.07 | *Alcaligenes faecalis* |
| β-Gluconase | 0.5 mg/mL | 0.95 | 3.44 | *Alcaligenes faecalis* |
| β-Gluconase | 0.05 mg/mL | −0.87 | 7.36 | *Alcaligenes faecalis* |
| β-Gluconase | 0.005 mg/mL | 8.15 | 4.61 | *Alcaligenes faecalis* |
| AMP-LKLK | 0.5 mg/mL | 3.66 | 3.74 | *Alcaligenes faecalis* |
| AMP-LKLK | 0.05 mg/mL | −15.18 | 4.54 | *Alcaligenes faecalis* |
| AMP-LKLK | 0.005 mg/mL | 5.90 | 3.52 | *Alcaligenes faecalis* |
| Lipase | 0.5 mg/mL | 9.26 | 3.16 | *Bacillus cereus* |
| Lipase | 0.05 mg/mL | 7.33 | 1.51 | *Bacillus cereus* |
| Lipase | 0.005 mg/mL | 11.03 | 0.52 | *Bacillus cereus* |
| OPDtox ™ | 0.5 mg/mL | 4.31 | 1.21 | *Bacillus cereus* |
| OPDtox ™ | 0.05 mg/mL | 9.35 | 1.45 | *Bacillus cereus* |
| OPDtox ™ | 0.005 mg/mL | 16.85 | 3.42 | *Bacillus cereus* |
| Cellulase | 0.5 mg/mL | 0.30 | 2.66 | *Bacillus cereus* |
| Cellulase | 0.05 mg/mL | 11.12 | 0.66 | *Bacillus cereus* |
| Cellulase | 0.005 mg/mL | 14.21 | 2.28 | *Bacillus cereus* |
| Trypsin | 0.5 mg/mL | −0.41 | 1.41 | *Bacillus cereus* |
| Trypsin | 0.05 mg/mL | 10.77 | 1.52 | *Bacillus cereus* |
| Trypsin | 0.005 mg/mL | 12.59 | 2.31 | *Bacillus cereus* |
| β-Glucosidase | 0.5 mg/mL | 1.13 | 2.87 | *Bacillus cereus* |
| β-Glucosidase | 0.05 mg/mL | 10.72 | 2.54 | *Bacillus cereus* |
| β-Glucosidase | 0.005 mg/mL | 17.35 | 6.15 | *Bacillus cereus* |
| Amyloglucosidase | 0.5 mg/mL | −9.50 | 4.38 | *Bacillus cereus* |
| Amyloglucosidase | 0.05 mg/mL | 4.93 | 0.90 | *Bacillus cereus* |
| Amyloglucosidase | 0.005 mg/mL | 10.40 | 1.79 | *Bacillus cereus* |
| β-Gluconase | 0.5 mg/mL | −7.01 | 3.62 | *Bacillus cereus* |
| β-Gluconase | 0.05 mg/mL | 3.62 | 2.47 | *Bacillus cereus* |
| β-Gluconase | 0.005 mg/mL | 6.66 | 3.51 | *Bacillus cereus* |
| AMP-LKLK | 0.5 mg/mL | 12.66 | 2.85 | *Bacillus cereus* |
| AMP-LKLK | 0.05 mg/mL | 8.86 | 1.33 | *Bacillus cereus* |
| AMP-LKLK | 0.005 mg/mL | 11.87 | 5.60 | *Bacillus cereus* |
| Lipase | 0.5 mg/mL | 5.71 | 4.16 | *Pseudomonas aeruginosa* |
| Lipase | 0.05 mg/mL | −3.39 | 4.21 | *Pseudomonas aeruginosa* |
| Lipase | 0.005 mg/mL | −4.75 | 2.73 | *Pseudomonas aeruginosa* |
| OPDtox ™ | 0.5 mg/mL | 6.60 | 1.30 | *Pseudomonas aeruginosa* |
| OPDtox ™ | 0.05 mg/mL | 4.34 | 1.67 | *Pseudomonas aeruginosa* |
| OPDtox ™ | 0.005 mg/mL | 5.77 | 4.75 | *Pseudomonas aeruginosa* |
| Cellulase | 0.5 mg/mL | 8.76 | 2.78 | *Pseudomonas aeruginosa* |
| Cellulase | 0.05 mg/mL | 0.00 | 3.29 | *Pseudomonas aeruginosa* |
| Cellulase | 0.005 mg/mL | −2.15 | 2.54 | *Pseudomonas aeruginosa* |
| Trypsin | 0.5 mg/mL | 10.69 | 4.04 | *Pseudomonas aeruginosa* |
| Trypsin | 0.05 mg/mL | 3.77 | 1.99 | *Pseudomonas aeruginosa* |
| Trypsin | 0.005 mg/mL | 4.59 | 1.75 | *Pseudomonas aeruginosa* |
| β-Glucosidase | 0.5 mg/mL | 8.34 | 1.38 | *Pseudomonas aeruginosa* |
| β-Glucosidase | 0.05 mg/mL | 2.91 | 3.82 | *Pseudomonas aeruginosa* |
| β-Glucosidase | 0.005 mg/mL | 7.09 | 3.20 | *Pseudomonas aeruginosa* |
| Amyloglucosidase | 0.5 mg/mL | 8.46 | 1.55 | *Pseudomonas aeruginosa* |
| Amyloglucosidase | 0.05 mg/mL | 6.43 | 0.72 | *Pseudomonas aeruginosa* |
| Amyloglucosidase | 0.005 mg/mL | 4.56 | 4.19 | *Pseudomonas aeruginosa* |
| β-Gluconase | 0.5 mg/mL | 3.64 | 2.85 | *Pseudomonas aeruginosa* |
| β-Gluconase | 0.05 mg/mL | 0.87 | 0.38 | *Pseudomonas aeruginosa* |
| β-Gluconase | 0.005 mg/mL | 3.89 | 2.33 | *Pseudomonas aeruginosa* |
| AMP-LKLK | 0.5 mg/mL | 14.12 | 4.78 | *Pseudomonas aeruginosa* |
| AMP-LKLK | 0.05 mg/mL | −11.65 | 1.43 | *Pseudomonas aeruginosa* |
| AMP-LKLK | 0.005 mg/mL | −2.77 | 1.56 | *Pseudomonas aeruginosa* |
| Lipase | 0.5 mg/mL | 1.27 | 5.49 | *Pseudomonas fluorescens* |
| Lipase | 0.05 mg/mL | −5.28 | 4.48 | *Pseudomonas fluorescens* |
| Lipase | 0.005 mg/mL | 5.43 | 20.90 | *Pseudomonas fluorescens* |
| OPDtox ™ | 0.5 mg/mL | 1.51 | 2.95 | *Pseudomonas fluorescens* |
| OPDtox ™ | 0.05 mg/mL | 1.38 | 6.18 | *Pseudomonas fluorescens* |
| OPDtox ™ | 0.005 mg/mL | 8.51 | 1.02 | *Pseudomonas fluorescens* |
| Cellulase | 0.5 mg/mL | −0.71 | 8.23 | *Pseudomonas fluorescens* |
| Cellulase | 0.05 mg/mL | −5.94 | 3.48 | *Pseudomonas fluorescens* |
| Cellulase | 0.005 mg/mL | −4.65 | 8.19 | *Pseudomonas fluorescens* |
| Trypsin | 0.5 mg/mL | 3.68 | 5.61 | *Pseudomonas fluorescens* |
| Trypsin | 0.05 mg/mL | 2.09 | 2.91 | *Pseudomonas fluorescens* |
| Trypsin | 0.005 mg/mL | 6.83 | 6.48 | *Pseudomonas fluorescens* |
| β-Glucosidase | 0.5 mg/mL | −3.70 | 6.60 | *Pseudomonas fluorescens* |
| β-Glucosidase | 0.05 mg/mL | −6.42 | 1.73 | *Pseudomonas fluorescens* |
| β-Glucosidase | 0.005 mg/mL | 1.87 | 3.22 | *Pseudomonas fluorescens* |
| Amyloglucosidase | 0.5 mg/mL | −5.40 | 0.61 | *Pseudomonas fluorescens* |
| Amyloglucosidase | 0.05 mg/mL | −1.34 | 0.65 | *Pseudomonas fluorescens* |
| Amyloglucosidase | 0.005 mg/mL | −8.80 | 5.75 | *Pseudomonas fluorescens* |
| β-Gluconase | 0.5 mg/mL | −1.24 | 3.89 | *Pseudomonas fluorescens* |
| β-Gluconase | 0.05 mg/mL | −7.69 | 2.44 | *Pseudomonas fluorescens* |

TABLE 107-continued

XTT Assay Results of Biobased Additives

| Additive | Concentration | Average % Reduction | Standard Deviation | Organism |
|---|---|---|---|---|
| β-Gluconase | 0.005 mg/mL | −0.08 | 4.24 | *Pseudomonas fluorescens* |
| AMP-LKLK | 0.5 mg/mL | 41.24 | 1.57 | *Pseudomonas fluorescens* |
| AMP-LKLK | 0.05 mg/mL | 15.20 | 2.99 | *Pseudomonas fluorescens* |
| AMP-LKLK | 0.005 mg/mL | 22.15 | 1.38 | *Pseudomonas fluorescens* |
| Lipase | 0.5 mg/mL | 5.46 | 1.49 | *Pseudomonas putida* |
| Lipase | 0.05 mg/mL | 4.37 | 5.56 | *Pseudomonas putida* |
| Lipase | 0.005 mg/mL | 16.69 | 2.47 | *Pseudomonas putida* |
| OPDtox ™ | 0.5 mg/mL | −5.47 | 2.03 | *Pseudomonas putida* |
| OPDtox ™ | 0.05 mg/mL | 3.86 | 6.97 | *Pseudomonas putida* |
| OPDtox ™ | 0.005 mg/mL | 15.85 | 1.15 | *Pseudomonas putida* |
| Cellulase | 0.5 mg/mL | 19.74 | 4.93 | *Pseudomonas putida* |
| Cellulase | 0.05 mg/mL | 21.68 | 3.98 | *Pseudomonas putida* |
| Cellulase | 0.005 mg/mL | 21.83 | 1.16 | *Pseudomonas putida* |
| Trypsin | 0.5 mg/mL | 15.02 | 5.74 | *Pseudomonas putida* |
| Trypsin | 0.05 mg/mL | 10.20 | 4.22 | *Pseudomonas putida* |
| Trypsin | 0.005 mg/mL | 17.47 | 7.25 | *Pseudomonas putida* |
| β-Glucosidase | 0.5 mg/mL | 10.90 | 7.50 | *Pseudomonas putida* |
| β-Glucosidase | 0.05 mg/mL | 17.63 | 1.13 | *Pseudomonas putida* |
| β-Glucosidase | 0.005 mg/mL | 19.43 | 2.13 | *Pseudomonas putida* |
| Amyloglucosidase | 0.5 mg/mL | 8.56 | 3.55 | *Pseudomonas putida* |
| Amyloglucosidase | 0.05 mg/mL | 7.66 | 9.04 | *Pseudomonas putida* |
| Amyloglucosidase | 0.005 mg/mL | 14.02 | 5.07 | *Pseudomonas putida* |
| β-Gluconase | 0.5 mg/mL | 14.48 | 8.11 | *Pseudomonas putida* |
| β-Gluconase | 0.05 mg/mL | 22.68 | 2.18 | *Pseudomonas putida* |
| β-Gluconase | 0.005 mg/mL | 24.02 | 3.78 | *Pseudomonas putida* |
| AMP-LKLK | 0.5 mg/mL | 49.50 | 1.52 | *Pseudomonas putida* |
| AMP-LKLK | 0.05 mg/mL | −6.87 | 6.19 | *Pseudomonas putida* |
| AMP-LKLK | 0.005 mg/mL | 5.05 | 9.20 | *Pseudomonas putida* |
| Lipase | 0.5 mg/mL | 2.63 | 3.76 | *Alcaligenes faecalis* |
| Lipase | 0.05 mg/mL | −4.75 | 3.50 | *Alcaligenes faecalis* |
| Lipase | 0.005 mg/mL | −1.01 | 2.83 | *Alcaligenes faecalis* |
| OPDtox ™ | 0.5 mg/mL | −8.89 | 3.84 | *Alcaligenes faecalis* |
| OPDtox ™ | 0.05 mg/mL | −11.66 | 5.03 | *Alcaligenes faecalis* |
| OPDtox ™ | 0.005 mg/mL | −3.99 | 5.39 | *Alcaligenes faecalis* |
| Cellulase | 0.5 mg/mL | 1.32 | 7.18 | *Alcaligenes faecalis* |
| Cellulase | 0.05 mg/mL | −11.61 | 5.41 | *Alcaligenes faecalis* |
| Cellulase | 0.005 mg/mL | 2.47 | 2.85 | *Alcaligenes faecalis* |
| Trypsin | 0.5 mg/mL | 7.23 | 4.20 | *Alcaligenes faecalis* |
| Trypsin | 0.05 mg/mL | −1.40 | 5.21 | *Alcaligenes faecalis* |
| Trypsin | 0.005 mg/mL | 4.09 | 2.75 | *Alcaligenes faecalis* |
| β-Glucosidase | 0.5 mg/mL | 3.20 | 4.80 | *Alcaligenes faecalis* |
| β-Glucosidase | 0.05 mg/mL | −0.23 | 9.47 | *Alcaligenes faecalis* |
| β-Glucosidase | 0.005 mg/mL | 4.98 | 2.90 | *Alcaligenes faecalis* |
| Amyloglucosidase | 0.5 mg/mL | −1.49 | 2.01 | *Alcaligenes faecalis* |
| Amyloglucosidase | 0.05 mg/mL | 1.36 | 1.26 | *Alcaligenes faecalis* |
| Amyloglucosidase | 0.005 mg/mL | 9.06 | 3.07 | *Alcaligenes faecalis* |
| β-Gluconase | 0.5 mg/mL | 0.95 | 3.44 | *Alcaligenes faecalis* |
| β-Gluconase | 0.05 mg/mL | −0.87 | 7.36 | *Alcaligenes faecalis* |
| β-Gluconase | 0.005 mg/mL | 8.15 | 4.61 | *Alcaligenes faecalis* |
| AMP-LKLK | 0.5 mg/mL | 3.66 | 3.74 | *Alcaligenes faecalis* |
| AMP-LKLK | 0.05 mg/mL | −15.18 | 4.54 | *Alcaligenes faecalis* |
| AMP-LKLK | 0.005 mg/mL | 5.90 | 3.52 | *Alcaligenes faecalis* |
| Lipase | 0.5 mg/mL | 9.26 | 3.16 | *Bacillus cereus* |
| Lipase | 0.05 mg/mL | 7.33 | 1.51 | *Bacillus cereus* |
| Lipase | 0.005 mg/mL | 11.03 | 0.52 | *Bacillus cereus* |
| OPDtox ™ | 0.5 mg/mL | 4.31 | 1.21 | *Bacillus cereus* |
| OPDtox ™ | 0.05 mg/mL | 9.35 | 1.45 | *Bacillus cereus* |
| OPDtox ™ | 0.005 mg/mL | 16.85 | 3.42 | *Bacillus cereus* |
| Cellulase | 0.5 mg/mL | 0.30 | 2.66 | *Bacillus cereus* |
| Cellulase | 0.05 mg/mL | 11.12 | 0.66 | *Bacillus cereus* |
| Cellulase | 0.005 mg/mL | 14.21 | 2.28 | *Bacillus cereus* |
| Trypsin | 0.5 mg/mL | −0.41 | 1.41 | *Bacillus cereus* |
| Trypsin | 0.05 mg/mL | 10.77 | 1.52 | *Bacillus cereus* |
| Trypsin | 0.005 mg/mL | 12.59 | 2.31 | *Bacillus cereus* |
| β-Glucosidase | 0.5 mg/mL | 1.13 | 2.87 | *Bacillus cereus* |
| β-Glucosidase | 0.05 mg/mL | 10.72 | 2.54 | *Bacillus cereus* |
| β-Glucosidase | 0.005 mg/mL | 17.35 | 6.15 | *Bacillus cereus* |
| Amyloglucosidase | 0.5 mg/mL | −9.50 | 4.38 | *Bacillus cereus* |
| Amyloglucosidase | 0.05 mg/mL | 4.93 | 0.90 | *Bacillus cereus* |
| Amyloglucosidase | 0.005 mg/mL | 10.40 | 1.79 | *Bacillus cereus* |
| β-Gluconase | 0.5 mg/mL | −7.01 | 3.62 | *Bacillus cereus* |
| β-Gluconase | 0.05 mg/mL | 3.62 | 2.47 | *Bacillus cereus* |
| β-Gluconase | 0.005 mg/mL | 6.66 | 3.51 | *Bacillus cereus* |
| AMP-LKLK | 0.5 mg/mL | 12.66 | 2.85 | *Bacillus cereus* |
| AMP-LKLK | 0.05 mg/mL | 8.86 | 1.33 | *Bacillus cereus* |

TABLE 107-continued

XTT Assay Results of Biobased Additives

| Additive | Concentration | Average % Reduction | Standard Deviation | Organism |
|---|---|---|---|---|
| AMP-LKLK | 0.005 mg/mL | 11.87 | 5.60 | Bacillus cereus |
| Lipase | 0.5 mg/mL | 3.01 | 0.53 | Enterobacter aerogenes |
| Lipase | 0.05 mg/mL | 1.02 | 1.53 | Enterobacter aerogenes |
| Lipase | 0.005 mg/mL | −0.45 | 2.56 | Enterobacter aerogenes |
| OPDtox ™ | 0.5 mg/mL | 6.08 | 1.53 | Enterobacter aerogenes |
| OPDtox ™ | 0.05 mg/mL | 6.09 | 3.57 | Enterobacter aerogenes |
| OPDtox ™ | 0.005 mg/mL | 8.20 | 1.03 | Enterobacter aerogenes |
| Cellulase | 0.5 mg/mL | 5.07 | 3.51 | Enterobacter aerogenes |
| Cellulase | 0.05 mg/mL | 5.12 | 2.49 | Enterobacter aerogenes |
| Cellulase | 0.005 mg/mL | 5.79 | 1.84 | Enterobacter aerogenes |
| Trypsin | 0.5 mg/mL | 7.43 | 3.96 | Enterobacter aerogenes |
| Trypsin | 0.05 mg/mL | 9.89 | 0.84 | Enterobacter aerogenes |
| Trypsin | 0.005 mg/mL | 9.50 | 2.24 | Enterobacter aerogenes |
| β-Glucosidase | 0.5 mg/mL | 3.81 | 2.37 | Enterobacter aerogenes |
| β-Glucosidase | 0.05 mg/mL | 7.76 | 2.21 | Enterobacter aerogenes |
| β-Glucosidase | 0.005 mg/mL | 4.21 | 0.34 | Enterobacter aerogenes |
| Amyloglucosidase | 0.5 mg/mL | 10.07 | 1.84 | Enterobacter aerogenes |
| Amyloglucosidase | 0.05 mg/mL | 9.58 | 2.29 | Enterobacter aerogenes |
| Amyloglucosidase | 0.005 mg/mL | 2.34 | 2.67 | Enterobacter aerogenes |
| β-Gluconase | 0.5 mg/mL | 3.73 | 5.20 | Enterobacter aerogenes |
| β-Gluconase | 0.05 mg/mL | 12.57 | 0.91 | Enterobacter aerogenes |
| β-Gluconase | 0.005 mg/mL | 6.35 | 6.25 | Enterobacter aerogenes |
| AMP-LKLK | 0.5 mg/mL | 39.26 | 2.03 | Enterobacter aerogenes |
| AMP-LKLK | 0.05 mg/mL | 31.00 | 3.17 | Enterobacter aerogenes |
| AMP-LKLK | 0.005 mg/mL | 11.01 | 11.40 | Enterobacter aerogenes |
| Cinnamaldehyde | 0.50% | 88.06 | 0.12 | Microbe mix |
| Cinnamaldehyde | 0.25% | 89.16 | 0.50 | Microbe mix |
| Cinnamaldehyde | 0.05% | 60.76 | 2.76 | Microbe mix |
| Citral | 0.50% | 61.88 | 1.13 | Microbe mix |
| Citral | 0.25% | 65.54 | 2.14 | Microbe mix |
| Citral | 0.05% | 23.29 | 4.90 | Microbe mix |
| Monolaurin | 0.5 mg/mL | 61.13 | 0.44 | Microbe mix |
| Monolaurin | 0.05 mg/mL | 13.57 | 4.87 | Microbe mix |
| Monolaurin | 0.005 mg/mL | 16.80 | 1.08 | Microbe mix |
| AMP-7 | 0.5 mg/mL | 53.55 | 2.82 | Microbe mix |
| AMP-7 | 0.05 mg/mL | 23.18 | 0.90 | Microbe mix |
| AMP-7 | 0.005 mg/mL | 13.99 | 1.84 | Microbe mix |
| AMP-6 | 0.5 mg/mL | 40.12 | 5.11 | Microbe mix |
| AMP-6 | 0.05 mg/mL | 19.66 | 3.07 | Microbe mix |
| AMP-6 | 0.005 mg/mL | 14.06 | 2.79 | Microbe mix |
| AMP-LKLK | 0.5 mg/mL | 36.77 | 2.78 | Microbe mix |
| AMP-LKLK | 0.05 mg/mL | 16.21 | 2.92 | Microbe mix |
| AMP-LKLK | 0.005 mg/mL | 12.95 | 4.27 | Microbe mix |
| Glucose oxidase | 0.5 mg/mL | 6.71 | 4.07 | Microbe mix |
| Glucose oxidase | 0.05 mg/mL | 6.89 | 0.99 | Microbe mix |
| Glucose oxidase | 0.005 mg/mL | 13.34 | 3.36 | Microbe mix |
| Peroxidase | 0.5 mg/mL | 8.65 | 6.47 | Microbe mix |
| Peroxidase | 0.05 mg/mL | −11.57 | 3.72 | Microbe mix |
| Peroxidase | 0.005 mg/mL | −2.20 | 4.58 | Microbe mix |
| Alginate lyase | 0.5 mg/mL | −0.92 | 2.25 | Microbe mix |
| Alginate lyase | 0.05 mg/mL | 8.62 | 5.35 | Microbe mix |
| Alginate lyase | 0.005 mg/mL | 7.05 | 8.71 | Microbe mix |
| Chymotrypsin | 0.5 mg/mL | −0.80 | 1.43 | Microbe mix |
| Chymotrypsin | 0.05 mg/mL | 2.87 | 1.62 | Microbe mix |
| Chymotrypsin | 0.005 mg/mL | 1.61 | 2.26 | Microbe mix |
| Protease | 0.5 mg/mL | −0.53 | 0.68 | Microbe mix |
| Protease | 0.05 mg/mL | −0.39 | 2.73 | Microbe mix |
| Protease | 0.005 mg/mL | 4.95 | 3.39 | Microbe mix |
| Lysozyme | 0.5 mg/mL | 21.89 | 2.87 | Microbe mix |
| Lysozyme | 0.05 mg/mL | 11.86 | 0.93 | Microbe mix |
| Lysozyme | 0.005 mg/mL | 12.61 | 5.54 | Microbe mix |
| Cinnamaldehyde + glucose oxidase | 0.5%/0.05 mg/mL | 85.13 | 1.05 | Microbe mix |
| Cinnamaldehyde + glucose oxidase | 0.25%/0.05 mg/mL | 85.55 | 3.09 | Microbe mix |
| Glucose oxidase + AMP-7 | 0.05 mg/mL/ 0.5 mg/mL | 49.34 | 4.14 | Microbe mix |
| Lysozyme + glucose oxidase + AMP-7 | 0.05 mg/mL/ 0.05 mg/mL/ 0.5 mg/mL | 40.03 | 15.31 | Microbe mix |
| Lysozyme + alginate lyase + | 0.5 mg/mL/ 0.5 mg/mL/ | | | |

TABLE 107-continued

XTT Assay Results of Biobased Additives

| Additive | Concentration | Average % Reduction | Standard Deviation | Organism |
|---|---|---|---|---|
| glucose oxidase + AMP-7 | 0.05 mg/mL/ 0.5 mg/mL | 38.38 | 0.34 | Microbe mix |
| Heat-killed (65° C., 30 min) | — | 81.07 | 3.04 | Microbe mix |

The biobased additives and active concentrations against each of the individual bacterial test strains is shown at the Table below.

TABLE 108

The effects of selected antimicrobial compounds on the growth of various microogarnisms.

| | | AVERAGES | | |
|---|---|---|---|---|
| Strain | Additive | 1% or 0.5 mg/ml | 0.1% or 0.05 mg/ml | 0.01% or 0.005 mg/ml |
| Pseudomonas aeruginosa | cinnamaldehyde | 95.28 | 77.20 | −3.09 |
| Pseudomonas aeruginosa | glucose oxidase | 11.62 | 7.35 | 14.51 |
| Pseudomonas aeruginosa | alginate lyase | −12.52 | −10.68 | −5.01 |
| Pseudomonas aeruginosa | peroxidase | 19.65 | −0.05 | −0.43 |
| Pseudomonas aeruginosa | monolaurin | 56.55 | −3.09 | −8.59 |
| Pseudomonas aeruginosa | citral | 25.46 | 33.70 | −1.03 |
| Pseudomonas aeruginosa | AMP-6 | 28.30 | −6.10 | −3.46 |
| Pseudomonas aeruginosa | AMP-7 | 61.19 | −0.83 | 2.29 |
| Pseudomonas aeruginosa | lysozyme | −4.82 | −3.60 | −3.18 |
| Pseudomonas putida | cinnamaldehyde | 92.50 | 86.04 | 68.15 |
| Pseudomonas putida | glucose oxidase | 59.68 | 74.16 | 76.30 |
| Pseudomonas putida | alginate lyase | 33.79 | 2.85 | −5.69 |
| Pseudomonas putida | peroxidase | 45.94 | 4.63 | −3.84 |
| Pseudomonas putida | monolaurin | 92.56 | 89.48 | 20.37 |
| Pseudomonas putida | citral | 84.60 | 92.50 | 84.14 |
| Pseudomonas putida | AMP-6 | 63.66 | 14.46 | 21.89 |
| Pseudomonas putida | AMP-7 | 89.91 | 51.99 | 2.87 |
| Pseudomonas putida | lysozyme | 17.44 | −21.00 | 34.51 |
| Pseudomonas fluorescens | cinnamaldehyde | 82.40 | 72.16 | 27.17 |
| Pseudomonas fluorescens | glucose oxidase | 45.86 | 28.49 | 34.28 |
| Pseudomonas fluorescens | alginate lyase | 32.36 | 2.54 | −0.43 |
| Pseudomonas fluorescens | peroxidase | 34.79 | 22.00 | 11.64 |
| Pseudomonas fluorescens | monolaurin | 61.87 | −5.93 | −4.19 |
| Pseudomonas fluorescens | citral | 79.16 | 86.56 | 2.16 |
| Pseudomonas fluorescens | AMP-6 | 62.80 | 16.05 | 20.30 |
| Pseudomonas fluorescens | AMP-7 | 72.73 | 26.04 | 21.59 |
| Pseudomonas fluorescens | lysozyme | 13.86 | 1.33 | 8.75 |
| Bacillus cereus | cinnamaldehyde | 83.02 | 43.03 | 3.28 |
| Bacillus cereus | glucose oxidase | 12.68 | 19.27 | 16.79 |
| Bacillus cereus | alginate lyase | 15.91 | 22.34 | 14.97 |
| Bacillus cereus | peroxidase | 7.03 | −2.37 | −0.51 |
| Bacillus cereus | monolaurin | 73.86 | 55.39 | 12.15 |
| Bacillus cereus | citral | 38.62 | 48.69 | 21.31 |
| Bacillus cereus | AMP-6 | 17.48 | 13.07 | 28.80 |
| Bacillus cereus | AMP-7 | 29.93 | 9.75 | 17.04 |
| Bacillus cereus | lysozyme | −9.07 | 1.39 | 17.97 |
| Alcaligenes faecalis | cinnamaldehyde | 86.77 | 67.90 | 57.22 |
| Alcaligenes faecalis | glucose oxidase | 64.05 | 76.69 | 79.88 |
| Alcaligenes faecalis | alginate lyase | 66.65 | 11.49 | 5.36 |
| Alcaligenes faecalis | peroxidase | 74.74 | 31.57 | 18.08 |
| Alcaligenes faecalis | monolaurin | 66.71 | 14.96 | 0.29 |
| Alcaligenes faecalis | citral | 74.93 | 79.50 | 52.54 |
| Alcaligenes faecalis | AMP-6 | 66.88 | 5.50 | −10.55 |
| Alcaligenes faecalis | AMP-7 | 68.38 | 2.36 | −10.23 |
| Alcaligenes faecalis | lysozyme | 32.58 | −35.02 | 1.48 |
| Enterobacter aerogenes | cinnamaldehyde | 95.20 | 46.62 | −13.98 |
| Enterobacter aerogenes | glucose oxidase | 24.76 | 21.47 | 51.89 |
| Enterobacter aerogenes | alginate lyase | 21.12 | 1.88 | 9.93 |
| Enterobacter aerogenes | peroxidase | 9.42 | 3.48 | 10.19 |
| Enterobacter aerogenes | monolaurin | 46.04 | 0.86 | 0.20 |
| Enterobacter aerogenes | citral | 78.36 | 46.50 | 14.80 |
| Enterobacter aerogenes | AMP-6 | 54.24 | 39.24 | 25.34 |
| Enterobacter aerogenes | AMP-7 | 61.52 | 43.83 | 28.70 |
| Enterobacter aerogenes | lysozyme | 26.02 | 6.45 | 14.59 |

Differences in susceptibility were seen among the test strains with A. faecalis and P. putida showing susceptibility to the highest number of biobased additives (8 and 7, respectively). B. cereus and P. aeruginosa were susceptible to the lowest number of biobased additives (2 and 3, respectively). Concentration differences were also seen between the strains with some only showing susceptibility to the highest test concentrations. In addition, some of the biobased additives showed a broader antibacterial activity with effectiveness against 5-6 of the test microorganisms (AMP-6, AMP-7, cinnamaldehyde, citral, and monolaurin), while others showed a narrower range of activity with effectiveness against only one microorganism (alginate lyase, peroxidase, and AMP-LKLK). Glucose oxidase was intermediate, showing activity against three of the test strains.

Following the screening of individual strains, the XTT assay was used to evaluate effectiveness against a mixed inoculum of all six test strains. This is similar in regard to the inoculation procedure used in ASTM D2574 where all strains are grown separately and then inoculated as a mixture into the coating. This was done on select single biobased additives and combinations of additives. In addition, several complex mixtures were analyzed for the potential of additive or synergistic effects—particularly with those biobased additives that target different molecular components of the cell. The effects of various antimicrobial compounds, alone and in combination, on the growth of a mixture in equal parts of A. faecalis, B. cereus, E. aerogenes, P. aeruginosa, P.

fluorescens, and *P. putida* as measured by XTT testing and the results shown in the Table below. For undiluted antimicrobial compounds 0.5% (v/v) for cinnamaldehyde and citral was used, and 0.5 mg/mL for all other compounds was used. For 1:10 dilution column results, (v/v) for cinnamaldehyde and citral was used, and 0.05 mg/mL for all other compounds used. For the 1:100 dilution column results, 0.05% (v/v) for cinnamaldehyde and citral was used, mg/mL for all other compounds was used.

TABLE 109

Mixed microbial innoculants XTT assay results against various biocides

| | average | | |
|---|---|---|---|
| | undiluted | 1:10 | 1:100 |
| cinnamaldehyde | 88.06 | 89.16 | 60.76 |
| citral | 61.88 | 65.54 | 23.29 |
| monolaurin | 61.13 | 13.57 | 16.80 |
| AMP-7 | 53.55 | 23.18 | 13.99 |
| AMP-6 | 40.12 | 19.66 | 14.06 |
| AMP-LKLK | 36.77 | 16.21 | 12.95 |
| glucose oxidase | 6.71 | 6.89 | 13.34 |
| peroxidase | 8.65 | −11.57 | −2.20 |
| alginate lyase | −0.92 | 8.62 | 7.05 |
| chymotrypsin | −0.80 | 2.87 | 1.61 |
| protease | −0.53 | −0.39 | 4.95 |
| lysozyme | 21.89 | 11.86 | 12.61 |
| cinnamaldehyde + glucose oxidase | 85.13 | 85.55 | |
| glucose oxidase + AMP-7 | 49.34 | | |
| lysozyme + glucose oxidase + AMP-7 | 40.03 | | |
| lysozyme + alginate lyase + glucose oxidase + AMP-7 | 38.38 | | |
| heat-killed (65 C., 30 min) | 81.07 | | |

Several additives displayed similar trends in activity against the mixed inoculum as was seen with individual strains—with cinnamaldehyde, citral, monolaurin, and AMP-7 showing the greatest reduction in cellular metabolism with 89%, 66%, 61%, and 54%, respectively. In addition, combinations containing cinnamaldehyde/glucose oxidase and AMP-7/glucose oxidase had a reduction in cellular metabolism of 85% and 49% respectively. AMP-6, AMP-LKLK, and a complex combination of lysozyme/AMP-7/glucose oxidase/alginate lyase showed around 40% reduction in cellular metabolism. All other biobased additives tested were below 25% reduction in metabolism.

Based on the XTT results, select biobased additives and combinations were tested using direct coating challenges as described in ASTM D2574 with the microbes being evaluated herein followed by sampling for recoverable growth over seven days. A biocide-free acrylic latex coating and acrylic latex coating containing Kathon™ LX 1.5% (final concentration 0.15 wt %) were prepared (see Table below).

TABLE 110

Coating Formulation

| Ingredient | Wt % | Vol |
|---|---|---|
| Water | 11.67 | 11.67 |
| Tamol 731 | 1.31 | 1.19 |
| Triton CF-10 | 0.28 | 0.26 |
| BYK 022 | 0.19 | 0.19 |
| Kathon LX (1.5%) | 0.15 | 0.15 |
| Ti-Pure 706 | 23.36 | 5.84 |

TABLE 110-continued

Coating Formulation

| Ingredient | Wt % | Vol |
|---|---|---|
| Polygloss 90 | 2.34 | 0.90 |
| Roller mill overnight, check grind (5-6 NS) Mixer at low speed | | |
| Water | 15.48 | 15.48 |
| Latex | 43.04 | 39.13 |
| Optifilm Enhancer 400 | 1.88 | 1.94 |
| BYK 024 | 0.18 | 0.18 |
| Rheovis PU 1250NC | 0.13 | 0.12 |
| | 100.00 | 77.04 |
| Mixer on high speed, hold 20 min | | |
| PVC, % | | 29 |
| Solids, wt % | | 48.10 |
| Solids, vol % | | 35.20 |

The biocide-free acrylic latex was used as a negative control and to formulate coatings containing the biobased additives and its combinations. The Kathon LX 1.5% was used as a traditional biocide containing positive control. A rating scale from 0-4 was used to indicate bacterial colony counts after an incubation period of seven days following plating on tryptic soy agar. Two separate tests were performed using different inoculation levels of the mixed bacterial species, 1 µL/mL and 10 µL/mL. This is the recommended inoculation level following ASTM and 10-fold the inoculation, which is recommended as the next inoculation level in the ASTM method. The coating containing Kathon LX 1.5% showed efficient control of the mixed microorganisms with a score of 0 on day 1. Cinnamaldehyde showed effectiveness against the tested microorganisms in both challenge experiments with some differences in the rate of decrease. The high concentration of cinnamaldehyde was used to confirm that the results of over 80% reduction in metabolism in the mixed microorganisms XTT assay translated to the ASTM coating challenge method. At the initial test concentrations presented here, a combination containing cinnamaldehyde and glucose oxidase showed a greater impact on day 1 than the cinnamaldehyde alone with a 2.5 (with one plate scoring a 2 and the other scoring a 3) on day 1 versus a 3 for the cinnamaldehyde coating alone, and both samples reached a 0 by day 3. This trend was not seen at the lower inoculation level. The coating containing citral also achieved a 0 by day 7, but the decrease was slower than that seen for cinnamaldehyde, with a 4 on day 1, 3 on day 3, 1.5 on day 5, and 0 on day 7. At the tested concentrations, neither AMP-7, AMP-6, monolaurin, glucose oxidase alone or in combination with other biobased additives targeting different molecular targets decreased the score from 4 by day 7. As per the ASTM, samples that achieved a 0 were reinoculated at a level of 10 µL/mL.

Initial property testing (pencil hardness, crosshatch adhesion, gloss, viscosity, and color) was conducted on acrylic latex coating formulated with several biobased additives alone or in combination (see Table below).

TABLE 111

Paint Properties

| Sample | Pencil Hardness* | Crosshatch Adhesion* | Gloss @60°† | ICI Viscosity (P) | Color† | ΔE |
|---|---|---|---|---|---|---|
| Control | B | 4B | 27.8 | 0.705 | L* = 96.6<br>a* = −1.2<br>b* = 2.1 | |
| AMP-7 0.5 mg/mL | HB | 5B | 28.5 | 1.029 | L* = 96.3<br>a* = −1.2<br>b* = 2.0 | 0.346 |
| Glucose oxidase 0.05 mg/mL | HB | 5B | 31.2 | 0.697 | L* = 96.5<br>a* = −1.2<br>b* = 2.1 | 0.106 |
| AMP-7 0.5 mg/mL, Lysozyme 0.5 mg/mL, Glucose oxidase 0.05 mg/mL | 2B | 5B | 30.1 | 0.636 | L* = 96.3<br>a* = −1.2<br>b* = 2.0 | 0.375 |

*Q-panel (dry film thickness 25-33 μm);
†Opacity chart (dry film thickness 48-54 μm)

The control (biocide-free) coating had pencil hardness and crosshatch adhesion values of B and 4B, respectively. All the biobased additive coatings scored a 5B on crosshatch adhesion. Coatings containing AMP-7 and glucose oxidase were rated as slightly harder with pencil hardness values of HB, but the coating with AMP-7/lysozyme/glucose oxidase was softer (2B). The biobased additives had minimal impact on the 60° gloss with values ranging from 27.8 for the control to 31.2 for the coating with glucose oxidase. The coating with AMP-7 exhibited higher ICI viscosity (1.029 P), and the other coatings were comparable in viscosity to the acrylic latex control (0.705 P). The biobased additives had negligible effect on the color (ΔE values <0.4 relative to the control).

The XTT assay of single bacterial challenge microbes successfully identified biobased additives that could reduce cellular metabolism by >50% as well as those that could reduce metabolism to over 80%, which is comparable to heat-killed experiments where no viable cells are detectable. These biobased additive candidates belonged to all test classes; enzymes, peptides and small-molecule natural products. Organismal-based differences in activity were observed as well as differences in effectiveness at various test concentrations. These differences in activity between groups of test strains reflect the differences in cellular characteristics between the test organisms, as well as the need to tailor effective microbicides across a broad spectrum of contaminants that can occur for different applications. For instance, endospore formation by B. cereus creates a protected dormant state that can persist in the environment and germinate at a later time to establish vegetative growth. It is common to include a spore former, such as Bacillus, in coating challenge experiments to evaluate the effectiveness in eliminating spores versus vegetative cellular growth. Pseudomonas species are amongst the most commonly recovered coating spoilage agents. The vast metabolic capability of Pseudomonads, protective exopolysaccharide glycocalyx, and propensity to produce biofilms aid in their success in such environments as coatings, additives, and production equipment. The formation of biofilms, which consist of bacteria entrapped in a network of complex and various extracellular polysaccharides, aids in attachment and protection. Species-specific differences were detected in the current study, with P. putida being susceptible to more classes and concentrations of biobased additives tested as compared to P. aeruginosa.

This Example and the additional disclosures herein indicate the ability to substitute biobased biocides for traditional biocides. A number of combinations of biobased biocides have been shown to eliminate common microbial contaminants of latex coatings. In some cases, all members of a mixed inoculum were eliminated similarly to a traditional biocide in the same coating. In other cases, all but a single up to only a few microbial contaminants was eliminated from a mixed inoculum by use of a biobased biocidal formulation—which results were distinguished by a high kill-rate exhibited by the metabolic assay, and a single species lawn or isolated colonies in the standard ASTM plating assay. In the case of the successful biobased preservatives, in certain additional instances, in-film antimicrobial efficacy was observed against Escherichia coli challenges of fixed films of the in-can preserved coatings.

Activities against single bacterial isolates were compared to a mixed inoculum containing all six test bacterial strains, as well as the molecular targeted combinations with biobased additives that did not display significant activity on their own were evaluated. The results indicate that this approach can be used to quickly focus the preservative formulation to those contaminants that exhibit initial recalcitrance. For instance, one such effective formulation was a combination of lysozyme, AMP-7, glucose oxidase, and alginate lyase. The method herein includes to select disruptive properties impacting distinct cellular components to achieve synergistic effects. Alginate lyase targets the extracellular polysaccharide layer, AMP-7 the membrane (amongst other impacts), lysozyme the cell wall, and glucose oxidase produces oxidative stress. For the single additives, high activity (>80% reduction in cellular metabolism) against all the individual stains correlated to high activity in the mixed inoculum test results. In the mixed inoculation assay, test concentrations of cinnamaldehyde at 0.5% and 0.25% showed >80% reduction in metabolism, while the effectiveness of the 0.05% additive concentration dropped to just over 60%.

For other additives that only displayed activity against a few of the strains, activity was not seen in the mixed inoculum at these test concentrations. For example, glucose oxidase and alginate lyase showed activity against one or more test strains alone, but had <20% reduction in metabolism against the mixed inoculum. Others like AMP-7, citral, and monolaurin which displayed >50% (and in some cases >80%) reduction in cellular metabolism against all but one of the test strains alone; and displayed >50%, but <70% reduction in metabolism for the mixed culture. This indicates that less than complete kill was achieved for at least one of the mixed strains, allowing for continued survival and growth in the culture media. Activity also dropped below 30% reduction in metabolism for the lower test concentrations in the mixed inoculum.

Biobased preservatives based on the XTT and ASTM data fall into several classes of biological molecules. AMPs are a diverse group of small peptides produced by numerous organisms from microbes to humans. They play a role in host defenses against microorganisms. The current AMPs tested are part of a combinatorial library generated by Reactive Surfaces Ltd. and consist of combinations of charged and hydrophobic groups. Their antimicrobial activity has been demonstrated in solution and in dry-film formulations against various microorganisms, including bacteria, fungi, algae, and viruses. Previous tests of AMP-7 indicated a level of 3% total solids in dry film had impact on several bacterial species including *Pseudomonas*. The small organic molecules used for comparative purposes between the XTT and ASTM, cinnamaldehyde and citral, are present in cinnamon bark and lemon grass (among other plants), respectively. They make up a large proportion of the essential oil content from their respective sources but are also synthesized on large scale.

It is contemplated that the enzyme biobased additives may be used in various combinations. For example, glucose oxidase and lysozyme may be evaluated at increased concentrations and in combination with other biobased additives. Both are listed as GRAS for various intended uses and have been used in the food industry. They are produced on commercial scale and available in bulk quantities. Lysozyme targets the bacterial cell wall and cleaves glyosidic bonds of peptidoglycan. It has been shown to be effective against Gram-positive bacteria and is routinely used in combination with other agents that disrupt the membrane allowing access to the peptidoglycan layer of the cell wall. Glucose oxidase catalyzes the oxidation of glucose and subsequent release of hydrogen peroxide that can induce cellular damage.

Several in-can challenge methodologies routinely used by the industry can vary in their degree of specificity, and it may not produce similar conclusions between them. The reliance on crude analysis and scoring methods may not provide a clear picture of the impact of novel biocides on the consortium growth. For instance, a score of 2 or 3 in the ASTM could be a single colony type or multiple colony types, and does not discern if each strain is remaining viable in the coating. Being able to make this differentiation gives valuable information as to whether the biocide is effective against a particular group of bacteria such as *Pseudomonas* versus *Bacillus*. While these methods are sufficient to determine end use effectiveness, ultimately achieving the goal of scoring a complete kill against the target microbes of interest, they do not easily facilitate the development of novel and tailored approaches to control and preservation. These results herein this Example indicate that an initial metabolic or other rapid-throughput assay allows an initial result that can be used to predict likelihood of success of the same biocide formulation as an in-can preservative. An 80% reduction in metabolism using the mixed inoculum translated into a complete kill in the ASTM challenge method. It is contemplated that the AMPs (and additional peptides and enzymes) may be similarly evaluated to determine if the same trend holds true for these molecules.

It is contemplated that molecular methods can be developed to conduct direct analysis of microbial community structure in coating samples. This will allow for real-time monitoring of individual bacterial growth patterns in the coating sample and impacts on each strain of the consortium following biobased additive treatment.

Example 65: Nuclease Coating Demonstration

In this Example, 50 μL Minwax was combined to 50 μL DNase I2998 U/mL (2.98 U/μL) or EcoRI 50 U/μL. A second EcoRI was combined to 90 μL Minwax and 10 μL EcoRI due to heavy cloudiness in coating (DNase I coating remained clear to eye). 24, of coating was spread into bottom of 96-well plate. The coating was cured one triplicate set (with Minwax control) at for 30 minutes and the other at room temp. The first test was 2 days following application. of precut plasmid DNA (cut with EcoRI so linear instead of circular) was added and incubated 20 minutes at 35° C. 10 μL of sterile water loading buffer (10:1) was added and entire contents loaded into precast 0.8% agarose gel containing ethidium bromide. The samples were electrophoresed for 30 minutes in a gel kit, then illuminated using uv light box. DNase I incorporated into minwax produced no visible bands indicating the coating degraded the DNA.

Additionally, another verification of the DNA degrading coating's activity was conducted. 25 μl TE buffer and 25 μl pAMP plasmid (0.2 μg/ml) was added to a microcentrifuge tube. The material was mixed and added 5 μl pAMP/TE solution into the following wells: 3 wells Minwax control, 3 wells EcoRI coating, and 3 wells DNase I coating. The coatings were incubated at 35° C. for 20 minutes. 10 μL TE containing 10% loading dye was added. Pipetting was done to evenly rinse wells and load entire contents into wells of a 0.8% agarose gel containing ethidium bromide. The materials were electrophoresed 30 minutes and visualized under uv light. The DNase coated wells had no visible bands, while all other samples did, demonstrating the coating degraded the DNA.

Example 66: Demonstrating the effectiveness of bio-based antimicrobial agents.

It is contemplated, and as described herein, that rapid molecular microbiology screening methods, traditional paint challenge procedures, retention of in-film activity, and augmenting paint challenge methods with molecular techniques may be used to demonstrate the effectiveness of bio-based antimicrobial agents alone or in combination with traditional chemical-based preservative(s) (e.g., biocide(s)). Examples of rapid methods for monitoring enzyme active in materials includes the small molecule, 4-nitrophenyl acetate, used as indicator of hydrolytic activity by generation of a yellow color indicates an enzyme (e.g., lipase) is working; and retention of antimicrobial activity (cell lysis) can be visualized by clearing of a solution of *Micrococcus luteus* cells wherein clearing of the turbid cell solution indicates a lytic bioadditive (e.g., lysozyme) is working. Another example is a liquid high-throughput XTT viability assay (XTT Cell Proliferation Assay Kit Instruction Manual, American Type Culture Collection, Manassas, V A, 2011), where the cell viability assay utilizes the ability of living cells to reduce the tetrazolium dye XTT (2,3-bis-(2-methoxy-4-nitro-5-sulfophenyl)-2H-tetrazolium-5-carboxanilide) to a colored product that can be measured spectrophotometrically. Examples of bio-based additives whose anti-microbial activity can be measured include enzymes [e.g., amyloglucosidase, alginate lyase, beta-glucosidase, lysozyme, pectinase, lipase, beta-mannosidase, trypsin, beta-glucanase, chymotrypsin, endoglucanase, protease, cellulase, glucose oxidase, amylase, peroxidase, organophosphate hydrolase (OPDtox™)], peptides (e.g., AMP-7, AMP-6, AMP-LKLK, nisin), small molecule natural products (e.g., cinnamaldehyde, citral, monolaurin), or a combination thereof. Examples of organisms that may be used in demonstrations of antimicrobial activity by a bio-based agent and/or traditional chemical preservative includes *Alcaligenes faecalis* (a Gram-negative *bacillus*), *Bacillus cereus* (a Gram-positive *bacillus*, spore former), *Enterobacter aerogenes* (a Gram-negative enteric organism), *Pseudomonas aeruginosa* (a Gram-negative pseudomonad, biofilm former), *Pseudomonas fluorescens* (a Gram-negative pseudomonad, biofilm former), *Pseudomonas putida* (a Gram-negative pseudomonad, biofilm former), or a combination thereof.

Additional examples of traditional preservatives that may be used in the compositions and methods herein include KORDEK™ 573F, which comprises 2-methyl-4-isothiazolin-3-one ("MIT"; an isothiazolinone derivative typically used as an in-can preservative); BIOBAN™ 5515, which comprises the isothiazolinone derivatives 2-methyl-4-isothiazolin-3-one ("MIT") and 2-methyl-1,2-benzisothiazol-3 (2H)-one ("MBIT"; which is typically used as an in-can preservative); KATHON™ LX 1.5% that comprises the isothiazolinone derivative 2-methyl-4-isothiazolin-3-one ("MIT") and the halogenated isothiazolinone derivative 5-chloro-2-methyl-4-isothiazolin-3-one ("MCI") typically for in-can preservation; ROCIMA™ 63 which comprises the isothiazolinone derivative 2-n octyl-4-isothiazolin-3-one ("OTT") the carbamate methylbenzimidazole-2-yl carbamate ("MBC") and phenylurea typically for use in dry-film; and Mergal 395 which comprises the hydantoin formaldehyde releaser 1,3-dihydroxymethyl-5,5-dimethylhydantoin ("DMDM") and is typically used in coatings, sealants, and stains; or a combination thereof. Issues that make use of traditional chemical biocides include human and environmental concerns (e.g., formaldehyde releasers, isothiazolinone skin sensitization, increased regulations on usage and levels). For example, in the European Union MIT has "skin sensitive" labeling as "may cause an allergic skin reaction" at less than or equal to 15 parts per million ("ppm"), and between 1.5 to 15 parts per million a label of "May produce an allergic reaction" with a MIT recommended dosage is 100-200 ppm, combined with CMIT to achieve dosage of less than 15 ppm; and it is contemplated that biobased additives may be used to decrease biocide concentrations.

Example 67: Demonstration of rapid methods for monitoring enzyme active in materials.

A commercial caulk was functionalized with lipase and activity measured in plate wells wherein 4-nitrophenyl hydrolysis demonstrated 7.9 micromoles/minute activity while a blank well control demonstrated 0 micromoles/minute activity. A commercial caulk was functionalized with lysozyme and activity measured by absorbance at 450 nm for turbidity in a *Micrococcus luteus* lysis assay demonstrated 0.1492 absorbance, vs. 0.5673 absorbance for a blank control. An XTT assay was used to demonstrate the percent reduction of metabolic activity by various bio-based agents at different concentrations against *P. aeruginosa, P. putida*, a mixture of microbes described in the Example above, select organisms at the Tables below.

TABLE 112A

XTT Assay measurements against *P. aeruginosa*.

| | AVERAGES | | |
|---|---|---|---|
| | 0.5 mg/ml | 0.05 mg/ml | 0.005 mg/ml |
| cinnamaldehyde | 79.64 | 18.23 | 1.52 |
| glucose oxidase | 11.62 | 7.35 | 14.51 |
| alginate lyase | −12.52 | −10.68 | −5.01 |
| peroxidase | 19.65 | −0.05 | −0.43 |
| monolaurin | 56.55 | −3.09 | −8.59 |
| citral | 14.30 | −0.36 | 9.36 |
| AMP-6 | 28.30 | −6.10 | −3.46 |
| AMP-7 | 61.19 | −0.83 | 2.29 |

TABLE 112B

XTT Assay measurements against *P. putida*

| | AVERAGES | | |
|---|---|---|---|
| | 0.5 mg/ml | 0.05 mg/ml | 0.005 mg/ml |
| cinnamaldehyde | 88.33 | 61.38 | 38.36 |
| glucose oxidase | 59.68 | 74.16 | 76.30 |
| alginate lyase | 33.79 | 2.85 | −5.69 |
| peroxidase | 45.94 | 4.63 | −3.84 |
| monolaurin | 92.56 | 89.48 | 20.37 |
| citral | 90.47 | 48.94 | 41.02 |
| AMP-6 | 63.66 | 14.46 | 21.89 |
| AMP-7 | 89.91 | 51.99 | 2.87 |

TABLE 112C

XTT Assay measurements against a mixture of mix of *P. putida, P. fluorescens, P. aeruginosa, B. cereus, E. aerogenes*, and *A. faecalis*

| | average | | |
|---|---|---|---|
| | undiluted | 1:10 | 1:100 |
| cinnamaldehyde | 55.06 | 11.66 | 4.44 |
| citral | 18.91 | 0.51 | −0.35 |
| monolaurin | 61.13 | 13.57 | 16.80 |
| AMP-7 | 53.55 | 23.18 | 13.99 |
| AMP-6 | 40.12 | 19.66 | 14.06 |
| glucose oxidase | 6.71 | 6.89 | 13.34 |
| peroxidase | 8.65 | −11.57 | −2.20 |
| alginate lyase | −0.92 | 8.62 | 7.05 |
| lysozyme | 21.89 | 11.86 | 12.61 |
| glucose oxidase + AMP-7 | 49.34 | | |
| lysozyme + glucose oxidase + AMP-7 | 40.03 | | |
| lysozyme + alginate lyase + glucose oxidase + AMP-7 | 38.38 | | |
| heat-killed (65 C, 30 min) | 81.07 | | |

TABLE 112D

XTT Assay measurements against select organisms.

|  | A. niger | P. notatum | C. vulgaris |
|---|---|---|---|
| Control Paint | 0 | 0 | 0 |
| AMP-7/ Lysozyme/G.O. | 81.62 | 100.29 | 45.23 |

Testing of the microorganisms using ASTM Standard D2574-16 (Standard Test Method for Resistance of Emulsion Coatings in the Container to Attack by Microorganisms, ASTM International, West Conshohocken, PA, 2016, DOI: 10.1520/D2574-16) are shown at the Table below.

TABLE 113

Testing of the microorganisms using ASTM Standard D2574-16.

| Day | Biocide Free | Kathlon LX | 0.5 mg/ml glucose oxidase (GO) | 0.1% cinnamaldehyde | 0.2% cinnamaldehyde | 0.1% cinnamaldehyde + GO |
|---|---|---|---|---|---|---|
| 1 | 4 | 0 | 4 | 4 | 4 | 4 |
| 3 | 4 | 0 | 4 | 2.5 | 1 | 3 |
| 5 | 4 | 0 | 4 | 1 | 0 | 0 |
| 7 | 4 | 0 | 4 | 0 | 0 | 0 |

The data for the re-inoculations are shown in the Tables below.

TABLE 114

Re-inoculation #1

|  | Score #1 | Score #2 |
|---|---|---|
| 0.5% cinnamaldehyde | 0 | 0 |
| 0.5% citral | 3 | 3 |
| 0.5% cinnamaldehyde, 0.5 mg/ml AMP-7, 0.05 mg/ml glucose oxidase | 0 | 0 |
| 0.5% cinnamaldehyde, 0.5 mg/ml monolaurin, 0.05 mg/ml glucose oxidase | 0 | 0 |
| 0.5% cinnamaldehyde, 0.05 mg/ml glucose oxidase | 0 | 0 |

TABLE 115

Re-inoculation #2

|  | Score #1 | Score #2 |
|---|---|---|
| 0.5% cinnamaldehyde | 0 | 0 |
| 0.5% cinnamaldehyde, 0.5 mg/ml AMP-7, 0.05 mg/ml glucose oxidase | 0 | 0 |
| 0.5% cinnamaldehyde, 0.5 mg/ml monolaurin, 0.05 mg/ml glucose oxidase | 0 | 0 |
| 0.5% cinnamaldehyde, 0.05 mg/ml glucose oxidase | 0 | 0 |

The ratings of 1-4 used were did not completely capture the differences in colonies seen when comparing control acrylic latex, 0.05 mg/ml glucose oxidase, KATHON™ LX 1.5%, 0.1% cinnamaldehyde coating streaked agar plates.

Example 68. This example shows the molecular approaches to augment paint challenges.

It is contemplated that the surviving organism(s) of a mixture of microorganisms after an preservative assay may be identified by molecular approaches. Colony or lawn growth can be streaked for isolation on appropriate media. DNA extracted and gene specific primers can be used for PCR amplification. The sequences can be aligned and compared for homology as well as searched against the GenBank sequence database, and comparison of sequences between inoculation microorganisms and surviving isolates identified.

It is further contemplated that a method for in can community structure analysis may be conducted to evaluate the preservative activity of a biobased agent and/or chemical based preservative at different times. Total RNA or DNA can be extracted from challenged paint samples. Probes specific for each strain targeting variable regions of the sequences can be designed. This would enable the rapid quantitation of growth rates of strain members in the sample over time without the necessity to identify isolated strains by biochemical or sequence methods. Further, it is contemplated this method may be applied to production point analysis to identify contaminating microorganisms at any point in manufacture of a material, particularly using general probes used to detect any contamination and specific probes for detailed organism identification. For example, the compositions and methods herein may be used in analysis to identify contaminating microorganisms at any point in manufacture of a material, such as at a tank farm having up to thousands (e.g., 1 to 2000 or more) of different raw materials of different types (e.g., a tint, a resin, an oil, a solvent); at a metering deck for the materials; a pre-mixing tank; a dispersion mill; during let-down ("dilution"); at a filing machine; a labeling machine; a packaging carton; during shipping (e.g., via truck, ship, airplane); at a store; and at the an end user; with one or more samples that could be taken from a tank, container (e.g., a coating can), mixing equipment, pipe, hose, etc. that contacts the materials at any point during processing.

Based on the disclosures herein, it is contemplated that XTT cell viability assay will be valuable for rapid screening of biobased additives (single species and mixed inoculum). It is contemplated that with certain molecules, high reduction in metabolism in the XTT correlated to good activity in the ASTM paint challenges. It is contemplated that particular biobased additive combinations will accelerate the rate of paint challenge killing. It is contemplated that in-film antimicrobial activity of additives will be retained. It is contemplated that synergistic activity of biobased additives with currently used biocides will occur. It is contemplated that molecular methods will be used to facilitate development of novel biocides and for contamination analysis.

Example 69: XTT Analysis of MIT and DMDM

The XTT assay analysis of a bacteria tested upon contact with 2-methyl-4-isothiazolin-3-one ("MIT") at 1500, 150, 15, 1.5, 0.15 ppm or 1,3-dihydroxymethyl-5,5-dimethylhydantoin ("DMDM," "Mergal") at 550, 220, 110, 55, 22 ppm; and the increased effectiveness of biobased agents with DMDM and MIT are shown in the Tables below.

TABLE 116A

The effects of MIT alone

| log concentration (log ppm) | % reduction in metabolism |
|---|---|
| 3.18 | 72.98 |
| 2.18 | 58.17 |
| 1.18 | 18.57 |
| 0.18 | −4.11 |

TABLE 116B

The effects of DMDM alone

| log concentration (log ppm) | % reduction in metabolism |
|---|---|
| 2.74 | 80.41 |
| 2.34 | 70.83 |
| 2.04 | 65.65 |
| 1.74 | 58.19 |
| 1.34 | 52.64 |

TABLE 116C

Biobased agents in combination with DMDM and MIT

| | None | 15 ppm DMSM | 15 ppm MIT |
|---|---|---|---|
| none | 0.00 | 15.47 | 13.34 |
| 0.1 mg/ml glucose oxidase | 26.37 | 68.67 | 62.71 |
| 0.05 mg/ml glucose oxidase | 23.09 | 69.49 | 66.49 |
| 0.005 mg/ml glucose oxidase | 14.31 | 23.10 | 63.95 |
| 0.5 mg/ml AMP7 | 50.22 | 55.85 | 55.29 |
| 0.05 mg/ml AMP7 | 38.20 | 29.07 | 36.80 |
| 0.005 mg/ml AMP7 | 18.46 | 15.37 | 28.88 |
| 0.5 mg/ml lysozyme | 26.98 | 20.61 | 35.16 |
| 0.2 mg/ml lysozyme | 24.18 | 16.54 | 27.73 |
| 0.05 mg/ml lysozyme | 16.90 | 14.93 | 18.27 |
| 1 mg/ml cinnamaldehyde | 78.99 | 79.82 | 74.88 |
| 0.5 mg/ml cinnamaldehyde | 64.19 | 63.77 | 60.00 |
| 0.2 mg/ml cinnamaldehyde | 44.04 | 56.22 | 55.98 |

In particular, synergy by combining a chemical preservative with a biobased agent is indicated, such as glucose oxidase with mergal or MIT. Both go from 20% reduction alone at 15 ppm to 70% with addition of glucose oxidase at various concentrations (max activity G.O. alone just over 20%). It is contemplated that lower concentrations of a chemical preservative may be used when combined with a biobased additive.

Example 70: XTT Analysis of In Film Biobased Preservatives Against Molds and Algae.

Individual rows of 96-well plates were painted with the above latex paint samples and cured inverted at 60 C for 1 hr. The combination of additives were as follows: Combo #10=Paint A+AMP-7 0.5%+Lysozyme 0.5%+Glucose Oxidase 0.05%+Alginate Lyase 0.5%; and Combo #3=Paint A+AMP-7 0.5%+Lysozyme 0.5%+Glucose Oxidase 0.05%. Harvested fungal spore suspensions or fresh cultures of algae were added to cured, coated well with either M9 media (fungi) or AlgaGro media (algae). For $A.\ niger$ 50 μL M9 and 100 μL spores, for $P.\ notatum$ 100 μL M9 and 50 μL spores, for $C.\ vulgaris$ 100 μL AG media and 100 μL spores. T0 readings (492 nm) were taken on samples prepared in clear blank wells. Following a 20 hour incubation period at 30 C, 100 μL was transferred to clear wells of a 96-well plate and 10 μL of XTT/menadione solution was added. Plates were incubated at room temperature for 20 hours and ABS 492 readings taken, and results shown in the Table below.

TABLE 117

In Film Activity of Antimicrobial Combos Against Eurkaryotic Microbes

| | Average % Reduction |
|---|---|
| *Aspergillus niger* | |
| Paint A Control | 0.00 |
| #10 | 66.95 |
| #3 | 81.62 |
| *Penicillium notatum* Trial 1 | |
| Paint A Control | 0.00 |
| #10 | 100.34 |
| #3 | 100.29 |
| *Penicillium notatum* Trial 1 | |
| Paint A Control | 0.00 |
| #10 | 107.47 |
| #3 | 111.79 |
| *Chorella vulgaris* | |
| Paint A Control | 0.00 |
| #10 | 31.43 |
| #3 | 45.23 |

Example 71: Anti-Viral Coating Composition

Experimentation was conducted using a surrogate enveloped bacterial virus characterized by having a lipid-rich viral membrane envelope. The selected surrogate enveloped bacterial virus was φ6 bacteriophage at a solution of approximately $1.5 \times 10^8$ PFU/mL (Plaque Forming Units) of φ6 in sterile distilled deionized water. Two bio-based additives were assessed for their efficacy in neutralizing activity of the φ6 bacteriophage—an enzyme capable of breaking the ester linkages of lipids and an antimicrobial peptide capable of disrupting microbial membranes.

Microscope slides were coated with an artist brush with a readily available 1K polyurethane clearcoat (i.e., MinWax Brand water-based polyurethane having an oil-modified polyurethane dispersion resin) with and without the following bioadditive(s): lipase (i.e., Bio-Cat 200,000 Federation Internationale Pharmaceutique Units/g), or a seven-amino acid antimicrobial peptide (i.e., AMP7 having sequence FRLKFHI as synthesized by $21^{st}$ Century Biochemicals), or a combination of both the lipase and the antimicrobial peptide. The bioadditives were each added to the clearcoat and rolled with milling beads for 30 minutes. Lipase was at a concentration within the clearcoat of 1.5% total solids and AMP-7 at a concentration within the clearcoat of 3% total solids. The clearcoat is 30% total solids, such that the lipase was added in an amount of 4.5 mg per gram of clearcoat and the antimicrobial peptide was added in an amount of 9 mg per gram of clearcoat.

A 1-hour exposure of the phage particles was allowed on the coated surfaces. The phage particles were delivered onto the coated microscope slides in a 10ul drop via a micropipette to simulate a cough or sneeze by an infective patient. Although the exact size of the base of the drop is dependent on surface tension and volume of liquid, it is estimated that the size of the base of the drop was in the range of a few squared micrometers.

Subsequently, the particles on each surface were resuspended in 100 μl of tryptone soy broth and 10 μl of this suspension was added via a micropipette to a soft-agar overlay of a lawn of *Pseudomonas syringae*, known to be a susceptible host for the bacteriophage. This soft-agar overlay was formed of 10 µL of phage suspension solution and 100 µL of overnight *P. syringae* culture (25° C. in tryptic soy broth), which was added to 2.5 mL soft-molten (48° C.) tryptic soy agar agar (0.5%). Then this soft-agar overlay was poured over a solid base agar of 1.5% tryptic soy agar.

The clearcoat-only control showed under visual microscopy that 260 infective enveloped virus particles were recovered (plaques). This was then compared to the infective particles recovered from coatings containing lipase where 142 plaques were recovered (45.4% reduction), AMP7 where 71 plaques were recovered (72.7% reduction), and a combination of both lipase and AMP7 where 53 plaques were recovered (79.6% reduction). See FIG. 1.

SEQUENCE LISTING

```
Sequence total quantity: 201
SEQ ID NO: 1            moltype =   length =
SEQUENCE: 1
000

SEQ ID NO: 2            moltype =   length =
SEQUENCE: 2
000

SEQ ID NO: 3            moltype =   length =
SEQUENCE: 3
000

SEQ ID NO: 4            moltype =   length =
SEQUENCE: 4
000

SEQ ID NO: 5            moltype =   length =
SEQUENCE: 5
000

SEQ ID NO: 6            moltype =   length =
SEQUENCE: 6
000

SEQ ID NO: 7            moltype =   length =
SEQUENCE: 7
000

SEQ ID NO: 8            moltype =   length =
SEQUENCE: 8
000

SEQ ID NO: 9            moltype =   length =
SEQUENCE: 9
000

SEQ ID NO: 10           moltype =   length =
SEQUENCE: 10
000

SEQ ID NO: 11           moltype =   length =
SEQUENCE: 11
000

SEQ ID NO: 12           moltype =   length =
SEQUENCE: 12
000

SEQ ID NO: 13           moltype =   length =
SEQUENCE: 13
000

SEQ ID NO: 14           moltype = AA  length = 6
FEATURE                 Location/Qualifiers
REGION                  1..6
                        note = Synthesized
REGION                  1..2
                        note = Misc_feature - X = any amino acid
```

```
source                      1..6
                            mol_type = protein
                            organism = synthetic construct
SEQUENCE: 14
XXKLRF                                                                              6

SEQ ID NO: 15               moltype = AA  length = 6
FEATURE                     Location/Qualifiers
REGION                      1..6
                            note = Synthesized
REGION                      1..6
                            note = Misc_feature - X = any amino acid
REGION                      1..2
                            note = Misc_feature - X = any amino acid
source                      1..6
                            mol_type = protein
                            organism = synthetic construct
SEQUENCE: 15
XXRLRF                                                                              6

SEQ ID NO: 16               moltype = AA  length = 6
FEATURE                     Location/Qualifiers
REGION                      1..6
                            note = Synthesized
REGION                      1..2
                            note = Misc_feature - X = any amino acid
source                      1..6
                            mol_type = protein
                            organism = synthetic construct
SEQUENCE: 16
XXHLRF                                                                              6

SEQ ID NO: 17               moltype = AA  length = 6
FEATURE                     Location/Qualifiers
REGION                      1..6
                            note = Synthesized
REGION                      1..2
                            note = Misc_feature - X = any amino acid
source                      1..6
                            mol_type = protein
                            organism = synthetic construct
SEQUENCE: 17
XXTLRF                                                                              6

SEQ ID NO: 18               moltype = AA  length = 6
FEATURE                     Location/Qualifiers
REGION                      1..6
                            note = Synthesized
REGION                      1..2
                            note = Misc_feature - X = any amino acid
source                      1..6
                            mol_type = protein
                            organism = synthetic construct
SEQUENCE: 18
XXFLRF                                                                              6

SEQ ID NO: 19               moltype = AA  length = 6
FEATURE                     Location/Qualifiers
REGION                      1..6
                            note = Synthesized
REGION                      1..2
                            note = Misc_feature - X = any amino acid
source                      1..6
                            mol_type = protein
                            organism = synthetic construct
SEQUENCE: 19
XXSLRF                                                                              6

SEQ ID NO: 20               moltype = AA  length = 6
FEATURE                     Location/Qualifiers
REGION                      1..6
                            note = Synthesized
REGION                      1..2
                            note = Misc_feature - X = any amino acid
source                      1..6
                            mol_type = protein
                            organism = synthetic construct
SEQUENCE: 20
XXILRF                                                                              6
```

```
SEQ ID NO: 21          moltype = AA   length = 6
FEATURE                Location/Qualifiers
REGION                 1..6
                       note = Synthesized
REGION                 1..2
                       note = Misc_feature - X = any amino acid
source                 1..6
                       mol_type = protein
                       organism = synthetic construct
SEQUENCE: 21
XXLLRF                                                                    6

SEQ ID NO: 22          moltype = AA   length = 6
FEATURE                Location/Qualifiers
REGION                 1..6
                       note = Synthesized
REGION                 1..2
                       note = Misc_feature - X = any amino acid
source                 1..6
                       mol_type = protein
                       organism = synthetic construct
SEQUENCE: 22
XXALRF                                                                    6

SEQ ID NO: 23          moltype = AA   length = 6
FEATURE                Location/Qualifiers
REGION                 1..6
                       note = Synthesized
REGION                 1..2
                       note = Misc_feature - X = any amino acid
source                 1..6
                       mol_type = protein
                       organism = synthetic construct
SEQUENCE: 23
XXWLRF                                                                    6

SEQ ID NO: 24          moltype = AA   length = 6
FEATURE                Location/Qualifiers
REGION                 1..6
                       note = Synthesized
REGION                 1..2
                       note = Misc_feature - X = any amino acid
source                 1..6
                       mol_type = protein
                       organism = synthetic construct
SEQUENCE: 24
XXMLRF                                                                    6

SEQ ID NO: 25          moltype =     length =
SEQUENCE: 25
000

SEQ ID NO: 26          moltype =     length =
SEQUENCE: 26
000

SEQ ID NO: 27          moltype =     length =
SEQUENCE: 27
000

SEQ ID NO: 28          moltype =     length =
SEQUENCE: 28
000

SEQ ID NO: 29          moltype = AA   length = 4
FEATURE                Location/Qualifiers
REGION                 1..4
                       note = Synthesized
source                 1..4
                       mol_type = protein
                       organism = synthetic construct
SEQUENCE: 29
FLRF                                                                      4

SEQ ID NO: 30          moltype = AA   length = 4
FEATURE                Location/Qualifiers
REGION                 1..4
                       note = Synthesized
```

```
source                   1..4
                         mol_type = protein
                         organism = synthetic construct
SEQUENCE: 30
WLRF                                                                     4

SEQ ID NO: 31            moltype = AA   length = 5
FEATURE                  Location/Qualifiers
REGION                   1..5
                         note = Synthesized
source                   1..5
                         mol_type = protein
                         organism = synthetic construct
SEQUENCE: 31
FHLRF                                                                    5

SEQ ID NO: 32            moltype = AA   length = 6
FEATURE                  Location/Qualifiers
REGION                   1..6
                         note = Synthesized
source                   1..6
                         mol_type = protein
                         organism = synthetic construct
SEQUENCE: 32
FFKLRF                                                                   6

SEQ ID NO: 33            moltype = AA   length = 6
FEATURE                  Location/Qualifiers
REGION                   1..6
                         note = Synthesized
source                   1..6
                         mol_type = protein
                         organism = synthetic construct
SEQUENCE: 33
VFKLRF                                                                   6

SEQ ID NO: 34            moltype = AA   length = 6
FEATURE                  Location/Qualifiers
REGION                   1..6
                         note = Synthesized
source                   1..6
                         mol_type = protein
                         organism = synthetic construct
SEQUENCE: 34
HFKLRF                                                                   6

SEQ ID NO: 35            moltype = AA   length = 6
FEATURE                  Location/Qualifiers
REGION                   1..6
                         note = Synthesized
source                   1..6
                         mol_type = protein
                         organism = synthetic construct
SEQUENCE: 35
IFKLRF                                                                   6

SEQ ID NO: 36            moltype = AA   length = 6
FEATURE                  Location/Qualifiers
REGION                   1..6
                         note = Synthesized
source                   1..6
                         mol_type = protein
                         organism = synthetic construct
SEQUENCE: 36
KRKLRF                                                                   6

SEQ ID NO: 37            moltype = AA   length = 6
FEATURE                  Location/Qualifiers
REGION                   1..6
                         note = Synthesized
source                   1..6
                         mol_type = protein
                         organism = synthetic construct
SEQUENCE: 37
LFKLRF                                                                   6

SEQ ID NO: 38            moltype = AA   length = 6
FEATURE                  Location/Qualifiers
```

```
REGION                   1..6
                         note = Synthesized
source                   1..6
                         mol_type = protein
                         organism = synthetic construct
SEQUENCE: 38
YFKLRF                                                                   6

SEQ ID NO: 39            moltype = AA  length = 7
FEATURE                  Location/Qualifiers
REGION                   1..7
                         note = Synthesized
source                   1..7
                         mol_type = protein
                         organism = synthetic construct
SEQUENCE: 39
FHFKLRF                                                                  7

SEQ ID NO: 40            moltype = AA  length = 7
FEATURE                  Location/Qualifiers
REGION                   1..7
                         note = Synthesized
source                   1..7
                         mol_type = protein
                         organism = synthetic construct
SEQUENCE: 40
IHFKLRF                                                                  7

SEQ ID NO: 41            moltype = AA  length = 6
FEATURE                  Location/Qualifiers
REGION                   1..6
                         note = Synthesized
source                   1..6
                         mol_type = protein
                         organism = synthetic construct
SEQUENCE: 41
FRLKFH                                                                   6

SEQ ID NO: 42            moltype = AA  length = 6
FEATURE                  Location/Qualifiers
REGION                   1..6
                         note = Synthesized
source                   1..6
                         mol_type = protein
                         organism = synthetic construct
SEQUENCE: 42
RFKLRF                                                                   6

SEQ ID NO: 43            moltype = AA  length = 6
FEATURE                  Location/Qualifiers
REGION                   1..6
                         note = Synthesized
source                   1..6
                         mol_type = protein
                         organism = synthetic construct
SEQUENCE: 43
SFKLRF                                                                   6

SEQ ID NO: 44            moltype = AA  length = 6
FEATURE                  Location/Qualifiers
REGION                   1..6
                         note = Synthesized
source                   1..6
                         mol_type = protein
                         organism = synthetic construct
SEQUENCE: 44
MFKLRF                                                                   6

SEQ ID NO: 45            moltype = AA  length = 6
FEATURE                  Location/Qualifiers
REGION                   1..6
                         note = Synthesized
source                   1..6
                         mol_type = protein
                         organism = synthetic construct
SEQUENCE: 45
TFKLRF                                                                   6

SEQ ID NO: 46            moltype = AA  length = 6
```

```
FEATURE                   Location/Qualifiers
REGION                    1..6
                          note = Synthesized
source                    1..6
                          mol_type = protein
                          organism = synthetic construct
SEQUENCE: 46
QFKLRF                                                                          6

SEQ ID NO: 47             moltype = AA   length = 6
FEATURE                   Location/Qualifiers
REGION                    1..6
                          note = Synthesized
source                    1..6
                          mol_type = protein
                          organism = synthetic construct
SEQUENCE: 47
WFKLRF                                                                          6

SEQ ID NO: 48             moltype = AA   length = 44
FEATURE                   Location/Qualifiers
REGION                    1..44
                          note = misc_feature - Tachystatin A Peptide
source                    1..44
                          mol_type = protein
                          organism = Tachypleus tridentatus
SEQUENCE: 48
YSRCQLQGFN CVVRSYGLPT IPCCRGLTCR SYFPGSTYGR CQRY                                44

SEQ ID NO: 49             moltype = AA   length = 25
FEATURE                   Location/Qualifiers
source                    1..25
                          mol_type = protein
                          organism = Androctonus australis
SEQUENCE: 49
RSVCRQIKIC RRRGGCYYKC TNRPY                                                     25

SEQ ID NO: 50             moltype = AA   length = 13
FEATURE                   Location/Qualifiers
REGION                    1..13
                          note = Synthetic Tritrpticin
source                    1..13
                          mol_type = protein
                          organism = unidentified
SEQUENCE: 50
VRRFPWWWPF LRR                                                                  13

SEQ ID NO: 51             moltype = AA   length = 30
FEATURE                   Location/Qualifiers
REGION                    1..30
                          note = misc_feature - HNP-3 Defensin
source                    1..30
                          mol_type = protein
                          organism = Homo sapiens
SEQUENCE: 51
DCYCRIPACI AGERRYGTCI YQGRLWAFCC                                                30

SEQ ID NO: 52             moltype = AA   length = 38
FEATURE                   Location/Qualifiers
source                    1..38
                          mol_type = protein
                          organism = Phytolacca americana
SEQUENCE: 52
AGCIKNGGRC NASAGPPYCC SSYCFQIAGQ SYGVCKNR                                       38

SEQ ID NO: 53             moltype = AA   length = 23
FEATURE                   Location/Qualifiers
REGION                    1..23
                          note = Synthetic construct Magainin 2
source                    1..23
                          mol_type = protein
                          organism = unidentified
SEQUENCE: 53
GIGKYLHSAK KFGKAWVGEI MNS                                                       23

SEQ ID NO: 54             moltype = AA   length = 13
FEATURE                   Location/Qualifiers
```

```
source                   1..13
                         mol_type = protein
                         organism = Bos taurus
SEQUENCE: 54
ILPWKWPWWP WRR                                                              13

SEQ ID NO: 55            moltype = AA   length = 44
FEATURE                  Location/Qualifiers
source                   1..44
                         mol_type = protein
                         organism = Heliothis virescens
SEQUENCE: 55
DKLIGSCVWG AVNYTSDCNG ECKRRGYKGG HCGSFANVNC WCET                            44

SEQ ID NO: 56            moltype = AA   length = 44
FEATURE                  Location/Qualifiers
source                   1..44
                         mol_type = protein
                         organism = Heliothis virescens
SEQUENCE: 56
DKLIGSCVWG AVNYTSDCNG ECKRRGYKGG HCGSFANVNC WCET                            44

SEQ ID NO: 57            moltype = AA   length = 46
FEATURE                  Location/Qualifiers
REGION                   1..46
                         note = misc_feature - Seed of pea defensin 1 (psd1)
source                   1..46
                         mol_type = protein
                         organism = Pisum sativum
SEQUENCE: 57
KTCEHLADTY RGVCFTNASC DDHCKNKAHL ISGTCHNWKC FCTQNC                          46

SEQ ID NO: 58            moltype = AA   length = 18
FEATURE                  Location/Qualifiers
REGION                   1..18
                         note = Synthetic Gomesin
source                   1..18
                         mol_type = protein
                         organism = unidentified
SEQUENCE: 58
QCRRLCYKQR CVTYCRGR                                                         18

SEQ ID NO: 59            moltype = AA   length = 25
FEATURE                  Location/Qualifiers
REGION                   1..25
                         note = misc_feature - Lactoferricin B
source                   1..25
                         mol_type = protein
                         organism = Bos taurus
SEQUENCE: 59
FKCRRWQWRM KKLGAPSITC VRRAF                                                 25

SEQ ID NO: 60            moltype = AA   length = 12
FEATURE                  Location/Qualifiers
REGION                   1..12
                         note = Synthetic PW2
source                   1..12
                         mol_type = protein
                         organism = unidentified
SEQUENCE: 60
HPLKQYWWRP SI                                                               12

SEQ ID NO: 61            moltype = AA   length = 20
FEATURE                  Location/Qualifiers
REGION                   1..20
                         note = misc_feature - Hepcidin 20
source                   1..20
                         mol_type = protein
                         organism = Homo sapiens
SEQUENCE: 61
ICIFCCGCCH RSKCGMCCKT                                                       20

SEQ ID NO: 62            moltype = AA   length = 25
FEATURE                  Location/Qualifiers
REGION                   1..25
                         note = misc_feature - Hepcidin 25
source                   1..25
                         mol_type = protein
                         organism = Homo sapiens
```

```
SEQUENCE: 62
DTHFPICIFC CGCCHRSKCG MCCKT                                            25

SEQ ID NO: 63            moltype = AA  length = 30
FEATURE                  Location/Qualifiers
source                   1..30
                         mol_type = protein
                         organism = Amaranthus caudatus
SEQUENCE: 63
VGECVRGRCP SGMCCSQFGY CGKGPKYCGR                                       30

SEQ ID NO: 64            moltype = AA  length = 78
FEATURE                  Location/Qualifiers
source                   1..78
                         mol_type = protein
                         organism = Amaranthus caudatus
SEQUENCE: 64
GYFCESCRKI IQKLEDMVGP QPNEDTVTQA ASQVCDKLKI LRGLCKKIMR SFLRRISWDI      60
LTGKKPQAIC VDIKICKE                                                   78

SEQ ID NO: 65            moltype = AA  length = 23
FEATURE                  Location/Qualifiers
REGION                   1..23
                         note = misc_feature - Magainin 2
source                   1..23
                         mol_type = protein
                         organism = Xenopus laevis
SEQUENCE: 65
GIGKFLHSAK KFGKAFVGEI MNS                                              23

SEQ ID NO: 66            moltype = AA  length = 26
FEATURE                  Location/Qualifiers
REGION                   1..26
                         note = misc_feature - venom Melittin B
source                   1..26
                         mol_type = protein
                         organism = Apis mellifera
SEQUENCE: 66
GIGAVLKVLT TGLPALISWI KRKRQQ                                           26

SEQ ID NO: 67            moltype = AA  length = 21
FEATURE                  Location/Qualifiers
source                   1..21
                         mol_type = protein
                         organism = Podisus maculiventris
SEQUENCE: 67
GSKKPVPIIY CNRRTGKCQR M                                                21

SEQ ID NO: 68            moltype = AA  length = 38
FEATURE                  Location/Qualifiers
REGION                   1..38
                         note = misc_feature - Antimicrobial peptide 1
source                   1..38
                         mol_type = protein
                         organism = Mesembryanthemum crystallinum
SEQUENCE: 68
AKCIKNGKGC REDQGPPFCC SGFCYRQVGW ARGYCKNR                              38

SEQ ID NO: 69            moltype = AA  length = 13
FEATURE                  Location/Qualifiers
REGION                   1..13
                         note = misc_feature - Melanotropin alpha (Alpha-MSH)
source                   1..13
                         mol_type = protein
                         organism = Bos taurus
SEQUENCE: 69
SYSMEHFRWG KPV                                                         13

SEQ ID NO: 70            moltype = AA  length = 33
FEATURE                  Location/Qualifiers
REGION                   1..33
                         note = misc_feature - Corticostatin III (MCP-1)
source                   1..33
                         mol_type = protein
                         organism = Oryctolagus cuniculus
SEQUENCE: 70
VVCACRRALC LPRERRAGFC RIRGRIHPLC CRR                                   33

SEQ ID NO: 71            moltype = AA  length = 33
```

```
FEATURE                 Location/Qualifiers
REGION                  1..33
                        note = misc_feature - Corticostatin IV (MCP-2)
source                  1..33
                        mol_type = protein
                        organism = Oryctolagus cuniculus
SEQUENCE: 71
VVCACRRALC LPLERRAGFC RIRGRIHPLC CRR                               33

SEQ ID NO: 72           moltype = AA  length = 35
FEATURE                 Location/Qualifiers
REGION                  1..35
                        note = misc_feature - Cecropin B
source                  1..35
                        mol_type = protein
                        organism = Antheraea pernyi
SEQUENCE: 72
KWKIFKKIEK VGRNIRNGII KAGPAVAVLG EAKAL                             35

SEQ ID NO: 73           moltype = AA  length = 48
FEATURE                 Location/Qualifiers
REGION                  1..48
                        note = misc_feature - Seminalplasmin
source                  1..48
                        mol_type = protein
                        organism = Bos taurus
SEQUENCE: 73
SDEKASPDKH HRFSLSRYAK LANRLANPKL LETFLSKWIG DRGNRSVK               48

SEQ ID NO: 74           moltype = AA  length = 34
FEATURE                 Location/Qualifiers
REGION                  1..34
                        note = misc_feature - NP-3A defensin
source                  1..34
                        mol_type = protein
                        organism = Oryctolagus cuniculus
SEQUENCE: 74
GICACRRRFC PNSERFSGYC RVNGARYVRC CSRR                              34

SEQ ID NO: 75           moltype = AA  length = 30
FEATURE                 Location/Qualifiers
REGION                  1..30
                        note = misc_feature - HNP-1 Defensin
source                  1..30
                        mol_type = protein
                        organism = Homo sapiens
SEQUENCE: 75
ACYCRIPACI AGERRYGTCI YQGRLWAFCC                                   30

SEQ ID NO: 76           moltype = AA  length = 29
FEATURE                 Location/Qualifiers
REGION                  1..29
                        note = misc_feature - HNP-2 Defensin
source                  1..29
                        mol_type = protein
                        organism = Homo sapiens
SEQUENCE: 76
CYCRIPACIA GERRYGTCIY QGRLWAFCC                                    29

SEQ ID NO: 77           moltype = AA  length = 33
FEATURE                 Location/Qualifiers
REGION                  1..33
                        note = misc_feature - HNP-4 Defensin
source                  1..33
                        mol_type = protein
                        organism = Homo sapiens
SEQUENCE: 77
VCSCRLVFCR RTELRVGNCL IGGVSFTYCC TRV                               33

SEQ ID NO: 78           moltype = AA  length = 24
FEATURE                 Location/Qualifiers
REGION                  1..24
                        note = misc_feature - Histatin 5
source                  1..24
                        mol_type = protein
                        organism = Homo sapiens
SEQUENCE: 78
DSHAKRHHGY KRKFHEKHHS HRGY                                        24
```

```
SEQ ID NO: 79              moltype = AA   length = 32
FEATURE                    Location/Qualifiers
REGION                     1..32
                           note = misc_feature - Histatin 3
source                     1..32
                           mol_type = protein
                           organism = Homo sapiens
SEQUENCE: 79
DSHAKRHHGY KRKFHEKHHS HRGYRSNYLY DN                                  32

SEQ ID NO: 80              moltype = AA   length = 12
FEATURE                    Location/Qualifiers
REGION                     1..12
                           note = Histatin 8
source                     1..12
                           mol_type = protein
                           organism = unidentified
SEQUENCE: 80
KFHEKHHSHR GY                                                        12

SEQ ID NO: 81              moltype = AA   length = 38
FEATURE                    Location/Qualifiers
REGION                     1..38
                           note = misc_feature - Tracheal antimicrobial peptide
source                     1..38
                           mol_type = protein
                           organism = Bos taurus
SEQUENCE: 81
NPVSCVRNKG ICVPIRCPGS MKQIGTCVGR AVKCCRKK                            38

SEQ ID NO: 82              moltype = AA   length = 37
FEATURE                    Location/Qualifiers
REGION                     1..37
                           note = misc_feature - antimicrobial peptidic agent1
                           (MJ-antimicrobial peptidic agent1)
source                     1..37
                           mol_type = protein
                           organism = Mirabilis jalapa
SEQUENCE: 82
QCIGNGGRCN ENVGPPYCCS GFCLRQPGQG YGYCKNR                             37

SEQ ID NO: 83              moltype = AA   length = 36
FEATURE                    Location/Qualifiers
REGION                     1..36
                           note = misc_feature - antimicrobial peptidic agent2
                           (MJ-antimicrobial peptidic agent2)
source                     1..36
                           mol_type = protein
                           organism = Mirabilis jalapa
SEQUENCE: 83
CIGNGGRCNE NVGPPYCCSG FCLRQPNQGY GVCRNR                              36

SEQ ID NO: 84              moltype = AA   length = 33
FEATURE                    Location/Qualifiers
REGION                     1..33
                           note = misc_feature - MBP-1
source                     1..33
                           mol_type = protein
                           organism = Zea mays
SEQUENCE: 84
RSGRGECRRQ CLRRHEGQPW ETQECMRRCR RRG                                 33

SEQ ID NO: 85              moltype = AA   length = 23
FEATURE                    Location/Qualifiers
REGION                     1..23
                           note = misc_feature - AFP2
source                     1..23
                           mol_type = protein
                           organism = Brassica napus
SEQUENCE: 85
QKLCERPSGT WSGVCGNNNA CKN                                            23

SEQ ID NO: 86              moltype = AA   length = 27
FEATURE                    Location/Qualifiers
REGION                     1..27
                           note = misc_feature - AFP1
source                     1..27
                           mol_type = protein
                           organism = Brassica rapa
```

```
SEQUENCE: 86
QKLCERPSGT WSGVCGNNNA CKNQCIN                                          27

SEQ ID NO: 87           moltype = AA  length = 27
FEATURE                 Location/Qualifiers
REGION                  1..27
                        note = misc_feature - AFP2
source                  1..27
                        mol_type = protein
                        organism = Brassica rapa
SEQUENCE: 87
QKLCERPSGT WSGVCGNNNA CKNQCIR                                          27

SEQ ID NO: 88           moltype = AA  length = 33
FEATURE                 Location/Qualifiers
REGION                  1..33
                        note = misc_feature - Adenoregulin
source                  1..33
                        mol_type = protein
                        organism = Phyllomedusa bicolor
SEQUENCE: 88
GLWSKIKEVG KEAAKAAAKA AGKAALGAVS EAV                                   33

SEQ ID NO: 89           moltype = AA  length = 16
FEATURE                 Location/Qualifiers
REGION                  1..16
                        note = misc_feature - Protegrin 2
source                  1..16
                        mol_type = protein
                        organism = Sus scrofa
SEQUENCE: 89
RGGRLCYCRR RFCICV                                                      16

SEQ ID NO: 90           moltype = AA  length = 18
FEATURE                 Location/Qualifiers
REGION                  1..18
                        note = misc_feature - Protegrin 3
source                  1..18
                        mol_type = protein
                        organism = Sus scrofa
SEQUENCE: 90
RGGGLCYCRR RFCVCVGR                                                    18

SEQ ID NO: 91           moltype = AA  length = 38
FEATURE                 Location/Qualifiers
REGION                  1..38
                        note = misc_feature - Histatin 1
source                  1..38
                        mol_type = protein
                        organism = Macaca fascicularis
SEQUENCE: 91
DSHEERHHGR HGHHKYGRKF HEKHHSHRGY RSNYLYDN                               38

SEQ ID NO: 92           moltype = AA  length = 24
FEATURE                 Location/Qualifiers
REGION                  1..24
                        note = misc_feature - Peptide PGQ
source                  1..24
                        mol_type = protein
                        organism = Xenopus laevis
SEQUENCE: 92
GVLSNVIGYL KKLGTGALNA VLKQ                                             24

SEQ ID NO: 93           moltype = AA  length = 20
FEATURE                 Location/Qualifiers
REGION                  1..20
                        note = misc_feature - Ranalexin
source                  1..20
                        mol_type = protein
                        organism = Rana catesbeiana
SEQUENCE: 93
FLGGLIKIVP AMICAVTKKC                                                  20

SEQ ID NO: 94           moltype = AA  length = 30
FEATURE                 Location/Qualifiers
REGION                  1..30
                        note = misc_feature - GNCP-2
```

```
source                 1..30
                       mol_type = protein
                       organism = Cavia cutleri
SEQUENCE: 94
RCICTTRTCR FPYRRLGTCL FQNRVYTFCC                                30

SEQ ID NO: 95          moltype = AA  length = 18
FEATURE                Location/Qualifiers
REGION                 1..18
                       note = misc_feature - Protegrin 4
source                 1..18
                       mol_type = protein
                       organism = Sus scrofa
SEQUENCE: 95
RGGRLCYCRG WICFCVGR                                             18

SEQ ID NO: 96          moltype = AA  length = 18
FEATURE                Location/Qualifiers
REGION                 1..18
                       note = misc_feature - Protegrin 5
source                 1..18
                       mol_type = protein
                       organism = Sus scrofa
SEQUENCE: 96
RGGRLCYCRP RFCVCVGR                                             18

SEQ ID NO: 97          moltype = AA  length = 27
FEATURE                Location/Qualifiers
REGION                 1..27
                       note = misc_feature - BMAP-27
source                 1..27
                       mol_type = protein
                       organism = Bos taurus
SEQUENCE: 97
GRFKRFRKKF KKLFKKLSPV IPLLHLG                                   27

SEQ ID NO: 98          moltype = AA  length = 28
FEATURE                Location/Qualifiers
REGION                 1..28
                       note = misc_feature - BMAP-28
source                 1..28
                       mol_type = protein
                       organism = Bos taurus
SEQUENCE: 98
GGLRSLGRKI LRAWKKYGPI IVPIIRIG                                  28

SEQ ID NO: 99          moltype = AA  length = 39
FEATURE                Location/Qualifiers
REGION                 1..39
                       note = misc_feature - Buforin 1
source                 1..39
                       mol_type = protein
                       organism = Bufo bufo gargarizans
SEQUENCE: 99
AGRGKQGGKV RAKAKTRSSR AGLQFPVGRV HRLLRKGNY                      39

SEQ ID NO: 100         moltype = AA  length = 21
FEATURE                Location/Qualifiers
REGION                 1..21
                       note = misc_feature - Buforin II
source                 1..21
                       mol_type = protein
                       organism = Bufo bufo gargarizans
SEQUENCE: 100
TRSSRAGLQF PVGRVHRLLR K                                         21

SEQ ID NO: 101         moltype = AA  length = 34
FEATURE                Location/Qualifiers
REGION                 1..34
                       note = misc_feature - BMAP-34
source                 1..34
                       mol_type = protein
                       organism = Bos taurus
SEQUENCE: 101
GLFRRLRDSI RRGQQKILEK ARRIGERIKD IFRG                           34

SEQ ID NO: 102         moltype = AA  length = 19
FEATURE                Location/Qualifiers
```

```
REGION                   1..19
                         note = misc_feature - Tricholongin
source                   1..19
                         mol_type = protein
                         organism = Trichoderma longibrachiatum
SEQUENCE: 102
AGFAAQAAAS LAPVAAQQL                                                19

SEQ ID NO: 103           moltype = AA  length = 34
FEATURE                  Location/Qualifiers
REGION                   1..34
                         note = misc_feature - Dermaseptin 1
source                   1..34
                         mol_type = protein
                         organism = Phyllomedusa sauvagei
SEQUENCE: 103
ALWKTMLKKL GTMALHAGKA ALGAAADTIS QGTQ                                34

SEQ ID NO: 104           moltype = AA  length = 45
FEATURE                  Location/Qualifiers
REGION                   1..45
                         note = misc_feature - Pseudo-hevein (Minor hevein)
source                   1..45
                         mol_type = protein
                         organism = Hevea brasiliensis
SEQUENCE: 104
EQCGRQAGGK LCPNNLCCSQ YGWCGSSDDY CSPSKNCQSN CKGGG                    45

SEQ ID NO: 105           moltype = AA  length = 33
FEATURE                  Location/Qualifiers
REGION                   1..33
                         note = misc_feature - Gaegurin-1
source                   1..33
                         mol_type = protein
                         organism = Rana rugosa
SEQUENCE: 105
SLFSLIKAGA KFLGKNLLKQ GACYAACKAS KQC                                 33

SEQ ID NO: 106           moltype = AA  length = 36
FEATURE                  Location/Qualifiers
REGION                   1..36
                         note = misc_feature - Skin peptide tyrosine-tyrosine
source                   1..36
                         mol_type = protein
                         organism = Phyllomedusa bicolor
SEQUENCE: 106
YPPKPESPGE DASPEEMNKY LTALRHYINL VTRQRY                              36

SEQ ID NO: 107           moltype = AA  length = 50
FEATURE                  Location/Qualifiers
REGION                   1..50
                         note = misc_feature - Penaeidin-1
source                   1..50
                         mol_type = protein
                         organism = Penaeus vannamei
SEQUENCE: 107
YRGGYTGPIP RPPPIGRPPL RLVVCACYRL SVSDARNCCI KFGSCCHLVK               50

SEQ ID NO: 108           moltype = AA  length = 33
FEATURE                  Location/Qualifiers
REGION                   1..33
                         note = misc_feature - Neutrophil defensin 1 (HANP-1)
source                   1..33
                         mol_type = protein
                         organism = Mesocricetus auratus
SEQUENCE: 108
VTCFCRRRGC ASRERHIGYC RFGNTIYRLC CRR                                 33

SEQ ID NO: 109           moltype = AA  length = 33
FEATURE                  Location/Qualifiers
REGION                   1..33
                         note = misc_feature - Neutrophil defensin 3 (HANP-3)
source                   1..33
                         mol_type = protein
                         organism = Mesocricetus auratus
SEQUENCE: 109
VTCFCRRRGC ASRERLIGYC RFGNTIYGLC CRR                                 33

SEQ ID NO: 110           moltype = AA  length = 21
```

```
                             -continued
FEATURE                 Location/Qualifiers
REGION                  1..21
                        note = misc_feature - Misgurin
source                  1..21
                        mol_type = protein
                        organism = Misgurnus anguillicaudatus
SEQUENCE: 110
RQRVEELSKF SKKGAAARRR K                                                 21

SEQ ID NO: 111          moltype = AA  length = 41
FEATURE                 Location/Qualifiers
REGION                  1..41
                        note = misc_feature - PN-antimicrobial peptidic agent
source                  1..41
                        mol_type = protein
                        organism = Pharbitis nil
SEQUENCE: 111
QQCGRQASGR LCGNRLCCSQ WGYCGSTASY CGAGCQSQCR S                            41

SEQ ID NO: 112          moltype = AA  length = 19
FEATURE                 Location/Qualifiers
REGION                  1..19
                        note = misc_feature - Histone H2B-1(HLP-1)(Fragment)
source                  1..19
                        mol_type = protein
                        organism = Oncorhynchus mykiss
SEQUENCE: 112
PDPAKTAPKK GSKKAVTKA                                                    19

SEQ ID NO: 113          moltype = AA  length = 17
FEATURE                 Location/Qualifiers
REGION                  1..17
                        note = misc_feature - Histone H2B-3(HLP-3)(Fragment)
source                  1..17
                        mol_type = protein
                        organism = Oncorhynchus mykiss
SEQUENCE: 113
PDPAKTAPKK KSKKAVT                                                      17

SEQ ID NO: 114          moltype = AA  length = 30
FEATURE                 Location/Qualifiers
REGION                  1..30
                        note = misc_feature - neutrophil defensin 2 (RMAD-2)
source                  1..30
                        mol_type = protein
                        organism = Macaca mulatta
SEQUENCE: 114
ACYCRIPACL AGERRYGTCF YMGRVWAFCC                                         30

SEQ ID NO: 115          moltype = AA  length = 36
FEATURE                 Location/Qualifiers
REGION                  1..36
                        note = misc_feature - Termicin
source                  1..36
                        mol_type = protein
                        organism = Pseudacanthotermes spiniger
SEQUENCE: 115
ACNFQSCWAT CQAQHSIYFR RAFCDRSQCK CVFVRG                                  36

SEQ ID NO: 116          moltype = AA  length = 25
FEATURE                 Location/Qualifiers
REGION                  1..25
                        note = misc_feature - Spingerin
source                  1..25
                        mol_type = protein
                        organism = Pseudacanthotermas spiniger
SEQUENCE: 116
HVDKKVADKV LLLKQLRIMR LLTRL                                              25

SEQ ID NO: 117          moltype = AA  length = 13
FEATURE                 Location/Qualifiers
REGION                  1..13
                        note = misc_feature - Aurein 1.1
source                  1..13
                        mol_type = protein
                        organism = Litoria raniformis
SEQUENCE: 117
GLFDIIKKIA ESI                                                          13
```

```
SEQ ID NO: 118            moltype = AA  length = 30
FEATURE                   Location/Qualifiers
REGION                    1..30
                          note = misc_feature - Ponericin G1
source                    1..30
                          mol_type = protein
                          organism = Pachycondyla goeldii
SEQUENCE: 118
GWKDWAKKAG GWLKKKGPGM AKAALKAAMQ                                    30

SEQ ID NO: 119            moltype = AA  length = 24
FEATURE                   Location/Qualifiers
REGION                    1..24
                          note = misc_feature - Brevinin-1BB
source                    1..24
                          mol_type = protein
                          organism = Rana berlandieri
SEQUENCE: 119
FLPAIAGMAA KFLPKIFCAI SKKC                                          24

SEQ ID NO: 120            moltype = AA  length = 20
FEATURE                   Location/Qualifiers
REGION                    1..20
                          note = misc_feature - Ranalexin-1CB
source                    1..20
                          mol_type = protein
                          organism = Rana clamitans
SEQUENCE: 120
FLGGLMKAFP AIICAVTKKC                                               20

SEQ ID NO: 121            moltype = AA  length = 31
FEATURE                   Location/Qualifiers
REGION                    1..31
                          note = misc_feature - Ranatuerin-2CA
source                    1..31
                          mol_type = protein
                          organism = Rana clamitans
SEQUENCE: 121
GLFLDTLKGA AKDVAGKLLE GLKCKIAGCK P                                  31

SEQ ID NO: 122            moltype = AA  length = 27
FEATURE                   Location/Qualifiers
REGION                    1..27
                          note = misc_feature - Ranatuerin-2CB
source                    1..27
                          mol_type = protein
                          organism = Rana clamitans
SEQUENCE: 122
GLFLDTLKGL AGKLLQGLKC IKAGCKP                                       27

SEQ ID NO: 123            moltype = AA  length = 40
FEATURE                   Location/Qualifiers
REGION                    1..40
                          note = misc_feature - Ginkbilobin
source                    1..40
                          mol_type = protein
                          organism = Ginkgo biloba
SEQUENCE: 123
ANTAFVSSAH NTQKIPAGAP FNRNLRAMLA DLRQNAAFAG                         40

SEQ ID NO: 124            moltype = AA  length = 20
FEATURE                   Location/Qualifiers
REGION                    1..20
                          note = misc_feature - Alpha-basrubrin (Fragment)
source                    1..20
                          mol_type = protein
                          organism = Basella alba
SEQUENCE: 124
GADFQECMKE HSQKQHQHQG                                               20

SEQ ID NO: 125            moltype = AA  length = 24
FEATURE                   Location/Qualifiers
REGION                    1..24
                          note = misc_feature - Pseudin 1
source                    1..24
                          mol_type = protein
                          organism = Pseudis paradoxa
SEQUENCE: 125
GLNTLKKVFQ GLHEAIKLIN NHVQ                                          24
```

```
SEQ ID NO: 126          moltype = AA   length = 45
FEATURE                 Location/Qualifiers
REGION                  1..45
                        note = misc_feature - Parabutoporin
source                  1..45
                        mol_type = protein
                        organism = Parabuthus schlechteri
SEQUENCE: 126
FKLGSFLKKA WKSKLAKKLR AKGKEMLKDY AKGLLEGGSE EVPGQ                    45

SEQ ID NO: 127          moltype = AA   length = 44
FEATURE                 Location/Qualifiers
REGION                  1..44
                        note = misc_feature - Opistoporin 1
source                  1..44
                        mol_type = protein
                        organism = Opistophthalmus carinatus
SEQUENCE: 127
GKVWDWIKST AKKLWNSEPV KELKNTALNA AKNLVAEKIG ATPS                     44

SEQ ID NO: 128          moltype = AA   length = 44
FEATURE                 Location/Qualifiers
REGION                  1..44
                        note = misc_feature - Opistoporin 2
source                  1..44
                        mol_type = protein
                        organism = Opistophthalmus carinatus
SEQUENCE: 128
GKVWDWIKST AKKLWNSEPV KELKNTALNA AKNFVAEKIG ATPS                     44

SEQ ID NO: 129          moltype = AA   length = 12
FEATURE                 Location/Qualifiers
REGION                  1..12
                        note = misc_feature - Histone H2A (Fragment)
source                  1..12
                        mol_type = protein
                        organism = Oncorhynchus mykiss
SEQUENCE: 129
AERVGAGAPV YL                                                        12

SEQ ID NO: 130          moltype = AA   length = 33
FEATURE                 Location/Qualifiers
REGION                  1..33
                        note = misc_feature - Dolabellanin B2
source                  1..33
                        mol_type = protein
                        organism = Dolabella auricularia
SEQUENCE: 130
SHQDCYEALH KCMASHSKPF SCSMKFHMCL QQQ                                 33

SEQ ID NO: 131          moltype = AA   length = 35
FEATURE                 Location/Qualifiers
REGION                  1..35
                        note = misc_feature - Cecropin A
source                  1..35
                        mol_type = protein
                        organism = Heliothis virescens
SEQUENCE: 131
RWKVFKKIEK VGRNIRDGVI KAAPAIEVLG QAKAL                               35

SEQ ID NO: 132          moltype = AA   length = 35
FEATURE                 Location/Qualifiers
REGION                  1..35
                        note = misc_feature - HNP-5 Defensin
source                  1..35
                        mol_type = protein
                        organism = Homo sapiens
SEQUENCE: 132
QARATCYCRT GRCATRESLS GVCEISGRLY RLCCR                               35

SEQ ID NO: 133          moltype = AA   length = 35
FEATURE                 Location/Qualifiers
REGION                  1..35
                        note = misc_feature - HNP-6 Defensin
source                  1..35
                        mol_type = protein
                        organism = Homo sapiens
```

```
SEQUENCE: 133
STRAFTCHCR RSCYSTEYSY GTCTVMGINH RFCCL                              35

SEQ ID NO: 134              moltype = AA  length = 84
FEATURE                     Location/Qualifiers
REGION                      1..84
                            note = misc_feature - Holotricin 3
source                      1..84
                            mol_type = protein
                            organism = Holotrichia diomphalia
SEQUENCE: 134
YGPGDGHGGG HGGGHGGGHG NGQGGGHGHG PGGGFGGGHG GGHGGGGRGG GGSGGGGSPG   60
HGAGGGYPGG HGGGHHGGYQ THGY                                         84

SEQ ID NO: 135              moltype = AA  length = 45
FEATURE                     Location/Qualifiers
REGION                      1..45
                            note = misc_feature - Lingual antimicrobial peptide
source                      1..45
                            mol_type = protein
                            organism = Bos taurus
SEQUENCE: 135
GFTQGVRNSQ SCRRNKGICV PIRCPGSMRQ IGTCLGAQVK CCRRK                   45

SEQ ID NO: 136              moltype = AA  length = 29
FEATURE                     Location/Qualifiers
REGION                      1..29
                            note = misc_feature - RatNP-3
source                      1..29
                            mol_type = protein
                            organism = Rattus norvegicus
SEQUENCE: 136
CSCRTSSCRF GERLSGACRL NGRIYRLCC                                     29

SEQ ID NO: 137              moltype = AA  length = 31
FEATURE                     Location/Qualifiers
REGION                      1..31
                            note = misc_feature - GNCP-1
source                      1..31
                            mol_type = protein
                            organism = Cavia cutleri
SEQUENCE: 137
RRCICTTRTC RFPYRRLGTC IFQNRVYTFC C                                  31

SEQ ID NO: 138              moltype = AA  length = 47
FEATURE                     Location/Qualifiers
REGION                      1..47
                            note = misc_feature - Penaeidin-4a
source                      1..47
                            mol_type = protein
                            organism = Penaeus vannamei
SEQUENCE: 138
HSSGYTRPLP KPSRPIFIRP IGCDVCYGIP SSTARLCCFR YGDCCHR                 47

SEQ ID NO: 139              moltype = AA  length = 6
FEATURE                     Location/Qualifiers
REGION                      1..6
                            note = misc_feature - hexapeptide
source                      1..6
                            mol_type = protein
                            organism = Bos taurus
SEQUENCE: 139
RRWQWR                                                              6

SEQ ID NO: 140              moltype = AA  length = 18
FEATURE                     Location/Qualifiers
source                      1..18
                            mol_type = protein
                            organism = Penaeus vannamei
SEQUENCE: 140
KWKLFKKIPK FLHLAKKF                                                 18

SEQ ID NO: 141              moltype = AA  length = 20
FEATURE                     Location/Qualifiers
REGION                      1..20
                            note = misc_feature - MUC7 20-Mer
source                      1..20
                            mol_type = protein
                            organism = Homo sapiens
```

```
SEQUENCE: 141
LAHQKPFIRK SYKCLHKRCR                                              20

SEQ ID NO: 142          moltype = AA  length = 21
FEATURE                 Location/Qualifiers
REGION                  1..21
                        note = misc_feature - Nigrocin 2
source                  1..21
                        mol_type = protein
                        organism = Rana nigromaculata
SEQUENCE: 142
GLLSKVLGVG KKVLCGVSGL C                                            21

SEQ ID NO: 143          moltype = AA  length = 33
FEATURE                 Location/Qualifiers
REGION                  1..33
                        note = misc_feature - Nigrocin 1
source                  1..33
                        mol_type = protein
                        organism = Rana nigromaculata
SEQUENCE: 143
GLLDSIKGMA ISAGKGALQN LLKVASCKLD KTC                               33

SEQ ID NO: 144          moltype = AA  length = 10
FEATURE                 Location/Qualifiers
REGION                  1..10
                        note = lactoferrin (Lf) peptide 2
source                  1..10
                        mol_type = protein
                        organism = unidentified
SEQUENCE: 144
FKCRRWQWRM                                                         10

SEQ ID NO: 145          moltype = AA  length = 18
FEATURE                 Location/Qualifiers
REGION                  1..18
                        note = misc_feature - Ib-antimicrobial peptidic agent3
source                  1..18
                        mol_type = protein
                        organism = Impatiens balsamina
SEQUENCE: 145
RHRCCAWGPG RKYCKRWC                                                18

SEQ ID NO: 146          moltype = AA  length = 18
FEATURE                 Location/Qualifiers
REGION                  1..18
                        note = misc_feature - Ib-antimicrobial peptidic agent4
source                  1..18
                        mol_type = protein
                        organism = Impatiens balsamina
SEQUENCE: 146
GRRCCGWGPG RRYCRRWC                                                18

SEQ ID NO: 147          moltype = AA  length = 14
FEATURE                 Location/Qualifiers
REGION                  1..14
                        note = Synthesis dhvar4
source                  1..14
                        mol_type = protein
                        organism = unidentified
SEQUENCE: 147
KRLFKKLLFS LRKY                                                    14

SEQ ID NO: 148          moltype = AA  length = 14
FEATURE                 Location/Qualifiers
REGION                  1..14
                        note = Synthesis dhvar5
source                  1..14
                        mol_type = protein
                        organism = unidentified
SEQUENCE: 148
LLLFLLKKRK KRKY                                                    14

SEQ ID NO: 149          moltype =     length =
SEQUENCE: 149
000
```

SEQ ID NO: 150        moltype =     length =
SEQUENCE: 150
000

SEQ ID NO: 151        moltype =     length =
SEQUENCE: 151
000

SEQ ID NO: 152        moltype =     length =
SEQUENCE: 152
000

SEQ ID NO: 153        moltype =     length =
SEQUENCE: 153
000

SEQ ID NO: 154        moltype =     length =
SEQUENCE: 154
000

SEQ ID NO: 155        moltype =     length =
SEQUENCE: 155
000

SEQ ID NO: 156        moltype =     length =
SEQUENCE: 156
000

SEQ ID NO: 157        moltype =     length =
SEQUENCE: 157
000

SEQ ID NO: 158        moltype =     length =
SEQUENCE: 158
000

SEQ ID NO: 159        moltype =     length =
SEQUENCE: 159
000

SEQ ID NO: 160        moltype =     length =
SEQUENCE: 160
000

SEQ ID NO: 161        moltype =     length =
SEQUENCE: 161
000

SEQ ID NO: 162        moltype =     length =
SEQUENCE: 162
000

SEQ ID NO: 163        moltype =     length =
SEQUENCE: 163
000

SEQ ID NO: 164        moltype =     length =
SEQUENCE: 164
000

SEQ ID NO: 165        moltype =     length =
SEQUENCE: 165
000

SEQ ID NO: 166        moltype =     length =
SEQUENCE: 166
000

SEQ ID NO: 167        moltype =     length =
SEQUENCE: 167
000

SEQ ID NO: 168        moltype =     length =
SEQUENCE: 168
000

```
SEQ ID NO: 169           moltype =    length =
SEQUENCE: 169
000

SEQ ID NO: 170           moltype =    length =
SEQUENCE: 170
000

SEQ ID NO: 171           moltype =    length =
SEQUENCE: 171
000

SEQ ID NO: 172           moltype =    length =
SEQUENCE: 172
000

SEQ ID NO: 173           moltype =    length =
SEQUENCE: 173
000

SEQ ID NO: 174           moltype =    length =
SEQUENCE: 174
000

SEQ ID NO: 175           moltype = AA   length = 6
FEATURE                  Location/Qualifiers
REGION                   1..6
                         note = Synthesized
source                   1..6
                         mol_type = protein
                         organism = synthetic construct
SEQUENCE: 175
WTFRYC                                                                      6

SEQ ID NO: 176           moltype = AA   length = 6
FEATURE                  Location/Qualifiers
REGION                   1..6
                         note = Synthesized
source                   1..6
                         mol_type = protein
                         organism = synthetic construct
SEQUENCE: 176
CYRFTW                                                                      6

SEQ ID NO: 177           moltype = AA   length = 11
FEATURE                  Location/Qualifiers
source                   1..11
                         mol_type = protein
                         organism = Glomerella cingulata
SEQUENCE: 177
GYFSYPHGNL F                                                               11

SEQ ID NO: 178           moltype = AA   length = 13
FEATURE                  Location/Qualifiers
source                   1..13
                         mol_type = protein
                         organism = Saccharomyces cerevisiae
SEQUENCE: 178
WHWLQLKPGQ PMY                                                             13

SEQ ID NO: 179           moltype = AA   length = 13
FEATURE                  Location/Qualifiers
source                   1..13
                         mol_type = protein
                         organism = Saccharomyces kluyveri
SEQUENCE: 179
WHWLSFSKGQ PMY                                                             13

SEQ ID NO: 180           moltype = AA   length = 19
FEATURE                  Location/Qualifiers
REGION                   1..19
                         note = Synthesized
MOD_RES                  3
                         note = Nle
source                   1..19
                         mol_type = protein
                         organism = synthetic construct
SEQUENCE: 180
YNLEDHPQGD HPKLQLWHW                                                       19
```

```
SEQ ID NO: 181          moltype = AA   length = 15
FEATURE                 Location/Qualifiers
REGION                  1..15
                        note = Synthesized
MOD_RES                 3
                        note = Nle
source                  1..15
                        mol_type = protein
                        organism = synthetic construct
SEQUENCE: 181
YNLEPQGPKL QLWHW                                                      15

SEQ ID NO: 182          moltype = AA   length = 13
FEATURE                 Location/Qualifiers
REGION                  1..13
                        note = Synthesized
source                  1..13
                        mol_type = protein
                        organism = synthetic construct
SEQUENCE: 182
YMPQGPKLQL FHW                                                        13

SEQ ID NO: 183          moltype = AA   length = 12
FEATURE                 Location/Qualifiers
REGION                  1..12
                        note = Synthesized
source                  1..12
                        mol_type = protein
                        organism = synthetic construct
SEQUENCE: 183
YMPQGPKLQL WH                                                         12

SEQ ID NO: 184          moltype = AA   length = 13
FEATURE                 Location/Qualifiers
REGION                  1..13
                        note = Synthesized
source                  1..13
                        mol_type = protein
                        organism = synthetic construct
SEQUENCE: 184
YMPQGPRLNL WHW                                                        13

SEQ ID NO: 185          moltype = AA   length = 26
FEATURE                 Location/Qualifiers
source                  1..26
                        mol_type = protein
                        organism = Magnaporthe grisea
SEQUENCE: 185
MSPSTKNIPA PVAGARAGPI HYCVIM                                          26

SEQ ID NO: 186          moltype = AA   length = 24
FEATURE                 Location/Qualifiers
source                  1..24
                        mol_type = protein
                        organism = Neurospora crassa
SEQUENCE: 186
MPSTAASTRV PQTTMNFNGY CVVM                                            24

SEQ ID NO: 187          moltype = AA   length = 23
FEATURE                 Location/Qualifiers
source                  1..23
                        mol_type = protein
                        organism = Cryphonectria parasitica
SEQUENCE: 187
MPSNTQTSNS SMGVNGYSYC VVM                                             23

SEQ ID NO: 188          moltype = AA   length = 11
FEATURE                 Location/Qualifiers
source                  1..11
                        mol_type = protein
                        organism = Magnaporthe grisea
SEQUENCE: 188
QWCPRRGQPC W                                                          11

SEQ ID NO: 189          moltype = AA   length = 11
FEATURE                 Location/Qualifiers
```

```
source                      1..11
                            mol_type = protein
                            organism = Neurospora crassa
SEQUENCE: 189
QWCRIHGQSC W                                                            11

SEQ ID NO: 190              moltype = AA  length = 13
FEATURE                     Location/Qualifiers
source                      1..13
                            mol_type = protein
                            organism = Saccharomyces cerevisiae
SEQUENCE: 190
WHWLQLKPGQ PMY                                                          13

SEQ ID NO: 191              moltype = AA  length = 10
FEATURE                     Location/Qualifiers
source                      1..10
                            mol_type = protein
                            organism = Cryphonectria parasitica
SEQUENCE: 191
WCLFHGEGCW                                                              10

SEQ ID NO: 192              moltype =   length =
SEQUENCE: 192
000

SEQ ID NO: 193              moltype = AA  length = 10
FEATURE                     Location/Qualifiers
REGION                      1..10
                            note = Synthesized
REGION                      3..4
                            note = Misc_feature - X = any amino acid
REGION                      6..8
                            note = Misc_feature - X = any amino acid
source                      1..10
                            mol_type = protein
                            organism = synthetic construct
SEQUENCE: 193
WCXXGXXXCW                                                              10

SEQ ID NO: 194              moltype =   length =
SEQUENCE: 194
000

SEQ ID NO: 195              moltype = AA  length = 10
FEATURE                     Location/Qualifiers
source                      1..10
                            mol_type = protein
                            organism = Fusarium graminearum
SEQUENCE: 195
WCQQKGQPCW                                                              10

SEQ ID NO: 196              moltype = AA  length = 10
FEATURE                     Location/Qualifiers
source                      1..10
                            mol_type = protein
                            organism = Fusarium graminearum
SEQUENCE: 196
WCTWKGQPCW                                                              10

SEQ ID NO: 197              moltype = AA  length = 7
FEATURE                     Location/Qualifiers
REGION                      1..7
                            note = Synthesized
source                      1..7
                            mol_type = protein
                            organism = synthetic construct
SEQUENCE: 197
FRLKFHF                                                                 7

SEQ ID NO: 198              moltype = AA  length = 6
FEATURE                     Location/Qualifiers
REGION                      1..6
                            note = Synthesized
source                      1..6
                            mol_type = protein
                            organism = synthetic construct
SEQUENCE: 198
FRLKHI                                                                  6
```

```
SEQ ID NO: 199        moltype = AA  length = 5
FEATURE               Location/Qualifiers
REGION                1..5
                      note = Synthesized
source                1..5
                      mol_type = protein
                      organism = synthetic construct
SEQUENCE: 199
FRLHF                                                                   5

SEQ ID NO: 200        moltype = AA  length = 6
FEATURE               Location/Qualifiers
REGION                1..6
                      note = Synthesized
source                1..6
                      mol_type = protein
                      organism = synthetic construct
SEQUENCE: 200
KLKFKL                                                                  6

SEQ ID NO: 201        moltype = AA  length = 4
FEATURE               Location/Qualifiers
REGION                1..4
                      note = Synthesized
source                1..4
                      mol_type = protein
                      organism = synthetic construct
SEQUENCE: 201
KLKL                                                                    4
```

What is claimed is:

1. A method for reducing microbial growth in an uncured polymeric coating material during storage prior to curing, comprising:
admixing an antibiological additive with the uncured polymeric coating material to provide an antibiological-functionalized coating material, wherein the antibiological additive comprises an antibiological peptidic biomolecule and a reactive oxygen based compound producing biomolecule; and wherein the uncured polymeric coating material is at least one selected from a coating, a plastic, an elastomer, a composite, a laminate, an adhesive, a sealant and a textile finish, wherein the antibiological peptidic biomolecule comprises SEQ. ID NO: 40, wherein the reactive oxygen based compound producing biomolecule is selected from the group consisting of: a lactoferrin, a peroxidase, a glucose oxidase, a laccase, and any combination thereof.

2. The method of claim 1, wherein the antibiological additive further comprises a small molecule selected from the group consisting of: citral, monolaurin, and any combination thereof.

3. The method of claim 1, wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material.

4. The method of claim 3, further comprising:
storing at least a portion of the antibiological-functionalized coating material within a container such that the functionalized level of microbial metabolic activity of the antibiological-functionalized coating material promotes shelflife performance of the antibiological-functionalized coating material by suppressing growth of the at least one target microorganism within the antibiological-functionalized coating material while stored within the container.

5. The method of claim 3, wherein the at least one target microorganism is selected from the group consisting of: *Alcaligenes faecalis, Aspergillus* sp., *Bacillus cereus, Enterobacter aerogenes, Fusarium oxysporium, Microbacterium paraoxydans, Micrococcus lysodeikticus, Pseudomonas aeruginosa, Pseudomonas alcaliphila, Pseudomonas fluorescens, Pseudomonas oleovorans, Pseudomonas putida, Stenotrophomonas maltophila*, and any combination thereof.

6. The method of claim 1, wherein the uncured polymeric coating material comprises an acrylic latex.

7. The method of claim 1, wherein a non-biobased antibiological substance is not added to the uncured polymeric coating material when producing the antibiological-functionalized coating material.

8. A method for reducing microbial growth in an uncured polymeric coating material, the method comprising:
applying an antibiological-functionalized coating material to a surface, the antibiological-functionalized coating material comprising an uncured polymeric coating material and an antibiological additive, wherein the antibiological additive comprises an antibiological peptidic biomolecule and a reactive oxygen based compound producing biomolecule, wherein the reactive oxygen based compound producing biomolecule is selected from the group consisting of: a lactoferrin, a peroxidase, a glucose oxidase, a laccase, and any combination thereof, and wherein the uncured polymeric coating material is at least one selected from a coating, a plastic, an elastomer, a composite, a laminate, an adhesive, a sealant, and a textile finish; and
curing the uncured polymeric coating material to produce cured film layer comprising a cured polymeric material and the antibiological additive, wherein the antibiological peptidic biomolecule comprises SEQ. ID NO: 40.

9. The method of claim 8, wherein the antibiological additive further comprises a small molecule selected from the group consisting of: citral, monolaurin, and any combination thereof.

10. The method of claim 8, wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material.

11. The method of claim 8, wherein the uncured polymeric coating material comprises an acrylic latex.

12. An antibiological-functionalized coating material effective in reducing microbial growth in an uncured polymeric coating material, the antibiological-functionalized coating material comprising:
  uncured polymeric coating material that is at least one selected from a coating, a plastic, an elastomer, a composite, a laminate, an adhesive, a sealant and a textile finish; and
  an antibiological additive comprising an antibiological peptidic biomolecule and a reactive oxygen based compound producing biomolecule,
  wherein the reactive oxygen based compound producing biomolecule is selected from the group consisting of: a lactoferrin, a peroxidase, a glycose oxidase, a laccase, and any combination thereof, and
  wherein the antibiological peptidic biomolecule comprises SEQ. ID NO: 40.

13. The antibiological-functionalized coating material of claim 12, wherein the antibiological additive further comprises a small molecule selected from the group consisting of: citral, monolaurin, and any combination thereof.

14. The antibiological-functionalized coating material of claim 12, wherein the antibiological additive is present within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material.

15. The antibiological-functionalized coating material of claim 12, wherein the uncured polymeric coating material is a coating that is a latex paint, an acrylic paint, or a water-based latex paint.

16. The antibiological-functionalized coating material of claim 14, wherein the at least one target microorganism is selected from the group consisting of: *Alcaligenes faecalis, Aspergillus* sp., *Bacillus cereus, Enterobacter aerogenes, Fusarium oxysporium, Microbacterium paraoxydans, Micrococcus lysodeikticus, Pseudomonas aeruginosa, Pseudomonas alcaliphila, Pseudomonas fluorescens, Pseudomonas oleovorans, Pseudomonas putida, Stenotrophomonas maltophila*, and any combination thereof.

17. A method for reducing microbial growth in an uncured polymeric coating material during storage prior to curing, comprising:
  admixing an antibiological additive with the uncured polymeric coating material to provide an antibiological-functionalized coating material, wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material; wherein the antibiological additive comprises an antibiological peptidic biomolecule and a reactive oxygen based compound producing biomolecule; wherein the reactive oxygen based compound producing biomolecule is selected from the group consisting of: a lactoferrin, a peroxidase, a glucose oxidase, a laccase, and any combination thereof, and wherein the uncured polymeric coating material is at least one selected from a coating, a plastic, an elastomer, a composite, a laminate, an adhesive, a sealant and a textile finish, and wherein the uncured polymeric coating material comprises an acrylic latex.

18. The method of claim 17, wherein the antibiological additive further comprises a small molecule selected from the group consisting of: citral, monolaurin, and any combination thereof.

19. The method of claim 17, further comprising:
  storing at least a portion of the antibiological-functionalized coating material within a container such that the functionalized level of microbial metabolic activity of the antibiological-functionalized coating material promotes shelflife performance of the antibiological-functionalized coating material by suppressing growth of the at least one target microorganism within the antibiological-functionalized coating material while stored within the container.

20. The method of claim 17, wherein the at least one target microorganism is selected from the group consisting of: *Alcaligenes faecalis, Aspergillus* sp., *Bacillus cereus, Enterobacter aerogenes, Fusarium oxysporium, Microbacterium paraoxydans, Micrococcus lysodeikticus, Pseudomonas aeruginosa, Pseudomonas alcaliphila, Pseudomonas fluorescens, Pseudomonas oleovorans, Pseudomonas putida, Stenotrophomonas maltophila*, and any combination thereof.

21. The method of claim 17, wherein a non-biobased antibiological substance is not added to the uncured polymeric coating material when producing the antibiological-functionalized coating material.

22. A method for reducing microbial growth in an uncured polymeric coating material, the method comprising:
  applying an antibiological-functionalized coating material to a surface, the antibiological-functionalized coating material comprising an uncured polymeric coating material and an antibiological additive, wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material, wherein the antibiological additive comprises an antibiological peptidic biomolecule and a reactive oxygen based compound producing biomolecule, wherein the reactive oxygen based compound producing biomolecule is selected from the group consisting of: a lactoferrin, a peroxidase, a glucose oxidase, a laccase, and any combination thereof, and wherein the uncured polymeric coating material is at least one selected from a coating, a plastic, an elastomer, a composite, a laminate, an adhesive, a sealant, and a textile finish; and curing the uncured polymeric coating material to produce cured film layer comprising a cured polymeric material and the antibiological additive, and wherein the uncured polymeric coating material comprises an acrylic latex.

23. The method of claim 22, wherein the antibiological additive further comprises a small molecule selected from the group consisting of: citral, monolaurin, and any combination thereof.

24. An antibiological-functionalized coating material effective in reducing microbial growth in an uncured polymeric coating material, comprising:

an uncured polymeric coating material that is at least one selected from a coating, a plastic, an elastomer, a composite, a laminate, an adhesive, a sealant and a textile finish; and an antibiological additive comprising an antibiological peptidic biomolecule, a reactive oxygen based compound producing biomolecule, and a small molecule, wherein the small molecule is selected from the group consisting of: citral, monolaurin, and any combination thereof, and wherein the antibiological peptidic biomolecule comprises SEQ. ID NO: 40.

25. The antibiological-functionalized coating material of claim 24, wherein the uncured polymeric coating material is a coating that is a latex paint, an acrylic paint, or a water-based latex paint.

26. The antibiological-functionalized coating material of claim 24, wherein the antibiological additive is present within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material.

27. The antibiological-functionalized coating material of claim 26, wherein the at least one target microorganism is selected from the group consisting of: *Alcaligenes faecalis*, *Aspergillus* sp., *Bacillus cereus*, *Enterobacter aerogenes*, *Fusarium oxysporium*, *Microbacterium paraoxydans*, *Micrococcus lysodeikticus*, *Pseudomonas aeruginosa*, *Pseudomonas alcaliphila*, *Pseudomonas fluorescens*, *Pseudomonas oleovorans*, *Pseudomonas putida*, *Stenotrophomonas maltophila*, and any combination thereof.

28. An antibiological-functionalized coating material effective in reducing microbial growth in an uncured polymeric coating material, the antibiological-functionalized coating material comprising:

uncured polymeric coating material that is at least one selected from a coating, a plastic, an elastomer, a composite, a laminate, an adhesive, a sealant and a textile finish; and an antibiological additive comprising an antibiological peptidic biomolecule and a reactive oxygen based compound producing biomolecule, wherein the antibiological additive is present within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material, wherein the reactive oxygen based compound producing biomolecule is selected from the group consisting of: a lactoferrin, a peroxidase, a glycose oxidase, a laccase, and any combination thereof, and wherein the uncured polymeric coating material comprises an acrylic latex.

29. The antibiological-functionalized coating material of claim 28, wherein the antibiological additive further comprises a small molecule selected from the group consisting of: citral, monolaurin, and any combination thereof.

30. A method for reducing microbial growth in an uncured polymeric coating material, the method comprising:

applying an antibiological-functionalized coating material to a surface, the antibiological-functionalized coating material comprising an uncured polymeric coating material and an antibiological additive, wherein the antibiological additive comprises an antibiological peptidic biomolecule, a reactive oxygen based compound producing biomolecule, and a small molecule, wherein the small molecule is selected from the group consisting of: citral, monolaurin, and any combination thereof, and wherein the uncured polymeric coating material is at least one selected from a coating, a plastic, an elastomer, a composite, a laminate, an adhesive, a sealant, and a textile finish; and curing the uncured polymeric coating material to produce cured film layer comprising a cured polymeric material and the antibiological additive, wherein the antibiological peptidic biomolecule comprises SEQ. ID NO: 40.

31. The method of claim 30, wherein the uncured polymeric coating material comprises an acrylic latex.

32. A method for reducing microbial growth in an uncured polymeric coating material during storage prior to curing, comprising:

admixing an antibiological additive with the uncured polymeric coating material to provide an antibiological-functionalized coating material, wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material, wherein the antibiological additive comprises an antibiological peptidic biomolecule, a reactive oxygen based compound producing biomolecule, and a small molecule, wherein the small molecule is selected from the group consisting of: citral, monolaurin, and any combination thereof, and wherein the uncured polymeric coating material is at least one selected from a coating, a plastic, an elastomer, a composite, a laminate, an adhesive, a sealant and a textile finish, and wherein the uncured polymeric coating material comprises an acrylic latex.

33. A method for reducing microbial growth in an uncured polymeric coating material during storage prior to curing, comprising:

admixing an antibiological additive with the uncured polymeric coating material to provide an antibiological-functionalized coating material, wherein the antibiological additive comprises an antibiological peptidic biomolecule and a reactive oxygen based compound producing biomolecule; wherein the reactive oxygen based compound producing biomolecule is selected from the group consisting of: a lactoferrin, a peroxidase, a glucose oxidase, a laccase, and any combination thereof; wherein the uncured polymeric coating material is at least one selected from a coating, a plastic, an elastomer, a composite, a laminate, an adhesive, a sealant and a textile finish; wherein the uncured polymeric coating material comprises an acrylic latex; wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material; and wherein the at least one target microorganism is selected from the group consisting of: *Alcaligenes faecalis, Aspergillus* sp., *Bacillus cereus, Enterobacter aerogenes, Fusarium oxysporium, Microbacterium paraoxydans, Micrococcus lysodeikticus, Pseudomonas aeruginosa, Pseudomonas alcaliphila, Pseudomonas fluorescens, Pseudomonas oleovorans, Pseudomonas putida, Stenotrophomonas maltophila,* and any combination thereof.

34. A method for reducing microbial growth in an uncured polymeric coating material, the method comprising:

applying an antibiological-functionalized coating material to a surface, the antibiological-functionalized coating material comprising an uncured polymeric coating material and an antibiological additive, wherein the antibiological additive comprises an antibiological peptidic biomolecule, a reactive oxygen based compound producing biomolecule, and a small molecule, wherein the small molecule is selected from the group consisting of: citral, monolaurin, and any combination thereof, and wherein the uncured polymeric coating material is at least one selected from a coating, a plastic, an elastomer, a composite, a laminate, an adhesive, a sealant, and a textile finish, and wherein the antibiological additive is admixed within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material; and curing the uncured polymeric coating material to produce a cured film layer comprising a cured polymeric material and the antibiological additive, and wherein the uncured polymeric coating material comprises an acrylic latex.

35. An antibiological-functionalized coating material effective in reducing microbial growth in an uncured polymeric coating material, the antibiological-functionalized coating material comprising:

an uncured polymeric coating material that is at least one selected from a coating, a plastic, an elastomer, a composite, a laminate, an adhesive, a sealant and a textile finish; and an antibiological additive comprises an antibiological peptidic biomolecule, a reactive oxygen based compound producing biomolecule, and a small molecule, wherein the antibiological additive is present within the uncured polymeric coating material at a concentration sufficient to enable the antibiological-functionalized coating material to provide a functionalized level of microbial metabolic activity for at least one target microorganism within the antibiological-functionalized coating material that is at least 60% less than a baseline level of microbial metabolic activity for the at least one target microorganism within the uncured polymeric coating material, wherein the small molecule is selected from the group consisting of: citral, monolaurin, and any combination thereof, and wherein the uncured polymeric coating material comprises an acrylic latex.

* * * * *